United States Patent [19]
Thomas et al.

[11] Patent Number: 5,995,995
[45] Date of Patent: Nov. 30, 1999

[54] APPARATUS AND METHOD FOR SCHEDULING VIRTUAL CIRCUIT DATA FOR DMA FROM A HOST MEMORY TO A TRANSMIT BUFFER MEMORY

[75] Inventors: Robert E. Thomas, Hudson; Robert J. Simcoe, Westborough; Peter J. Roman, Hopkinton; Anna Charny; Wing Cheung, both of Sudbury, all of Mass.

[73] Assignee: Cabletron Systems, Inc., Rochester, N.H.

[21] Appl. No.: 08/712,698

[22] Filed: Sep. 12, 1996

[51] Int. Cl.[6] .................................................. G06F 9/00
[52] U.S. Cl. .................. 709/100; 709/101; 709/104; 709/105
[58] Field of Search .............................. 395/200.19, 671, 395/674, 675; 709/100, 101, 104, 105

[56] References Cited

U.S. PATENT DOCUMENTS

| | | | |
|---|---|---|---|
| 5,115,429 | 5/1992 | Hluchyj | 370/84 |
| 5,153,884 | 10/1992 | Lucak et al. | 371/32 |
| 5,247,626 | 9/1993 | Firoozmand | 395/250 |
| 5,274,768 | 12/1993 | Traw et al. | 395/275 |
| 5,280,475 | 1/1994 | Yanagi et al. | 370/60 |
| 5,313,454 | 5/1994 | Bustini et al. | 370/13 |
| 5,404,536 | 4/1995 | Ramakrishnan et al. | 395/725 |
| 5,412,782 | 5/1995 | Hausman et al. | 395/250 |
| 5,426,635 | 6/1995 | Mitra et al. | 370/60 |
| 5,440,690 | 8/1995 | Rege et al. | 395/200.02 |
| 5,463,620 | 10/1995 | Sriram | 370/60 |
| 5,504,900 | 4/1996 | Raz | 395/650 |
| 5,515,359 | 5/1996 | Zheng | 370/13 |
| 5,515,363 | 5/1996 | Ben-Nun et al. | 370/17 |
| 5,528,587 | 6/1996 | Galand et al. | 370/60 |
| 5,528,591 | 6/1996 | Lauer | 370/60.1 |
| 5,530,806 | 6/1996 | Condon et al. | 395/185.02 |
| 5,530,874 | 6/1996 | Emery et al. | 395/735 |
| 5,579,312 | 11/1996 | Regache | 370/60.1 |
| 5,592,476 | 1/1997 | Calamvokis et al. | 370/390 |
| 5,594,729 | 1/1997 | Kanakia et al. | 370/391 |
| 5,606,559 | 2/1997 | Badger et al. | 370/395 |
| 5,610,921 | 3/1997 | Christensen | 370/395 |
| 5,623,605 | 4/1997 | Keshav et al. | 395/200.17 |
| 5,629,937 | 5/1997 | Hayter et al. | 370/233 |
| 5,633,870 | 5/1997 | Gaytan et al. | 370/235 |
| 5,649,110 | 7/1997 | Ben-Nun et al. | 395/200.19 |
| 5,650,993 | 7/1997 | Lakshman et al. | 370/236 |
| 5,687,316 | 11/1997 | Graziano et al. | 395/200.2 |
| 5,694,390 | 12/1997 | Yamato et al. | 370/230 |
| 5,701,291 | 12/1997 | Roberts | 370/232 |
| 5,701,480 | 12/1997 | Raz | 395/671 |
| 5,708,799 | 1/1998 | Gafken et al. | 395/500 |
| 5,712,976 | 1/1998 | Falcon, Jr. et al. | 395/200.09 |
| 5,715,250 | 2/1998 | Watanabe | 370/395 |
| 5,721,955 | 2/1998 | Cedros et al. | 395/853 |
| 5,724,513 | 3/1998 | Ben-Nun et al. | 395/200.13 |
| 5,726,640 | 3/1998 | Jones et al. | |
| 5,726,985 | 3/1998 | Daniel et al. | 370/382 |
| 5,737,313 | 4/1998 | Kolarov et al. | 370/234 |

OTHER PUBLICATIONS

B.R. Venkatraman, R.E. Newman–Wolfe, "Transmission Schedules to Prevent Traffic Analysis"; IEEE Comput. Sco. Press, Los Alamitos, CA, pp. 108–115 Dec. 1993.

Smith, et al., "Giving Applications Access to BGS Networking" IEEE Network, pp. 44–55 Jul. 1993.

You et al., "A Study On The Performance Of A Frame Relay network Adapter For An Information Service Access Point" IEEE ICCS, pp. 1175–1179 1994.

*Primary Examiner*—Majid A. Banankah
*Attorney, Agent, or Firm*—Wolf, Greenfield & Sacks, P.C.

[57] ABSTRACT

A method of scheduling the transmission of cells from a network node involves storing entries in a schedule table at predetermined locations, wherein each location represents a point in time at which a cell is to be transmitted. Each entry in the table contains a pointer to a list of virtual circuits having cells scheduled for transmission at the time corresponding to the location of the entry in the table. When a VC has a cell to be transmitted at a particular time, the VC is queued to the head, rather than the tail, of the list of VCs pointed to by the pointer located at the entry in the table corresponding to the time at which the cell is to be transmitted. The VC is therefore the first VC transmitted from the list of VCs.

17 Claims, 79 Drawing Sheets

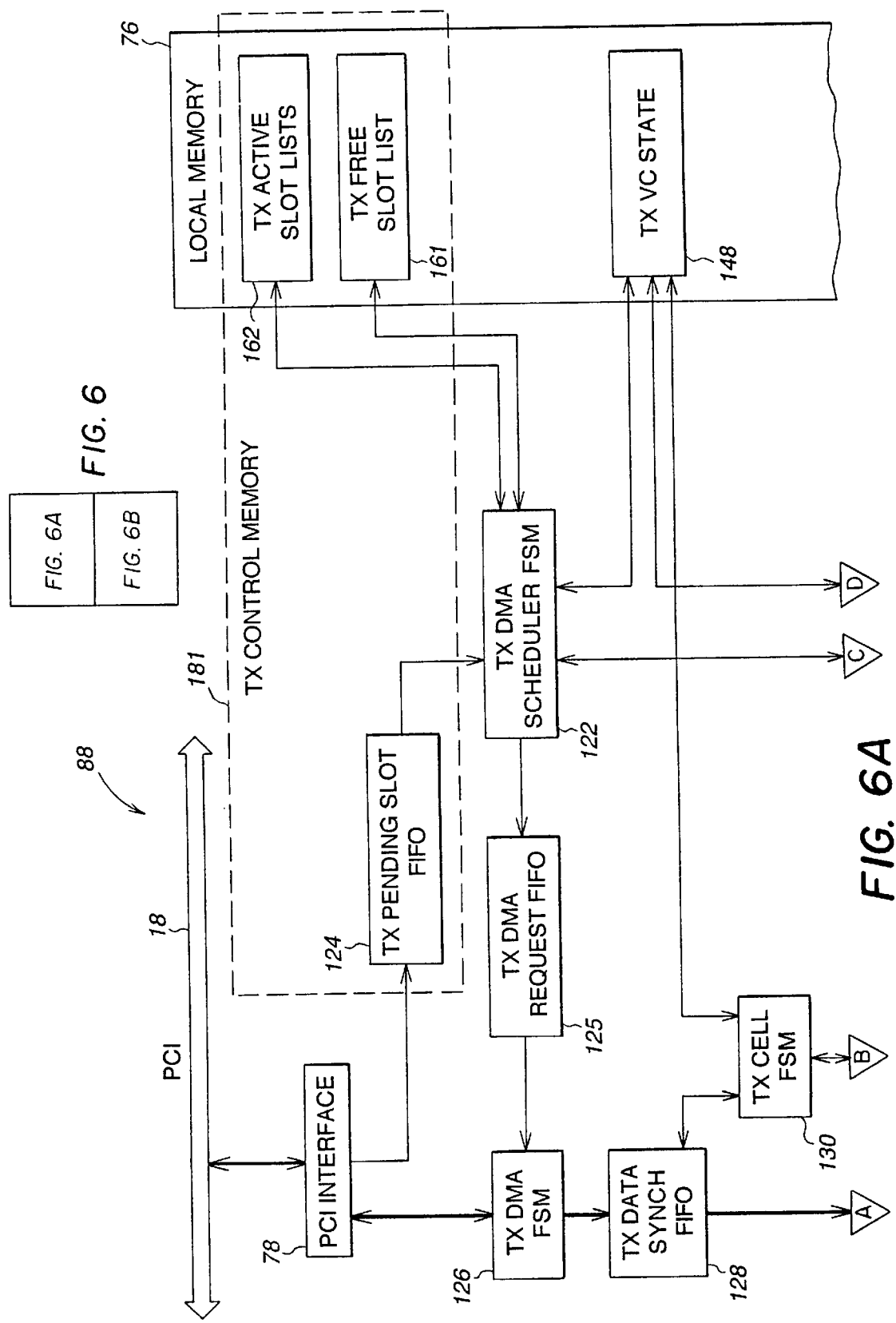

TX DMA REQUEST FIFO: DATA DMA REQUEST ENTRY

350

| 376 | 374 | 372 | 370 | 368 | 366 | 364 | 362 | 360 | 358 | 356 |
|---|---|---|---|---|---|---|---|---|---|---|
| CBR | ADD_MPEG TRAILER | EOC | INT | DMA_SIZE >0 | EOP | CRC_ENA | CLP | RM (=0) | SCHED_TIME | VC |
| RESERVED | | | | | | | | | | |

WORD 0
WORD 1

DMA_ADDRESS
378

FIG. 19a

TX DMA REQUEST FIFO: IDLE SLOT REPORT REQUEST ENTRY

352

| 384 | 382 | 380 |
|---|---|---|
| RESERVED | DMA_SIZE =0 | RESERVED | RM (=0) | RESERVED | VC |
| RESERVED | | |

WORD 0
WORD 1

FIG. 19b

TX DMA REQUEST FIFO: RM CELL REQUEST ENTRY

354

| 394 | 392 | 390 | 388 | 386 |
|---|---|---|---|---|
| RESERVED | FORWARD | CLP | RM (=1) | SCHED_TIME | VC |
| RESERVED | | | | |

WORD 0
WORD 1

FIG. 19c

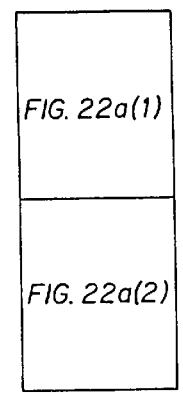
FIG. 22a
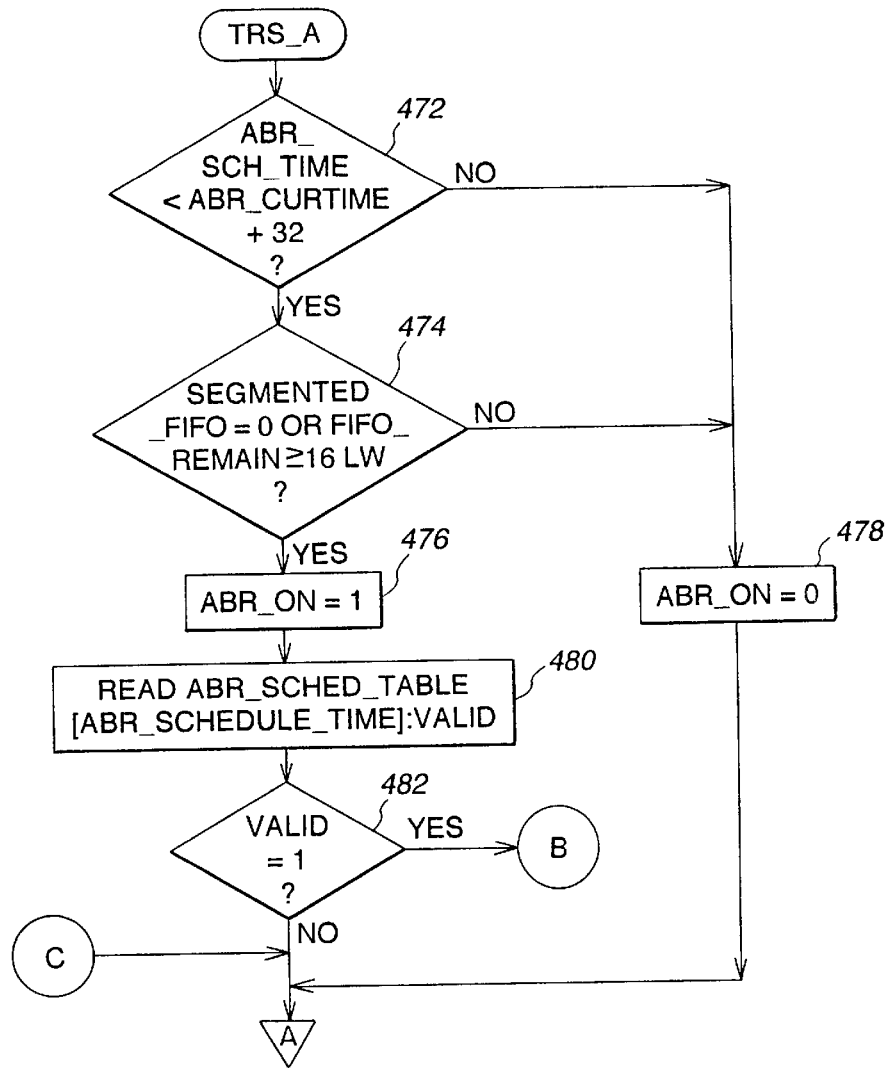
FIG. 22a(1)

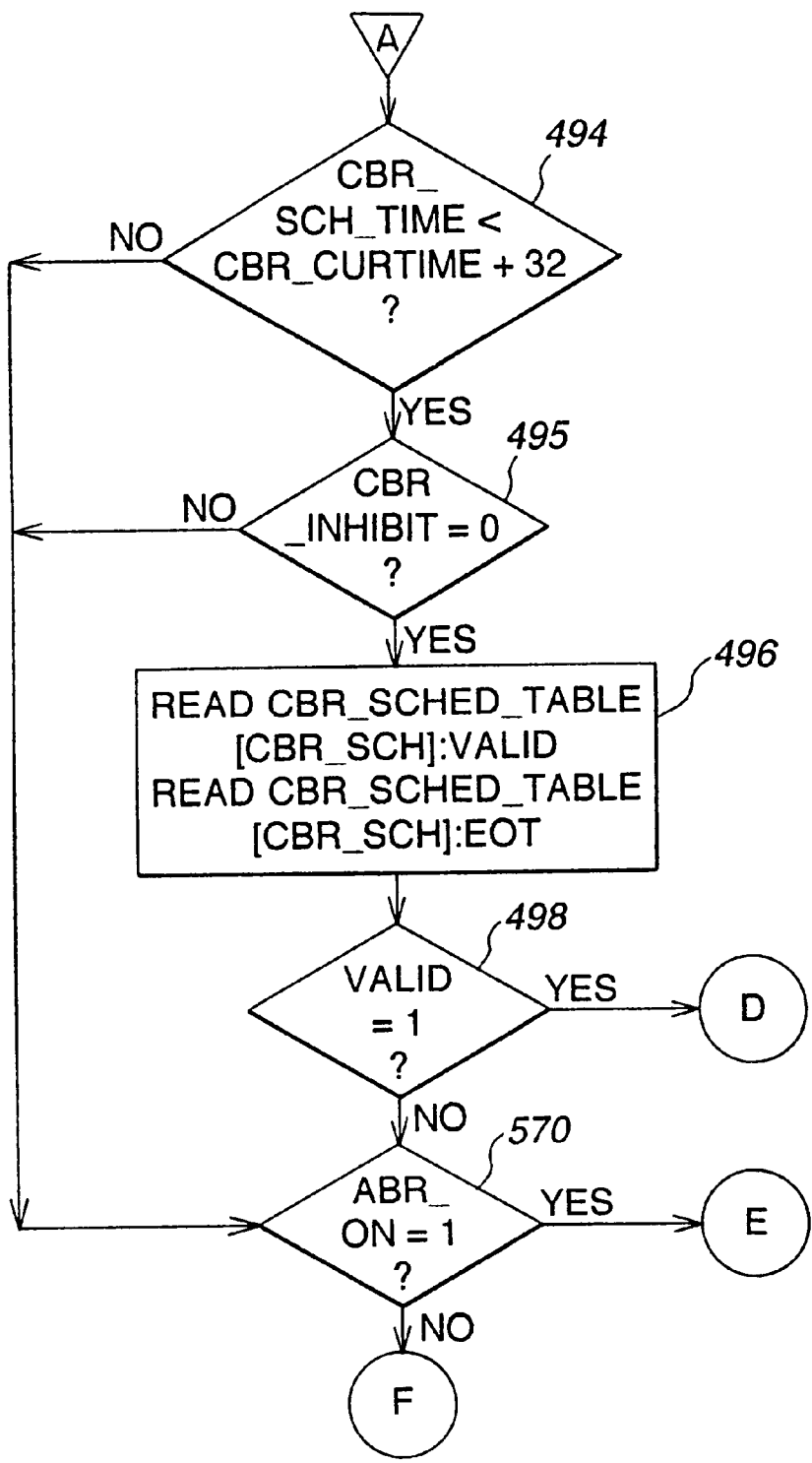
FIG. 22a(2)

FIG. 22i
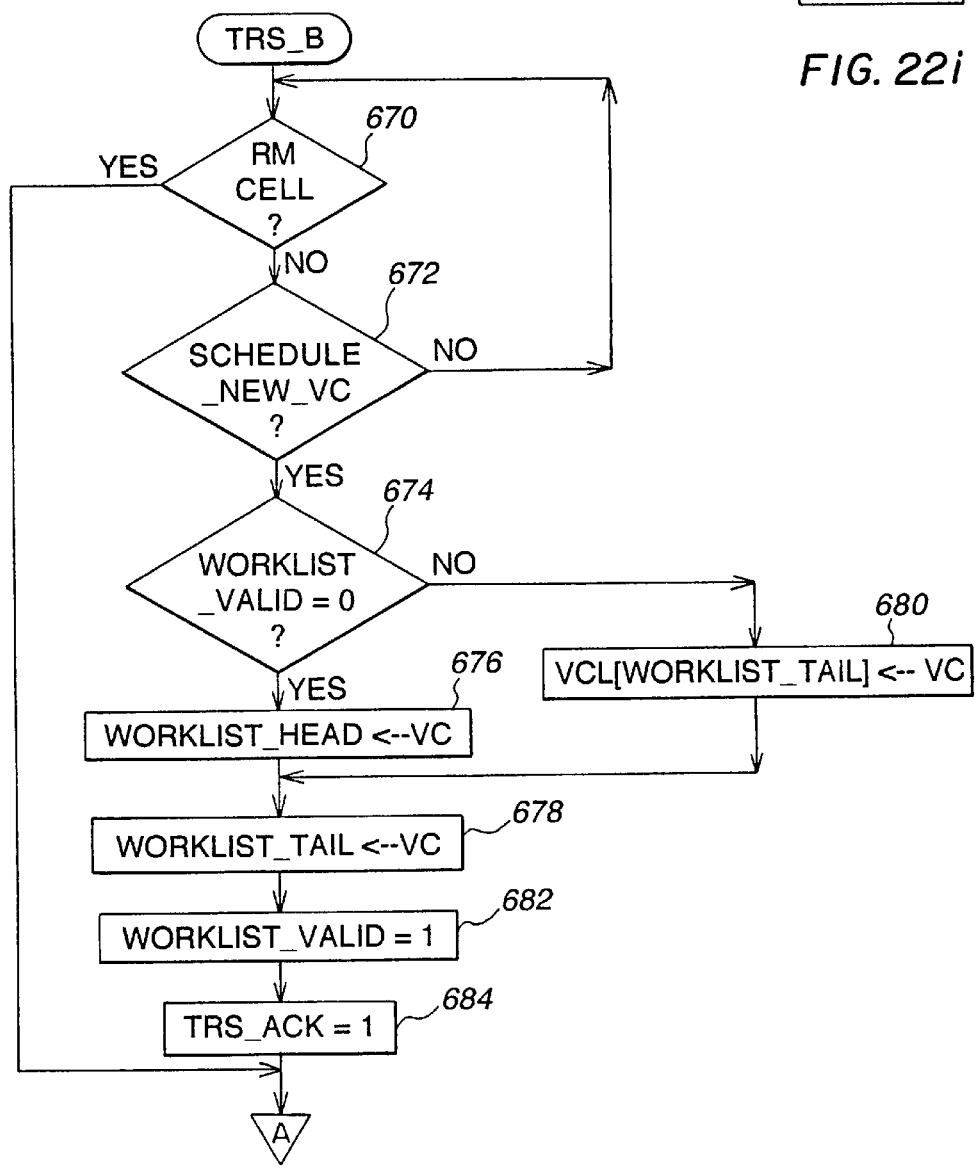
FIG. 22i(1)

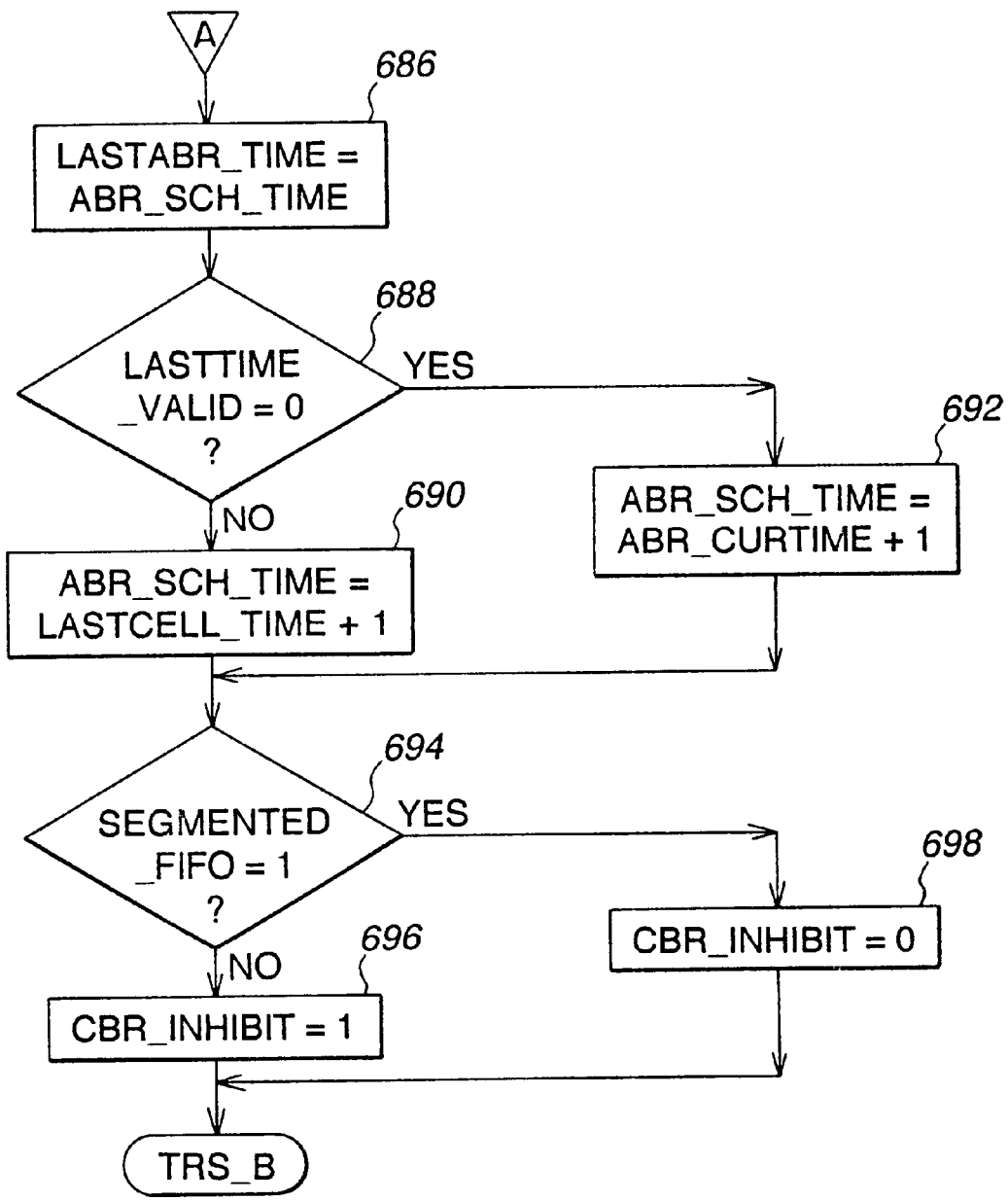
FIG. 22i(2)

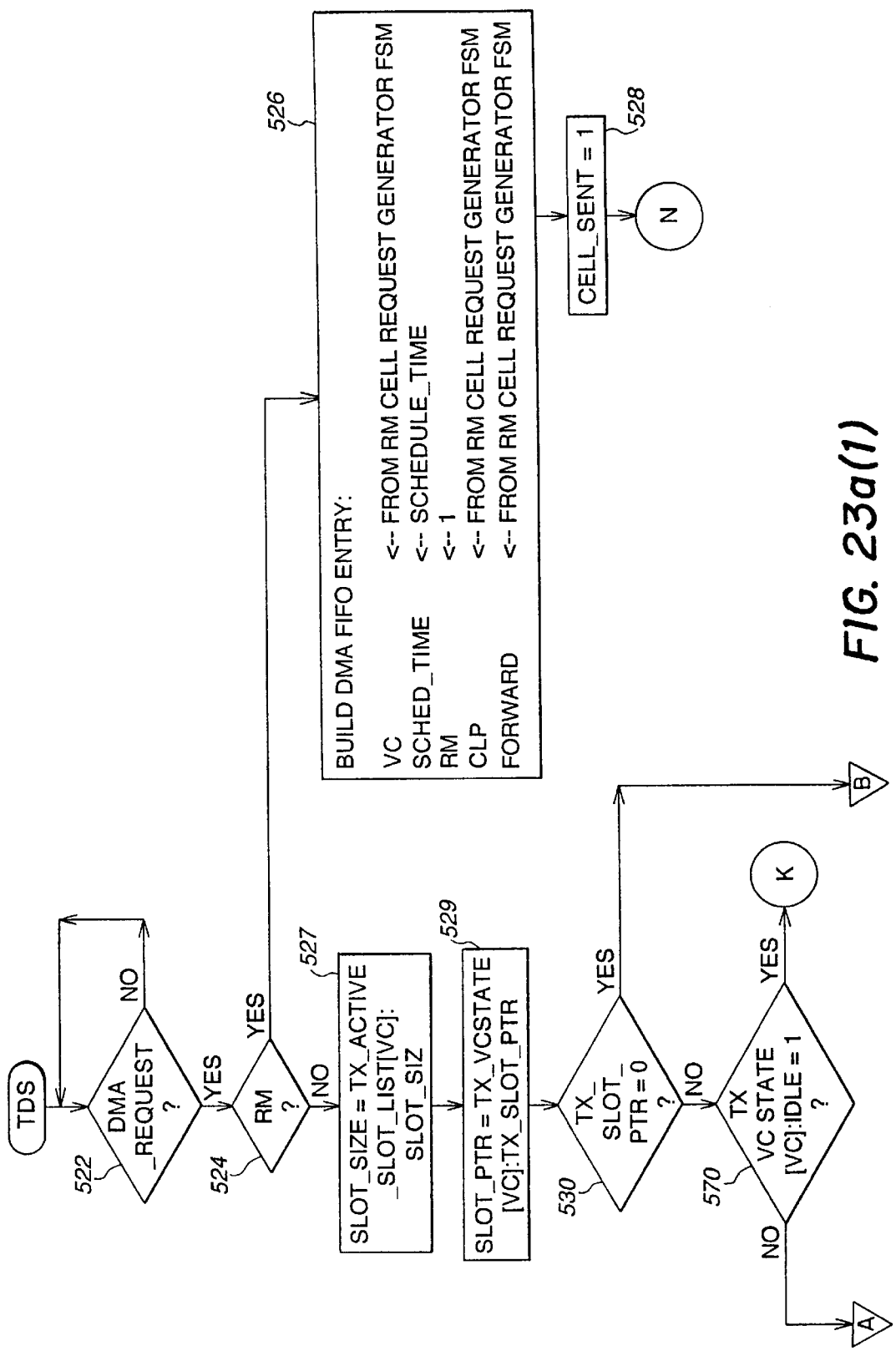
FIG. 23a(1)

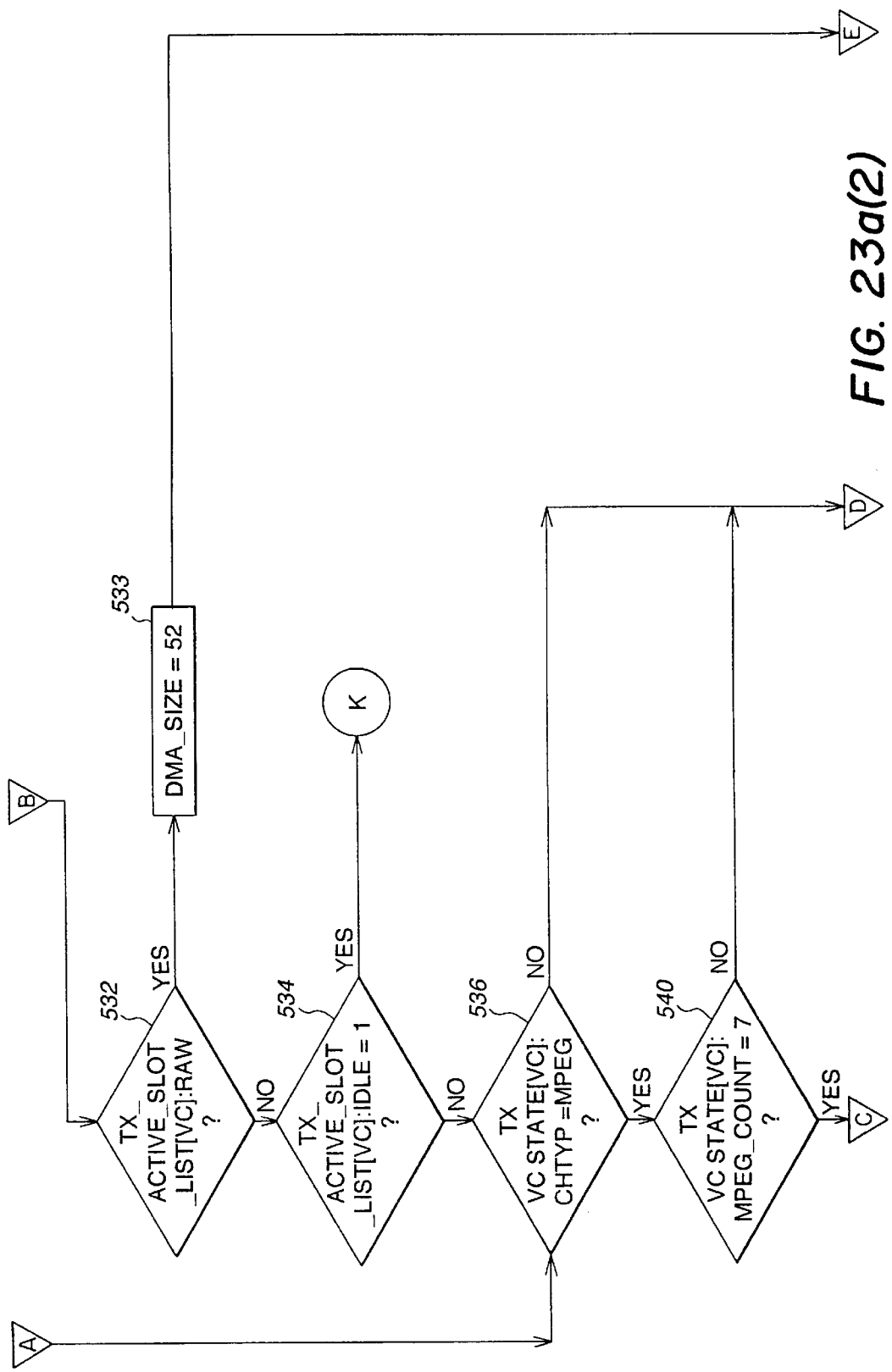
FIG. 23a(2)

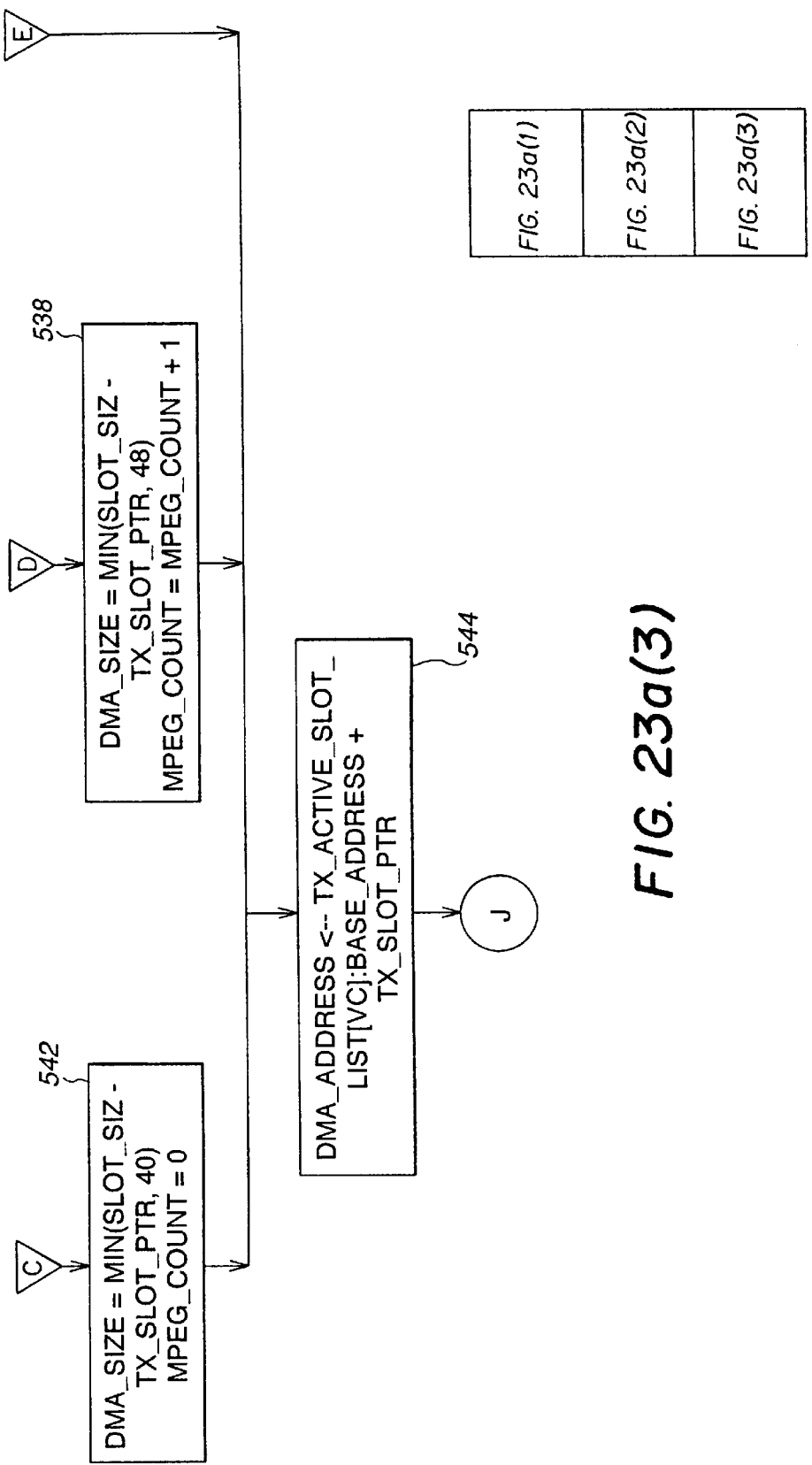

TX DATA SYNCH FIFO SOC CONTROL LONGWORD

TX DATA FIFO SOC CONTROL LONGWORD

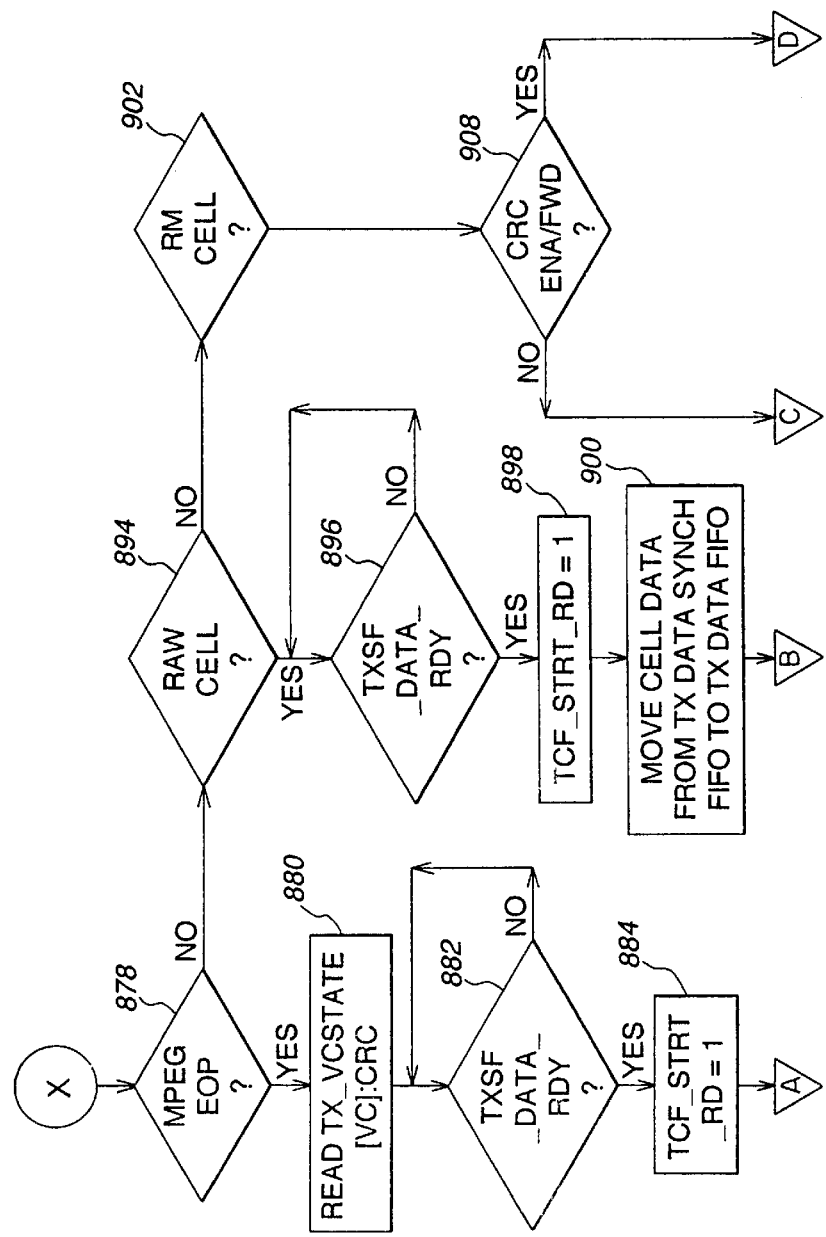

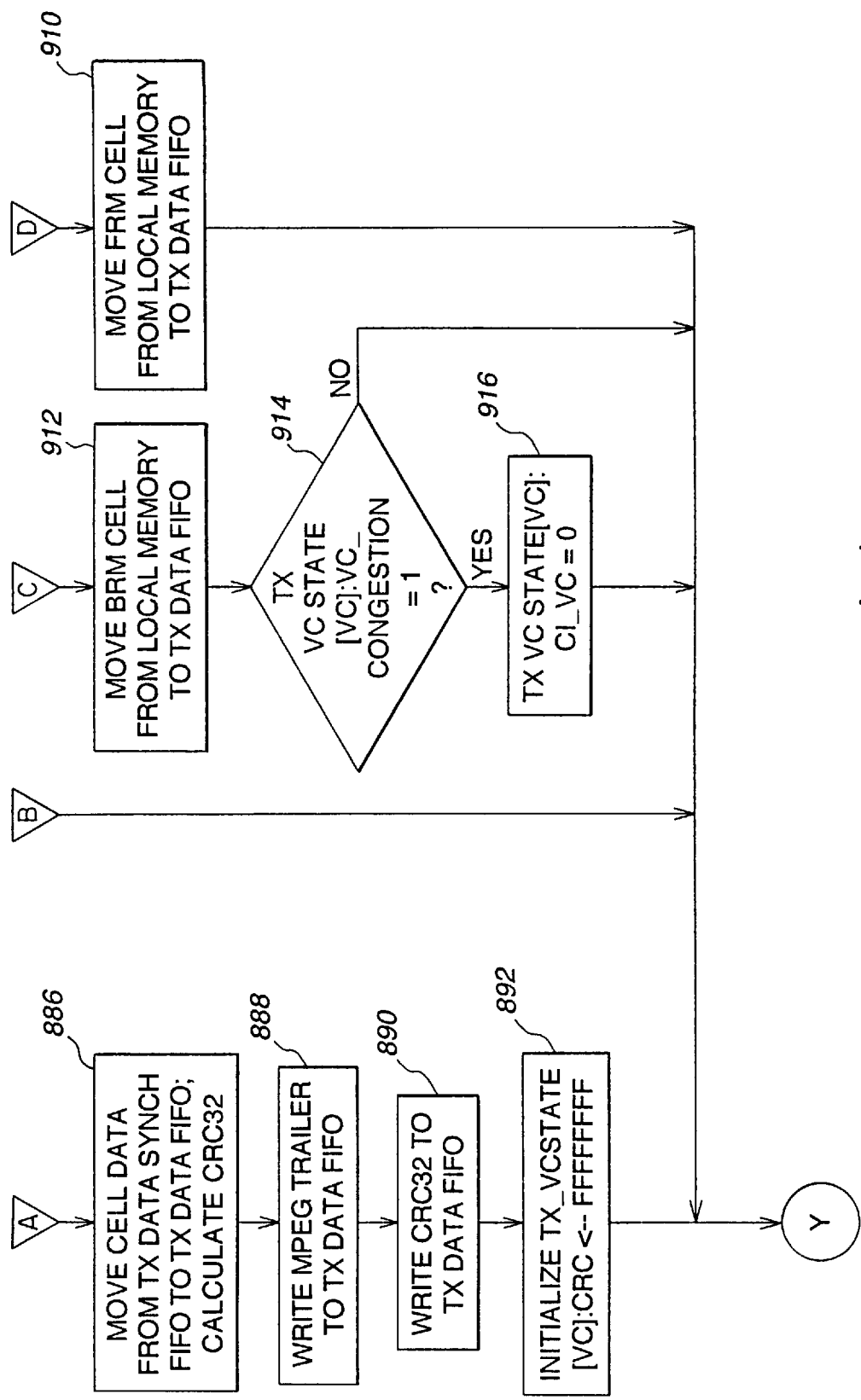
FIG. 28c(2)

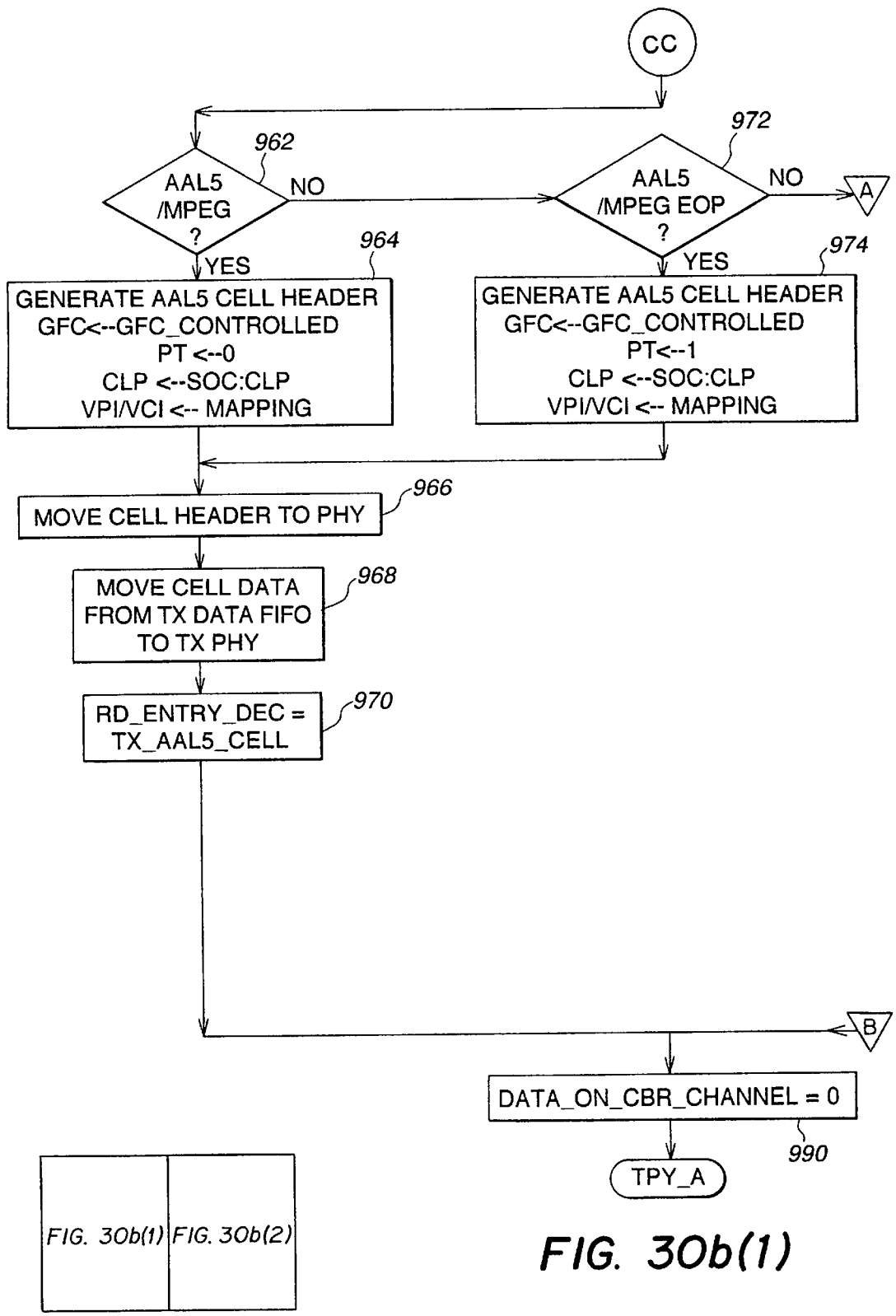
FIG. 30b(1)

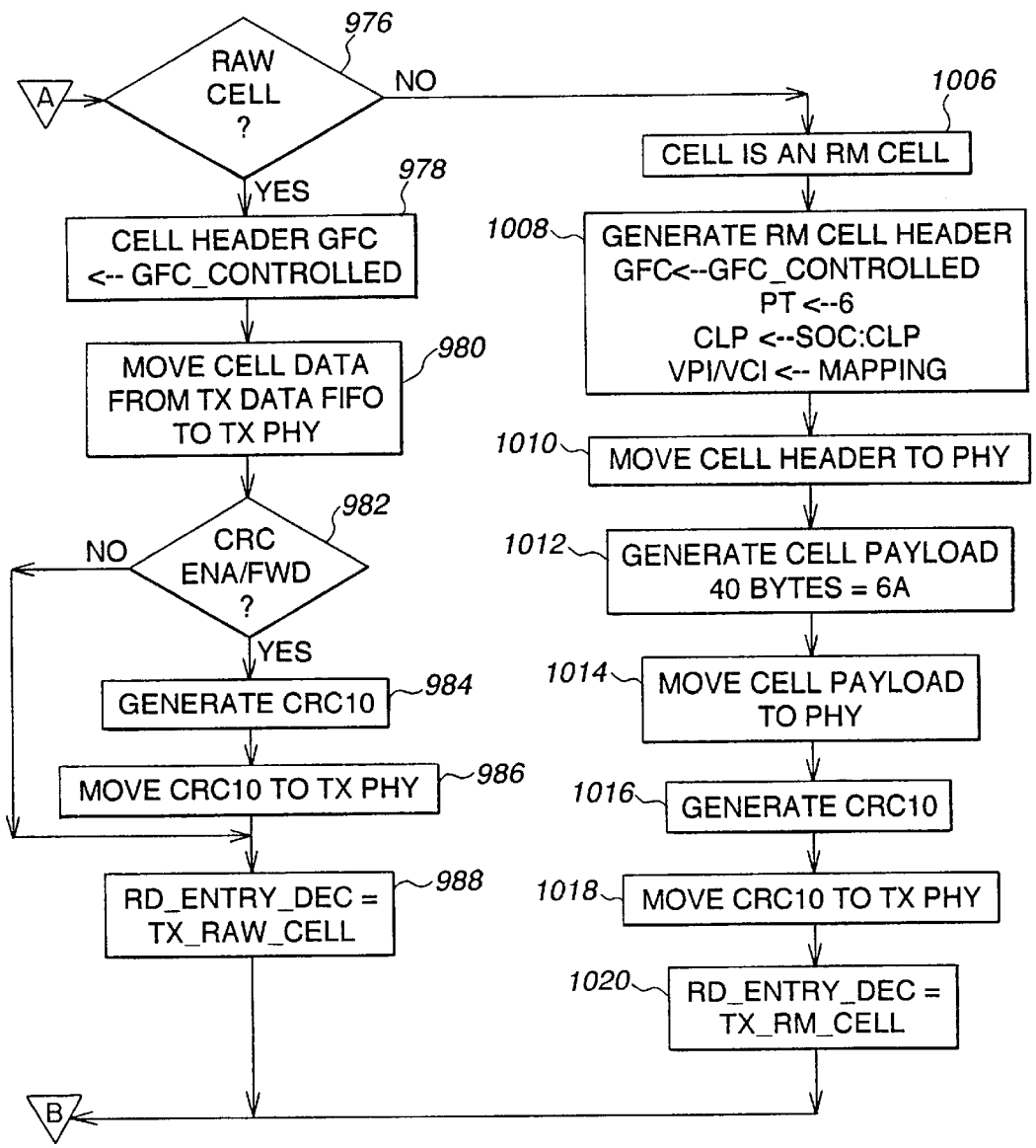
FIG. 30b(2)

DIR = 0 FOR FORWARD RM CELLS
= 1 FOR BACKWARD RM CELLS
BN = 1 FOR NON-SOURCE GENERATED (BECN) RM CELLS
= 0 FOR SOURCE GENERATED RM CELLS
CI = 1 TO INDICATE CONGESTION
= 0 OTHERWISE
NI = 1 TO INDICATE NO ADDITIVE INCREASE ALLOWED
= 0 OTHERWISE
RA - NOT USED FOR ABR. SEE DESCRIPTION BELOW

APPARATUS AND METHOD FOR SCHEDULING VIRTUAL CIRCUIT DATA FOR DMA FROM A HOST MEMORY TO A TRANSMIT BUFFER MEMORY

FIELD OF THE INVENTION

The present invention relates generally to the field of computer networks, and, more particularly, to the scheduling of data transfers from a host to a network end-node adapter such that data is available for transfer from the adapter to the network in a timely manner.

BACKGROUND OF THE INVENTION

Asynchronous Transfer Mode (ATM) is a class of digital switching technologies for computer networks. ATM is a cell based technology; that is, compared to common packet technologies such as X.25 or frame relay, ATM transfers short, fixed length units of information called cells. Accordingly, larger packets or protocol data units (PDU's) from a source are broken up into these fixed length cells for transmission, and then reassembled at their destination.

ATM is a connection based technology, meaning that all communications between two stations occur via a virtual circuit (VC) which is initially established between them. ATM is designed to support users having diverse requirements for service. For example, a given VC may be established in accordance with a constant bit rate (CBR) or variable bit rate (VBR) service type. Once established, the service type for a given VC is maintained in accordance with quality of service (QoS) parameters for that type.

In order to control the transmission of VBR cells from an ATM adapter over multiple VCs, it is known to employ a scheduling process which scans a schedule table having multiple entries. Each entry in the schedule table contains a pointer to a list of VCs to be transmitted at a given time. This table is scanned at the link rate. For each entry, a cell for the VC at the head of the list pointed to by that entry is transmitted on the link.

Once a cell for a given VC is transmitted on the link, the VC is rescheduled into the schedule table at a location dictated by the QoS parameters for the VC. In the past, the VC has simply been queued to the tail of the linked list pointed to by the table entry at which it is rescheduled. This method of scheduling has been found to result in less than optimum performance. An improved method of scheduling is therefore desired.

SUMMARY OF THE INVENTION

According to the broad aspects of the present invention there is provided an apparatus and method for scheduling the transmission of data units. Accordingly, a schedule table stores entries at locations, each location representing a point in time at which a data unit is to be transmitted. Each entry corresponds to a data structure of data units scheduled for transmission at the time corresponding to the location of the entry in the table. When a data unit is to be transmitted at a particular time, a scheduler writes the data unit to the data structure corresponding to the entry at the location in the schedule table corresponding to the time at which the data unit is to be transmitted. The scheduler writes the data unit to the data structure such that the data unit is the first of the data units in the data structure to be transmitted.

As applied in networking applications, the invention provides an apparatus and method for scheduling the transmission of cells from a network node. Accordingly, entries are stored in a schedule table at locations, wherein each location represents a point in time at which a cell is to be transmitted. Each entry in the table contains a pointer to a list of virtual circuits (VCs) having cells scheduled for transmission at the time corresponding to the location of the entry in the table. When a VC has a cell to be transmitted at a particular time, the VC is queued to the head of the list of VCs pointed to by the pointer located at the entry in the table corresponding to the time at which the cell is to be transmitted.

By queuing VCs to the head of the schedule table lists, rather than to the tail of the lists as is done in traditional schedulers, high rate VCs which are more sensitive to transmission latencies are more likely to be transmitted at their scheduled times. It can therefore be appreciated that the foregoing represents a significant performance advantage, particularly in the field of ATM network adapters.

BRIEF DESCRIPTION OF THE DRAWINGS

An embodiment of the invention will be described with reference to the accompanying drawings, in which:

FIGS. 6A–B is a block diagram of the segmentation engine of the SAR controller shown in FIG. 4;

FIGS. 19a–c illustrate the three types of tx DMA request FIFO entries: Data DMA request entry (FIG. 19a), Idle Slot Report Request Entry (FIG. 19b) and RM Cell Request Entry (FIG. 19c);

FIGS. 22*a–j* show a detailed flow diagram of the operation of the tx rate scheduler FSM of FIG. 6;

FIGS. 23*a–f* show a detailed flow diagram of the operation of the tx DMA scheduler FSM of FIG. 6;

FIGS. 28*a–d* is a detailed flow diagram of the operation of the tx cell FSM of FIG. 6;

FIGS. 30*a–d* show a detailed flow diagram of the operation of the tx phy FSM of FIG. 6;

DESCRIPTION OF THE PREFERRED EMBODIMENT

Figure 1:
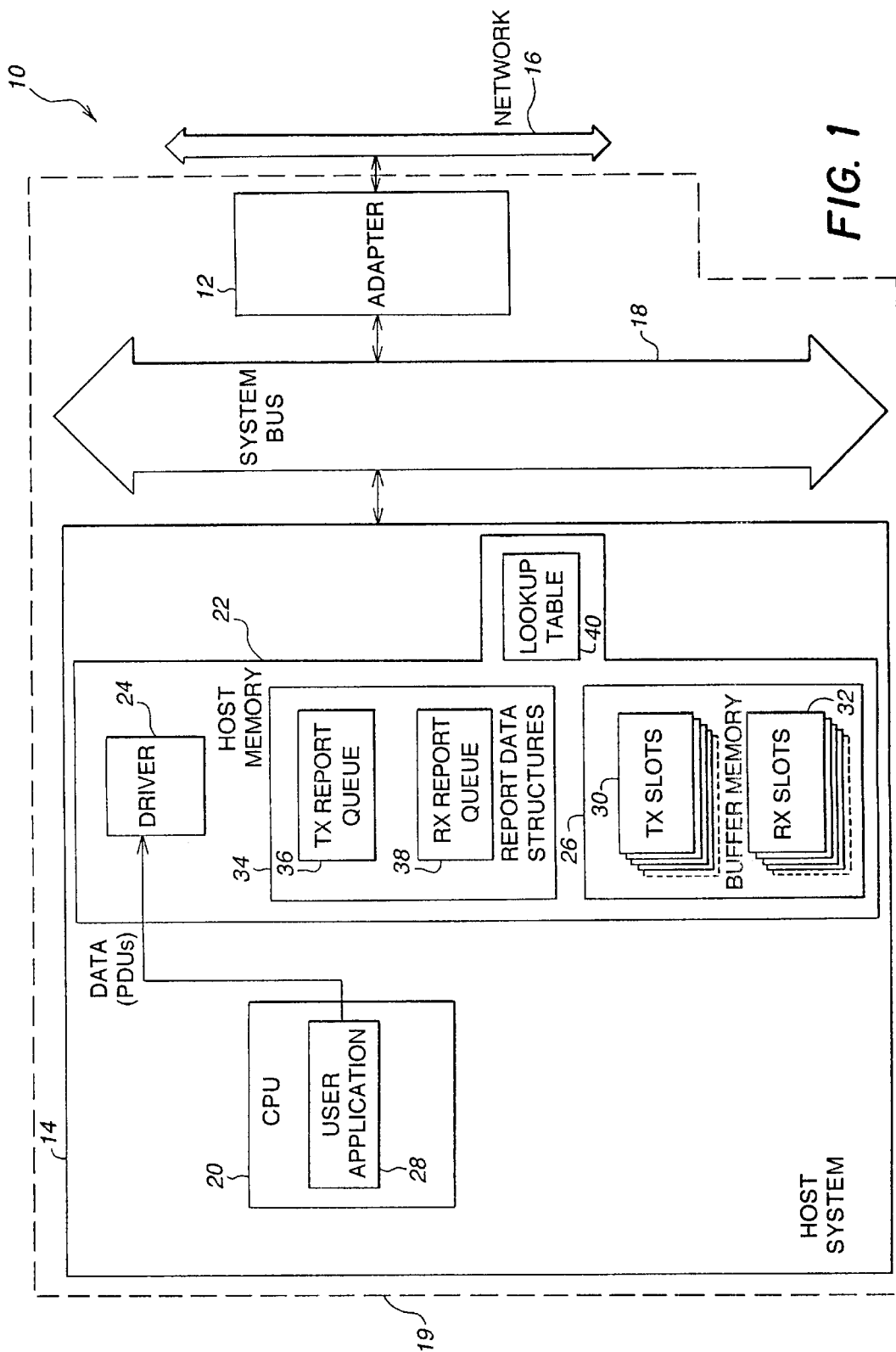
FIG. 1 is a block diagram of a system having a host system connected to a network via an adapter.

Referring to FIG. 1, there is illustrated a system 10, which includes an adapter 12 coupled to an end-system shown as a host system 14 and a network 16. The host system 14 and adapter 12 each are connected to and communicate with one another over a system bus 18. The adapter 12 is connected to and directly interfaces with the network 16. The host system 14, system bus 18 and adapter 12 in the illustrated configuration thus represent a "network" node 19. This type of network node is an end-system network connection, sometimes referred to as an "end" node.

In pertinent part, the host system 14 includes a central processing unit (CPU) 20 coupled to a host memory 22. The host memory includes a driver 24 and a buffer memory 26. A user application 28 (executing in the CPU 20) provides, via networking software layers (not shown), network-bound user data to the driver 24 as protocol data units (PDUs).

In the illustrated embodiment, the buffer memory 26 includes transmit (tx) slots 30 and receive (rx) slots 32. The driver utilizes the tx slots 30 to store the PDUs awaiting transmission. The rx slots 32 are used to store data received from the network 16 via the adapter 12.

Further included in the host memory are report data structures 34 for storing status reports provided to the host system 14 by the adapter 12. The report data structures include a transmit (tx) report queue 36 and a receive (rx) report queue 38. Additionally, there is provided in the host memory a lookup table 40 for physical-to-virtual address mapping.

Figure 3:
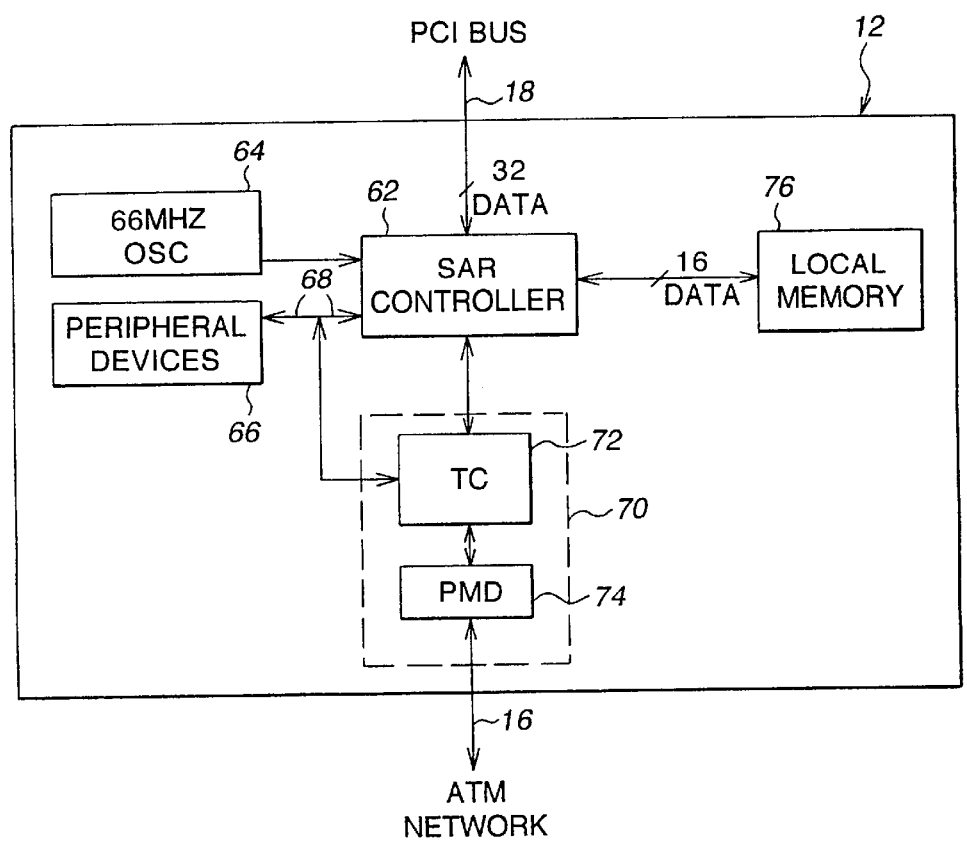
FIG. 3 is block overview of the adapter of FIG. 1.

Now referring to FIG. 3, there is shown a preferred implementation of the adapter 12 (from FIG. 1) as an Asynchronous Transfer Mode (ATM) adapter. Because the description of this embodiment contains numerous acronyms and terms that are associated with ATM, the description of the adapter 12 in FIG. 3 follows a very brief discussion of ATM networks. Additional information can be had with reference to "ATM User-Network Interface Specification, Version 3.1", and other documents published by the "ATM Forum".

An ATM network is a cell-based network in which fixed-length cells relating to different media are statistically multiplexed together and have random time intervals between them. The ATM cells are transmitted in slots in the payload of, e.g., the frames of a SONET signal.

Figure 2:
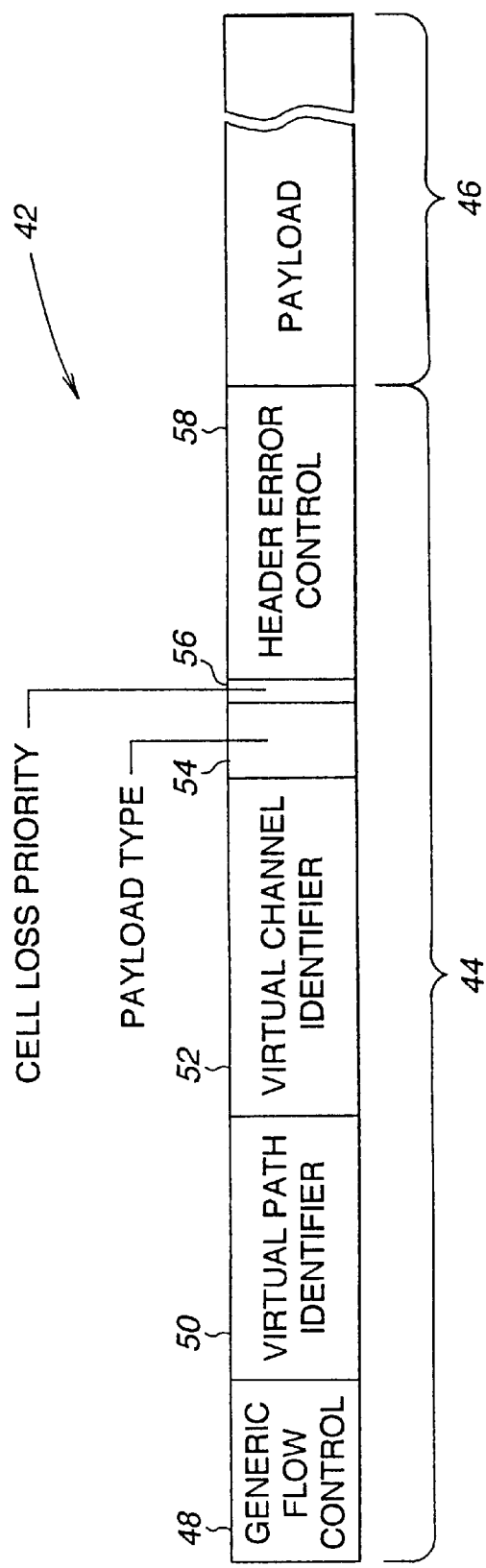
FIG. 2 depicts the format for an ATM cell.

ATM messages move through the network over virtual circuits (VCs), which are set up by and established between the end nodes in the network. Each message in an ATM network is made up of one or more of the fixed-length cells. Referring to FIG. 2, an ATM cell 42 is shown to be 53 bytes long. The ATM cell 42 is typically divided into a 5-byte header 44 and a 48-byte payload 46. As shown, the ATM header 44 includes the following: a generic flow control field 48, a virtual path (VPI) identifier 50, a virtual channel identifier (VCI) 52, a payload type identifier (PT) field 54, and a cell loss priority (CLP) field 56. The ATM header 44 further includes a header error control (HEC) field 58. The GFC field 48 is used to ensure that users are given fair access to transmission facilities. The VPI 50 identifies a virtual path between two nodes. The virtual path is simply a collection of channels associated with the same user endpoint. The VCI 52 identifies a virtual channel between two nodes. A virtual channel is a unidirectional virtual circuit (VC) associated with a particular user. The PT field 54 is used to differentiate between cells carrying user data and cells carrying ATM control information, such as OAM cells. The CLP field 56 indicates the eligibility of a cell being discarded during a period of congestion. The HEC field 58 is used to detect corruption of the information contained in the ATM header 44. The payload field 46 contains the data portion of a cell.

Referring now to FIG. 3, the adapter 12 includes a Segmentation and Reassembly (hereinafter referred to as simply "SAR") controller 62, which interfaces directly to the system bus 18. In this embodiment, the system bus 18 is a 32-bit PCI bus with Universal I/O. The SAR controller 62 is connected to a crystal oscillator 64, which provides a timing source for the SAR controller, as well as one or more adapter-resident devices indicated as peripheral devices 66 via a peripheral bus 68. The peripheral devices 66 include (but are not limited to) LEDs, MAC address PROM and PCI subsystem ID registers.

The SAR controller 62 is further connected to a PHY device 70, which implements the ATM physical layer. As shown, the PHY device 70 includes a Transmission Convergence (TC) sublayer device 72 and a Physical Media Dependent (PMD) sublayer device 74. The TC sublayer device 72 defines line coding, scrambling, data framing and synchronization. The PMD sublayer device 74 typically includes the functions for transmitter, receiver and timing recovery that allow connection to the transmission media of the network 16, also referred to as the network bus 16. In the embodiment of the invention illustrated in FIG. 3, the network bus 16 is indicated as being of the SONET STS-3c/STM-1 type. The SONET STS-3c/STM-1 transmission rate is specified to be 155.52 Mb/s. It can be seen from the figure that peripheral bus 68 also provides access to PHY layer devices (not shown) in the PHY device 70.

Additionally, the adapter includes a local memory 76, which is connected to the SAR controller 62 and provides storage for numerous data structures utilized by the SAR controller 62 and the host system 14 (from FIG. 1) for various key functions. In this embodiment, the local memory 76 supports 1K VC mode memory requirements. The internal organization of the local memory 76 and the different data structures contained therein will be described in detail later.

Figure 4:
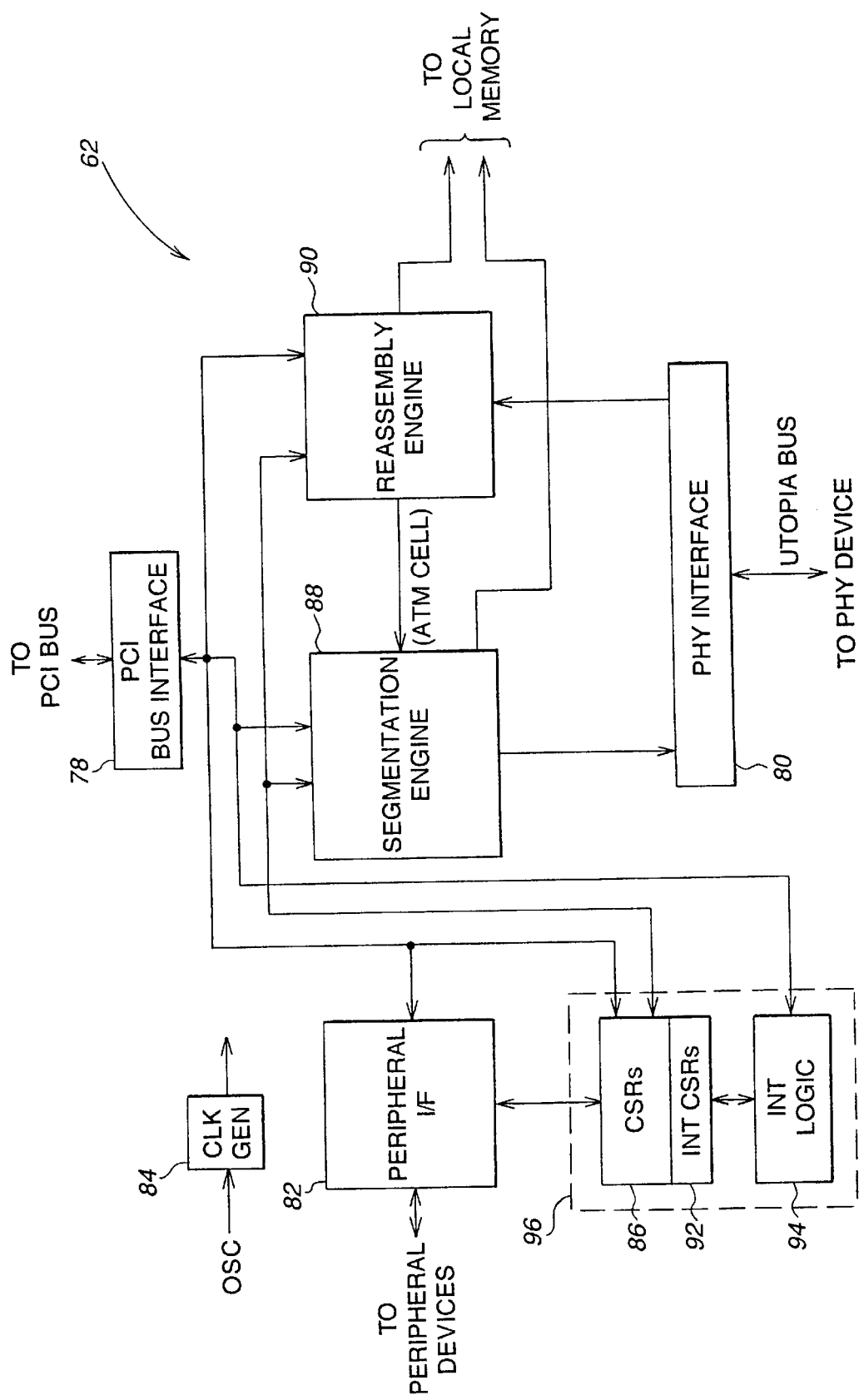
FIG. 4 is a top-level functional block diagram of the SAR controller in the adapter of FIG. 3.

FIG. 4 is a top-level diagram illustrating the general architecture of the SAR controller 62. The SAR controller 62 has three interfaces that include the following: a PCI bus interface 78 with a 32-bit wide data bus, a PHY interface 80 and a peripheral bus interface 82.

The PCI bus interface 78 connects the SAR controller to the PCI bus 18, and therefore couples the SAR controller 62 to the host system 14 via the PCI bus 18. Although not shown in FIG. 1, the host system 14 may include a PCI bus interface or PCI bridging logic, depending on the configuration of the host system and whether the PCI is serving as a local or system bus. The SAR controller 62 masters the PCI bus in its master mode and allows the host system 14 to access the SAR controller 62 in slave-mode operation. The PCI bus interface 78 implements a 32-bit data buffer to provide a data path to and from the host system. This block also includes PCI configuration space registers (not shown).

On the line-side of the SAR controller 62, the PHY interface 80 implements the industry-standard UTOPIA data path handshake protocol in conformance with the UTOPIA interface specification. The UTOPIA interface consists of an 8-bit wide data path and associated control signals in both the tx and rx directions. Consequently, ATM cells pass between the ATM and PHY layers through the UTOPIA interface.

Although not shown, the SAR controller 62 may also be connected directly to devices implementing the ATM layer of the UTOPIA specification (as opposed to the PHY layer) through a Reversible UTOPIA mode of operation. In Reversible UTOPIA mode, the SAR controller 62 acts as the UTOPIA PHY layer at the line-side interface. This is particularly useful in ATM switch applications, where the SAR controller 62 may be connected to the switch fabric through the same mechanism as all other ports in the switch.

The peripheral interface 82 is connected to the PCI bus interface 78. Through the peripheral interface 82, the host system may access the various on-adapter peripheral devices. As already mentioned, these peripheral devices may include a MAC address PROM and LEDs, as well as PCI subsystem and subsystem vendor ID registers. Additional devices could include error-logging EPROM and CSRs in the PHY device. In the embodiment of the present invention, the peripheral interface 82 directly supports a 64 KB address space and an 8-bit wide data path.

The SAR controller 62 also includes a clock generation block 84, which generates and distributes clock signals to the various components of the SAR controller 62, and a number of internal control and status registers (CSRs), which are shown in FIG. 3 as CSRs 86. The CSRs 86 are coupled to the PCI bus interface 78, a segmentation engine 88 and a reassembly engine 90. As shown in the figure, the CSRs include interrupt CSRs 92, which are coupled to an interrupt logic block 94. Together, the interrupt CSRs 92 and interrupt logic block 94 compose an interrupt block 96 (indicated in dashed lines).

An address map for the CSRs 86 is provided in Table 1 below.

TABLE 1

| CSR | Read/Write | LW Address | Default |
|---|---|---|---|
| Tx_Pending Slots | WO | 0 × 0 – 0 × F | N.A. |
| Rx_Pending Slots | WO | 0 × 10 – 0 × 1F | N.A. |
| SAR_Cntrl1 | RW | 0 × 20 | 00000040 |
| SAR_Cntrl2 | RW | 0 × 21 | 00001001 |
| Intr_Status | RW1C | 0 × 22 | 00000000 |
| Intr_Enb | RW | 0 × 23 | 00000000 |
| Intr_Hldoff | RW | 0 × 24 | 00000000 |
| Tx_FS_List_Ptrs | RW | 0 × 25 | 00000000 |
| Tx_Report_Base | RW | 0 × 26 | 00000000 |
| Rx_Report_Base | RW | 0 × 27 | 00000000 |
| Tx_Report_Ptr | RO | 0 × 28 | 00000000 |
| Rx_Report_Ptr | RO | 0 × 29 | 00000000 |
| Rx_Slot_Cong_Th | RW | 0 × 2A | 00000000 |
| Tx_ABR_ADTF | RW | 0 × 2B | 00000000 |
| Tx_ABR_Nm_Trm | RW | 0 × 2C | 00000000 |
| Peephole_Cmd | RW | 0 × 2D | 40000000 |
| Peephole Data | RW | 0 × 2E | 80000000 |
| Rx_Raw_Slot_Tag | RO | 0 × 2F | 00000000 |
| Rx_CellCnt | RO | 0 × 30 | 00000000 |
| Rx_AAL5_DropPKTCnt | RO | 0 × 31 | 00000000 |
| Rx_Raw_DropCellCnt | RO | 0 × 32 | 00000000 |
| Tx_CellCnt | RO | 0 × 33 | 00000000 |
| Real_Time | RO | 0 × 34 | 00000000 |
| Current_Time | RO | 0 × 35 | 00000000 |
| Test_Cntrl | RW | 0 × 36 | 00000000 |

NOTES:
RW = Read/Write
RW1C = Read/Write-one-to-clear
RO = Read only
WO = Write-only Because the local memory and peripheral devices external to the SAR controller are not memory-mapped, there is needed a means by which the host system can access these areas. Two of the CSRs, the Peephole_Cmd and the Peephole_Data registers, provide a mechanism which allows the host system to access local memory using address space available through a local memory interface (not shown) or peripheral devices using address space available through the peripheral interface. For a read transaction, for example, the host system writes a device address (in the partitioned address space) to the Peephole_Cmd register and uses other bits in the register to indicate the type of access and select the type of device to be read as either a peripheral device or SRAM. It then polls the Peephole_Data register for an indication that the operation has been completed. Once that indication is given (i.e., setting of bit in data register), the returned data can be read from the register. Because this mechanism is well known in the art, further details are not provided. The operational functions provided by other CSRs are referred to and discussed in more detail later.

The primary function performed by the SAR controller 62 is the segmentation and reassembly of CPCS-PDUs. Referring again to FIG. 4, the SAR controller 62 receives packet information over the PCI bus through the PCI interface 78. Connected to both the PCI interface 78 and the PHY interface 80, as well as the adapter's local memory 76 (from FIG. 3) is the segmentation engine 88 and a reassembly engine 90. Collectively, the segmentation engine 88 and the reassembly engine 90 implement the SAR function as described in the ATM User-Network Interface Specification, Version 3.1.

In the transmit direction, the SAR controller 62 receives from the driver 24 (shown in FIG. 1) complete AAL5 CPCS-PDUs, each including a 4-byte AAL5 CRC placeholder. The Pad, Control and Length fields provided by the driver must be correct, and are not checked by the SAR controller. In contrast, the AAL5 CRC need not be correct. The segmentation engine 88 segments the AAL5 PDUs into fixed length ATM cells, appends cell headers to each ATM cell created by the segmentation process, computes AAL5 CRCs, and overwrites the placeholder CRCs with the computed CRCs in the transmitted PDUs. Segmentation and transmission of up to 1K AAL5 PDUs simultaneously is supported.

In the receive direction, the reassembly engine 90 reassembles the AAL5 PDUs and can reassemble up to 1K AAL5 PDUs simultaneously. In addition, the engine calculates and verifies the AAL5 CRC and length fields of received AAL5 CPCS-PDUs.

With respect to the embodiment described herein, a VC opened for transmission and reception of data is defined to be in one of 3 classes: constant bit rate (CBR), and variable bit rate which may be either available bit rate (ABR) or unspecified bit rate (UBR). CBR circuits have a fixed cell transmission rate which is specified at signaling time and does not change thereafter. ABR circuits are subject to the rate-based flow control mechanisms specified by the Traffic Management specification of the ATM Forum. The allowed cell transmission rate for such a circuit will therefore vary over time. UBR circuits have a fixed peak cell rate which is also specified at signaling time and does not change thereafter. The SAR controller guarantees that this peak cell rate will not be exceeded under any condition, but it does not guarantee that this rate will be met.

The SAR controller 62 also implements the Generic Flow Control protocol as defined in ITU-T SG 13 Revised version documents I.361-TD41 and I.150-TD42 November 1994 Geneva. GFC is a one-way, link-level flow control scheme for controlling the flow of data into an ATM network. In the GFC protocol, the ATM connections are divided into two categories: controlled and uncontrolled. When a cell is received with the HALT bit set in the GFC field 48 in the cell header 44 (FIG. 2), all transmit traffic is halted. When a cell is received with the SET_A bit reset (=0), controlled traffic is halted, while uncontrolled traffic may be transmitted. As implemented herein, all CBR VCs are uncontrolled, while ABR and UBR VCs are controlled.

Also supported is credit-based flow control. There are a number of well-known credit-based flow control schemes; thus, a description of credit-based flow control is not provided herein, but can be had with reference to a paper by Cuneyt M. Ozveren, Robert Simcoe and George Varghese, entitled "Reliable and Efficient Hop-by-Hop Flow Control", IEEE Journal on Selected Areas in Communications. May 1995, pp. 642–650.

The SAR controller 62 supports up to 1K Virtual Circuits (VCs) simultaneously, in both the receive and transmit directions. Therefore, as many as 1K AAL5 PDUs may be segmented and transmitted simultaneously (1K-way interleaving of AAL5 PDUs on the link), while 1K AAL5 PDUs are being simultaneously received and reassembled.

In addition to implementation of the AAL5 adaptation layer, the SAR controller 62 provides support for other adaptation layers via "raw" 52-byte cells and provides for the segmentation of MPEG "super-packets" into multiple 8-cell AAL5 packets. Related support is provided for the insertion of "idle packets" in order to achieve exact rates and reduce the amount of buffering needed, for example, at a set-top box. MPEG super-packet segmentation is selected on a per-VC basis, and idle packet insertion is done on a per-packet basis, where idle packets may consist of any number of cells.

ATM is fundamentally a full-duplex technology and thus the transmit and receive operations of SAR controller 62 can be viewed as largely independent operations. Therefore, each operation is discussed separately in the description to follow.

Hereafter, it is assumed that a sufficient amount of local memory (e.g., 128 KB SRAM) to support 1K transmit and receive VCs is present on the adapter 12. The term "longword" (LW) refers to a 4-byte unit of data. The term "word" (W) refers to a 2-byte unit of data. The transmit (tx) or outgoing direction of data flow refers to data flowing from host memory, into the SAR controller 62, and onto the network 16. The receive (rx) or incoming direction of data flow refers to data flowing from the network 16, into the SAR controller 62, and then into host memory 22. The word "packet" (or, alternatively, the acronym "PDU") as used herein refers to either AAL5 CPCS-PDUs or raw cells. Raw cells are defined as cells which are not part of an AAL5 CPCS-PDU. For example, they may be F4 or F5 OAM cells, ABR RM cells, or cells for an AAL other than AAL5. It should be noted that tx RM cells are generated by the SAR controller itself. Further, there are many FIFOs and linked lists employed in the architecture of the SAR controller. In the described embodiment, entries for these types of data structures are written to the tail of the structure, and read from the head, unless explicitly set forth otherwise. References to elements in the various link lists to be described are set forth in the format "A[B]:C" wherein A is the list, B the index into the list, and C the field in the element indexed.

Transmit Operation

Returning to FIG. 1, the driver 24 of the host system 14 places user data contained in a packet received from the user application 28 into one or more of the tx slots 30 in host memory 22 in order to begin the transmission of the packet. Each tx slot 30 is a block of memory in a physically contiguous area in host memory 22. A single AAL5 packet may be contained in a single tx slot, or may span many tx slots 30. Each raw cell must be contained in a single tx slot 30. Although the tx slots 30 are depicted as being of uniform size, their size can in fact vary. Tx slots containing portions of an AAL5 PDU may vary in size from 1 byte to 16 Kbytes, with 1-byte granularity, while tx slots containing raw cells are exactly 52 bytes long. The first byte of a raw cell or AAL5 packet occupies the lowest byte address of a tx slot. A single tx slot can contain at most one AAL5 packet or raw cell. Tx slots 30 may be located at any byte address in host memory 22, although optimal performance is obtained when the starting address of each slot is longword-aligned. Also, for best performance, slots should generally be as large as possible, with the optimal case being a one-to-one correspondence between packets and tx slots.

Each AAL5 packet posted for transmission contains the AAL5 pad (0 to 47 bytes), Control (2 bytes), Length (2 bytes) and CRC placeholder (4 bytes) fields. The SAR controller 62 will compute the correct AAL5 CRC and overwrite the placeholder CRC when transmitting the packet.

Figure 5:
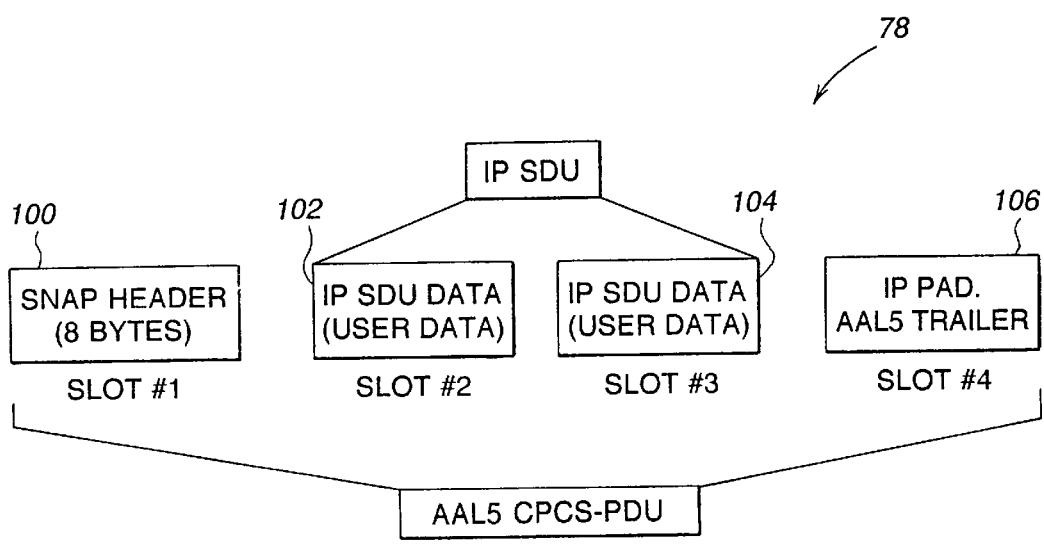
FIG. 5 illustrates a classical IP packet residing in the host memory of the host system shown in FIG. 1.

FIG. 5 depicts a classical Internet Protocol (IP) packet 98 to be transmitted on the link as it may appear in host memory when occupying four tx slots. As shown, slot 1 100 contains 8 bytes of SNAP header information. Slots 2 (102) and 3 (104) contain IP SDU data. These user data slots may be different sizes. IP pad information occupies slot 4 (106).

The driver 24 may allocate as much host memory 22 as it wishes for tx slots, and any number of tx slots may be in use by the driver 24 at any point in time. In the embodiment shown in the figures, the SAR controller 62 only limits the total number of slots from which it may be reading data for transmission at any one point in time to the number of flows which it supports. In the described embodiment, a "flow" is a VC; however, other types of flows can be utilized without departing from the spirit of the inventive concepts described herein. An example of an alternative type of flow is a stream of packets between a pair of nodes in a datagram network.

Once the driver has placed data for one or more packets across one or more VCs in tx slots 30 in host memory 22, it must indicate to the SAR controller 62 the location of the tx slots 30 and the VCs with which each slot is associated. In order to post a single slot for transmission, the driver writes control information to an address space (see Tx_Pending Slots in CSRs shown in Table 1) in the SAR controller. In this embodiment, the control information is 2 LWs long. The address space is hereafter referred to as the "tx pending slots" address space. When the driver writes 2 consecutive LWs of control information to this address space, the operation is referred to as posting a tx slot. Note that the 2 LW writes are not required to occur in a single PCI burst; the SAR controller can handle an arbitrarily long delay between the write of the first and the second LWs corresponding to the posting of a single tx slot. The tx pending slot address space is 16-LW deep in order to allow the posting of up to 8 tx slots in a single 16-LW PCI burst.

Figure 6B:
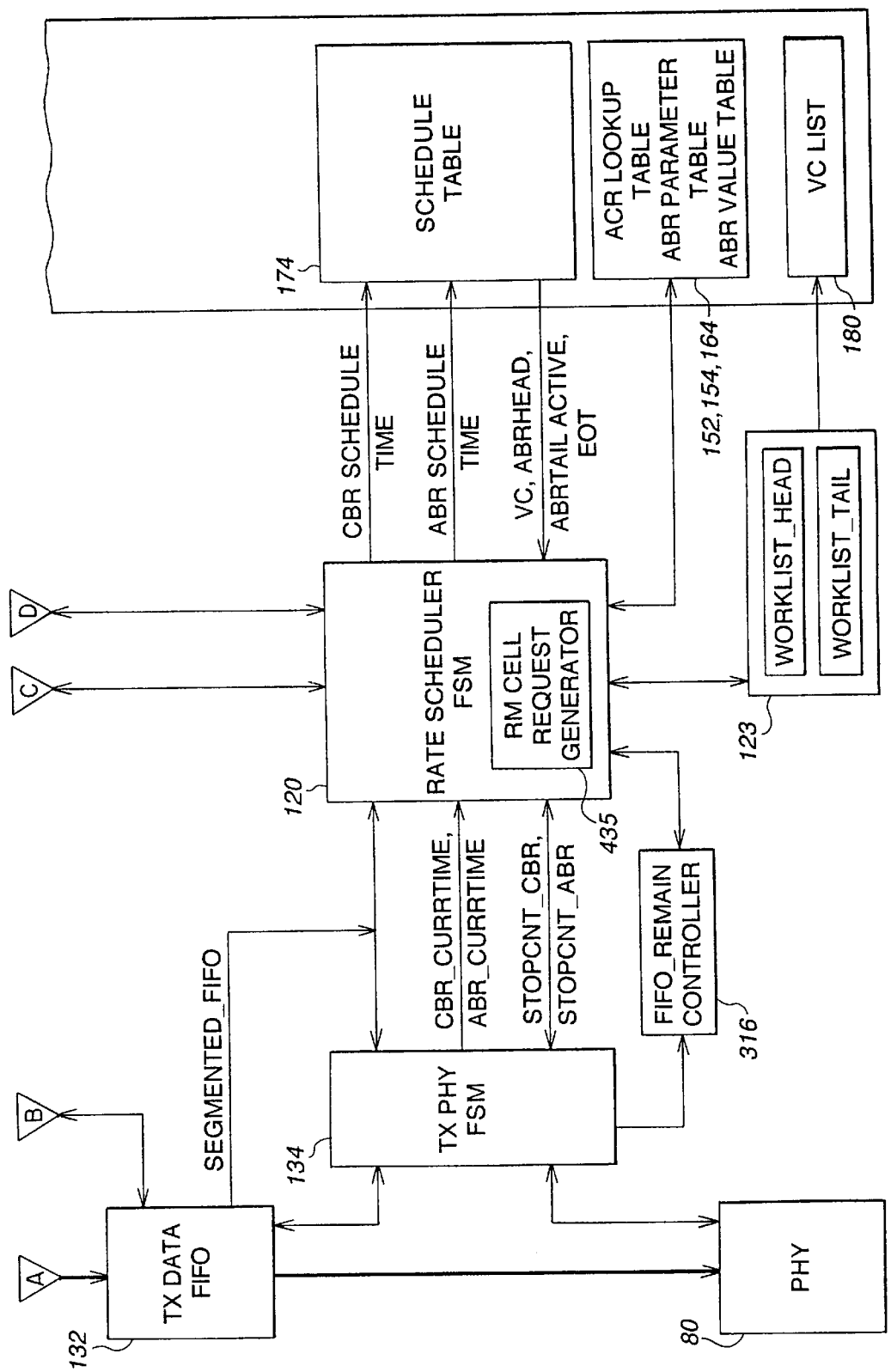

Referring to FIG. 6, there is shown the major functional components of the segmentation engine 88 of the SAR controller 62. A tx rate scheduler FSM 120 is coupled to a tx DMA scheduler FSM 122, worklist pointers 123 and the local memory 76. The tx DMA scheduler FSM 122 is coupled to a tx pending slot FIFO 124, a tx DMA request FIFO 125, and the local memory 76. A tx DMA FSM 126 is coupled to the PCI interface 78, to the tx DMA request FIFO 125, and to a tx cell FSM 130. A tx data synch FIFO 128 is coupled to the tx DMA FSM 126, to the tx cell FSM 130, to a tx data FIFO 132, and to a tx phy FSM 134. The tx phy FSM 134 is coupled back to the rate scheduler FSM 120.

Also shown is the adapter-resident local memory 76 (from FIG. 3). Although the local memory is not part of the SAR controller 62 in the illustrated ATM adapter of FIG. 2, it is utilized by the SAR controller 62 during a transmit operation and thus included in the figure. Although some of the data structures in the local memory are used during a receive operation, it is necessary to discuss briefly the various data structures contained within the local memory at this point.

Figure 7:
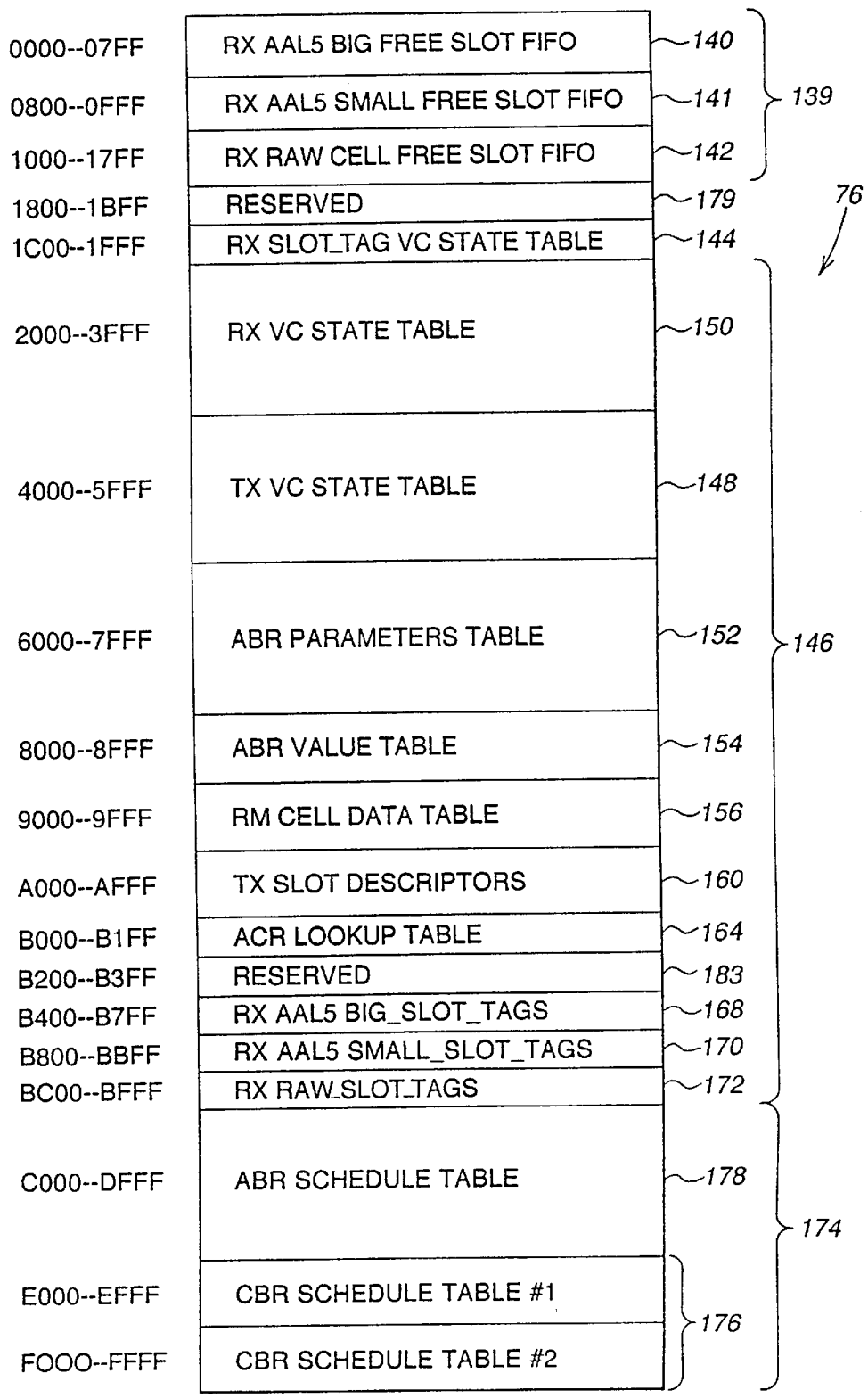
FIG. 7 illustrates the organization of the local memory shown in FIG. 3.

An example of the internal organization of the local memory 76 in its entirety is provided by FIG. 7. FIG. 6 illustrates only those data structures that relate to a transmit operation. With reference to both FIGS. 6 and 7, the local memory 76 includes the following control data structures: rx free buffer memories 139, implemented as FIFOs and thus alternatively referred to as rx free slot FIFOs 139, preferably including an rx AAL5 big free slot FIFO 140, an rx AAL5 small free slot FIFO 141 and an rx raw cell free slot FIFO 142; an rx slot_tag VC state table 144; VC state tables 146 preferably including a tx VC state table 148 and a rx VC state table 150; an ABR parameters table 152; an ABR value table 154; an RM cell table 156; tx slot descriptors 160, which includes a tx free slot list 161 and active slot lists 162 (both shown in FIG. 6); an ACR lookup table 164; rx AAL5 big_slot_tags 168, rx AAL5 small_slot_tags 170, and rx raw_slot_tags 172; a schedule table 174 including a CBR schedule table 176 and an ABR schedule table 178; and VC List 180. Two reserve fields are also provided, and are indicated by reference numbers 179 and 183. Referring to FIG. 6 only, the combination of the tx pending slot FIFO 124, the tx free slot list 161 and the tx active slot lists is depicted as and referred to as a tx control memory 181. Many of these structures will be discussed in detail with reference to the transmit and/or receive operations.

When the above-mentioned control information is written by the host system 14 to the tx pending slot address space, it is placed in the tx pending slot FIFO 124 by the PCI bus interface 78 operating in PCI slave mode. In keeping with the embodiment thus described, the tx pending slot FIFO 124 is 8 entries deep. Each time a set of 2-LW writes occurs to the tx pending slot address space (i.e., each time the driver posts a tx slot for transmission), a single entry is placed on the tx pending slot FIFO 124.

Figure 8A:
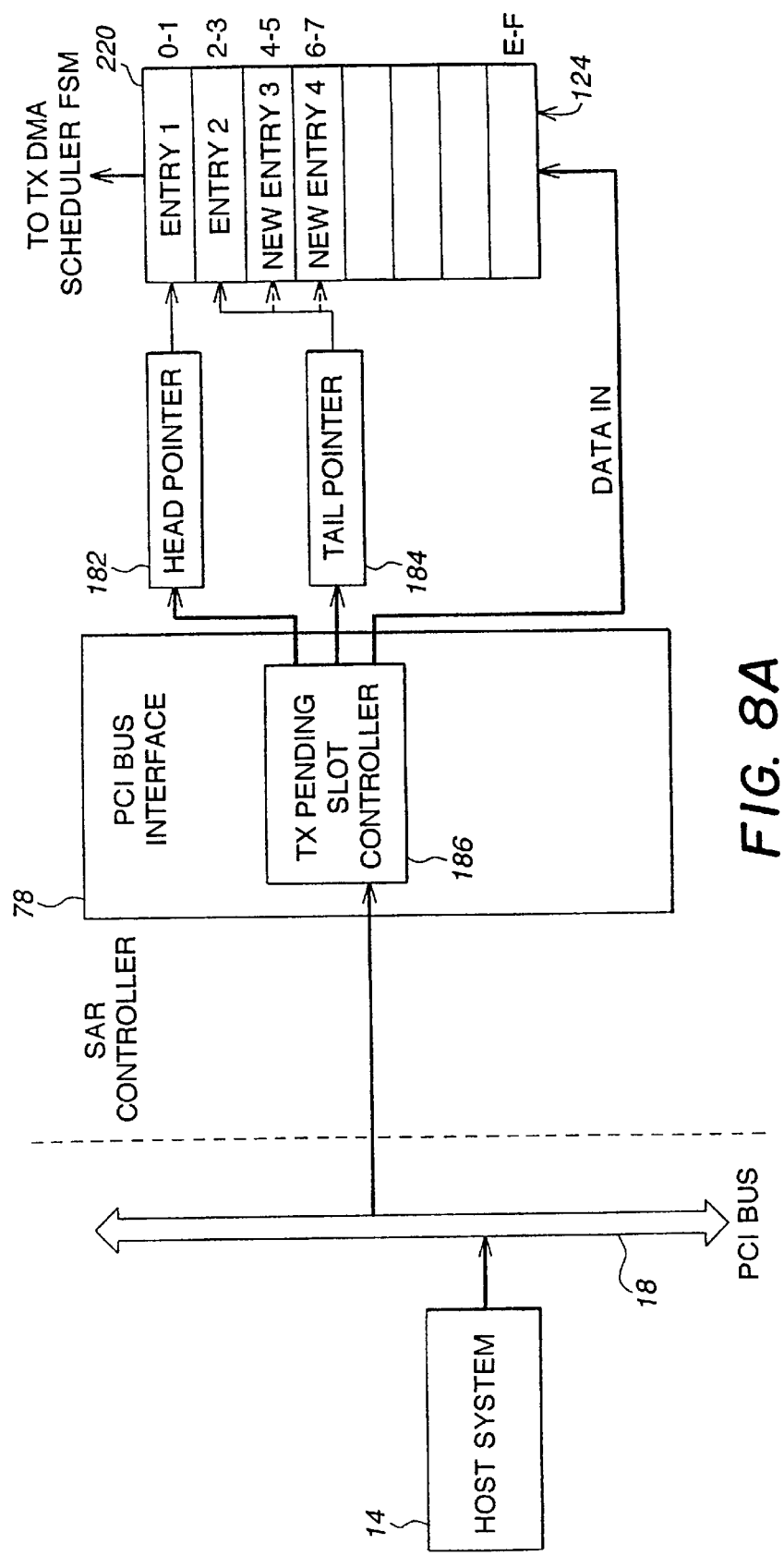
FIG. 8A is a block diagram showing the host system, PCI bus, PCI bus interface and the tx pending slot FIFO, the block diagram serving to illustrate the tx pending slot controller in the PCI bus interface.

The tx pending slot FIFO 124 is shown in further detail in FIG. 8A. Data is read from the head of the FIFO 124 and written to the tail. Tx pending slot head and tail pointers 182 and 184 are used to access the head and tail of the tx pending slot FIFO 124 respectively. A tx pending slot controller 186 in the PCI bus interface 78 controls the manipulation of the head and tail pointers 182 and 184 and the transfer of data to and from the tx pending slot FIFO 124.

The tx pending slot controller 186 takes advantage of the burst write capability of the PCI bus 18 to provide a performance advantage. A PCI bus burst write transaction is shown in the timing diagram of FIG. 8B. Accordingly, when data is to be written to successive addresses via the PCI bus 18, this can be accomplished using a single PCI bus transaction having multiple data phases. Whereas the usual device mapped to a single CSR address can be accessed only by separate and individual PCI write transactions to that address, the device as herein described (the tx pending slot FIFO 124) is accessible at any CSR address within a successive range of CSR addresses. The controller 186 recognizes a PCI burst write to a CSR address within this range, and then enables the writing of data to the device during each successive data phase of a burst write to the successive CSR addresses within the range.

As previously shown in Table 1, the tx pending slot FIFO 124 is accessible at any of CSR locations 0×0H–0×FH. Each tx pending slot FIFO entry is 2 longwords long; thus, 2 16 bit locations are used for each entry. In order to post a series of tx slot descriptors to the tx pending slot FIFO 124, the host 14 generates a PCI burst write to successive CSR addresses within the range of the CSR locations 0×0H through 0×FH. For each successive data phase of the burst write, the controller 186 writes the data to the FIFO 124 and increments the tx pending slot tail pointer 184. When the tx pending slot FIFO 124 is full, the PCI slave disconnects the host from the PCI bus. The burst write transaction is thereby advantageously used to load data to the FIFO.

Figure 9:
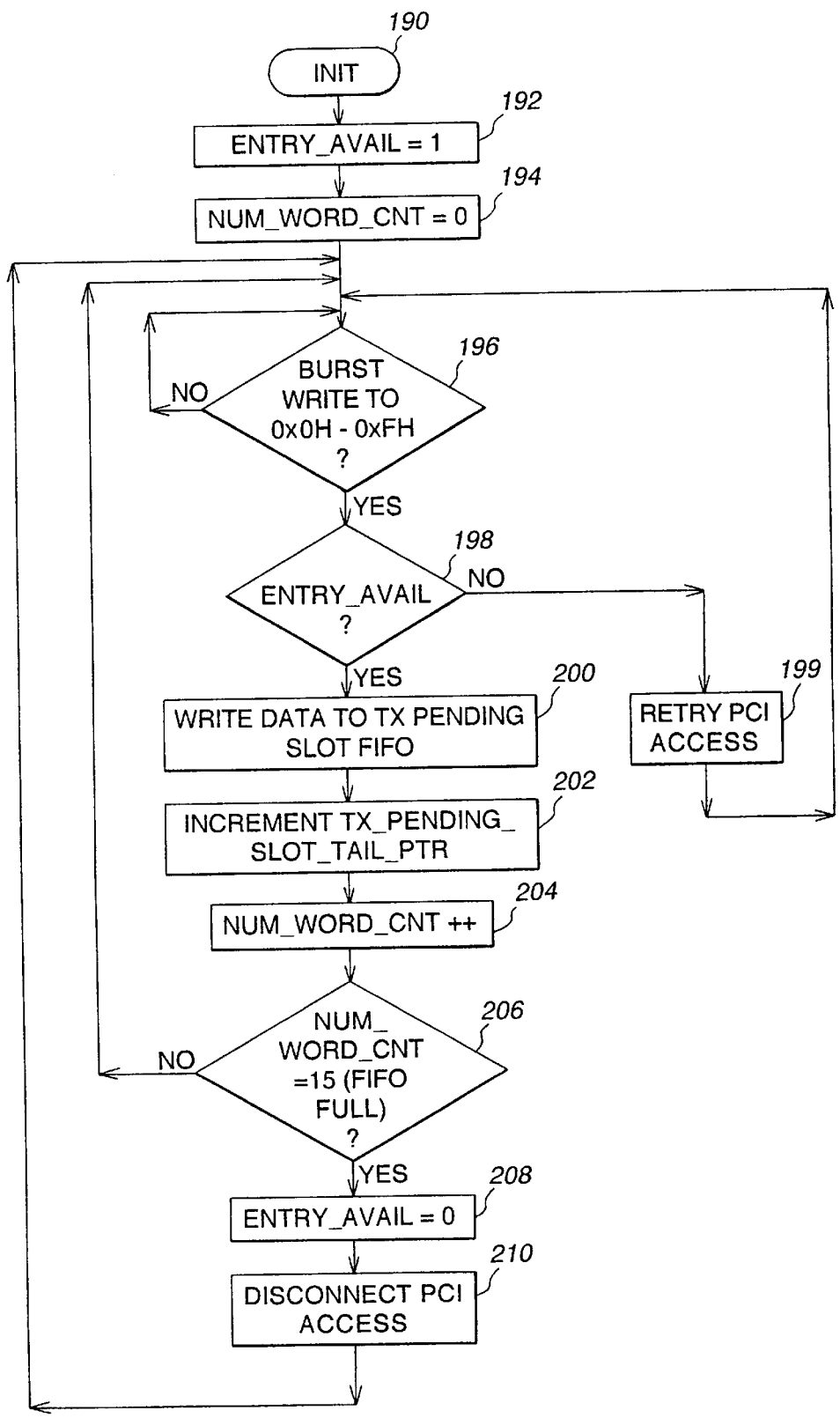
FIG. 9 is a flow diagram depicting a method used by the tx pending slot controller 186 of FIG. 8A for performing a burst write of data to the tx pending slot FIFO.

The detailed operation of the CSR burst technique 188 employing the tx pending slot FIFO controller is shown in the flow diagram of FIG. 9. The entry_avail bit, when asserted, indicates that at least one entry 220, or two longwords, are available in the tx pending slot FIFO. The counter num_word_cnt keeps track of the number of entries (each of which are two longwords long) present in the FIFO. Upon initialization (step 190), entry_avail is asserted to indicate that there is space available in the FIFO (step 192), and num_word_cnt=0; that is, the FIFO is empty (step 194).

The tx pending slot controller 186 waits for a burst write from the PCI bus 18 to the tx pending slot CSR space 0H–0FH. When a burst write occurs (step 196), if the entry_avail signal is deasserted (step 198) indicating that no space is presently available in the tx pending slot FIFO 124, the PCI access is re-tried (step 199). As long as entry_avail is asserted (step 198), then for each successive data phase of the burst the data on the PCI bus 18 is written to the tx pending slot FIFO 124 (step 200), the tx pending slot tail pointer 184 is incremented (step 202), and the num_word_cnt counter 188 is incremented (step 204).

For example, if after initialization two entries 220(4 longwords) are written to the tx pending slot FIFO 124, the head pointer 182 points to location 0 while the tail pointer 184 points to location 4. When the host 14 desires to write another tx pending slot, the host 14 performs a burst write to location 0h. The tx pending slot controller 186 senses the write to the tx pending slot CSR address space. For each data phase within the burst, the mapping logic writes the data to the tx pending slot FIFO 124 and increments the tx pending slot tail pointer 184.

The tx pending slot controller 186 continues to process the burst writes in this manner until the num_word_cnt counter reaches 15, indicating that the FIFO 124 is full (step 206). The entry_avail bit is then deasserted (step 208) and the tx pending slot controller 186 is disconnected from the PCI bus (step 210).

Entries are read from the tx pending slot FIFO 124 by the tx DMA scheduler FSM 122. As will be further described in conjunction with that machine (FIG. 23*e*), when an entry is read from the tx pending slot FIFO 124, the transmit pending slot head pointer 182 is incremented, the num_word_cnt counter is decremented by two, and the entry_avail bit is asserted, thereby enabling further data writes to the tx pending slot FIFO 124.

Figure 10:
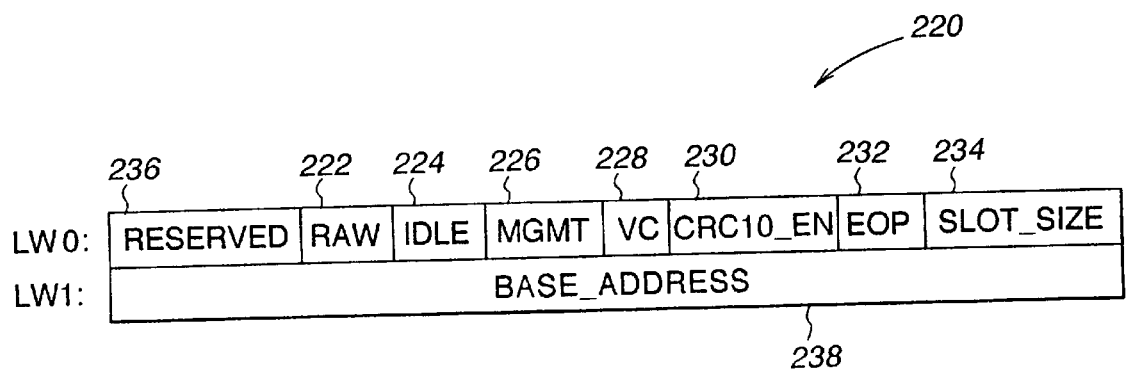
FIG. 10 illustrates the layout of a tx pending slot FIFO entry in the tx pending slot FIFO.

FIG. 10 illustrates a tx pending slot FIFO entry 220. As shown, the tx pending slot FIFO entry 220 comprises a number of different fields. Included is a RAW field 222, a single-bit field for indicating whether the transmit slot contains data for an AAL5 or idle packet (0) or for a single 52-byte raw cell (1). An IDLE field 224 indicates whether the data in the slot should be DMA'd and transmitted normally (0), or whether the SAR controller should schedule an idle cell for transmission for every cell contained in the slot (1). This bit is used for timing MPEG streams. When it is set, no data from the tx slot will be DMA'd or transmitted on the network 16. A single-bit MGMT field 226 indicates if the data in the slot constitutes an F4 or F5 OAM cell. When this bit is set, it indicates to the SAR controller 62 that the data in the slot should be transmitted whether or not the VC of the data has Flowmaster credits available (even if the VC is under Flowmaster flow control). A VC field 228, shown as a 12-bit field, is used to indicate the VC with which the tx slot data is associated. A CRC10_EN field 230 is a 1-bit field which is only of significance when the RAW field bit is set. The bit in the CRC10_EN is used to select whether or not a 10-bit CRC should be calculated and appended to the raw cell being transmitted. CRC10_EN should be set to 0 for AAL5 slots. Generally, it is set to 1 for both F4 and F5 OAM cells.

An EOP field 232 is used for two purposes: to indicate that a transmit slot contains the last byte of data of an AAL5 or idle packet (raw=0), or to indicate that a status report and interrupt should be generated on completion of the DMA of a raw cell slot (raw=1).

Also included in the tx pending slot FIFO entry is a slot size (SLOT_SIZE) field 234, shown as a 14-bit field, for indicating the number of bytes contained in the transmit slot. If the slot is a raw cell slot (raw=1), then this field should always be set to 52 by the host system. For AAL5 or idle slots (raw=0), this field must be in the range 1–16383 (the value 0 is not allowed). A reserved field 236 is also provided. Lastly, the tx pending slot FIFO entry includes a BASE_ADDRESS field 238, implemented as 32-bits wide, for indicating the physical base address of a transmit slot in host memory. It may contain any value for idle slots, since no data is DMA'd from idle slots.

Figure 11:
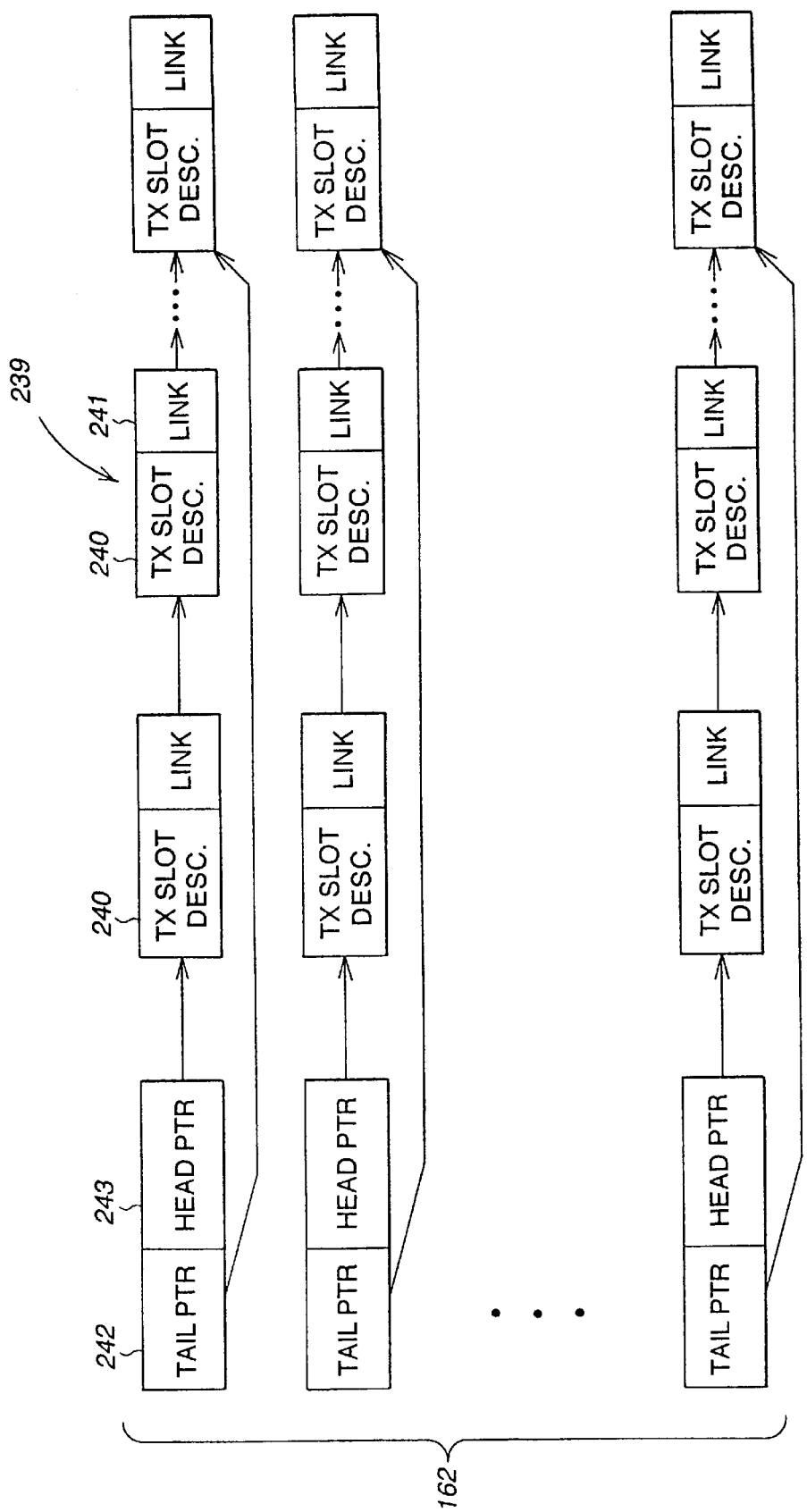
FIG. 11 is a depiction of the tx active slot lists residing in control memory on the adapter of FIG. 2.

With continuing reference to FIG. 6, the tx DMA scheduler FSM takes entries off of the tx pending slot FIFO and places data from the entries onto the tx active slot lists 162, as will be further described with reference to that machine. FIG. 11 illustrates the tx active slot lists 162. The tx active slot lists 162 are "per VC" lists having tx active slot list entries 239. Each tx active slot list entry includes a tx slot descriptor 240, which is associated with a single tx slot in host memory. It can be understood from the figures that the tx slot descriptors are therefore comprised of information from all but the VC field 228 in the tx pending slot FIFO entry 220. The VC field is used to queue a tx slot descriptor contained in fields 222–226 and 230–238 in the pending slot FIFO entry to the appropriate tx active slot list. In the described embodiment, there are 1K active slot lists and each is organized as a linked list. Therefore, each tx active slot list entry 239 further includes a link field 241, which contains a pointer to the next tx slot descriptor on the list. A head pointer 243 and tail pointer 242 for pointing to the head and tail, respectively, of each of the tx active slot lists are 12-bits wide and are obtained from the tx VC state table 148 (from FIG. 7).

Figure 12:
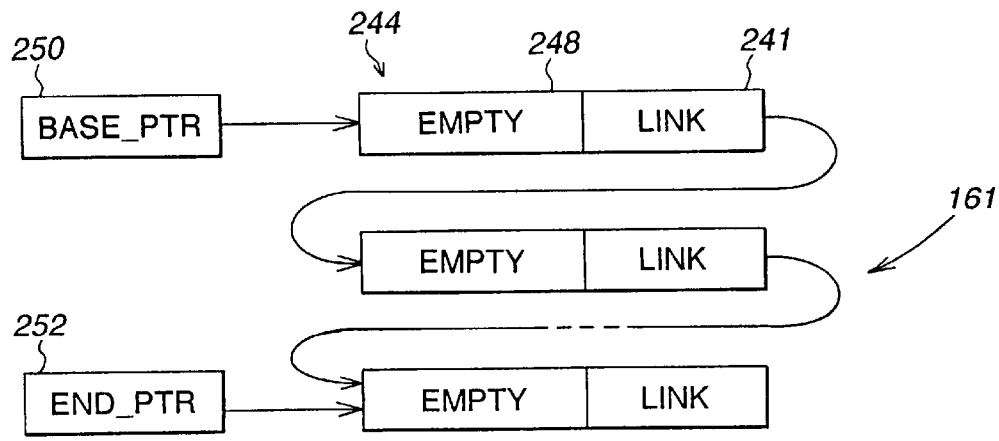
FIG. 12 is a depiction of the tx free slot list in the local memory on the adapter of FIG. 2.

Storage for each tx slot descriptor in the tx active slot lists is taken from the tx free slot list 161, also located in the local memory 76 as shown previously with reference to FIG. 6. The size of the tx free slot list, according to the described embodiment, is 1K entries. FIG. 12 illustrates the tx free slot list 161. With reference to FIG. 12, the tx free slot list 161 includes tx free slot entries 244, which each include the link field 241 and an empty portion 248 (which is written with a tx slot descriptor from the pending slot FIFO). The entries are taken from the head of the free slot list, pointed to by a base_ptr 250 and placed on the tail of the list, being pointed to by end_ptr 252. The base_ptr 250 and end_ptr 252 (from FIG. 12) are stored in one of the CSRs on the SAR controller itself.

Figure 13:
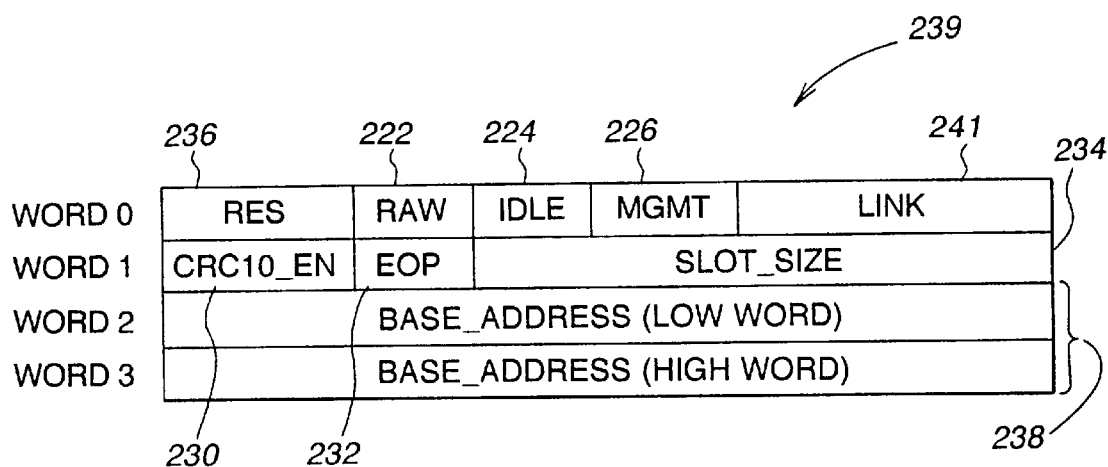
FIG. 13 shows the format of the active slot list entry in the active slot lists.

FIG. 13 illustrates the format of the tx active slot list entry 239 from FIG. 11. With the exception of the link field 241, the fields are the same as the equivalently named fields in the tx pending slot FIFO entries and thus retain the reference numbers used in FIG. 10.

Once the data in a posted tx slot has been transmitted, the tx free slot FIFO entry associated with the tx slot is returned to the free slot list by the tx DMA scheduler FSM. The driver keeps a count of the total number of slots (across all VCs) queued but not yet transmitted, and ensures that this number never exceeds the total number of supported tx slot descriptors. This number is determined by the size of the free slot list, which is exactly 1K.

Both the tx free slot list and the tx active slot lists are initialized by the driver at initialization time. Initialization of the tx free slot list consists of writing every link field in the tx free slot list entries (1K–1 links) to create a linked list, and writing the base and end pointers of the tx free slot list in the CSRs. Initialization of the tx active slot lists consists of writing the head and tail pointers of all of the tx active slot lists with the value 0, since all tx active slot lists are initially empty.

In the embodiment described herein, the tx control memory 181 includes the tx pending slot FIFO 124, the tx free slot list 161 and the tx active slot lists 162; however, alternative implementations of the tx control memory may be utilized. For example, in a network node supporting only one VC, the tx control memory 184 could be implemented as a single data structure, such as a list. A linked list is preferable, as it allows tx slots which are noncontiguous with respect to one another to be chained for a given PDU that spans multiple tx slots.

As previously indicated, the network node of the described embodiment supports up to 1K active VCs. When a VC is opened, it is set-up as an AAL5 VC, an AAL3/4 VC, or some other type of flow. The SAR controller 62 recognizes three types of flow: AAL5, Raw and MPEG. Two bits in the tx VC state table 148 for a given VC identify the type of flow to which the VC has been assigned. In the following description, any reference to AAL5 streams includes MPEG streams (since MPEG streams are assumed to be carried over AAL5). An MPEG stream is different from an AAL5 stream only in that a single MPEG packet ("super-packet") may be segmented into several AAL5 packets. When packets are transmitted on a VC which is an AAL5 VC, the AAL5 CRC will be computed and appended to the packets. OAM-F5 cells are identified through the PT field of the cell, rather than by the VC field, and may be carried on the same VC as an AAL5 flow. Whenever the host system wishes to transmit an F4 or F5 OAM cell, it needs to set the bits of the raw and crc10_en fields in the tx slot descriptor for the cell. The setting of these bits indicates to the SAR controller that the tx slot contains a single raw cell for which the CRC-10 must be computed and appended. It also indicates, in the case of F5 cells carried over an AAL5, that the CRC-32 of the cell's VC in the tx VC state table should not be updated.

It should be noted that, aside from the fact that they do not affect the CRC-32 calculation, OAM-F5 cells are treated no differently than data cells of the VC on which they are being sent. In terms of DMA and transmit scheduling and for purposes of ABR rate-based flow control calculations they are considered part of the normal data flow of the VC. OAM-F4 cells are identified by their VC (VC=3 or 4). The SAR controller will generate the CRC-10 field for all transmitted cells for which the bit of the crc10_en field is set. It will then overwrite the appropriate bits in the transmitted cell with the calculated CRC-10 value. This function may be used to aid in the transmission of AALs other than AAL5 which use the CRC-10, such as AAL3/4.

Figure 14:
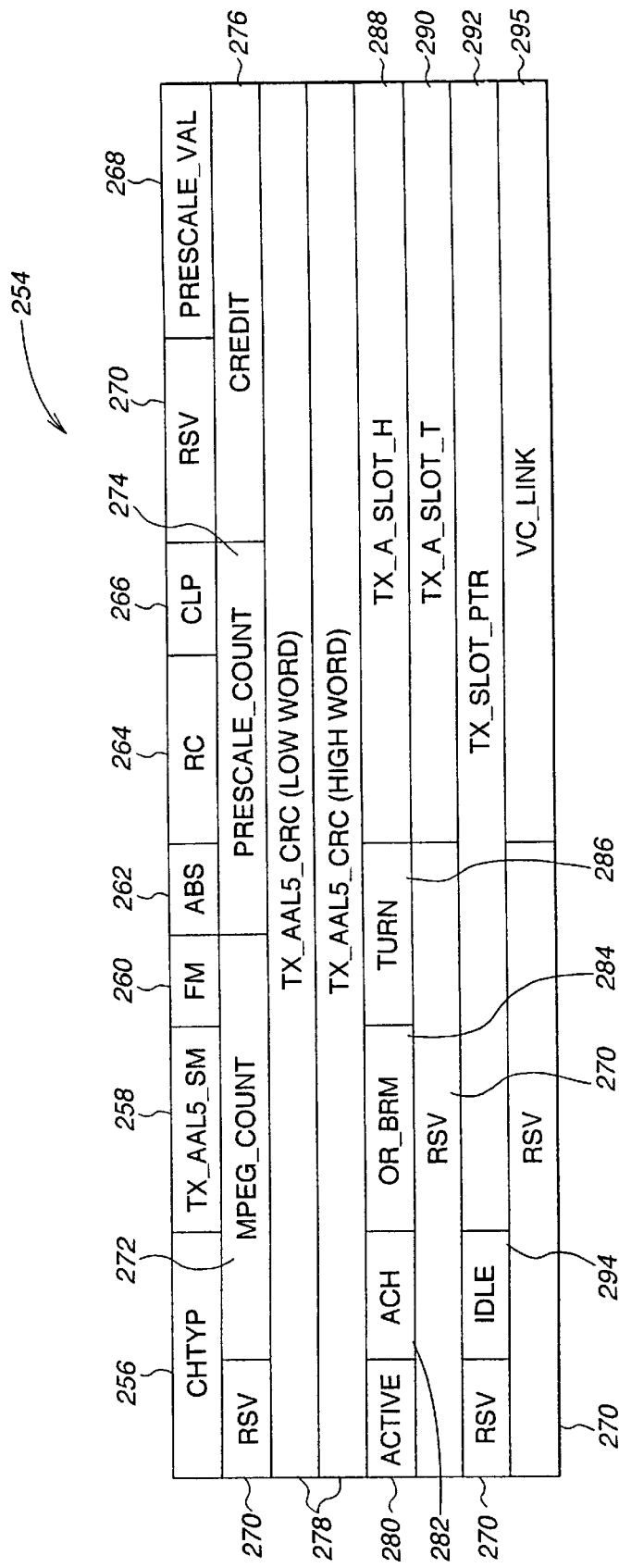
FIG. 14 is a layout of the transmit VC state table in the local memory.

FIG. 14 depicts the format of a tx VC state table entry 254 in the tx VC state table 148. As shown, the entry comprises 8 words. Word 0 provides a two-bit channel type (chtyp) field 256 for indicating the channel type. The two bit field is decoded as follows: 00 corresponds to a raw cell data, 01 is reserved, 10 corresponds to AAL5 and 11 corresponds to MPEG cell data.

A streaming mode enable (tx_AAL5_SM) field 258 is a one-bit field for enabling streaming mode for AAL5 cells. This field is used for reports and interrupts, as will be seen later. An FLOWmaster enable (FM) field 260 is set to enable FLOWmaster control support. Word 0 further comprises an ABR parameter base set selection (ABS) field 262 and a rate control (R) field 264 to indicate the particular rate control selected. This two-bit field is decoded as follows: 00 corresponds to CBR, 01 is set for ABR, 10 is set for UBR and 11 is reserved. A one-bit cell loss priority (CLP) field 266 indicates the cell loss priority transferred to the ATM header of the transmitted AAL5 cells. Lastly, word 0 includes a prescale counter value (prescale_val) field 268 for providing the prescale counter initial value for CBR and UBR rate control. The remaining bits (7:4) are contained in reserved field 270. This reference number is used to indicate all of the five reserved fields shown in the figure.

Now referring to word 1, the entry further comprises an MPEG_count field 272, which serves as a counter for counting the number of cells in an MPEG packet. A Prescale_count field 274 is a down counter used for slowing down CBR/ABR/UBR rates. A credit field 276 provides a FLOWmaster transmit credit counter. The MSB of word 1 is a second reserved field 270.

Together, Words 2 and 3 correspond to a 32-bit CRC 278 for transmitted AAL5 packets. Particularly, word2 contains the low word and word 3 the high word. Word4 includes an active field 280, a flag to indicate that data exists in the active slot list for a VC, and a schedule flag 282 to indicate that a VC is scheduled in the ABR/UBR schedule table. An out-of-rate backward RM (OR_BRM) flag 284 is used to indicate that an out-of-rate backward RM cell should be transmitted. A turn field 286 is a flag for indicating that a backward RM turn-around cell is pending. Also provided is a tx active slot list head pointer 288 and, in word5, a tx active slot list tail pointer 290. Word5 also includes a third reserved field 270.

Words 6 and 7 include a fourth reserved field 270 and a fifth reserved field 270 respectively. Word6 also includes a transmit slot pointer (tx_slot_ptr) 292 corresponding to the byte offset into the current slot from which transmit data is being DMA'ed on a VC and an idle field 294. Lastly, word7 provides for ABR or UBR schedule pointers in a VC_link field 295.

Figure 15:
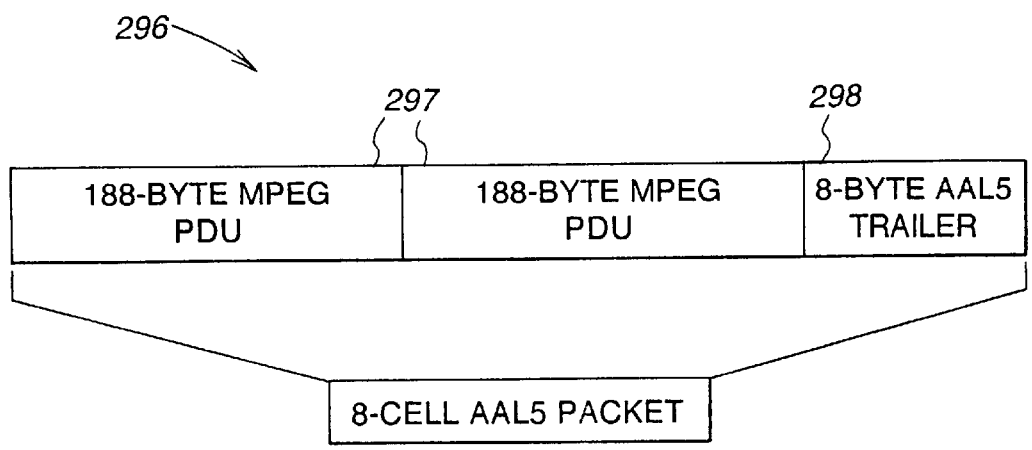
FIG. 15 illustrates the format of an AAL5 packet carrying two MPEG protocol data units (PDUs)

As already stated above, the SAR controller provides support for transmission of data encoded according to the MPEG standard through the use of MPEG Super-Packets. FIG. 15 illustrates the format of an 8 cell AAL5 packet 296 carrying two MPEG PDUs 297 and an AAL5 trailer 298. Each of the MPEG PDUs 297 is exactly 188 bytes in length. This means that 2 MPEG PDUs (376 bytes) may be packed together into a single 8-cell AAL5 packet with no AAL5 padding, as shown. An MPEG super-packet is a packet provided by the driver which may contain any even number of MPEG PDUs on a VC which has been specified as an MPEG VC (in the tx VC state table). The SAR controller automatically segments the packet into 1 or more AAL5 packets, placing 2 MPEG PDUs in each AAL5 packet.

The driver does not provide any AAL5 information in MPEG super-packets (as opposed to AAL5 packets, which must include the AAL5 pad, control and length fields and a 4-byte CRC placeholder). For example, if the driver wishes to transmit 10 MPEG PDUs in a single MPEG super-packet, it posts an MPEG super-packet exactly 1880 bytes in length (188×10). The SAR controller then segments the super-packet into 5 AAL5 packets and append the appropriate AAL5 length (376), control (0) and CRC fields to each AAL5 packet. As with other AAL5 packets, MPEG super-packets may be posted across any number of slots.

SAR Controller Segmentation Engine

The segmentation engine 88 of the SAR controller 62 functions to segment data provided by the driver 24 into fixed length cells to be transmitted to the PHY 80. The data to be segmented into cells and transmitted on a given VC resides in host memory 22; therefore, the elements shown in FIG. 6 interoperate in part to schedule DMA requests to host memory 22 to retrieve data for each VC and to transmit that data from the tx data FIFO 132 according to the traffic class and rate requirements for that VC.

In brief overview, the tx DMA scheduler 122 reads the tx pending slot FIFO 124 and moves transmit slot descriptors 240 (FIGS. 11–13) from the free slot list 161 to the active slot lists 162. The schedule table 174, which includes the CBR schedule table 176 and ABR schedule table 178, holds entries corresponding to CBR and ABR/UBR VCs to be transmitted. The tx rate scheduler FSM 120 (hereinafter tx rate scheduler 120) loads these entries into the schedule table 174 at locations determined in accordance with the rate requirements for the VCs. The tx rate scheduler 120 scans the CBR and ABR schedule tables 176 and 178, processing each of the entries in the tables sequentially. For each entry read, the tx DMA scheduler FSM 122 (hereinafter tx DMA scheduler 122) places a CBR or ABR tx DMA request entry in the tx DMA request FIFO 125, updates the tx VC state table 254, and moves tx slot descriptors 240 from the tx active slot lists 162 to the tx free slot list 161 as necessary.

The tx DMA FSM 126 processes the entries in the tx DMA request FIFO 125, generating a single burst read request to the PCI bus 18 for entries requiring the transfer of data from host memory 22 into the tx data synch fifo 128. The tx data synch fifo 128 provides buffering between the PCI bus 18 and SAR controller 62 clock domains. The tx cell FSM 130 in turn controls the transfer of data between the tx data synch fifo 128 and the tx data fifo 132.

The tx data fifo 132 serves as the transmit buffer memory, and as herein shown holds up to 16 CBR and/or ABR/UBR cells for transmission to the PHY interface 80. The configuration of the tx data fifo 132 depends upon whether GFC is enabled. The configuration of the tx data fifo 132 affects the operation of the various FSMs, and so is now described in detail.

Dual Mode Tx Data Fifo 132

Recall that, when GFC is enabled and SET_A is deasserted, controlled ABR/UBR traffic is halted while uncontrolled CBR traffic continues to flow. If both controlled and uncontrolled traffic are buffered in a single tx data FIFO 132 when GFC is enabled, then if a controlled ABR/UBR cell is at the head of the FIFO and GFC set_A is deasserted, any uncontrolled CBR traffic behind the pending ABR/UBR cell is unacceptably blocked from transmission.

Figures 16A, 16B:
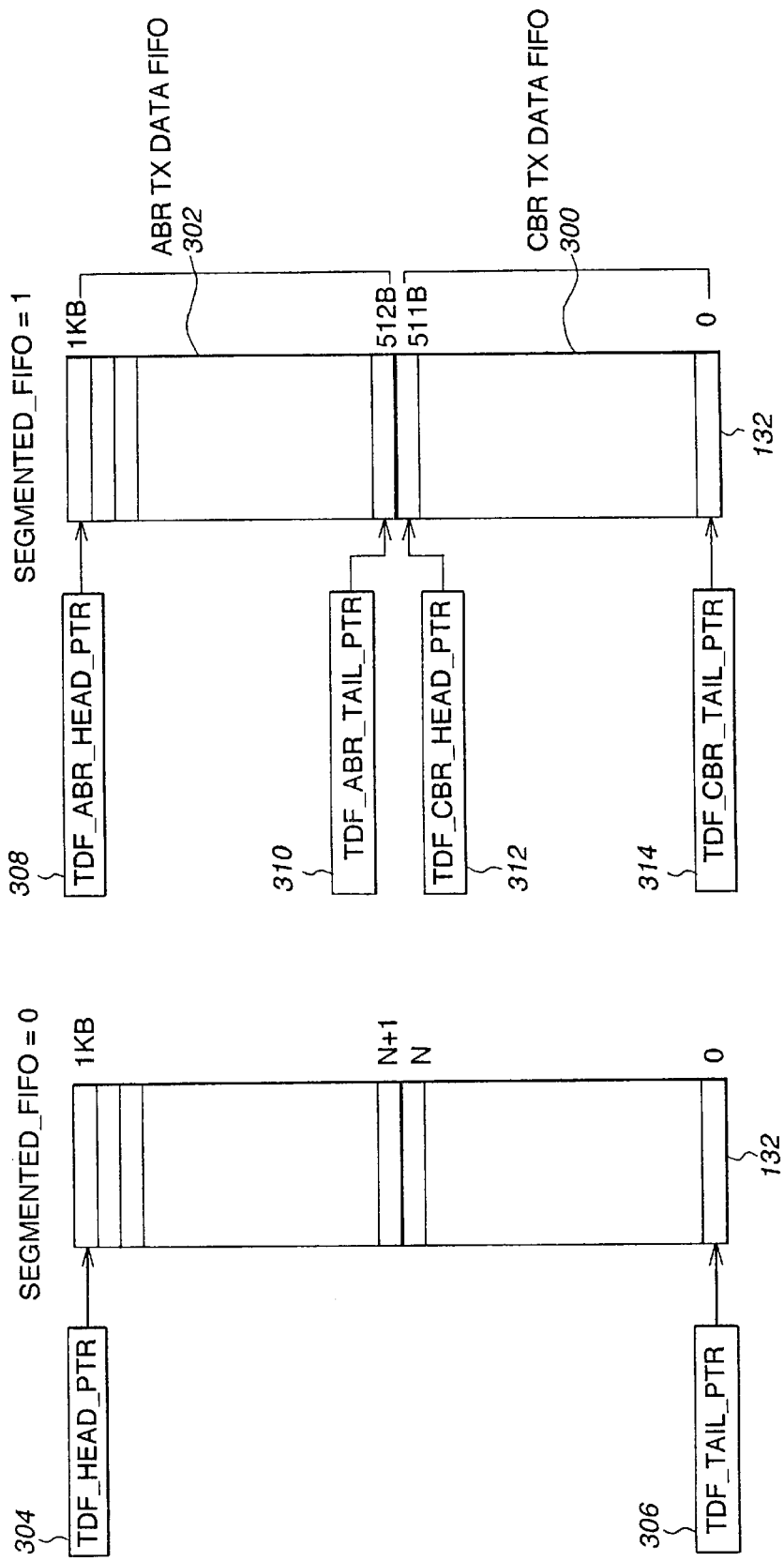
FIGS. 16a–b are block diagrams of the tx data FIFO of FIG. 6, in unsegmented and segmented mode respectively.

A dual-mode tx data FIFO 132 is therefore provided. Referring to FIG. 16a, when GFC is disabled, the tx data FIFO 132 is configured as a single FIFO for holding CBR, ABR, and UBR traffic. When GFC is enabled, however, the tx data FIFO 132 is segmented into a cbr tx data FIFO 300 for holding uncontrolled CBR traffic and an abr tx data FIFO 302 for holding controlled ABR and UBR traffic, as shown in FIG. 16b. When GFC is enabled and set_A is deasserted, only the abr tx data FIFO 302 traffic flow is halted. The separate cbr and abr tx data FIFOs 300 and 302 thereby prevent blocking of uncontrolled traffic in the event that controlled traffic is halted.

More particularly, when GFC is disabled (FIG. 16a), as indicated by the deassertion of a segmented_fifo signal by the tx data FIFO 132, the tx data FIFO 132 is configured as a single FIFO for holding CBR, ABR, and UBR VCs. A single set of head and tail pointers controls access to the tx data FIFO 132, shown here as tdf_head_ptr 304 and tdf_tail_ptr 306. When GFC is enabled (FIG. 16b), the signal segmented_fifo is asserted by the PHY and the FIFO is bifurcated into a cbr tx data FIFO 300 for holding uncontrolled cells and an abr tx data FIFO 302 for holding controlled cells. Two separate sets of pointers are then used. A tdf_abr_head_ptr 308 and tdf_abr_tail_ptr 310 control access to and from the abr tx data FIFO 302, while a tdf_cbr_head_ptr 312 and tdf_cbr_tail_ptr 314 control access to and from the cbr tx data FIFO 300.

Consider now the provision of dual FIFOs for controlled and uncontrolled traffic in combination with the provision of only a single DMA request FIFO 125 (FIG. 6). When GFC flow control is enabled and SET_A is deasserted, the flow of cells from the abr tx data FIFO 302 is halted, while uncontrolled CBR cells should continue to flow from the cbr tx data FIFO 300. Consider that the abr tx data FIFO 302 becomes full, and then a DMA request for an ABR cell is scheduled into the DMA request FIFO 125. Once the ABR entry rises to the head of the DMA request FIFO 125, back pressure from the abr tx data FIFO 302 prevents the processing of the request. Therefore, any uncontrolled CBR entries behind the ABR entry in the tx DMA request FIFO 125 will not be processed either.

This problem can be prevented through the provision of dual DMA request FIFOs—one for controlled and one for uncontrolled traffic. However, the problem is herein solved while allowing the efficient use of a single DMA request FIFO 125. Accordingly, when GFC flow control is enabled, the tx DMA scheduler 122 will not schedule DMA requests from the ABR schedule table 178 unless the abr tx data FIFO 132 can accommodate at least one cell. A fifo_remain controller 316 keeps track of the number of entries outstanding in the abr tx data FIFO 302. Thus, whereas cbr DMA scheduling may be prevented by back pressure from the cbr tx data FIFO 300, abr DMA scheduling is counter controlled.

Figure 17:
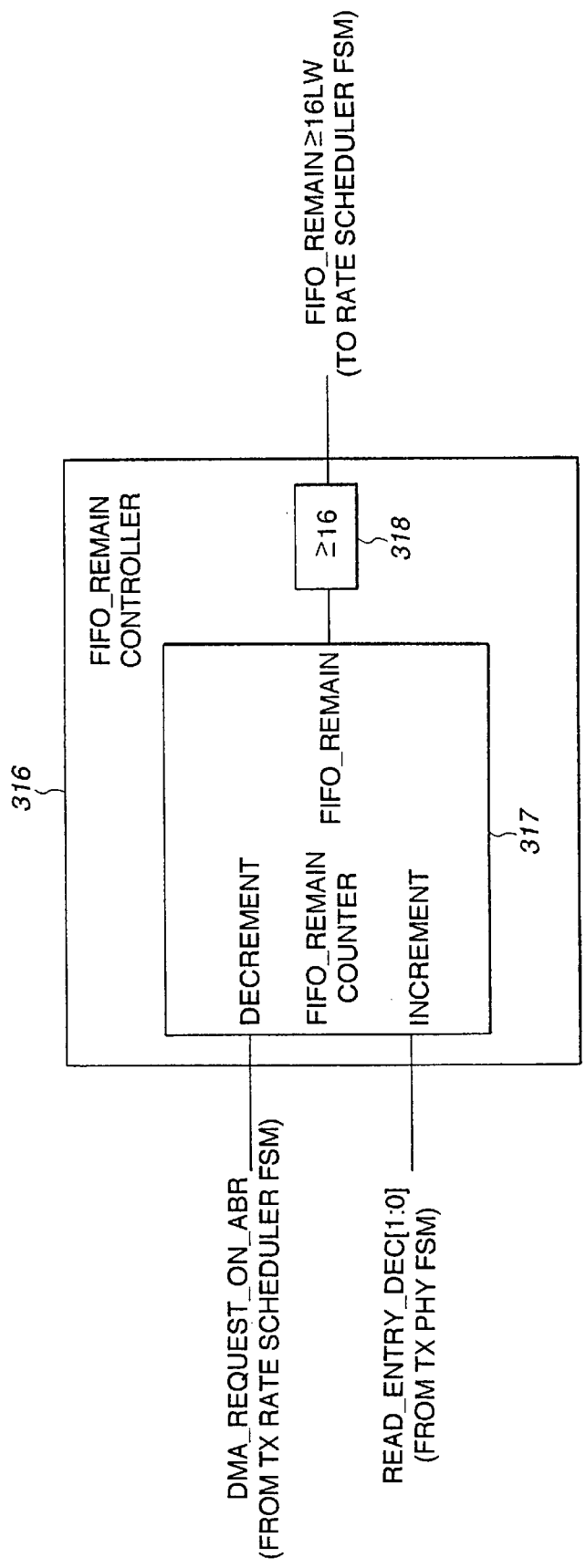
FIG. 17 is a block diagram of the fifo_remain controller of FIG. 6.
Figure 18:
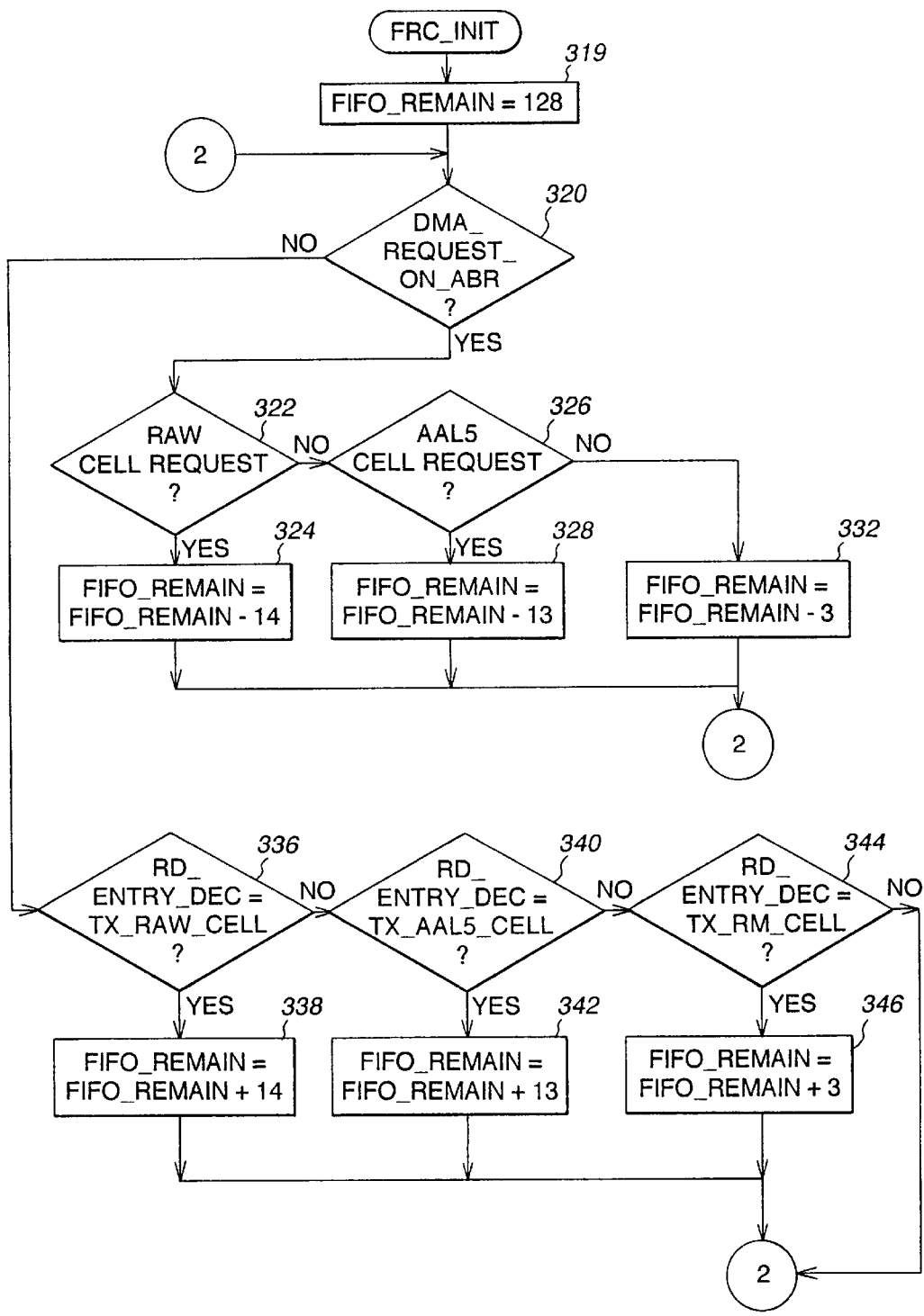
FIG. 18 is a flow diagram of the operation of the fifo_remain counter of FIG. 17.

As seen in FIG. 6, The fifo_remain controller 316 is coupled between the tx phy FSM 134 and the tx rate scheduler 120. The fifo_remain controller 316 is shown in more detail in FIG. 17 to include a counter 317 and a comparator 318. It accepts as input a DMA_request_on_abr signal from the tx rate scheduler 120 and a read_entry_dec[1:0] vector from the tx phy FSM 134, and produces as output a fifo_remain≧16 LW signal which is fed to the tx rate scheduler 120. A flow diagram representing the operation of the counter 317 is shown in FIG. 18.

As herein embodied, the tx data FIFO 132 is a 1K byte FIFO which may be segmented into a 512 byte cbr tx data FIFO 300 and a 512 byte abr tx data FIFO 302. At step 319 the counter 317 is initialized to 128 longwords, which is the number of longwords available in the empty abr tx data FIFO 302. Upon assertion of the DMA_request_on_abr bit by the tx DMA scheduler 122 (step 320), which indicates that a DMA request for an ABR/UBR cell has just been queued to the DMA request FIFO 125, the counter 317 is decremented by the number of bytes associated with the type of cell requested. The cell requested is one of three types: raw, AAL5, or RM. As will be further described in conjunction with the tx data FIFO 132, raw cells consume 14 longwords in the FIFO, AAL5 cells consume 13 longwords, and RM cells consume 3 longwords. Thus, for a raw cell, the counter 317 is decremented by 14 (steps 322 and 324), and for AAL5 cells, by 13 (steps 326 and 328). If the cell requested is neither raw or AAL5, then the counter 317 is decremented by the size of an RM cell, i.e. by 3 (step 332).

When a cell is transferred out of the abr tx data FIFO 302, the read_entry_dec[1:0] vector takes on a non-zero value that encodes the type of cell transmitted. In this case the counter 317 is incremented by the number of bytes in the cell transmitted. Thus, when the read_entry_dec[1:0] vector is decoded to indicate transmission of a raw cell, the counter 317 is incremented by 14 (steps 336 and 338). Decode of an AAL5 cells increments the counter 317 by 13 (steps 340 and 342). Decode of an RM cell increments the counter 317 by 3 (steps 344 and 346).

The output of the counter 317 is input to the comparator 318, where it is compared to a value of 16 longwords. As long as the counter 317 output remains greater than or equal to 16 longwords, the fifo_remain≧16 LW signal remains asserted and does not prevent DMA scheduling of VCs from the ABR schedule table 178. If the counter 317 output should ever fall below 16 longwords, the fifo_remain≧16 LW signal will be deasserted, preventing further abr DMA scheduling until a cell is transferred out of the abr tx data FIFO 302.

Note that the above described controller 316 is useful in general for transferring various sorts of data units, some of which are subject to a flow control mechanism, between a host memory and a peripheral interface. Where there is generally provided two transmit buffer memories, one for holding flow controlled data units (i.e. the abr tx data FIFO 302) and one for holding uncontrolled data units (i.e. the cbr tx data FIFO 300), and it is desirable to provide only a single request buffer (i.e. the tx DMA request FIFO 125), a controller such as the fifo_remain controller 316 can prevent data transfer circuitry (such as the combination of the tx rate scheduler FSM 120, tx DMA scheduler FSM 122, and tx DMA FSM 126) from transferring further data from the host memory to the transmit buffer memory storing the flow controlled data units when it is determined that there is not enough room in the transmit buffer memory storing the flow controlled data units to accommodate another data unit. Meanwhile, the controller 316 allows the data transfer circuitry to transfer further data from the host memory to the transmit buffer memory storing the uncontrolled data units.

Note also that, though the previously described embodiment employs a counter for keeping track of the space remaining in the the abr tx data FIFO 302, other embodiments can be used to achieve the same result. For example, a counter could be used to keep track of the number of entries used in the FIFO, rather than the number of entries remaining.

Each element shown in FIG. 6 is now described in detail.
Tx DMA Request FIFO 125

As the tx rate scheduler 120 scans the schedule table 174, DMA requests are generated by the tx DMA scheduler 122 and placed as entries in the tx DMA request FIFO 125. These entries are then read by the tx DMA FSM 126, which processes the entries and generates DMA requests for data from host memory 22. Referring now to FIGS. 19a–19c, The tx DMA scheduler 122 may generate any of 3 types of entries: a data DMA request entry 350, an idle slot report request entry 352, or an RM cell request entry 354. Fields in the first word of the entry identify the type of entry, as shown in Table 2.

TABLE 2

| Tx DMA request FIFO 125 Entry Type Decoding | | |
|---|---|---|
| RM | DMA_SIZE <5:0> | ENTRY TYPE |
| 0 | >0 | Data DMA Request |
| 0 | 0 | Idle Slot Report Request |
| 1 | N.A. | RM Cell Request |

The three types of tx DMA request FIFO 125 entries are defined as follows:
Data DMA Requests This type of entry represents a single request by the tx DMA scheduler 122 to read data from host memory 22. Each data DMA request is processed by the tx DMA FSM 126, and results in a single burst read request to the PCI bus 18.

FIG. 19a illustrates a data DMA request entry 350. This entry is identified by (RM=0) and (DMA_Size>0).
Data DMA Request Entry Fields:
VC (356)

This 12-bit field identifies the VC to which the data to be DMA'd from host memory 22 belongs. The VC is that obtained by the tx rate scheduler 120 when reading either a valid CBR schedule table entry or a worklist entry.
Sched_Time (358)

This 8-bit field is a timestamp representing the time at which the DMA Request was placed in the tx DMA request FIFO 125. It does not affect the functioning of the tx DMA FSM 126, but is placed by the tx Cell FSM 130 in the tx data FIFO 132 along with the data to be transmitted. The field is then used by the tx phy FSM 134 to resynchronize cell transmission, so that the pattern of cells emerging at the PHY interface 80 more closely resembles the pattern seen in the schedule table 174 by the tx rate scheduler 120, as will be further described in conjunction with the tx rate scheduler 120 and the tx phy FSM 134.
RM (360)

This 1-bit field is cleared (0) for data DMA request entries. It differentiates the entries from RM cell request entries.
CLP (362)

This 1-bit field indicates the value of the CLP bit which should be inserted in the AAL5 cell transmitted. It has no meaning for raw cells.
CRC_Ena (364)

This 1-bit field when set indicates that a CRC must be computed across the data DMA'd as a result of the request. If the request is for a raw cell (as indicated by the fact that the DMA_Size field of the request is equal to 52 bytes), then this bit indicates that a CRC-10 will be computed and inserted in the raw cell transmitted as a result of the request. If the request is for part of an AAL5 packet (DMA_Size field of the request is not equal to 52 bytes), then this bit indicates that a CRC-32 should be computed across the data DMA'd and transmitted as a result of the request.
EOP (366)

This 1-bit field indicates if the DMA burst to be executed is either:

A burst of a number of bytes containing the last byte of data in an AAL5 packet; or A 52-byte burst of a raw cell whose EOP bit is set.

The bit is used by the tx cell FSM 130 to determine AAL5 packet boundaries, in order to write computed AAL5 CRCs to the tx data FIFO 132 at the appropriate time. This bit does not affect the functioning of the tx DMA FSM 126.

DMA_Size (368)

This 6-bit field differentiates data DMA request entries from idle slot report request entries and indicates the number of bytes to be DMA'd from host memory 22. It will be 0 for idle slot report request entries and non-zero for data DMA request entries. For raw cell slots, this field will always indicate 52 bytes. For AAL5 slots, this field will usually indicate 48 bytes, except sometimes at slot boundaries, and it will never indicate more than 48 bytes.

Int (370)

This 1-bit field when set indicates that a tx status report should be completed and a tx interrupt generated upon completion of the DMA'ing of data.

EOC (372)

This 1-bit field indicates whether or not the request is for the end of an AAL5 or raw cell. EOC is set to 1 for every raw cell request (DMA_Size=52) and for every request which results in the DMA of the 48th byte of data of an AAL5 cell.

Add_MPEG_Trailer (374)

This 1-bit field when set indicates that an AAL5 trailer should be appended to the end of the data DMA'd when the data is placed into the tx data FIFO 132 by the tx cell FSM 130. This bit is set at 376-Byte boundaries of MPEG super-packets. The AAL5 trailer appended will consist of 0 bytes of paddings, a length field=376 bytes, control field=0, and a 4-byte CRC.

CBR (376)

This 1-bit field indicates whether the request is associated with a CBR or ABR/UBR VC, and is used when GFC is enabled in order to direct the data associated with the request to the appropriate cbr or abr tx data FIFO 300 or 302.

DMA_Address (378)

This 32-bit field indicates the physical address in host memory 22 from which data should be DMA'd.

Idle Slot Report Requests

Idle slot report requests do not result in any data being DMA'd from host memory 22. Idle slots are used in part by the host 14 for fine tuning of CBR traffic rates. The purpose of an idle slot report request is to indicate to the tx DMA FSM 126 that it should report to the host driver 24 the consumption of an idle slot. Transmit reporting is also discussed in detail later.

The tx DMA scheduler 122 issues idle slot report requests only for the last cell of an idle slot, and only when the EOP bit for the idle slot is set (FIG. 10), indicating that consumption of the slot should be reported. If an idle slot does not have its EOP bit set, the tx DMA scheduler 122 will consume the slot without actually issuing any DMA requests for the slot. FIG. 19*b* illustrates an idle slot report request entry 352. This entry is identified by (RM=0) and (DMA_Size=0).

Idle Slot Report Request Entry Fields:

VC (380)

This 12-bit VC identifies the VC for which an idle slot was consumed.

RM (382)

This 1-bit field is cleared (0) for idle slot report request entries. It differentiates the entries from RM cell request entries.

DMA_Size (384)

This 6-bit field differentiates idle slot report request entries from data DMA request entries. It indicates the number of bytes to DMA'd from host memory 22, and will thus always be 0 for idle slot report request entries and non-zero for data DMA request entries.

RM Cell Requests

This type of entry represents a single request by the tx DMA scheduler 122 to transmit an RM cell on the link. This request does not result in the DMA of any data from host memory 22. It is simply an indication to the tx DMA FSM 126 that it must request that the appropriate RM cell be created and placed in the tx data FIFO 132 for transmission. FIG. 19*c* illustrates an RM cell request entry 354.

RM Cell Request Entry Fields:

VC (386)

This 12-bit field identifies the VC on which an RM cell should be transmitted.

Sched_Time (388)

This 8-bit field is a timestamp representing the time at which the RM Cell Request was placed in the FIFO. It does not affect the functioning of the tx DMA FSM 126 or tx cell FSM 130, but is placed in the tx data FIFO 132 along with the data to be transmitted. The field is then used by the tx phy FSM 134 to resynchronize cell transmission, so that the RM cell is transmitted at the appropriate time.

RM (390)

This 1-bit field is set (1) for RM cell request entries. It differentiates the entries from the 2 other types of entries in the FIFO.

CLP (392)

This 1-bit field indicates the value of the CLP bit which should be inserted in the transmitted RM cell.

Forward (394)

This 1-bit field indicates whether the RM cell to be generated is a forward RM cell (1) or a backward RM cell (0).

Schedule Table

Figure 20A:
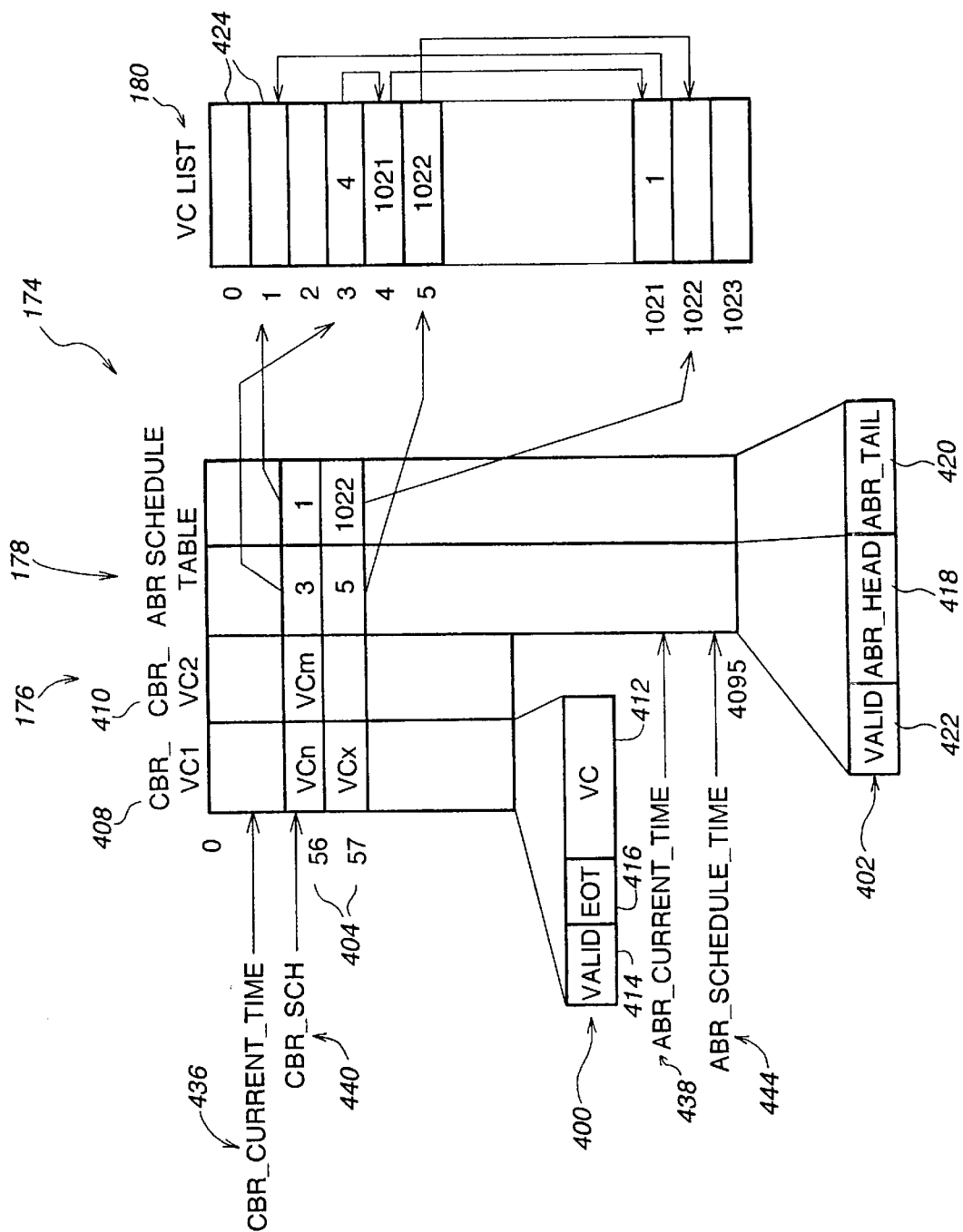
FIG. 20*a* is a detailed block diagram of the schedule table and VC list of FIG. 6.

The segmentation engine 88 uses a schedule table and worklist-based approach to DMA scheduling, wherein flows are represented by their VCs in the schedule table 174, shown in more detail in FIG. 20*a*. The schedule table 174 is a data structure located in local memory 76. It includes a CBR schedule table 176 and an ABR schedule table 178. As herein embodied, the CBR schedule table 176 contains from 2 to 4096 entries 400 used to schedule CBR flows, and the ABR schedule table 178 contains 4K entries 402 used to schedule ABR and UBR flows.

Each location or row 404 in the schedule table 174 represents a point in time that is 1 cell time (at whatever rate the physical interface 80 is running) from the adjoining rows. For example, at STS-3c/STM-1 line rates, the first row 404 in the schedule table 174 is associated with a time t=0, the next row 404 with a time t≈2.83 $\mu$s, and the next row 404 with a time t≈5.66 $\mu$s. Cell data is transferred from the tx data FIFO 132 to the PHY interface 80 at the line rate; thus, each location 404 represents a point in time at which data can be transferred from the tx data FIFO 132 to the PHY interface 80. The schedule table 174 operates as a circular structure, such that, for example, the entry at row (4095) adjoins the entry at row (4094) and the entry at row 0 in the ABR schedule table 178.

There are 2 separate columns in the CBR schedule table 176: cbr_vc1 (408) and cbr_vc2 (410). Each is a word wide and may include a single entry 400. Each entry 400 contains a 12-bit VC field 412, along with a valid bit 414 and an EOT bit 416. These fields indicate the CBR flow to be scheduled for transmission at the time at which the entry appears. When the valid bit 414 is asserted, the VC 412 in the entry 400 is valid. Otherwise, there is no CBR VC to be scheduled at the time represented by the entry 400. The EOT bit 416 is used to indicate the last entry 400 in the CBR schedule table 176.

Only one cbr_vc column is used at one time. The column in use is selected by the driver 24 through manipulation of a cbr-st-sel control bit in a CSR (not shown). The provision of two cbr_vc columns in the CBR schedule table 176 supports modification of CBR rates in real-time by the driver 24. At initialization time, the driver 24 will select the cbr_vc1 column 408 by setting the cbr_st_sel bit to 0, and initializing all entries in the column. When the driver 24 wishes to modify the CBR schedule, it will write the entries in the cbr_vc2 column 410 with the new schedule, then toggle the cbr_st_sel bit to 1. The tx rate scheduler 120 will then start using the cbr_vc2 column to schedule the transmission of CBR flows. If the driver 24 wishes to modify the schedule once again, it will modify the cbr_vc1 column, then toggle the cbr_st_sel bit back to 0.

An ABR schedule table entry 402 includes an abr_head field 418 and abr_tail field 420, each of which hold 12-bit pointers into a VC list 180, located in local memory 76. In addition, the abr_head field contains a valid bit 422. The VC list 180 is an array of 1K entries 424, each of which is a 12 bit pointer to another entry 424 in the list. Each entry 424 represents a VC, depending on its position in the array. For example, using the term VCL[i] to represent the ith entry in the VC list, VCL[5] represents VC 5, whereas VCL[256] represents VC 256. As herein implemented, the entries in the VC list 180 are the VC_link fields 295 in the tx VC state table entry 254 for each VC.

The abr_head field 418 of an ABR schedule table entry 402 is a pointer that points to the beginning of a linked list of VCs kept in the VC list 180. The abr_tail field 420 of an ABR schedule table entry 402 is a pointer that points to the end of a linked list of VCs kept in the VC list 180.

Thus, the abr_head and abr_tail pointers 418 and 420 of the ABR schedule table entries 402 along with the VC list 180 are used to assign a linked list of ABR and UBR VCs to each ABR schedule table entry 402. The linked list of ABR and UBR VCs located at a given schedule table entry 402 contains the complete set of ABR and UBR VCs which are scheduled to transmit a cell at the time slot represented by the location 404 of the entry 402 in the ABR schedule table 174.

The valid bit 422 indicates whether or not the abr_head and abr_tail pointers 418 and 420 in a given entry 402 are valid. When the valid bit 422 is asserted, the pointers in the entry are valid. Otherwise there are no ABR or UBR VCs to be scheduled at the time represented by the entry 402, and the pointers are ignored.

FIG. 20a shows 2 separate lists implemented using the abr_head and abr_tail fields 418 and 420 of the ABR schedule table 178 and the VC list 180. The list indicated by entry 402 at location 56 contains 4 entries 424: 3, 4, 1021, and 1. The list indicated by entry 402 at location 57 contains 2 entries 424: 5 and 1022.

As the ABR schedule table 178 is scanned by the tx rate scheduler FSM 120, the ABR/UBR list at the current schedule table entry 402 is appended to the tail of a linked list called the ABR/UBR work list 428 (hereinafter "work list 428"), shown in FIG. 20b. The work list is implemented with two worklist pointers 123 stored within the segmentation engine 88, the worklist_head and worklist_tail pointers 430 and 432. These two structures are pointers into the VC list 180. A schedule table ABR/UBR list is appended to the work list by copying the value of abr_head 418 into the location in the VC list 180 pointed to by worklist_tail 432, and copying the value of abr_tail 420 into worklist_tail 432.

Figure 20B:
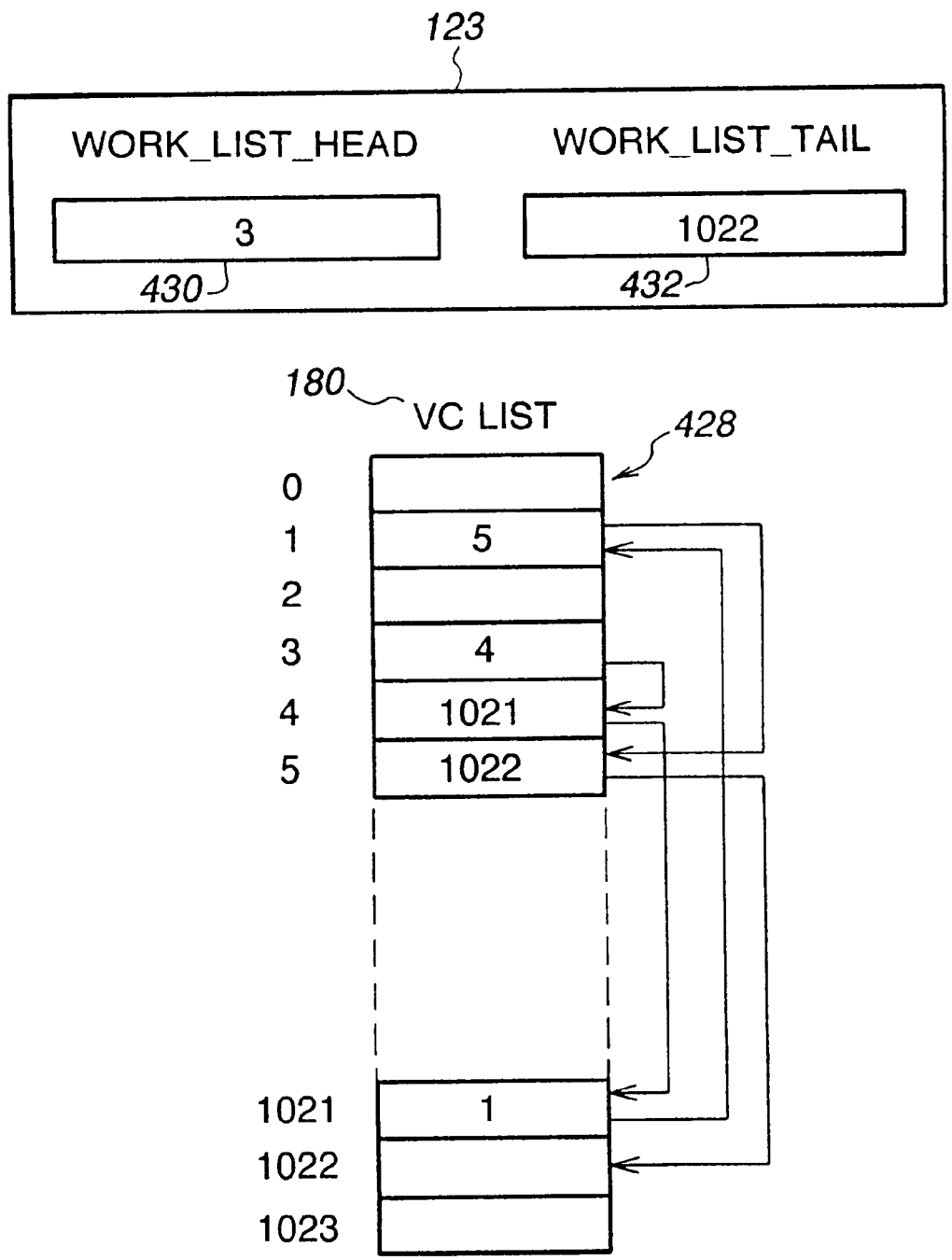
FIG. 20*b* is a block diagram of a worklist utilizing the VC list shown in FIG. 20*a*.

The work list shown in FIG. 20b could have been produced by scanning schedule table entries 56 and 57, for example, where abr_head at location 56 pointed to VC list entry 3 and abr_tail pointed to VC list entry 1, abr_head at location 57 pointed to VC list entry 5, and abr_tail at location 57 pointed to VC list entry 1022.

The ABR/UBR work list 428 is used to keep track of ABR and UBR cells to be DMA'd and transmitted. Whereas CBR VCs are read directly from the CBR schedule table 176 and then scheduled for DMA, ABR and UBR VCs are first copied onto the tail of the work list 428 from the ABR schedule table 178, then scheduled for DMA when they appear at the head of the work list 428. As ABR VCs are scheduled for DMA, they are popped off of the work list 428, then rescheduled into the ABR schedule table 178 according to the ABR parameters in effect at rescheduling time. As UBR VCs are scheduled for DMA, they are popped off of the work list 428 and rescheduled into the ABR schedule table 178 at the location specified by the peak cell rates of the VCs. When an ABR or UBR VC is rescheduled into a given entry in the ABR schedule table 178, it is added to the head of the ABR/UBR list located at the given schedule table entry, as will be further described in conjunction with the tx rate scheduler FSM 120.

The schedule table 174 according to the preferred embodiment supports CBR rates, ABR allowed cell rates or UBR peak rates in the range of approximately 36.6 kb/s to 149.76 mb/s. However, it may be desirable to achieve CBR rates or UBR peak rates down to approximately 8 Kb/s, and it is essential for compliance with the ATM Forum Traffic Management Specification to support ABR rates down to 4.2 kb/s (10 cells/s). In order to achieve these low rates without expanding the schedule table to an unreasonable size, 2 per-VC variables, Prescale_val (268) and Prescale_count (274), stored in the tx VC state table 254 (FIG. 14), are used.

Prescale_val specifies a scaling-down of the basic schedule-table implemented rate according to the following equation:

$$Rate = Schedule\_table\_rate/(Prescale\_val+1)$$

For example, if prescale_val for a VC is programmed with the value 0, then the rate specified on the VC will be equal to that implemented by the schedule table 174. If prescale_val is programmed with the value 1, the rate on the VC will be half that implemented by the schedule table 174. Prescale_count is used by the tx rate scheduler 120 to perform the scaling-down operation, as will be further described.

For CBR flows, prescale_val is programmed by the driver 24 and is never modified by the SAR controller 62. A given CBR rate maps into a given pattern of entries in the CBR schedule table 176 as follows: for every entry for a given VC in the CBR schedule table 176, the entry will receive (1/(st_size*(prescale_val+1)))th of the link bandwidth, where st_size is the size of the CBR schedule table 176 in units of entries. Thus, if a VC appears only once in the CBR schedule table 176, prescale_val for the VC is set to 0, and the CBR schedule table 176 contains 2119 entries, the VC will receive (1/2119)*149.76 Mb/s=70.67 Kb/s of bandwidth at STS-3c/STM-1 line rates. If, for example, the driver 24 wishes to allocate one half of the link bandwidth to CBR VC J, it fills half of the cbr_vc entries in the cbr_vc column being used with the value J, and programs prescale_val for the VC with 0.

For ABR and UBR flows, prescale_val is not used. The tx rate scheduler modifes prescale_count as necessary, according to the ABR protocol for ABR flows, or according to the fixed peak rate specified by the driver 24 for UBR flows. For all three types of flows, prescale_count is initialized to 0 by the driver 24.

Tx Rate Scheduler FSM and Tx DMA Scheduler FSM

The tx rate scheduler FSM 120 performs the following functions:

scans the off-chip schedule table 174, reading cbr entries 400 from the CBR schedule table 176 and abr entries 402 from the ABR schedule table 178;

for each valid entry found in the schedule table 174, calls the tx DMA scheduler FSM to post a data DMA request or idle slot report request to the DMA request FIFO 125;

calculates, in the RM cell request generator 435, the timing for the generation of RM cells according to ABR rates in effect for a given ABR VC, and posts requests to the tx DMA scheduler 122 to post an RM cell request to the DMA request FIFO 125;

reschedules ABR and UBR flows which have had DMA requests posted to the tx DMA request FIFO 125 by the tx DMA scheduler 122;

schedules new, presently unscheduled ABR/UBR VCs into the ABR schedule table 178.

The tx DMA scheduler 122 performs the following functions:

It reads the tx pending slot FIFO 200 and moves tx slot descriptors 158 from the tx free slot list 161 to the appropriate tx active slot list 162 as necessary;

In response to requests from the tx rate scheduler FSM 120, it reads parts of VC state from the tx VC state table 254, reads tx slot descriptors 240 from the active slot list 162, and queues ABR, UBR, and CBR data DMA requests, idle slot report requests, and RM cell requests to the tx DMA FIFO 125.

It moves tx slot descriptors 240 from tx active slot lists 162 to the tx free slot list 161 as tx slots are consumed.

According to the preferred embodiment, the rate at which the tx rate scheduler 120 (also referred to as the tx rate scheduler 120) scans the schedule table is at least 1.2 times as fast as a cell time at STS-3c/STM-1 line rates (≈2.83 μs). This allows the tx rate scheduler 120 to effectively "look into the future" a number of cell times and post requests to the tx DMA scheduler 122 to fill the tx DMA request FIFO 125 with requests for PCI transfers if PCI latency prohibits the tx DMA FSM 126 from making progress on the requests. This ensures that the PCI bus 18 can be used efficiently by the tx DMA FSM 126 when bus bandwidth becomes available.

As seen in FIG. 20a, five different pointers facilitate the scanning of the schedule table by the tx rate scheduler 120: CBR_current_time (436), ABR_current_time (438), CBR_sch (440), CBR_schedule_time (not shown), and ABR_schedule_time (444). The CBR_current_time and ABR_current_time pointers keep track of the time at which cells associated with entries in the CBR and ABR schedule tables are to be transferred from the tx data FIFO, while the ABR_schedule_time and CBR_sch pointers are used by the tx rate scheduler FSM 120 to scan the schedule tables. The pointers function as follows:

CBR_Current_time

This pointer is generated by a counter in the tx phy FSM 134 and points to location 0 of the CBR schedule table 176 after initialization. It advances by one schedule table entry 400 every time a cbr cell is transmitted from the tx data FIFO to the PHY interface, and thus advances at a maximum rate equal to the STS-3c/STM-1 line rate. It wraps at the end of the ABR/UBR portion of the schedule table (4K entries). The SAR controller 62 never actually accesses the CBR schedule table entry 400 pointed to by the CBR_current_time pointer.

ABR_Current_time

This pointer is generated by a counter in the tx phy FSM 134 and points to location 0 of the ABR schedule table 178 after initialization. It advances by one schedule table entry 402 every time an ABR/UBR cell is transmitted from the tx data FIFO to the PHY interface, and thus advances at a maximum rate equal to the STS-3c/STM-1 line rate. It wraps at the end of the ABR/UBR portion of the schedule table (4K entries). The SAR controller 62 never actually accesses the schedule table entry pointed to by the ABR_current_time pointer.

ABR_Schedule_time

This pointer is generated by the tx rate scheduler FSM 120 and points to location 0 of the ABR schedule table after initialization. It is advanced by the tx rate scheduler 120 through successive locations in the ABR schedule table 178 at a rate much faster than the ABR_current_time pointer; as herein implemented, about 1.2 times faster than STS-3c/STM-1 line rates. The ABR_schedule_time pointer therefore often represents a point in time which is ahead of the point in time represented by the current time counter. As herein embodied, it will never be allowed to be more than 32 locations ahead of the ABR_current_time pointer. The tx rate scheduler FSM 120 reads the abr_head 418 and abr_tail 420 fields of the abr entry 402 at the location 404 pointed to by the ABR_schedule_time pointer. This pointer wraps at the end of the ABR schedule table 178; i.e. at 4K.

CBR_schedule_time

This pointer is generated by the tx rate scheduler FSM 120 and points to location 0 of the CBR schedule table after initialization. It is advanced by the tx rate scheduler 120 through successive locations in the ABR schedule table 178 at a rate much faster than the CBR_current_time pointer; at least 1.2 times faster than STS-3c/STM-1 line rates. The CBR_schedule_time pointer therefore often represents a point in time which is ahead of the point in time represented by the current time counter. As herein embodied, it will never be allowed to be more than 32 entries ahead of the ABR_current_time pointer. This pointer wraps at the end of the ABR schedule table; i.e. at 4K.

CBR_sch

This pointer is generated by the tx rate scheduler FSM 120 and points to location 0 of the CBR schedule table after initialization. It is advanced by the tx rate scheduler 120 at the same rate as the CBR_schedule_time pointer. The tx rate scheduler FSM 120 reads the cbr entry 400 in one of the CBR columns (either CBR1 (408) or CBR2 (410)) at the location pointed to by the CBR_sch pointer. This pointer wraps at the end of the variable-length CBR portion of the CBR schedule table 176.

Cbr_curtime and abr_curtime hereinafter refer to the position of (or the values held in) the CBR_current_time and ABR_current_time pointers respectively, whereas cbr_sch refers to the position of the cbr_sch pointer, cbr_sch_time refers to the position of the CBR_schedule_time pointer and abr_sch_time refers to the position of the ABR_schedule_time pointer.

Separate CBR_current_time and ABR_current_time pointers are used when GFC is enabled, as will be further described. When GFC is disabled, only a single current_time pointer need be used. In this case, abr_curtime will take on the same value as cbr_curtime.

As will be seen, the schedule table 174 and the above described pointers provide a mechanism for ensuring that data for a given VC is transferred from the tx data FIFO 132 at the rate that was intended for the VC when entries for the VC were written into the schedule table 174. For example, valid entries 402 for a given ABR VC are placed in the ABR schedule table 178 at intervals corresponding to the rate at which they should be transmitted. The entries 402 are read from the ABR schedule table 178 at locations pointed to by the ABR_schedule_time pointer. Data transfers are initiated from the host memory 22 to the tx data synch FIFO 128, and ultimately to the tx data FIFO 132, in response to the entries read. Since the ABR_schedule_time pointer leads the ABR_current_time pointer, data can reside in the tx data FIFO 132 by the time the ABR_current_time pointer reaches the same location at which the ABR_schedule_time pointer pointed when the corresponding entry 402 was read. Thus, as will be seen, the tx PHY FSM 134 transfers cell data from the tx data FIFO 132 to the PHY interface 80 when the ABR_current_time pointer reaches the value that the ABR_schedule_time pointer held when the data DMA transfer was initiated. In this way, cell data leaves the tx data FIFO 132 at the rate that was intended for the VC when the entries for the VC were placed at intervals in the ABR schedule table 178.

Figure 21:
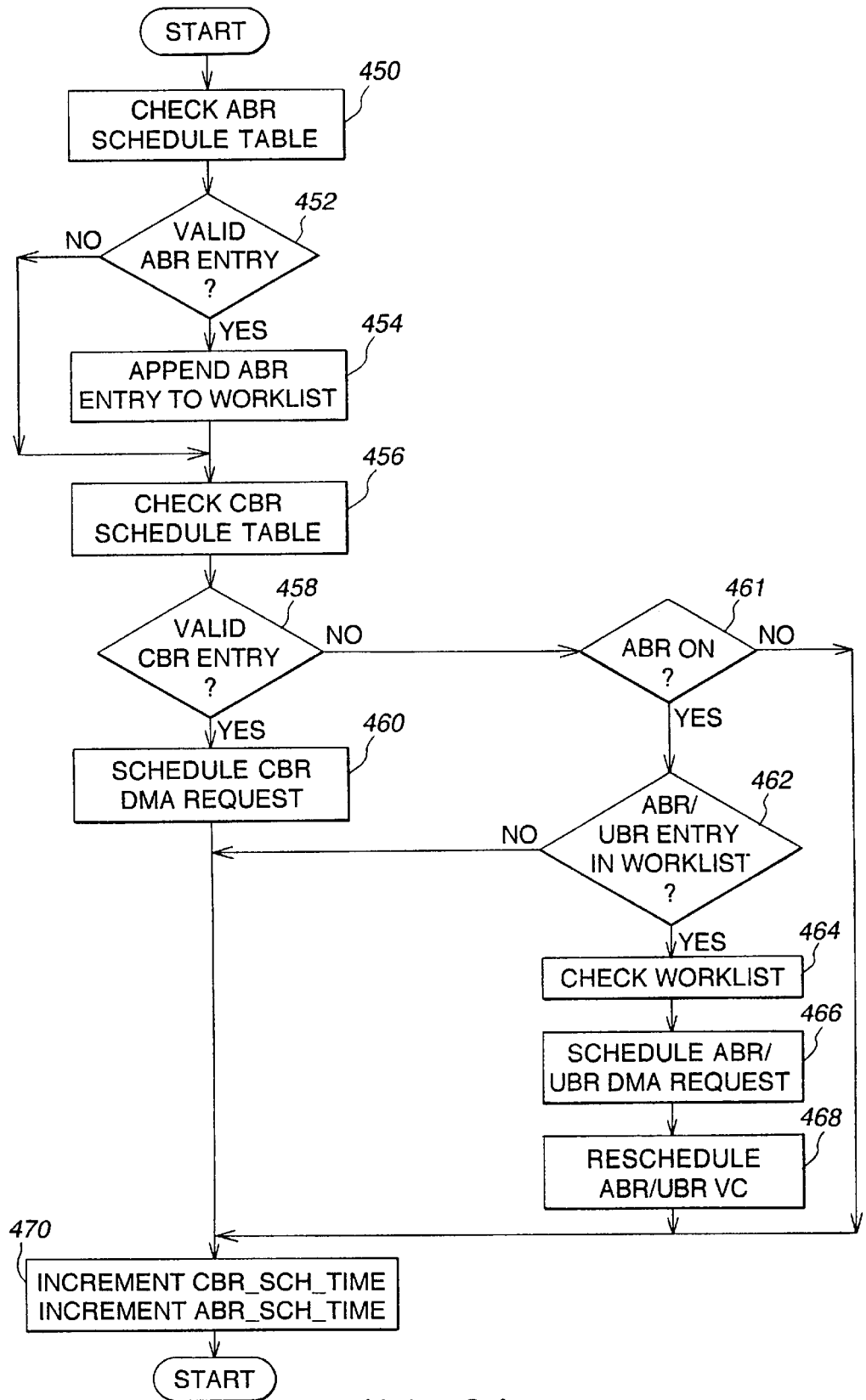
FIG. 21 is a high level flow diagram showing the operation of the tx rate scheduler and tx DMA scheduler FSMs of FIG. 6.

The tx rate scheduler 120 and tx DMA scheduler 122 operate generally as shown in the high level flow diagram of FIG. 21. The tx rate scheduler 120 first checks for an abr entry 402 at abr_sch_time; that is, at the location presently pointed to by the ABR_schedule_time pointer (step 450). If a valid entry 402 exists here (step 452), the list indicated by the ABR_head 418 and ABR_tail 420 pointers of the entry 402 is appended to the end of the worklist (step 454). If no valid entry 402 exists here, step 454 is skipped. The tx rate scheduler 120 then checks the CBR schedule table 176 at cbr_sch_time (step 456). If a valid cbr entry 400 exists here, (step 458), the tx rate scheduler 120 initiates a data transfer of data from the host memory 22 to the tx data synch FIFO 128 and on to the tx data FIFO 132 by invoking the tx DMA scheduler 122 to generate a DMA request to be placed in the DMA request FIFO 125 (step 460).

If no valid entry exists at this location in the CBR schedule table (step 458), the tx rate scheduler 120 then checks to see if ABR DMA scheduling is allowed. (step 461). If so, the tx rate scheduler 120 checks to see if an entry exists in the worklist 428 (step 462). If so, the tx rate scheduler 120 reads the head of the worklist 428 (step 464) and initiates a data transfer for the VC at the head of the worklist 428 by calling the tx DMA scheduler 122 to generate a DMA request to be placed in the DMA request FIFO 125 (step 466). The VC is then rescheduled into the ABR schedule table 178 (step 468). After a DMA request is scheduled, or in the event that no valid entry exists in either the CBR schedule table or the work list, the CBR_schedule_time and ABR_schedule_time pointers are advanced (step 470) and the process is repeated. The scanning of the schedule table 174 is stalled when either the tx DMA request FIFO 125 becomes full or the tx DMA scheduler 122 has scanned 32 entries ahead of the "current time" into the schedule table.

Figure 22B:
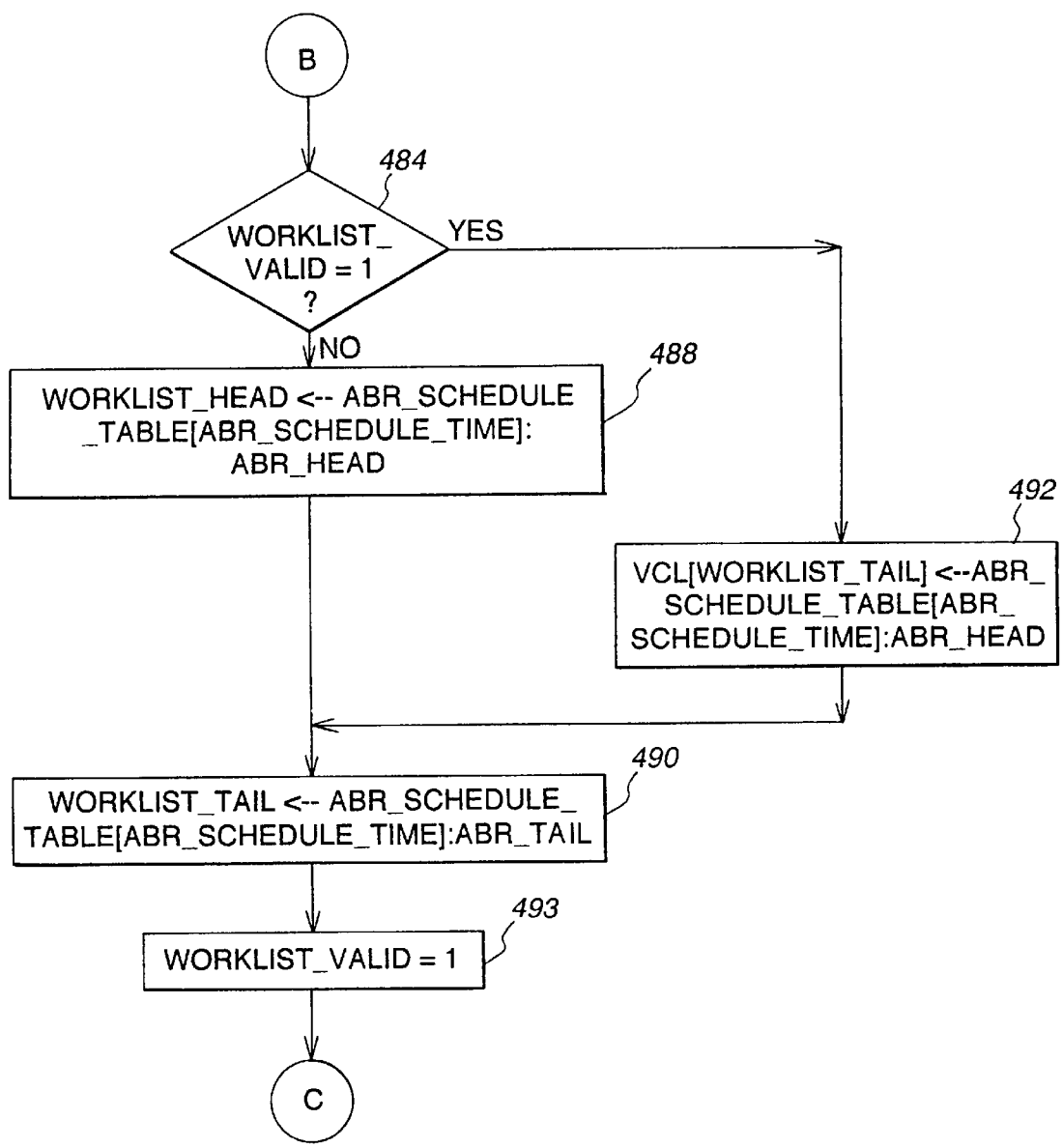

FIGS. 22a–22j show a flow diagram representing the detailed operation of the tx rate scheduler 120, while FIGS. 23a–23d show a flow diagram of the operation of the tx DMA scheduler 122. Referring now to FIG. 22a, the tx rate scheduler 120 first checks to see if ABR DMA scheduling is permitted (steps 472 and 474). If GFC controlled traffic is not enabled, ABR scheduling is permitted if the ABR_schedule_time pointer is within the permitted range of the ABR_current_time pointer. Thus, if abr_sch_time is within 32 cell times of abr_curtime as shown at step 472, and if the segmented_fifo signal is in its deasserted state at step 474 (indicating GFC controlled traffic is disabled), then ABR DMA scheduling is permitted, and is so indicated by the assertion of the signal ABR_ON (step 476). Else the ABR_ON signal is deasserted (step 478).

If GFC controlled traffic is enabled, i.e. the segmented_fifo signal is in its asserted state, then the tx rate scheduler 120 must not only ensure that abr_sch_time is within the permitted range of abr_curtime, but also that there is room in the abr tx data FIFO 302 to accommodate at least one ABR cell. Thus, as shown at steps 472 and 474, if abr_sch_time is less than abr_curtime+32, and if there are at least 16 long words available in the abr tx data FIFO 302 as indicated by the assertion of the signal fifo_remain≧16 LW output from the fifo_remain counter 316, the ABR_ON signal is asserted (step 476); else ABR_ON is deasserted (step 478).

If ABR DMA scheduling is permitted, i.e. ABR_ON is asserted, the tx rate scheduler 120 proceeds to read the valid field 422 in the abr entry 402 in the ABR schedule table 178 at the location pointed to by the ABR_schedule_time pointer (step 480). If the valid bit is set (step 482), indicating a valid ABR entry 402 exists at this location, then the list indicated by the ABR_head and ABR_tail fields 418 and 420 of the entry 402 is appended to the tail of the worklist 428.

The worklist 428 is appended as shown in FIG. 22b. First a worklist_valid bit is checked (step 484). If the worklist_valid bit is deasserted, indicating that no valid entries presently exist in the worklist, then the worklist_head pointer 430 is written with the VC number contained in the abr_head field 418 of the ABR schedule table entry 402 at the location pointed to by the ABR_schedule_time pointer (step 488), and the worklist_tail pointer 432 is written with the VC number contained in the abr_tail field 420 of the abr entry 402 at the location pointed to by the ABR_schedule_time pointer (step 490). If the worklist_valid bit is asserted, then the worklist 428 is not presently empty. In this case, the list indicated by the ABR_head and ABR_tail fields is appended to the tail of the worklist by writing the VC number contained in the abr_head field 418 of the entry 402 at the location pointed to by the ABR_schedule_time pointer to the location in the VC List 180 pointed to by the worklist_tail pointer 432 (step 492), and by writing the VC number contained in the abr_tail field 420 of the entry 402 to the worklist_tail pointer 432 (step 490). In either case, the worklist_valid bit is then set (step 493).

Figure 22C:
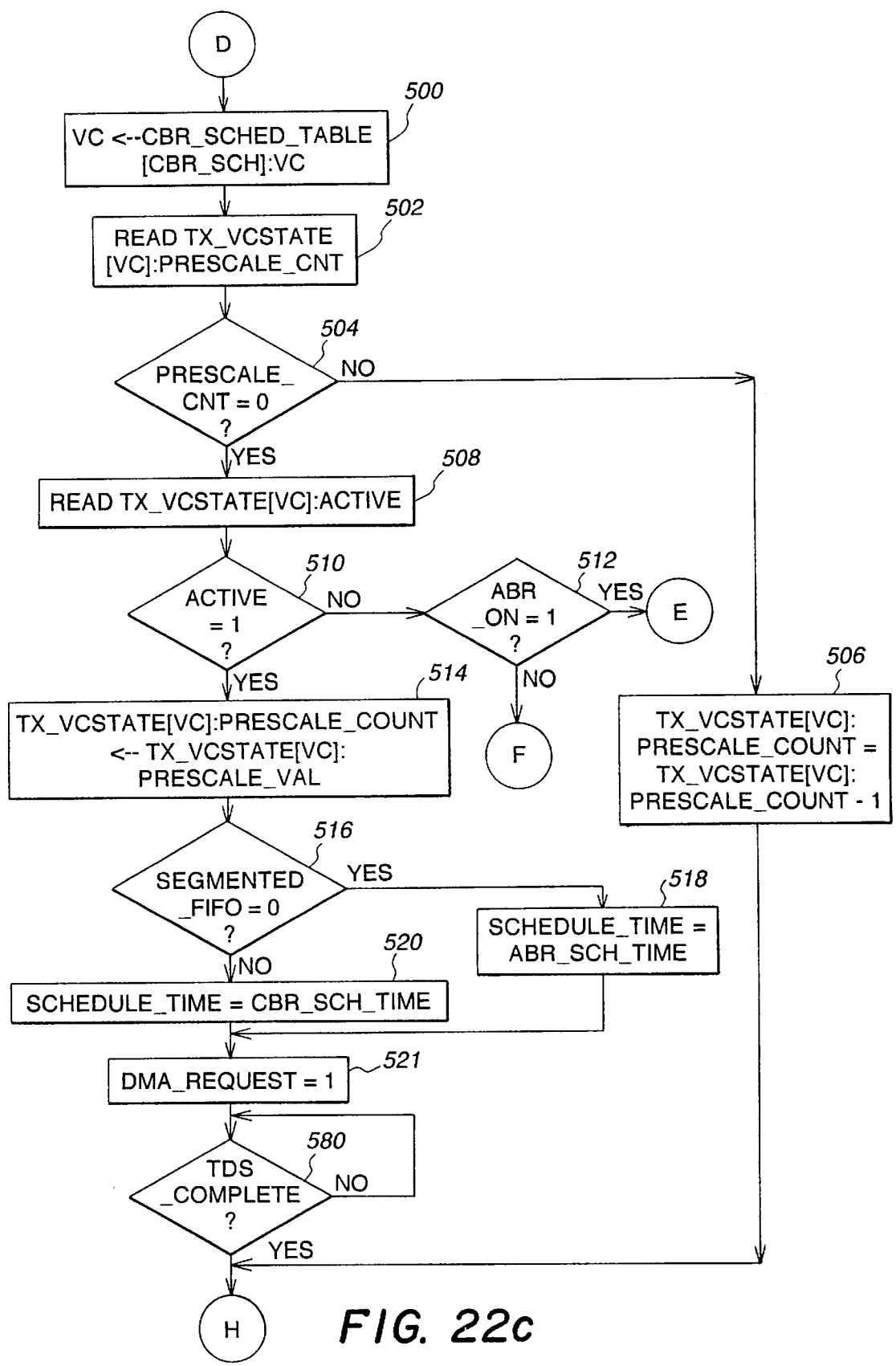

Referring back to FIG. 22a, the tx rate scheduler 120 next checks to see whether a DMA request for a CBR cell should be placed in the tx DMA request FIFO 125. If cbr_sch_time is less than cbr_curtime+32 (step 494), and if a cbr_inhibit bit (to be further described later) is deasserted (step 495), the CBR schedule table 176 is read at the location currently pointed to by the cbr_sch pointer (step 496). Referring now to FIG. 22c, which shows the cbr handling portion of the tx rate scheduler 120, if the valid bit at this location is asserted, indicating that a valid CBR entry exists here (step 498), then the CBR VC number to be scheduled for DMA is read from the VC field at this location (step 500). This VC number is used to index the tx VC state table 254. The tx rate scheduler 120 then reads the contents of the prescale_count field in the tx VC state table 254 for the VC (step 502). If prescale_count is non-zero (step 504), then the VC may not transmit a cell. In this case, prescale_count value is decremented (step 506).

If prescale_count is 0 (step 504), then the tx rate scheduler 120 determines whether data is available in host memory 22 for the VC. Accordingly, the Active bit is in the tx VC state table 254 for the VC read (step 508). If it is deasserted (step 510), no data exists to be transmitted on this CBR VC, and the tx rate scheduler proceeds to schedule any pending ABR/UBR VCs for DMA in the event that ABR scheduling is allowed (step 512).

If the active bit is set (step 510), data exists in the active slot list 162 for the CBR VC. The VC's prescale_count value is then reset to the value of prescale_val; that is, the prescale_count field in the tx VC state table 254 for the VC is written with the value contained in the prescale_val field in the tx VC state table 254 for the VC (step 514).

The tx rate scheduler 120 then determines what value should be passed to the tx DMA scheduler 122 to be used as the Sched_Time timestamp field in the DMA request entry to be posted. When GFC is disabled and the tx data FIFO 132 is not segmented, only a single timestamp need be used; thus, when the segmented_fifo signal is deasserted (step 516), a schedule_time variable is set to abr_sch_time (step 518). If the segmented_fifo signal is asserted, two separate tx data FIFOs are operating independently and thus their respective entries require independent timestamps; thus, the schedule_time variable for CBR traffic is set to cbr_sch_time (step 520), while the schedule_time variable for ABR/UBR traffic will be timestamped with abr_sch_time.

A DMA_request signal is then asserted (step 521), invoking the tx DMA scheduler 122 to post a CBR DMA request entry to the DMA request FIFO 125.

Referring now to FIGS. 23a–23d, the tx DMA scheduler 122 senses the assertion of the DMA_request signal to prepare a DMA request entry for the DMA request FIFO 125 (step 522). If the request is from the RM cell request generator 435 (step 524), the tx DMA scheduler builds an RM cell request entry 354 (step 526) and indicates that a cell has been scheduled for DMA by asserting a cell_sent signal (step 528).

The RM cell request entry 354 fields are written as follows:

VC: from the RM cell request generator FSM 435, the VC on which the RM cell is to be transmitted.

Sched_time: the current value of schedule_time as passed from the tx rate scheduler FSM.

RM: =1.

CLP: from the RM cell request generator FSM 435.

FORWARD: from the RM cell request generator FSM 435.

If the request is not from the RM cell request generator FSM 435 (step 524), then the tx DMA scheduler 122 has been called from either the cbr or abr handling portions of the tx rate scheduler FSM. In this case, the tx DMA scheduler 122 first reads the slot_size field 234 in the slot descriptor 240 at the head of the tx active slot list 162 for the VC (step 527), and then reads the tx_slot_ptr field 292 in the tx VC state table 254 for the VC (step 529). If the tx_slot_ptr field is 0 (step 530), the beginning of a transmit slot is being processed. The size of the DMA transfer to be requested is then determined. If the raw bit 222 in the entry at the head of the tx active slot list 162 for the VC is asserted (step 532), then the size of the DMA transfer will be 52 bytes; thus, a DMA_size variable is set to 52 (step 533). If the idle bit 224 in the entry at the head of the tx active slot list 162 for the VC is asserted (step 534), then the tx DMA scheduler 122 proceeds to an idle cell processing portion, to be further described.

If the idle bit 224 is deasserted (step 534), then the tx DMA scheduler 122 will build a data DMA request entry 350. First determined is the size of the DMA transfer to be requested. Accordingly, the tx DMA scheduler 122 checks the chtyp field in tx VC state for the VC to see if the request is for an MPEG cell (step 536). If it is not, then the request is for an AAL5 cell, and the size of the DMA transfer is determined. The tx_slot_ptr field in tx VC state 254 for the VC indicates the byte position within the current slot from which data is currently being DMA'd. Therefore, the size of the DMA transfer to be requested is determined as the minimum of either slot_siz–tx_slot_ptr, or 48 bytes. The DMA_siz variable is set to this value at step 538. If at step 536 the request is determined to be for an MPEG cell, then the size of the DMA transfer depends upon whether the request is for the final cell in an 8-cell MPEG superpacket. Therefore, at step 540 the MPEG_count field in tx VC state for the VC is checked. This field was initialized to 0 and is updated on the transmission of each cell in an 8-cell MPEG superpacket. Thus, if MPEG_count is less than 7, then the size of the DMA transfer to be requested is determined as the minimum of either slot_siz–slot_ptr or 48 bytes, as for a regular AAL5 packet. DMA_size is then set to this value at step 538, and the MPEG_count value is incremented. If the MPEG_count value is equal to 7 (step 540), the size of the DMA transfer to be requested is determined as the minimum of either slot_siz–slot_ptr, or 40 bytes. The DMA_size variable is set accordingly at step 542, and MPEG_count is reset.

Once the size of the DMA has been determined, the DMA address from which data should be DMA'd is determined by adding the value in slot_ptr to the contents of the base_address field 238 in the tx active slot list 162 for the VC (step 544).

Figure 23B:
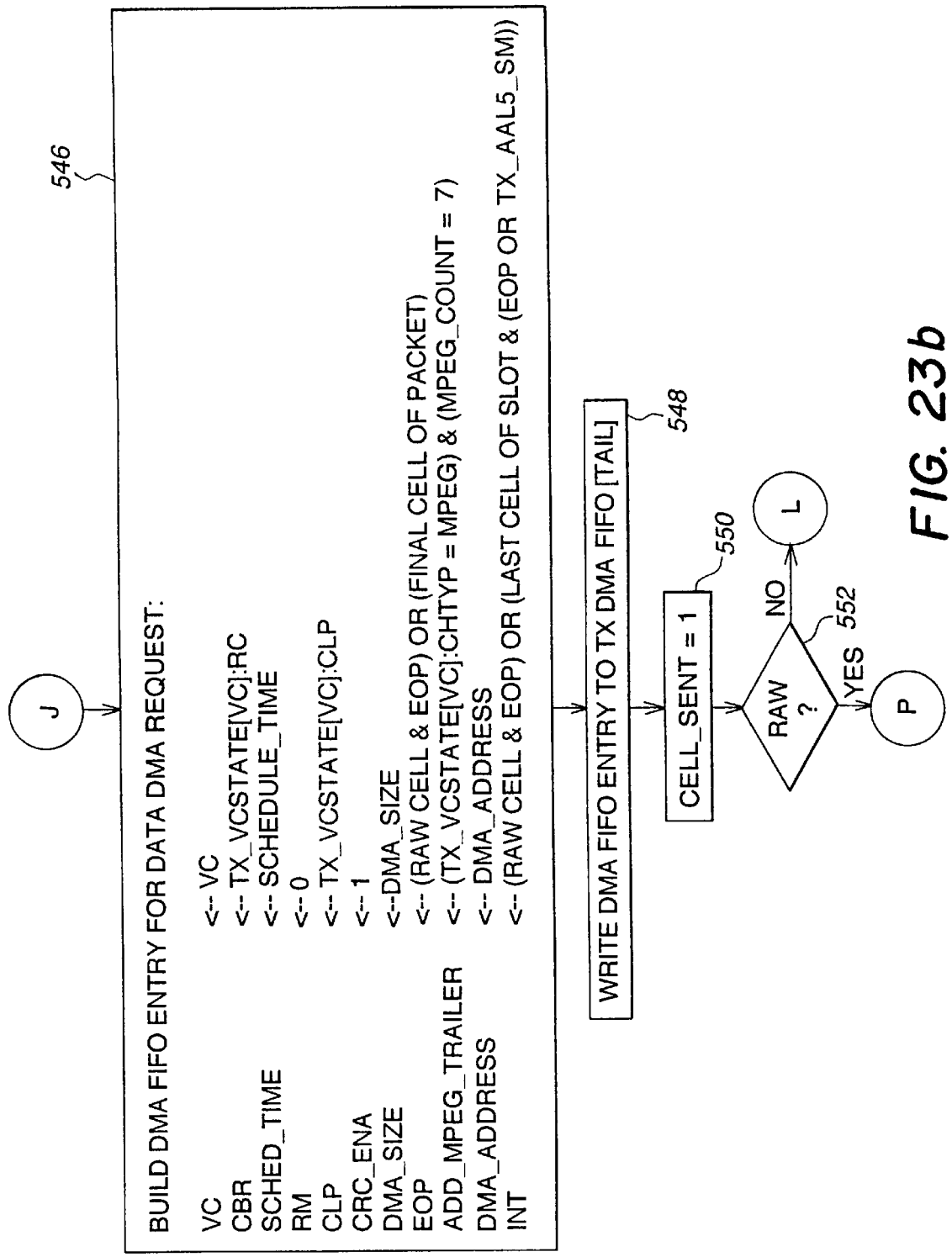
Figure 23C:
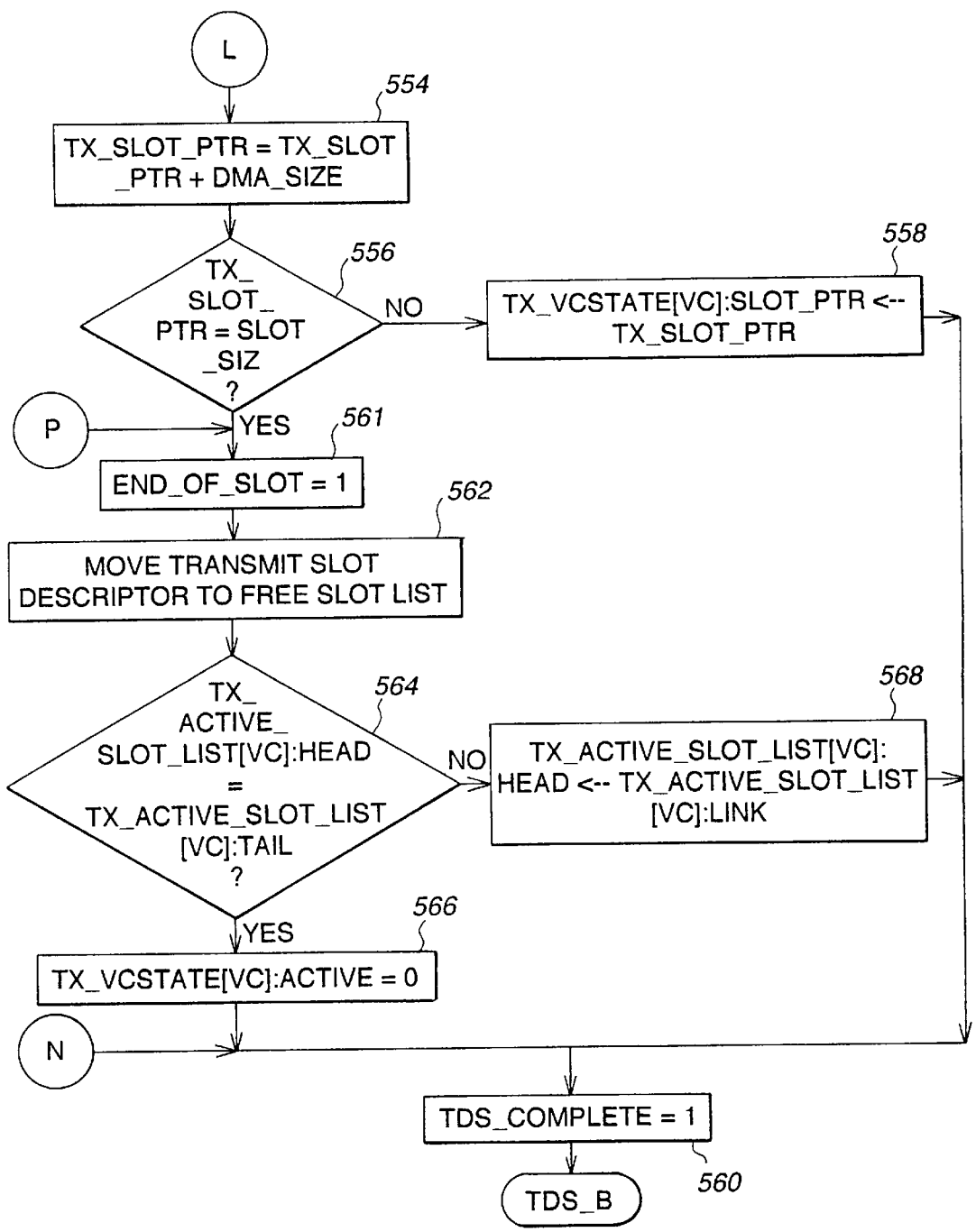

Referring now to FIG. 23b, the Data DMA request entry is built at step 546 as follows:

VC : When called from the cbr handling portion of the tx rate scheduler 120, the contents of the VC field read from the CBR schedule table entry 400 at the location pointed to by the cbr_sch pointer. When called from the abr handling portion of the tx rate scheduler 120, the contents of the VC field from the entry at the head of the worklist 428.

CBR: the contents of the RC field in the tx VC state table 254 for the VC. When called from the cbr handling portion of the tx rate scheduler, is =1. When called from the abr handling portion of the tx rate scheduler, is =0.

Sched_time: schedule_time as passed from the tx rate scheduler FSM 120.

RM: 0

CLP: the contents of the CLP field in the tx VC state table 254 for the VC

CRC_Ena: 1

DMA_Size: Raw cell: 52 bytes

AAL5/MPEG cell: the contents of the variable DMA_size as determined by the tx DMA scheduler FSM at steps 538 or 542.

EOP: 1 if the tx slot descriptor for the VC indicates a raw cell and the EOP bit is set, or 1 if the tx VC state table 254 for the VC indicates an AAL5 or MPEG VC and the EOP bit is set in the VC's tx slot descriptor, indicating the end of a packet.

Add_MPEG_Trailer: 1 if the chtyp field in the tx VC state table 254 for the VC indicates an MPEG VC.

DMA Address: as determined by the tx DMA scheduler 122 at step 544.

INT: raw cell: 1 if the EOP field in the tx_active_slot_list for the VC is set.

AAL5 cell: 1 if the end of a slot has been encountered and either the AAL5_SM field in the tx VC state table 254 is set, or the EOP bit in the tx slot descriptor is set.

Once the Data DMA request has been built, it is written to the tail of the tx DMA request FIFO 125 (step 548), and the cell_sent bit is set to indicate that a cell is scheduled for DMA (step 550). If the cell scheduled was not a raw cell (step 552), i.e. was an AAL5 or MPEG type cell, the tx_slot_ptr value must be updated. Accordingly, referring to FIG. 23c, DMA_size is added to tx_slot_ptr (step 554). If tx_slot_ptr is not yet equal to slot_siz (step 556), the entire slot has not yet been consumed. The tx_slot_ptr field in tx VC state for the VC is therefore updated with the new value of tx_slot_ptr (step 558), and a tds_complete bit is set, returning control to the tx rate scheduler FSM (step 560).

If tx_slot_ptr is now equal to slot_siz (step 556), the end of a slot has been encountered (step 561). The transmit slot descriptor 240 is then moved from the head of the active slot list 162 to the tail of the free slot list 161 (step 562). The head pointer 243 for the tx active slot list for the VC is then compared to the tail pointer 242 of the tx active slot list for the VC (step 564). If the pointers are equal, the end of the active slot list has been reached. In this case, the active field 280 in tx VC state 254 for the VC is reset to 0 (step 566), deactivating the VC from scheduling. The tds_complete bit is then set, returning control to the tx rate scheduler FSM (step 560).

If the head and tail pointers 243 and 242 for the active slot list 162 for the VC are determined at step 564 to be unequal, then the head pointer 243 into the tx active slot list for the VC is updated by copying the link field 241 in the current tx active slot list entry into the tx active slot list head pointer 243 (step 568). The tds_complete bit is then set, returning control to the tx rate scheduler 120 (step 560).

Figure 23D:
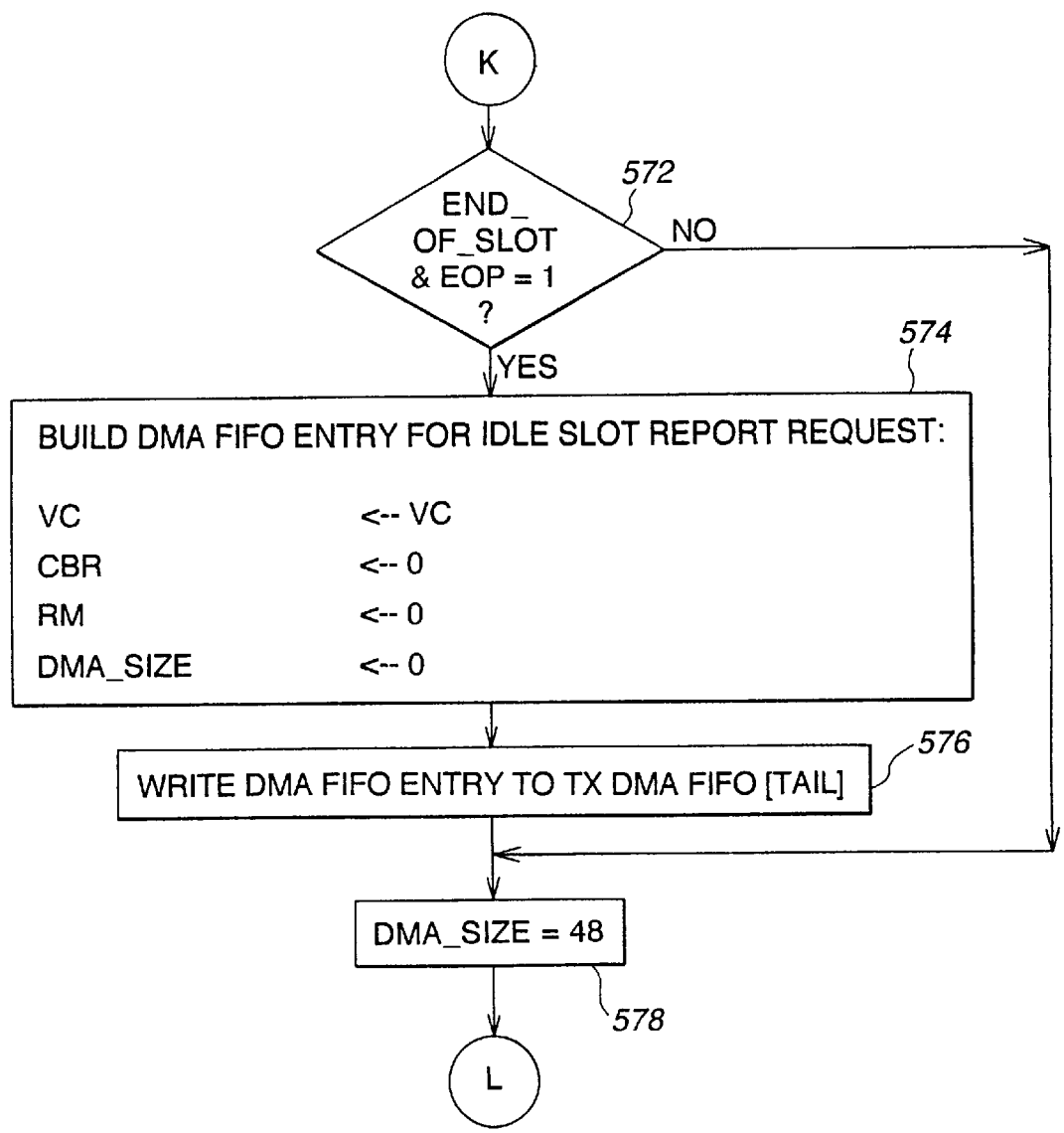

Referring back to FIG. 23a, if the value of tx_slot_ptr as checked at step 530 is determined to be non-zero, either an idle slot is to be processed or processing of an AAL5 or MPEG type slot is to be continued. Accordingly, the tx DMA scheduler 122 checks the idle field 224 in tx VC state for the VC. If the idle bit is reset, processing of an AAL5 or MPEG slot continues as described from step 536. If the idle field is set, idle slot processing continues from step 572 (FIG. 23d).

Idle cell processing is thus entered at step 572 either from step 570 or as previously described from step 534. At this point, The tx DMA scheduler 122 determines whether an idle slot report request 352 should be generated. If the EOP bit in the tx active slot list 162 for the VC is set, and if the end of a slot has been encountered, then an idle slot report request 352 is generated. Note that, as for idle cells, the size of the DMA request is 0, since no data is actually transferred for idle slots. The Idle slot report request is generated as follows at step 574:

VC: the contents of the VC field read from the CBR schedule table entry at the location pointed to by the cbr_sch_time pointer.
CBR: the contents of the RC field in the tx VC state table 254 for the VC. When called from the cbr handling portion of the tx rate scheduler, is =1. When called from the abr handling portion of the tx rate scheduler, is =0.
RM: 0
DMA_Size: 0

The Idle cell report request 352 is then written to the tail of the tx DMA request FIFO 125 (step 576). Whether or not an idle cell report request 352 was generated, the tx DMA scheduler 122 then proceeds to set DMA_size to 48; i.e. the size in bytes of an idle cell (step 578). Processing then proceeds from step 554 as previously described.

Figure 22D:
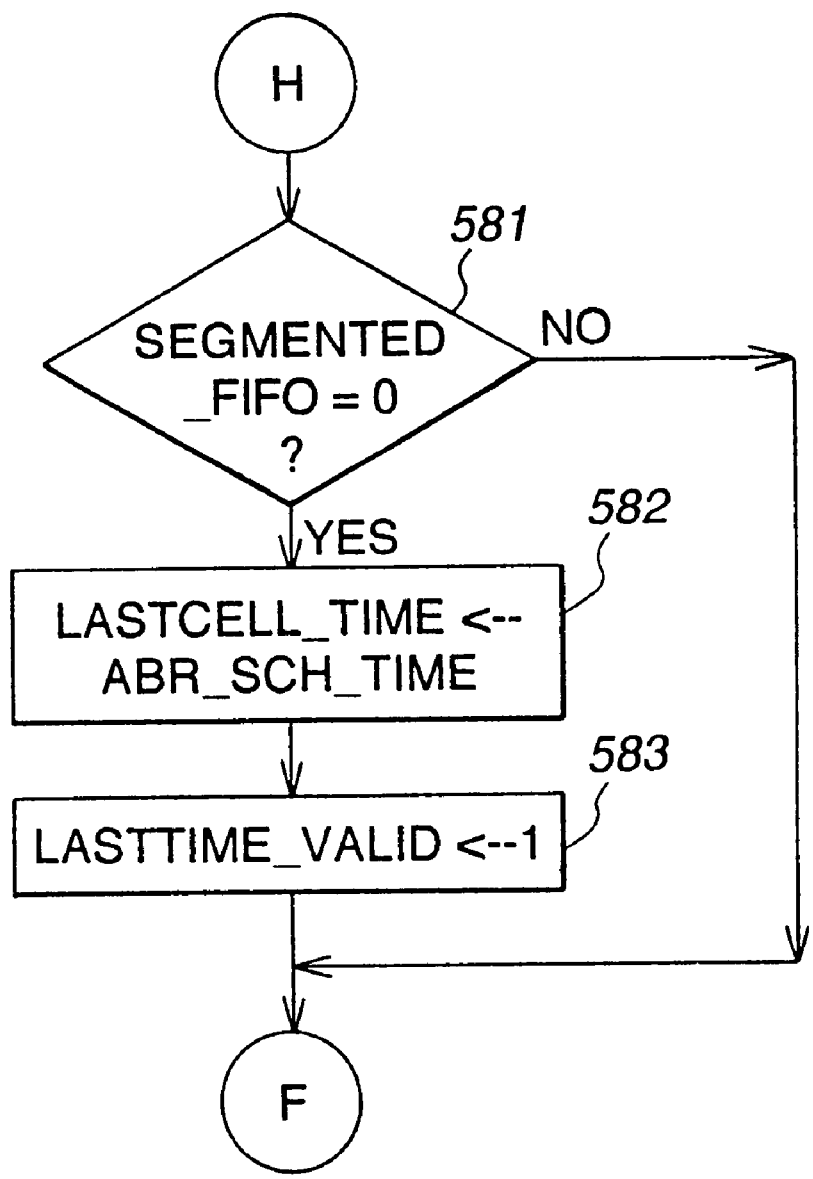
Figure 22E:
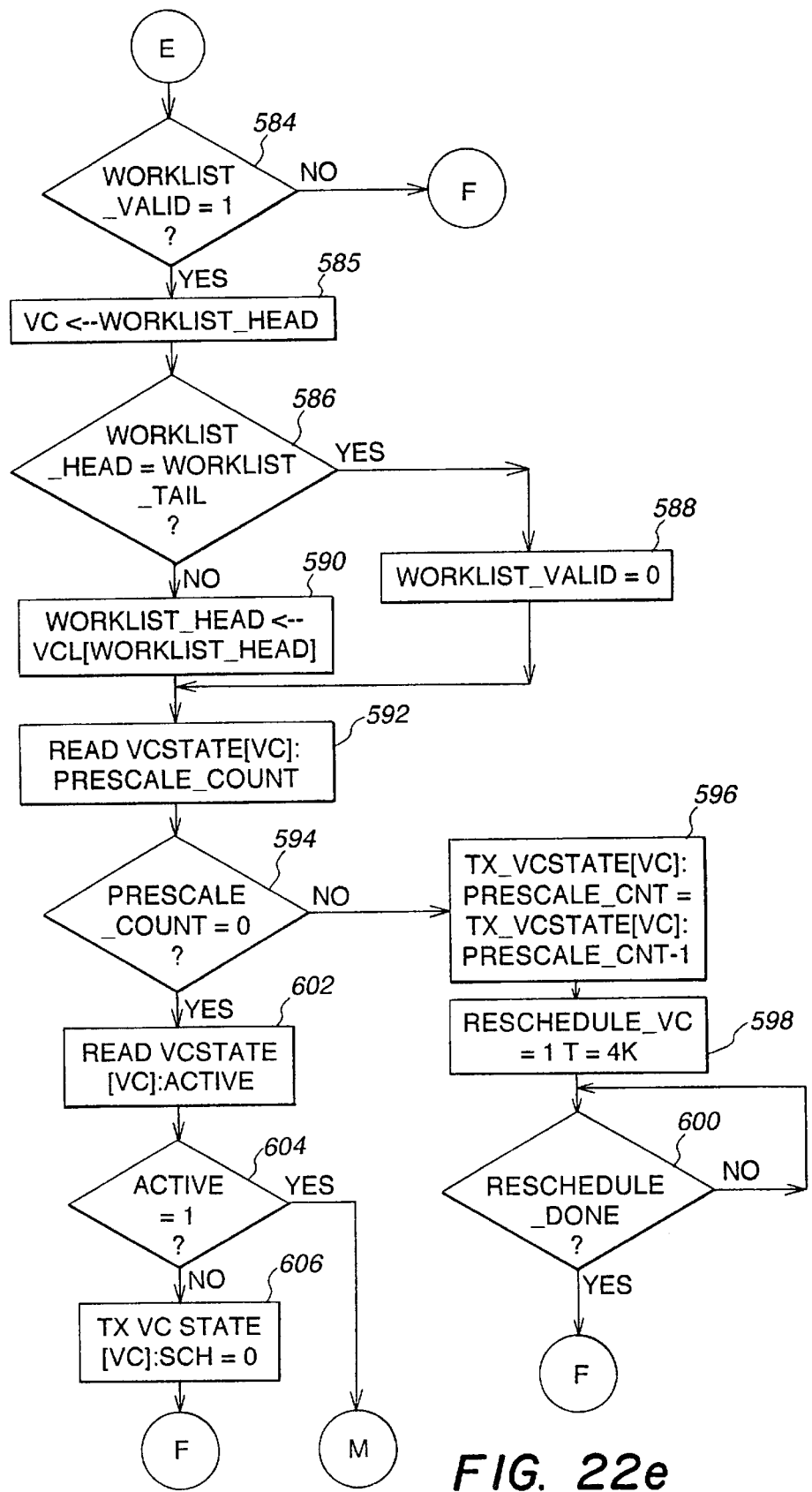

Referring back to FIG. 22c, the tx rate scheduler FSM 120 awaits the assertion of the tds_complete signal (step 580). Referring now to FIG. 22d, if the segmented_fifo signal is deasserted (step 581), a lastcell_time parameter is written with the current abr_sch_time (step 582), and a lasttime_valid bit is set (step 583). These signals will be further described later in conjunction with the scheduling of new VCs. The tx rate scheduler 120 then proceeds with the updating of the schedule time pointers.

If, at step 498 (FIG. 22a), no CBR VC is located at the CBR schedule table entry being read (the valid field of the entry is deasserted), and if ABR_ON is asserted (step 570) indicating that ABR DMA requests are permitted, then the tx rate scheduler FSM 120 checks the worklist 428 to see if there is an ABR/UBR VC waiting to generate a DMA request. The tx rate scheduler 120 first checks the worklist_valid bit (step 584). If the worklist_valid bit is 0, there are no ABR or UBR VCs waiting for DMA scheduling, so the tx rate scheduler 120 proceeds to update the schedule table pointers. If the worklist_valid bit is set, the value at the head of the worklist is the VC number to be scheduled for DMA (step 585). The worklist 428 is then updated. Accordingly, at step 586 the worklist_head pointer 430 is compared to the worklist_tail pointer 432. If the pointers are equal, the worklist 428 is now empty and the worklist_valid bit is reset to 0 (step 588). If the pointers are not equal, the worklist_head pointer 430 is updated to point to the next entry in the worklist 428 by writing the value at the location in VC List 180 pointed to by the worklist_head pointer 430 to the worklist_head pointer 430 (step 590).

The tx rate scheduler 120 now proceeds to initiate a data transfer from the host memory 22 to the tx data synch FIFO 128 and on to the tx data FIFO 132 by invoking the tx DMA scheduler FSM 122 to schedule a DMA request. The tx rate scheduler 120 reads the contents of the prescale_count field in the tx VC state table 254 for the VC (step 592). If prescale_count is non-zero (step 594), then the VC may not transmit a cell. In this case, the prescale_count value is decremented (step 596), and the VC is rescheduled into the ABR schedule table 178. Accordingly, reschedule_vc bit is set, invoking the rescheduling portion of the tx rate scheduler 120. A parameter "t" is set to 4K, step (598) indicating the number of locations from current schedule time at which the VC should be re-entered into the ABR schedule table 178. The value of 4K effectively reschedules the VC at the same location in the ABR schedule table 178. The tx rate scheduler 122 then waits at step 600 for the assertion of a reschedule_done bit from the rescheduling portion of the tx rate scheduler (to be further described later), and then proceeds to update the schedule table pointers.

If the prescale_count value as checked at step 594 was found to be 0, then the tx rate scheduler 120 determines whether data is available in host memory 22 for the VC. Accordingly, the active bit 280 in the tx VC state table 254 for the VC read (step 602). If it is deasserted (step 604), no data exists to be transmitted on this ABR/UBR VC, so the sch bit 282 in tx VC state for the VC is reset to 0 (step 606), indicating that this VC is not currently scheduled in the ABR schedule table 178. If the active bit is asserted, the tx rate scheduler 120 proceeds to schedule an ABR/UBR VC for DMA.

Figure 22F:
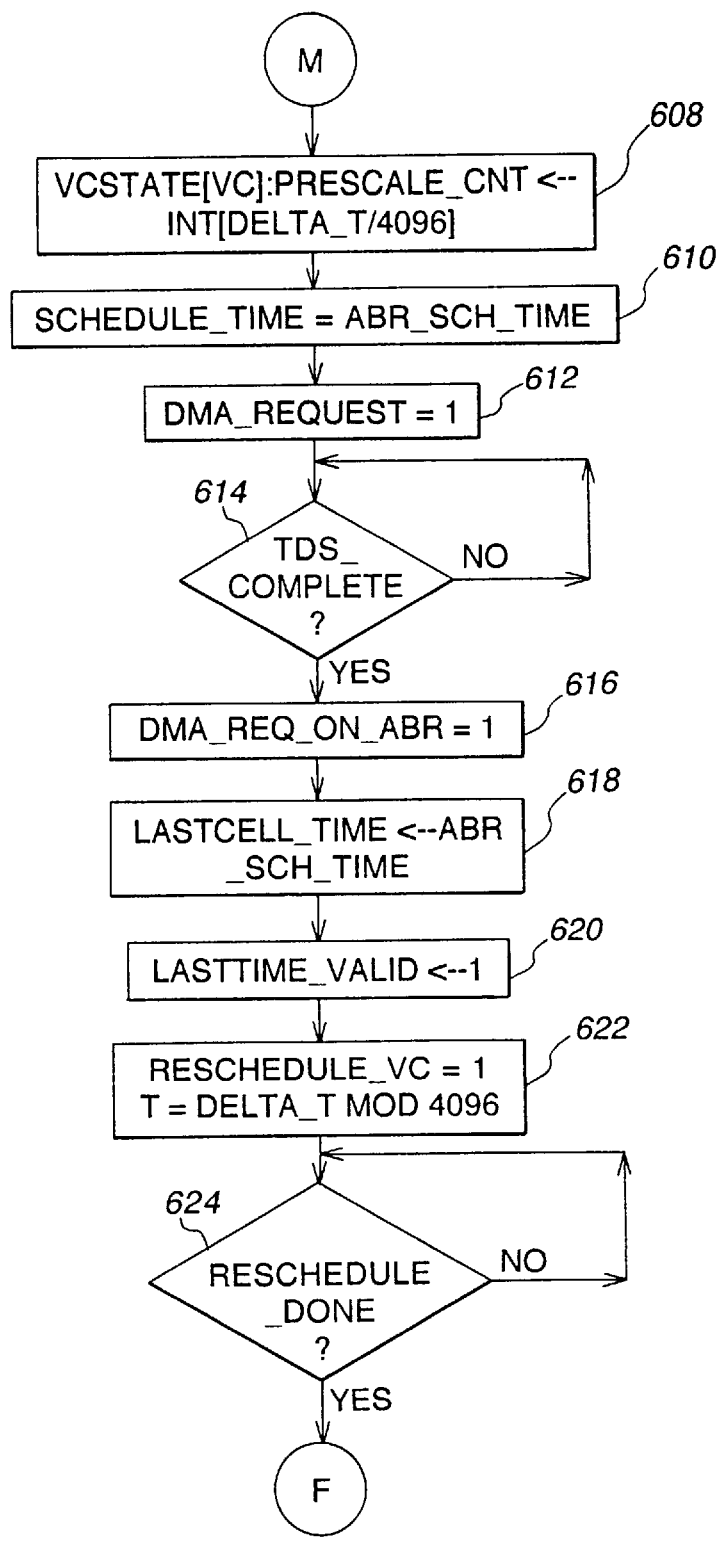

Referring now to FIG. 22f, before the VC is scheduled for DMA, the prescale_count field in the tx VC state for the VC is reset to its initial value. Each VC has associated with it a value delta_T which represents the time in number of cells, and therefore in number of locations or rows 404 in the ABR schedule table 178, by which successive cells on a VC are to be transmitted. In the case of an ABR VC, the value of delta_T is derived from the current ACR (Allowed Cell Rate) for the VC, which is read from the ABR value table for the VC. In the case of a UBR VC, the value of delta_T is derived from the peak cell rate, which is read from the abr parameter table 152 for the VC. The prescale_count field in tx VC state for the VC is written with the integer portion of delta_T divided by the size of the schedule table 178; herein, the integer portion of delta_T divided by 4096 (step 608). The prescale_cnt field then effectively holds the number of times the rate scheduler 120 should cycle through ABR schedule table 178 before scheduling the VC for DMA.

The rate scheduler next sets the schedule_time parameter to abr_sch_time (step 610). This value is to be passed to the DMA scheduler FSM 122 to be written as the timestamp portion of any data or RM cell requests. The DMA request signal is then asserted (step 612), invoking the DMA scheduler FSM to post a DMA request to the DMA request FIFO 125. The rate scheduler 120 then waits for the tds_complete signal from the DMA scheduler 122 (step 614), indicating that the request has been successfully posted.

Referring to FIGS. 23a–23d, the DMA request is built by the tx DMA scheduler FSM 122 in the same manner as was previously described in relation to the CBR handling portion of the tx rate scheduler FSM. However, when a data DMA request entry is built (FIG. 23b step 546), the CBR field in the data DMA request entry is set to 0 when called from the ABR handling portion of the tx rate scheduler 120. Likewise, the CBR field in an idle slot report request entry is also set to 0 when called from the ABR handling portion of the tx rate scheduler 120 (FIG. 23d step 574).

Referring back to FIG. 22f, upon detecting the assertion of the tds_complete signal (step 614), the signal DMA_request_on_abr is asserted (step 616). This signal is used to decrement the fifo_remain counter 317 as previously described. The tx rate scheduler 120 then sets the value in a lastcell_time register to abr_sch_time (step 618), and then sets a lasttime_valid bit (step 620). The lastcell_time register stores abr_sch_time for the last ABR cell scheduled for DMA, and the lasttime_valid bit indicates that the value in the lastcell_time register is valid. The lastcell_time register and the lasttime_valid bit are used by the rate scheduler FSM when scheduling new VCs into the schedule table, and will be further described later in conjunction therewith.

After scheduling the ABR DMA request, the tx rate scheduler 120 calls the rescheduling portion of the tx rate scheduler 120 to reschedule the VC into the ABR schedule table. Accordingly, a reschedule_vc signal is asserted, and a value "t" is passed which indicates the position in the ABR schedule table 178 at which the VC should be appended (step 622). The delta_T value for the VC is first prescaled as previously described by performing the function (delta_T/table_size), where table_size is the size of the ABR schedule table 178, herein 4096. The remainder of the function then gives the position in the ABR schedule table 178 relative to abr_sch_time at which the VC should be appended, while the integer portion of the function is written as the prescale_cnt value in tx VC state for the VC (FIG. 22f step 608). It is the remaining portion of the function that is passed to the rescheduler portion of the tx rate scheduler 120 as the parameter "t".

Note that when the tx DMA scheduler 122 issues a DMA request for an ABR or UBR VC, it will reschedule the VC in the schedule table whether or not the VC has any data left to send. This means that an ABR or UBR VC at the head of the worklist 428 may in fact have no data available for fetching. If this event occurs, the active condition check at step 604 will fail. The VC will be taken off of the work list, it will not be rescheduled, and the sch bit will be cleared in the tx VC state table 254 for the VC to indicate to the rate scheduler FSM that the VC is no longer scheduled for transmission. When, at some point in the future, the host posts a tx slot for the VC, the VC will be placed at the tail of the worklist 428 (as will be further described) and the sch bit will be set.

The rescheduling portion of the rate scheduler FSM reschedules VCs into the ABR schedule table either in the event that the prescale_cnt value for the VC was zero, or in the event that a DMA request has been generated for the VC. Referring to FIG. 22j, the rescheduler portion of the tx rate scheduler FSM 120 awaits the assertion of the reschedule_vc signal (step 624). When the signal is asserted, the tx rate scheduler 120 accepts as input a VC number and a time value "t". For VCs for which the prescale count was non-zero, "t" is set to 4K (FIG. 22e step 598), effectively rescheduling the VC at the location in the ABR schedule table currently being processed. For VCs for which the prescale count was non-zero, "t" may be any value between 1 and 4K, and is determined as previously described as the remainder of the function delta_T mod 4096 where delta_T is determined according to the ABR parameters currently in effect, as calculated from values read from the ABR parameter and value tables (FIG. 22f step 622).

A value T, calculated as T=(abr_sch_time+t) mod table_size (step 625), represents the new location in the ABR schedule table at which the VC should be rescheduled, and is therefore used as an index into the ABR schedule table 178. First, the valid bit 422 of the abr entry 402 at location T in the ABR schedule table 178 is read (step 626). If the valid bit 422 is deasserted (step 630), then there are no VCs currently scheduled at the time represented by the location T. In this case, the abr_head and abr_tail fields 418 and 420 for the entry 402 at location T are set to the VC (step 632, 634), and the valid bit 422 is set (step 636).

If the valid bit 422 is set (step 630), then there are other VCs waiting to transmit cells at the time T. In this case, the VC is added to the head of the list of VCs scheduled to transmit cells at the time T. Accordingly, the contents of location VC in the VC list 180 is written with the contents of the abr_head field 418 of the entry 402 at location T (step 638), and the abr_head field 418 of the entry 402 at location T is then written with the VC number (step 640). In either case, a reschedule_done bit is set (step 642) to indicate completion of rescheduling.

Rescheduling VCs at the head of the ABR schedule table list rather than at the tail of the list results in a performance advantage. High rate VCs are typically more sensitive to cell latency than lower rate VCs, and high rate VCs are rescheduled more often than lower rate VCs. By rescheduling VCs at the head of the list, the cells for high rate VCs are more likely to be transmitted at the scheduled time; therefore, the traffic for the high rate VCs will tend to comply more closely with the ACR for the VCs.

Note also that this concept can be useful in any application which utilizes a schedule memory (i.e. the schedule table 174) for storing entries at locations, each of which represent a point in time at which a data unit is to be transmitted. The concept is particularly useful where certain data units to be scheduled for transmission are members of a relatively high rate group. Wherever there is provided a schedule memory, each of whose entries contain a pointer pointing to a data structure containing data units (of any sort)

scheduled for transmission at a time corresponding to the location of the entry in the schedule memory, and a new data unit is to be added to the data structure to be transmitted at a particular time, a performance advantage can be obtained if the scheduler (such as tx rate scheduler 120) writes the data unit to the data structure such that the data unit is the first of the data units in the data structure to be transmitted.

New ABR/UBR VC Scheduling

Figure 23E:
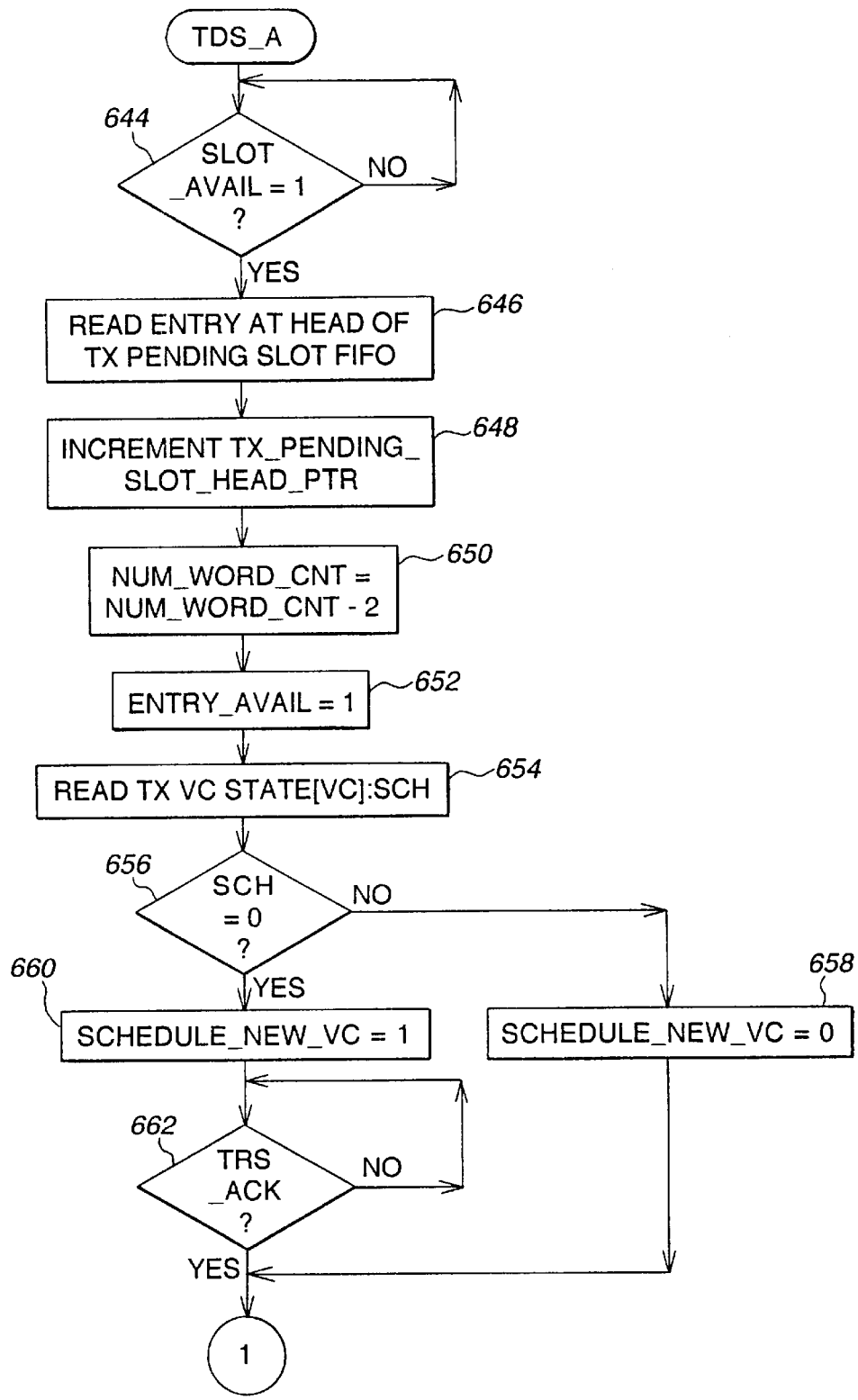

Recall that when a new ABR/UBR VC is set up by the host driver 24, the driver 24 sets up the tx VC state table 254 for the VC and writes tx slot descriptors 240 for the VC to the tx pending slot FIFO 124. Referring now to FIG. 23e, when the tx pending slot FIFO 124 indicates to the tx DMA scheduler 122 that a slot is available (step 644), the tx DMA scheduler 122 pops an entry from the head of the FIFO (step 646), obtaining a VC number from the VC field of the entry. The tx DMA scheduler then increments the tx pending slot FIFO head pointer 182 (step 648). The parameter num_word_count, used as previously described by the tx pending slot controller 186, is decremented by 2 (step 650), and the entry_avail signal is asserted (step 652), indicating that there is room in the tx pending slot FIFO 124 to accept another descriptor from the host system 14. The tx DMA scheduler 122 then reads the sch field in the tx VC state table 254 for the VC to determine whether the VC is already scheduled in the ABR schedule table (step 654). If the sch bit is asserted (step 656), then the VC is already scheduled and a schedule_new_vc signal remains deasserted (step 658). If the sch bit is deasserted, then the VC needs to be scheduled into the schedule table by the tx rate scheduler 120. The schedule_new_vc signal is asserted (step 660) to invoke this process. The tx DMA scheduler 122 then awaits the assertion of a trs_ack signal (step 662), indicating that the tx rate scheduler has completed the process of scheduling the new VC.

Figure 23F:
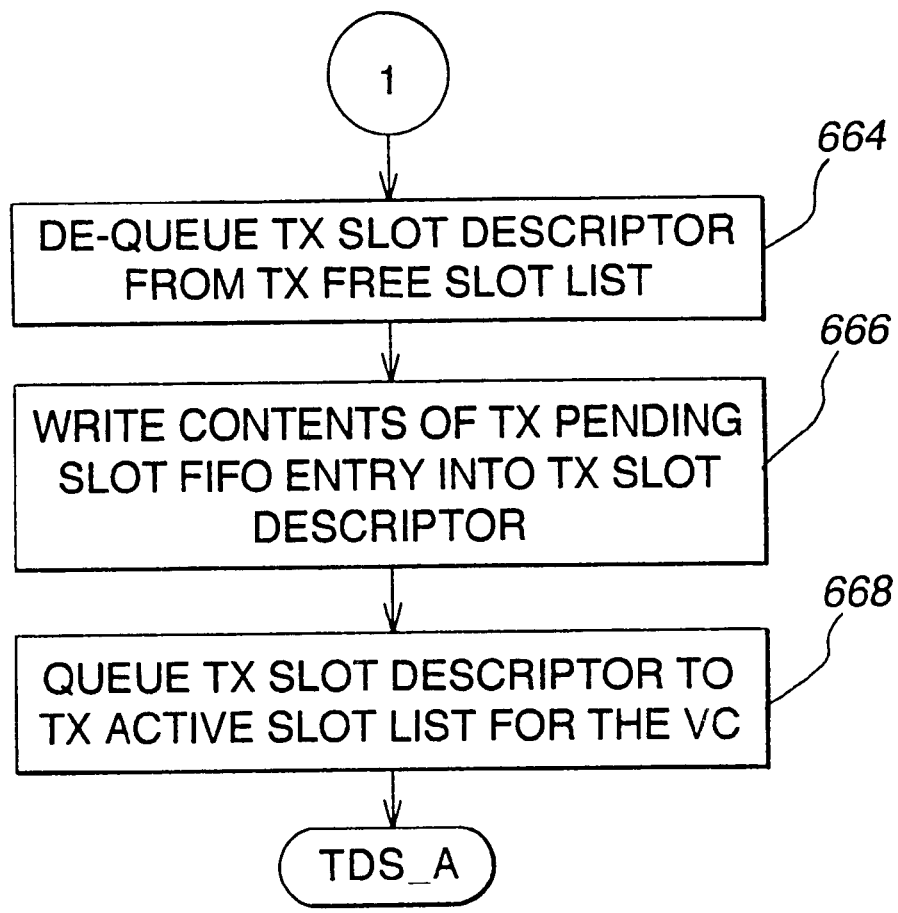

In either case, referring to FIG. 23f, the tx DMA scheduler then de-queues a tx slot descriptor 240 from the free slot list 161 (step 664), writes the contents of the tx pending slot FIFO entry just read into the tx slot descriptor 240 (step 666), and then queues the tx slot descriptor 240 to the active slot list 162 for the VC (step 668).

Referring now to FIG. 22i, there is shown the process undertaken by the tx rate scheduler 120 for scheduling new VCs into the ABR schedule table 178. Scheduling of new VCs is handled differently than rescheduling of already scheduled VCs for the following reason. Recall that the ABR_schedule_time pointer advances through the ABR schedule table at a faster rate than the ABR_current_time pointer, and can advance up to 32 locations ahead. If no other VCs are scheduled between abr_curtime and abr_sch_time, the new VC should be scheduled for immediate transmission. However, if the new VC is simply scheduled at abr_sch_time and timestamped as such when a DMA request is posted (i.e. the DMA request entry Sched_time field is set to abr_sch_time), its transmission will be delayed by a number of cell times equal to the difference between abr_curtime an abr_sch_time, which may be up to 32 cell times.

This unacceptable latency in the transmission of new VCs is avoided by appending the new VC directly to the tail of the worklist. Accordingly, referring to FIG. 22i, if no out-of-rate RM cells are pending (to be further described) (step 670), the tx rate scheduler 120 awaits the assertion of the schedule_new_vc signal (step 672) by the tx DMA scheduler 122, which indicates that a new VC should be scheduled in the ABR schedule table. If the worklist_valid bit is reset (step 674), indicating that the worklist is empty, the worklist_head and worklist_tail pointers 430 and 432 are written with the VC number (steps 676, 678). Otherwise, if the worklist_valid bit is set, (step 674), the VC is appended to the end of the worklist by first writing the contents of the VC list 180 at the location pointed to by the worklist_tail pointer 432 to the VC (step 680), and then updating the worklist_tail pointer with the new VC (step 678). Thus, if the worklist is empty when the new VC is scheduled (and it most likely is in the event that abr_sch_time has advanced in time beyond abr_curtime), the new VC will be transmitted immediately (provided there is no CBR traffic to be transmitted at the same time.) The tx rate scheduler 120 then sets a work list_valid signal (step 682) and a trs_ack signal (step 684), indicating to the tx DMA scheduler 122 that new VC scheduling has been completed.

The tx rate scheduler 120 will now back up abr_sch_time to point to a location immediately following the time at which a DMA request for an ABR VC was last generated. This is done for two reasons.

First of all, recall that when a data DMA request entry 350 is produced for the VC at the head of the worklist 428, the Sched_time field is written with abr_sch_time. That is, abr_sch_time is used as the timestamp to indicate to the tx phy FSM 134 the time at which the ABR cell associated with the request should be transmitted. Therefore, if abr_sch_time is not reset, the timestamp associated with the new VC will be up to 32 cell times later than necessary, thereby adding needless latency to cell transmission.

Secondly, high-rate VCs will call for scheduling only a small number of cell times apart. However, as previously described, after the new VC is appended to the worklist 428, it rises to the head of the worklist, a DMA request for the new VC is generated, and the VC is rescheduled relative to abr_sch_time. Consider now the case where the ABR_schedule_time pointer points at a location 32 cell times from abr_curtime. The new VC is appended to the end of the worklist and then is rescheduled at a time delta_T=2. If abr_sch_time is not backed up, the rescheduled VC will not be scheduled for DMA until abr_sch_time+2; i.e. 34 cell times in the future rather than the intended 2 cell times, again adding needless latency to cell transmission.

Abr_sch_time is therefore reset in the following manner. Recall that the tx rate scheduler FSM 120 at step 618 (FIG. 22f) provides a lastcell_time variable which stores the abr_sch_time at which the last DMA request for an ABR/UBR VC was generated. A lasttime_valid bit (step 620) indicates that the value held in lastcell_time is valid. As long as the value in lastcell_time is greater than abr_curtime—that is, abr_curtime has not yet passed the location at which the last cell was scheduled—then lastcell_time is valid, and abr_sch_time should take on the value of lastcell_time+1. The lasttime_valid bit is reset when abr_curtime reaches lastcell_time. In this case, abr_sch_time should take on the value of abr_curtime+1.

Thus, as shown then in FIG. 22i, the tx rate scheduler 120 saves the current value of abr_sch_time in a lastabr_time register (step 686). The function of this parameter is described later. Then, if the lasttime_valid bit is set (step 688), abr_sch_time is reset to the location (or time) immediately following the value held in lastcell_time (step 690). If the lasttime_valid bit is not set, abr_sch_time is reset to the time indicated by abr_curtime+1 (step 692).

Note that, as an alterative to the previously described process in which the new VC was appended to the tail of the worklist 428, the new VC could be inserted at the head of the ABR schedule table list located at lastcell_time+1 (or abr_curtime+1) rather than at the tail of the worklist to achieve the same result. This alternative costs an extra local memory access to append the ABR schedule table 178 entry 402 to the worklist 428.

Out-of-rate RM cells (ORM cells) are not scheduled for DMA via the worklist 428; rather, the RM cell request generator (FIG. 6) 435 builds RM cell request entries 354 (FIG. 19c) in accordance with the rate requirements in effect for the VCs with which they are associated, and writes them directly to the tx DMA request FIFO 125. As shown in FIG. 22i, ORM cells are arbitrarily scheduled with priority over new VCs. ORM cells are transmitted at no more than 10 cells/s; thus, priority scheduling of these cells expends minimal bandwidth while avoiding ORM cell clumping. As ORM cells are scheduled for DMA (step 670), the lasttime_valid bit is checked and abr_sch_time is reset to lastcell_time or abr_curtime as previously described (steps 688–692).

Once abr_sch_time is reset to either lastcell_time or abr_curtime, the segmented_fifo signal is checked (step 694). If it is asserted, a cbr_inhibit signal is asserted (step 696); else, the cbr_inhibit signal remains deasserted (step 698). The function of this signal is further described later. The new VC scheduling portion of the tx rate scheduler then returns to await the scheduling of an ORM cell or new VC.

At this point, the tx rate scheduler FSM 120 has either posted a CBR DMA request, or, if no CBR entries were scheduled in the CBR schedule table, an ABR DMA request, or, if there were no entries in the worklist 428, no request. It is now time to increment the schedule time pointers and repeat the process.

Figure 22G:
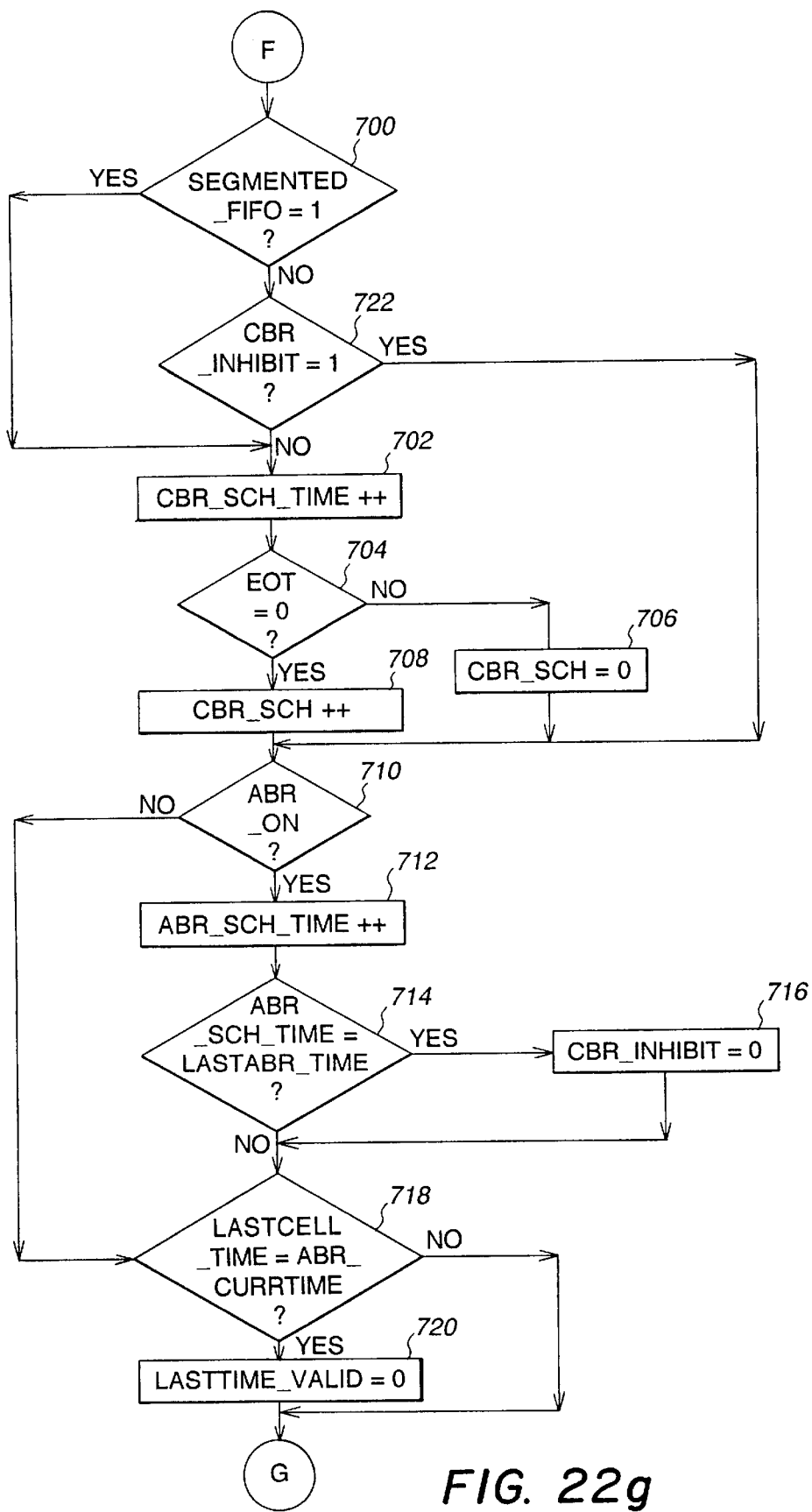

Referring to FIG. 22g, the tx rate scheduler 120 checks the segmented_fifo signal (step 700). If it is asserted, cbr_sch_time is incremented (step 702). When the tx rate scheduler 120 read the CBR schedule table entry at step 496 (FIG. 22a), it retained the value of the EOT bit for that entry. This bit is now checked (step 704). If it is set, indicating that the end of the CBR schedule table 176 has been reached, the cbr_sch pointer is reset to 0 (step 706). Otherwise, the cbr_sch pointer is incremented (step 708).

If ABR DMA scheduling is permitted, as indicated by the assertion of ABR_ON (step 710), abr_sch_time is also incremented (step 712). Abr_sch_time is then compared to lastabr_time (step 714), and if equal, the cbr_inhibit signal is reset (step 716). Abr_curtime is then compared to lastcell_time (regardless of whether ABR_ON is set) (step 718), and if they are equal, lasttime_valid is reset (step 720).

If at step 700 the segmented_fifo signal is found to be deasserted, the cbr_inhibit signal is checked (step 722). Recall that the cbr_inhibit signal is asserted by the new VC scheduling portion of the tx rate scheduler 120 at step 694 (FIG. 22i).

The cbr_inhibit signal serves the following purpose. Recall that, when the segmented_fifo signal is deasserted, abr_sch_time is used by the cbr handling portion of the tx rate scheduler 120 as the timestamp portion of data DMA requests and idle slot report requests. When the tx rate scheduler 120 schedules a new VC, abr_sch_time is backed up as previously described. If the cbr_sch pointer is allowed to continue advancing after this occurs, successive timestamps could be lower in value than previous ones already scheduled, thereby causing perturbations on the constant bit rate channel. Furthermore, if the cbr_sch pointer is merely prevented from advancing, the same entry will be read from the CBR schedule table 176 on each scan of the table 176 by the tx rate scheduler 120. This could cause incorrect decrementing of the prescale_count value for the VC associated with the entry being read, and thus incorrect cell generation.

The cbr_inhibit signal is therefore used to prevent operation of the cbr handling portion of the tx rate scheduler 120 until abr_sch_time has caught up to its previous value, which was saved in the lastabr_time register. Recall that at step 495 in FIG. 22a the CBR schedule table 176 was not accessed unless the cbr_inhibit bit was reset.

Accordingly, referring back to FIG. 22g, abr_sch_time is compared to the contents of the lastabr_time register (step 714). If the values are equal, abr_sch_time has caught up to the point from which it was reset, cbr_inhibit is reset (step 716), and the CBR_schedule_time and cbr_sch pointers are then incremented on further passes through the tx rate scheduler 120. Otherwise, cbr_inhibit remains set and incrementing of the CBR_schedule_time and cbr_sch pointers is inhibited until abr_sch_time has caught up to the point from which it was reset.

Figure 22H:
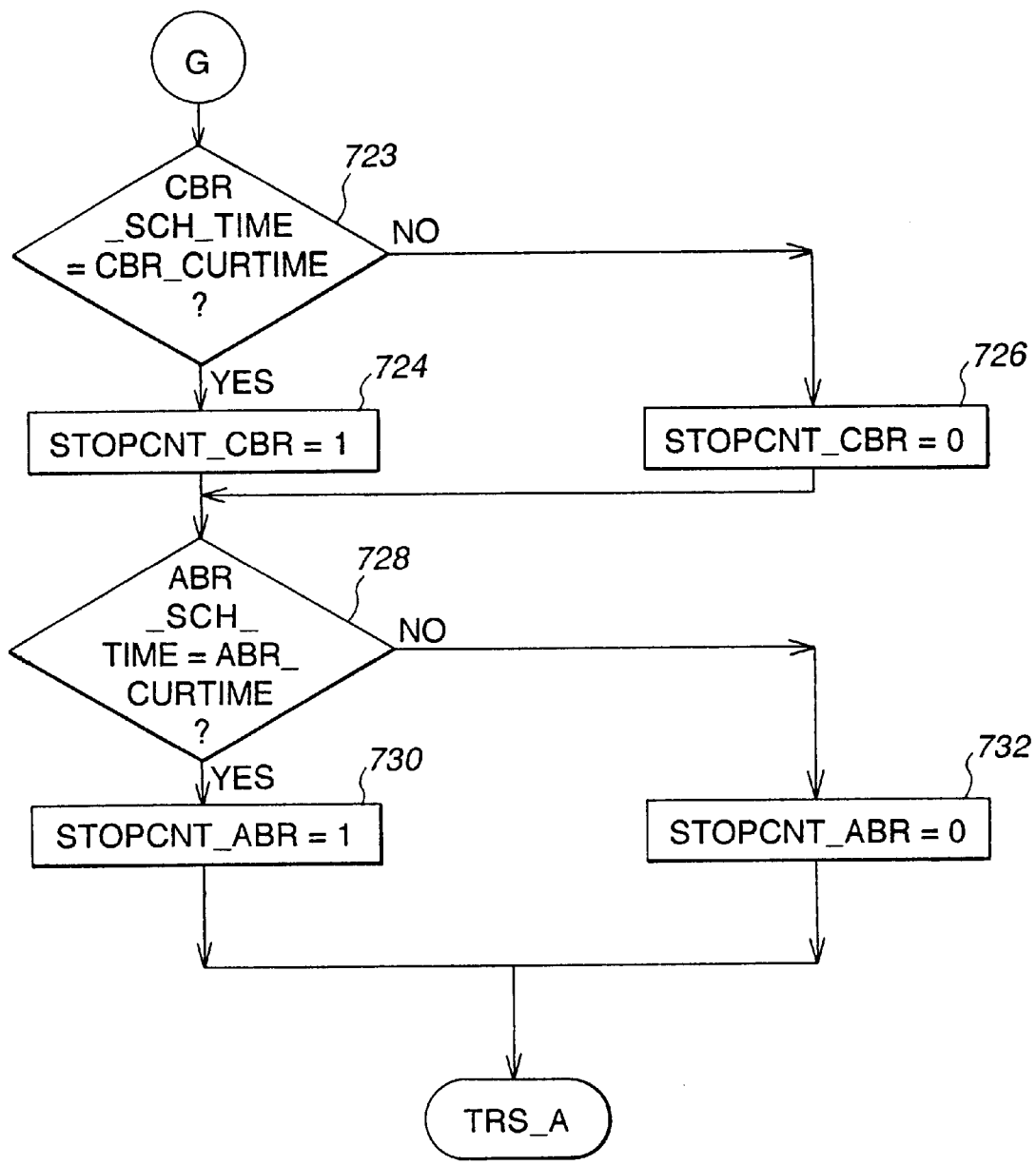
Figure 22J:
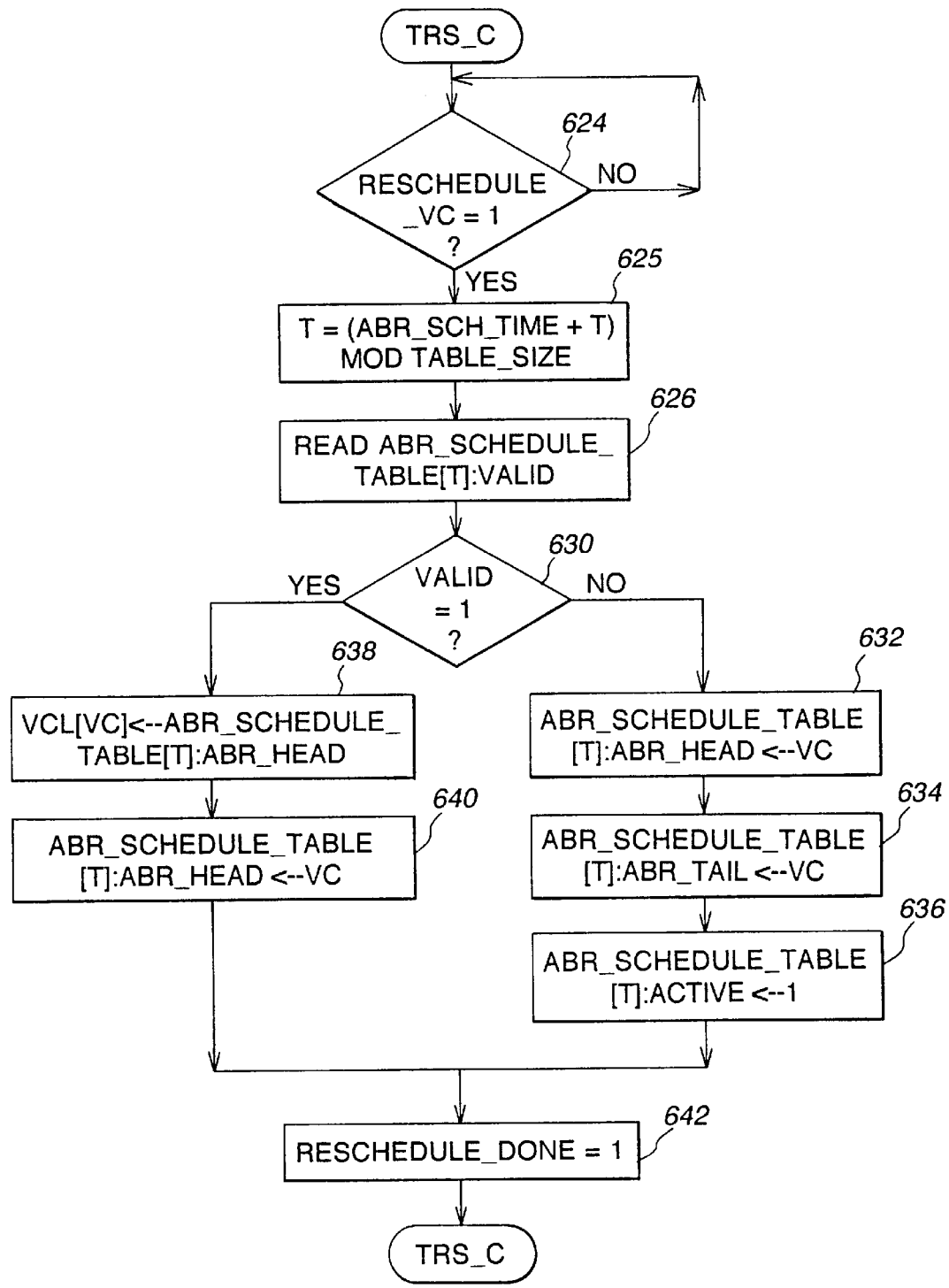

After the schedule time pointers are incremented, cbr_sch_time is compared to cbr_curtime (step 723, FIG. 22h). If they are equal, a set_stopcnt_cbr signal is asserted (step 724); else this signal is deasserted (step 726). Likewise, abr_sch_time is then compared to abr_curtime (step 728). If they are equal, a set_stopcnt_abr signal is asserted (step 730); else this signal is deasserted (step 732). These signals are used by the tx phy FSM 134 to control the advancement of the CBR_current_time and ABR_current_time pointers, as will be further described in conjunction with that machine. The tx DMA scheduler 122 then returns to its initial state.

The schedule table 174 and current_time and schedule_time pointers previously described provide a mechanism for ensuring that data for a given VC is transferred from the tx data FIFO 132 at the rate that was intended for the VC when the entries for the VC were written into the schedule table 174. This is accomplished by providing a schedule time pointer that leads in time ahead of a current time pointer, and by initiating data transfers from host memory to (ultimately) the tx data FIFO based on information obtained from the schedule table at locations pointed to by the schedule time pointer. Then, despite system bus latencies, the cell data for a given VC will reside in the transmit buffer memory (tx data FIFO 132) by the time the current_time pointer reaches the time at which the VC was scheduled. The data can then be transmitted when the current_time pointer reaches the time in the schedule table at which the VC was scheduled.

It should be noted that the scheduling mechanism herein described is useful in any type of environment requiring the transfer of data from a source memory to a transmit buffer memory and then on to an interface. Though the source memory herein described is a host memory 22, the scheduling mechanism could easily operate to transfer data from memory on a different node to an interface, or from memory on one adapter to memory on another adapter (i.e. peer-to-peer memory) and then to an interface. On the other hand, the source memory, transmit buffer memory, and interface may all reside on the same system module. Moreover, though the transmit buffer memory herein described is the tx data FIFO 132, and the interface is a network interface, the scheduling mechanism may be easily employed to transfer data from a source memory to any buffer memory residing between the source memory and any type of interface; e.g. a data storage buffer coupled to a disk drive interface, a video buffer coupled to a graphics interface, or the like.

Tx Data Synch Fifo 128

The entries which were placed in the DMA request FIFO 125 by the tx DMA scheduler 122 are now read by the tx DMA FSM 126, which processes each entry and initiates the appropriate DMA requests to move cell data from host memory 22 to the tx data synch fifo 128. According to the preferred embodiment, the tx data synch fifo 128 is implemented as a 16 LW deep FIFO, which provides adequate buffering for the maximum transmit DMA burst of 13 LW which the controller may perform, in addition to a longword of control information for each burst.

Figure 24:
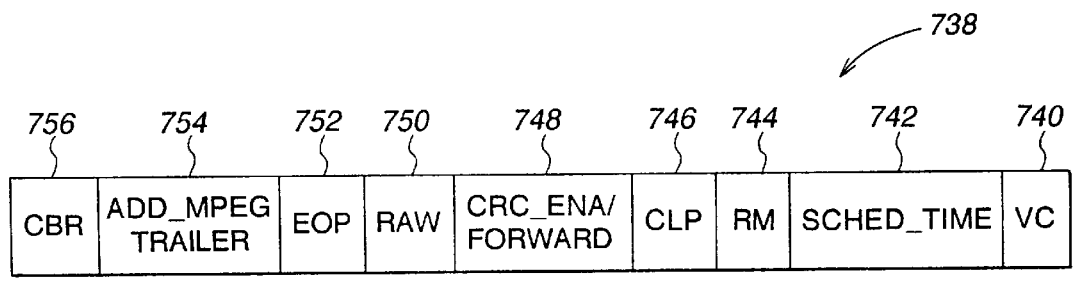
FIG. 24 illustrates a tx data synch FIFO SOC control longword.

Referring to FIG. 24, when the tx DMA FSM 126 processes a DMA request for a new cell, it creates a 4-byte txsf start of cell (SOC) control longword 738 (txsf SOC LW) which it places in the tx data synch fifo 128 in order to provide the tx cell FSM 130 information about the request. AAL5 cells are stored as the 4-byte txsf SOC LW 738 followed by 48 bytes of data (unless the AAL5 cell spans two slots, as will be further described in conjunction with the tx cell FSM 130). Raw cells are stored as the 4-byte txsf SOC LW 738 followed by 52-bytes of data (the entire cell excluding the HEC). Each RM cell request in the tx DMA request FIFO 125 results in the creation of a single txsf SOC LW with no subsequent data in the tx data synch fifo 128. Idle cell requests do not result in any entries being placed in the tx data synch fifo 128, nor in the DMA of any data.

All of the fields in the txsf SOC LW 738 are simply copied directly from the corresponding fields in the tx DMA request FIFO 125 entries. The various fields of a txsf SOC LW 738 are shown in FIG. 24 and described as follows:

VC (740)
This 12-bit field specifies the VC with which the cell is associated.

Sched_time (742)
This 8-bit field contains the time at which the tx DMA scheduler 122 issued the request for the cell.

RM (744)
This 1-bit field indicates if the txsf SOC LW is an RM cell request (RM=1) or the beginning of a raw or AAL5 cell (RM=0).

CLP (746)
This 1-bit field contains the CLP bit to be inserted into the cell header of the transmitted cell for AAL5 cells or RM cells.

CRC_Ena/Forward (748)
For non-RM SOC entries, this 1-bit field when set indicates that a CRC must be computed across the data DMA'd as a result of the request. If the request is for a raw cell (as indicated by the raw bit), then this bit indicates that a CRC-10 will be computed and inserted in the raw cell transmitted as a result of the request. If the request is for part of an AAL5 packet then this bit indicates that a CRC-32 should be computed across the data DMA'd and transmitted as a result of the request.

For RM SOC entries, this bit indicates whether the RM cell created should be a forward (forward=1) or backward (forward=0) RM cell.

Raw (750)
This 1-bit field indicates whether the cell following the SOC control longword is an AAL5 cell consisting of 48 bytes of data or a raw cell consisting of 52 bytes of data.

EOP (752)
This 1-bit field indicates if the cell following the txsf SOC LW contains the last byte of an AAL5 packet. It's value is significant only when the Raw bit is cleared. This bit will be used to determine the value of the EOM bit of the PT field for AAL5 packets, and to overwrite the driver 24-provided AAL5 CRC placeholders with the computed CRCs in the last cells of AAL5 packets.

Add_MPEG_Trailer (754)
This 1-bit field indicates if the AAL5 packet being segmented is an MPEG super packet and if the txsf SOC LW describes the last cell in a set of 2 MPEG PDUs (transmitted in a single AAL5 packet). This bit indicates that the tx cell FSM 130 should append the MPEG trailer (AAL5 Control=0, AAL5 length=376, AAL5 CRC) to the end of the data in the tx data synch fifo 128 when moving the data into the tx data FIFO 132.

CBR (756)
This 1-bit field indicates whether the request is associated with a CBR or ABR VC, and is used when GFC is enabled in order to direct the data associated with the request to the appropriate cbr or abr tx data FIFO 300 or 302.

In the actual implementation, the eop and add_mpeg_trailer bits are not actually placed in the tx data synch fifo 128, but rather are held in flops. This is because these 2 bits which describe a cell are not valid until the last DMA request out of several requests which may make up a cell (for AAL5 cells). The txsf SOC LW entry is written at the time of the first request, but since the 2 bits are not valid until the last request, they are stored in flops and multiplexed with the FIFO output for consumption by the tx cell FSM 130.

Tx DMA FSM 126
The tx DMA FSM 126 serves as the interface between the tx DMA request FIFO 125, the PCI bus 18, and the tx data synch fifo 128. The tx DMA FSM 126 performs the following functions:
 reads entries from the tx DMA request FIFO 125;
 generates DMA requests for cell data transfers from the host 14 to the SAR controller 62 via the PCI bus 18 when required;
 generates a txsf SOC control longword 738 for each entry;
 writes the txsf SOC control longwords 738 and cell data to the tx data synch fifo 128.

Figure 25A:
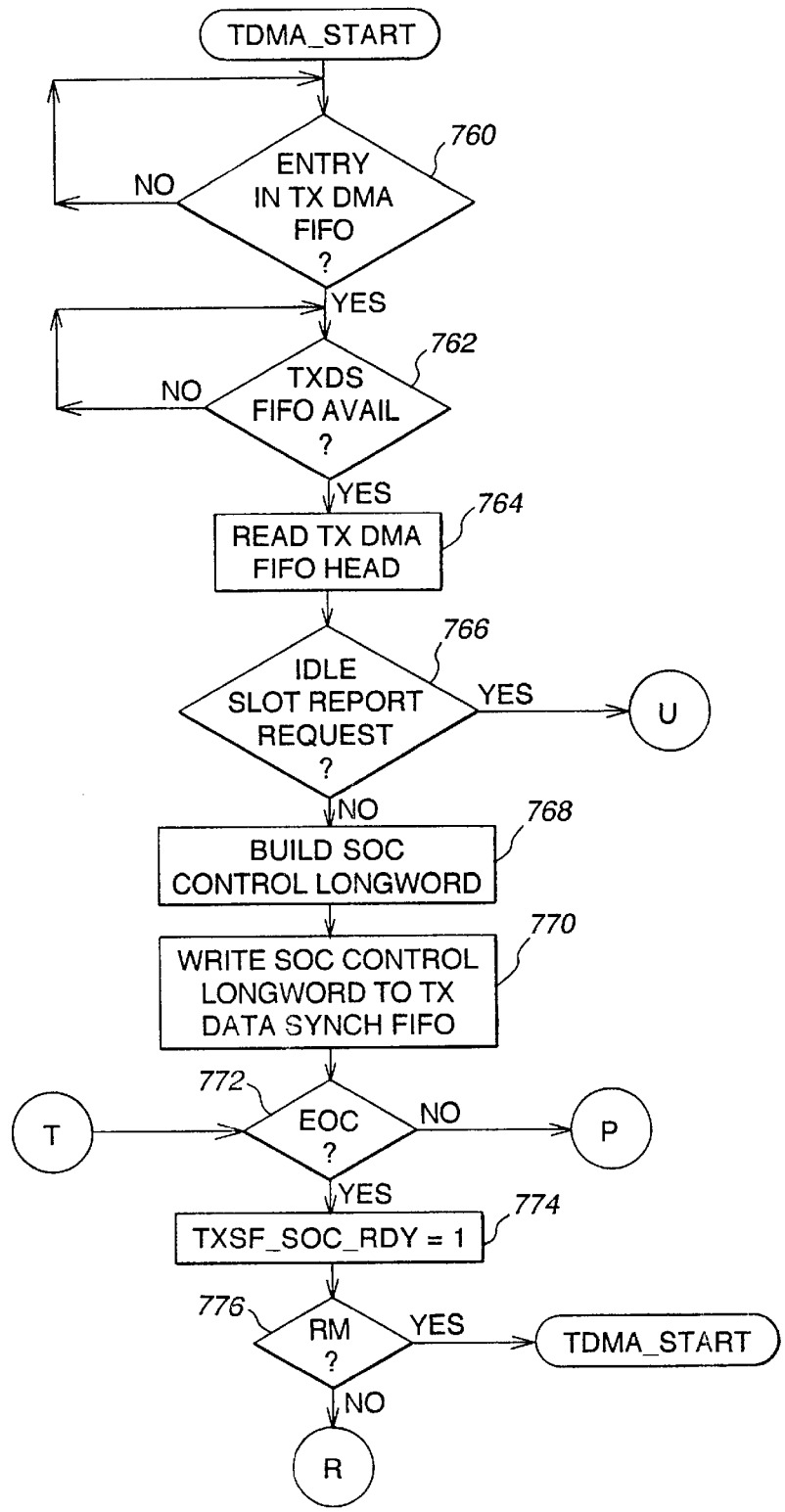
FIGS. 25*a–b* show a detailed flow diagram of the operation of the tx DMA FSM of FIG. 6.
Figure 25B:
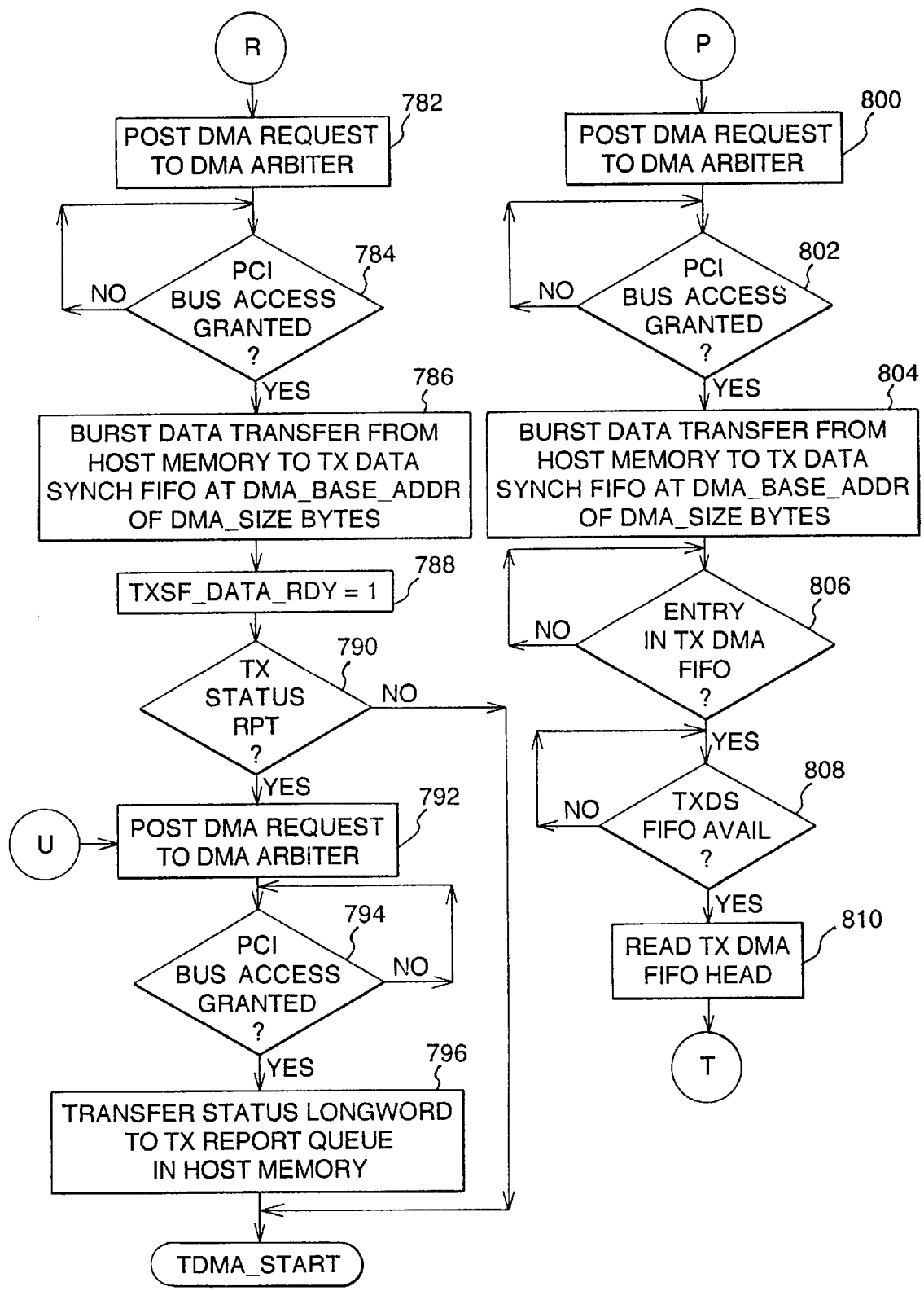

The operation of the tx DMA FSM 126 is shown in the flow diagram of FIGS. 25a–25b. When the tx DMA FSM 126 detects that the tx DMA request FIFO 125 contains at least one entry (step 760), and through handshaking with the tx cell FSM 130 verifies that the tx data synch fifo 128 is either empty or will be emptied in the near future (step 762), it pops an entry off the head of the DMA request FIFO 125 (step 764). If the entry popped off the DMA request FIFO 125 is not an idle slot report request 352, (STEP 766) the tx DMA FSM 126 builds a txsf SOC LW 738 (txsf SOC LW) based on the contents of the tx DMA request FIFO 125 entry popped (step 768), and writes it to the tx data synch fifo 128 (step 770).

The EOC bit for the entry is then checked (step 772). If the DMA burst is for a new cell which is to be transferred via a single DMA request, the EOC bit in the DMA request FIFO 125 entry will be set. In this case, a txsf_SOC_rdy bit is set to indicate to the tx cell FSM 130 that a valid txsf SOC LW entry exists in the tx data synch fifo 128 (step 774). When the tx DMA FSM 126 detects that a request in the tx DMA request FIFO 125 is an RM cell request (step 776), it places a txsf SOC LW entry in the tx data synch fifo 128 requesting that an RM cell be built and transmitted but does not DMA any data from host memory 22.

If the request is for a data cell rather than an RM cell (step 776), a DMA request is posted to a DMA arbiter (step 782), which arbitrates between the various processes that contend for the PCI bus 18. When the arbiter grants PCI access to the tx DMA FSM 126 (step 784), the FSM uses the DMA_base_addr and DMA_size fields of the DMA request FIFO 125 entry to burst data for a cell from host memory 22 into the tx data synch fifo 128 (step 786). For requests to DMA data from raw cell slots, exactly 52 bytes of data will be transferred across the PCI bus 18. For requests to DMA data from AAL5 slots, 1 to 48 bytes of data will be transferred across the PCI bus 18. Upon completion of the data transfer (and on completion of the construction of an RM cell header at step 780), a txsf_data_rdy bit is set (step 788) to indicate to the tx cell FSM 130 that a cell is available in the tx data synch fifo 128 for transfer to the tx data FIFO 132.

The tx DMA FSM 126 now checks to see whether a tx status report should be generated (step 790). A tx status report is generated for end-of-packet (EOP) slots or for AAL5 slots in which the tx_AAL5_SM bit is set in tx VC state for the VC. If no tx status report is due, the tx DMA FSM 126 returns to process the next entry in the tx DMA request FIFO 125. Otherwise, a DMA request is posted to the DMA arbiter (step 792), and, when PCI bus access is granted (step 794), a tx status longword is transferred to the tx status report queue in host memory 22 (step 796).

In the case where the tx DMA FSM 126 must fetch an AAL5 cell which straddles a slot boundary, it must do so in 2 or more separate DMA requests. In this case, the EOC bit in the tx DMA request FIFO 125 entry will be set only for the entry containing the final byte of data to be transferred. The first request will result in the creation of the txsf SOC control longword in the tx data synch fifo 128, but the tx DMA FSM 126 will not be informed of the availability of the SOC longword until the request for the last byte of data in the cell is issued. Accordingly, if EOC is not set (step 772), A DMA request is posted to the DMA arbiter (step 800), and, when the arbiter grants PCI access to the tx DMA FSM 126 (step 802), the tx DMA FSM 126 bursts data for a cell from host memory 22 into the tx data synch fifo 128 (step 804). The process repeats (steps 806, 808, 810, 772, 800, 802, 804) until the EOC bit for an entry is set (step 772). The txsf_SOC_rdy bit is then set (step 774), the DMA request is posted (step 782), the DMA transfer is completed (steps 784, 786), and the txsf_data_rdy bit is set (step 788).

Tx data FIFO 132

The tx data FIFO 132 serves as the transmit buffer memory for the segmentation engine 88. The tx data FIFO 132 is written by the tx cell FSM 130 and read by the tx phy FSM 134. The tx data FIFO 132 is implemented according to the preferred embodiment to provide buffering for up to approximately 16 cells to be transmitted on the link. As was previously described, (FIG. 6), when GFC flow control is enabled, the tx data FIFO indicates such with the assertion of the segmented_fifo signal. The tx data FIFO 132 is then split into two FIFOS capable of holding 8 cells each—a cbr tx data FIFO 300 for storing uncontrolled CBR cells, and an abr tx data FIFO 302 for storing controlled ABR/UBR cells.

Figure 26:
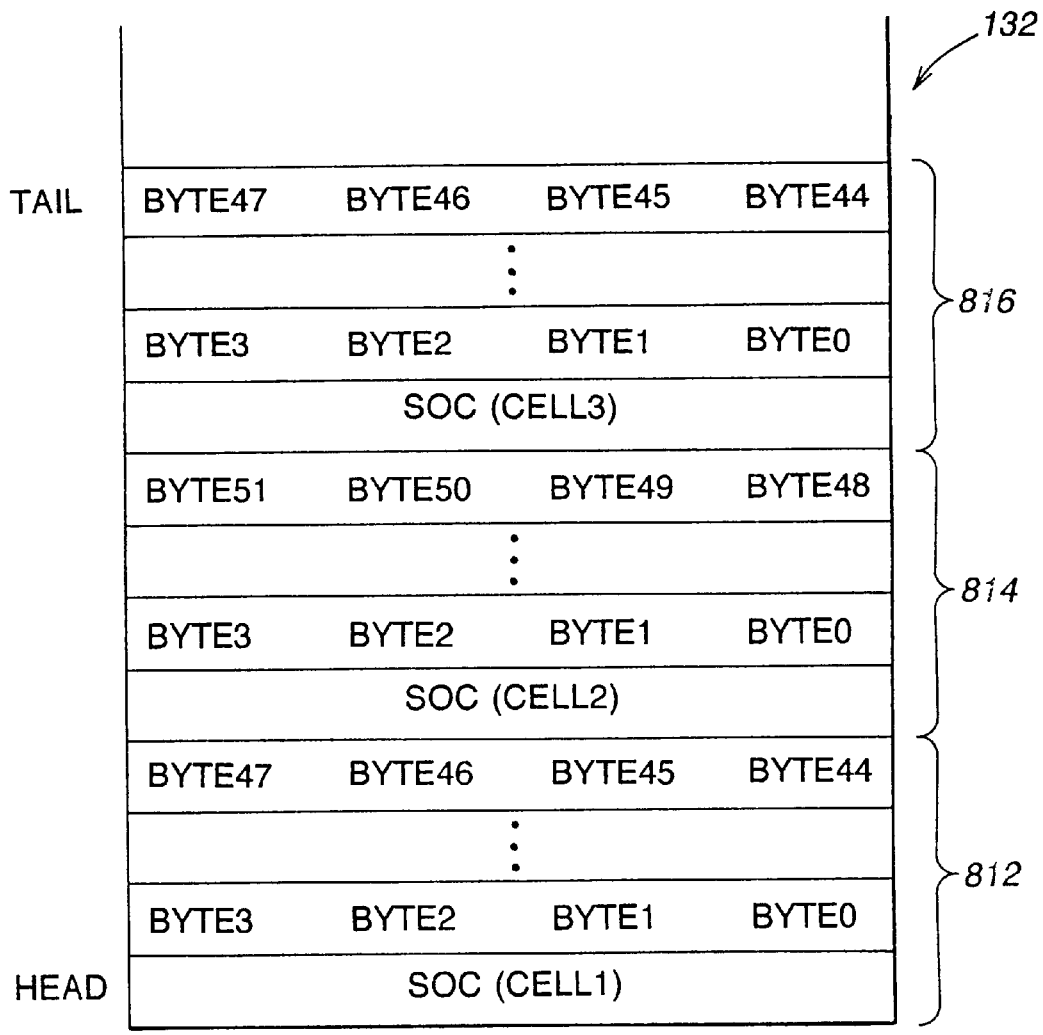
FIG. 26 is a block diagram illustrating the tx data FIFO of FIG. 6 holding three entries.
Figure 28A:
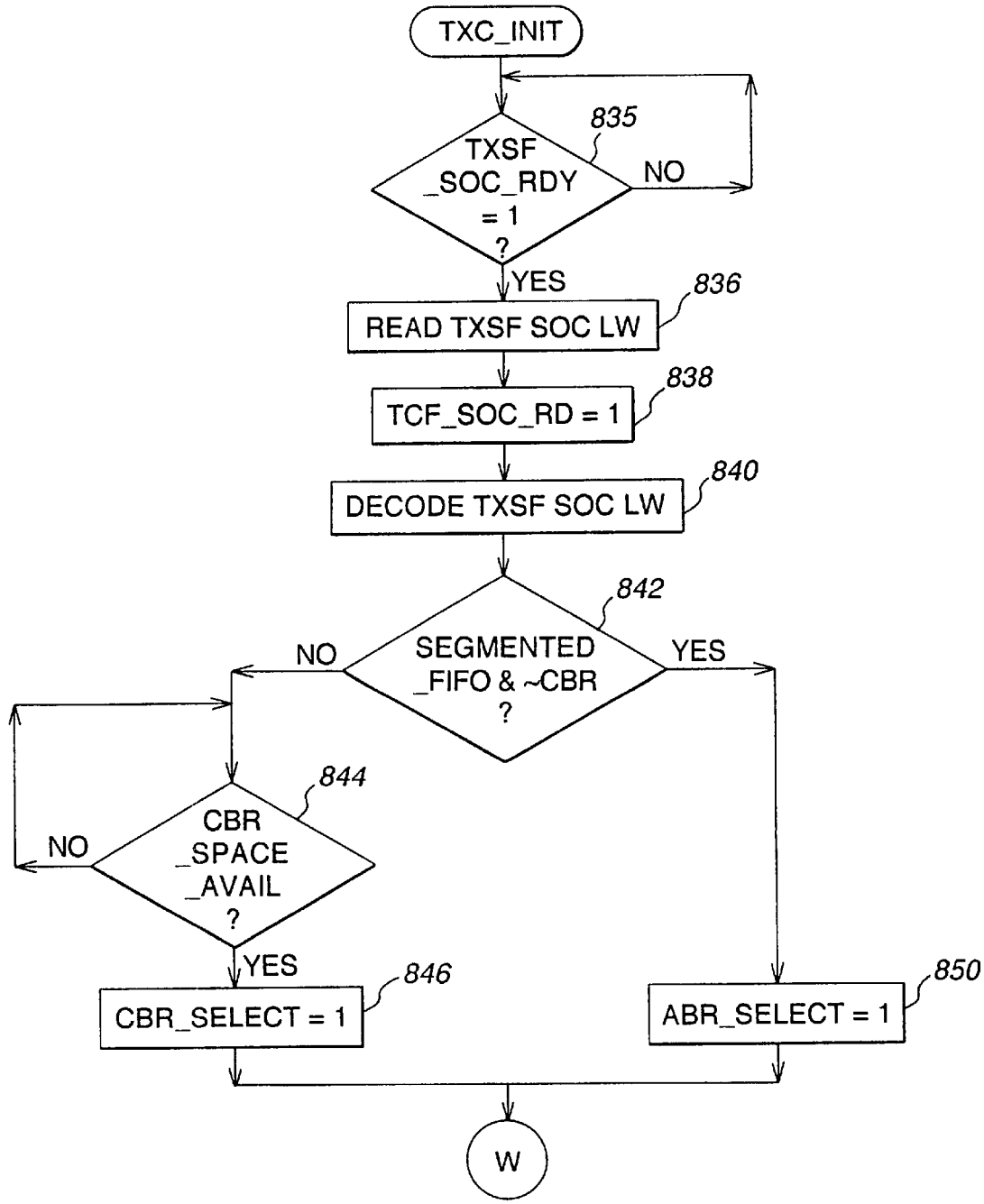
Figure 28B:
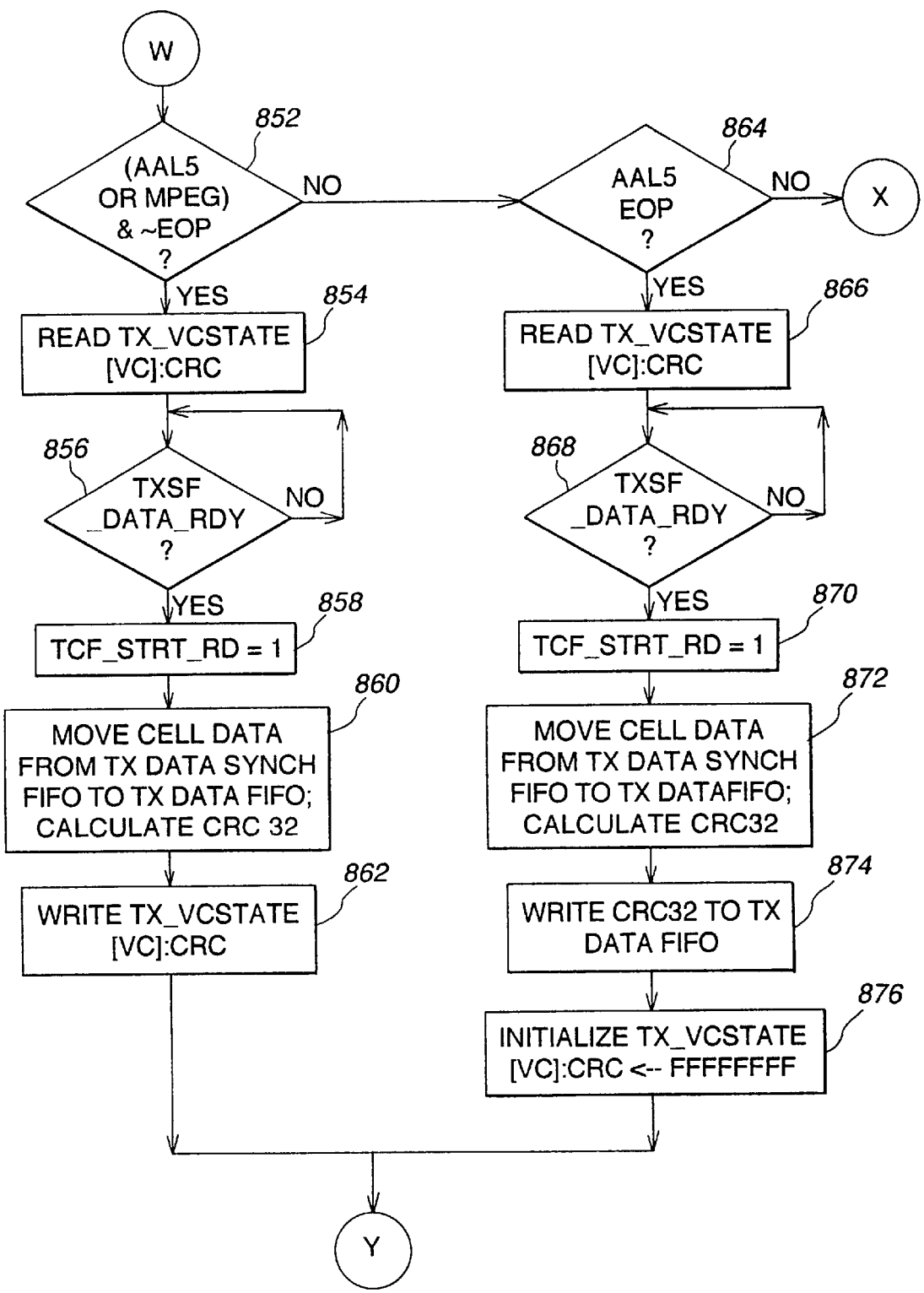
Figure 28D:
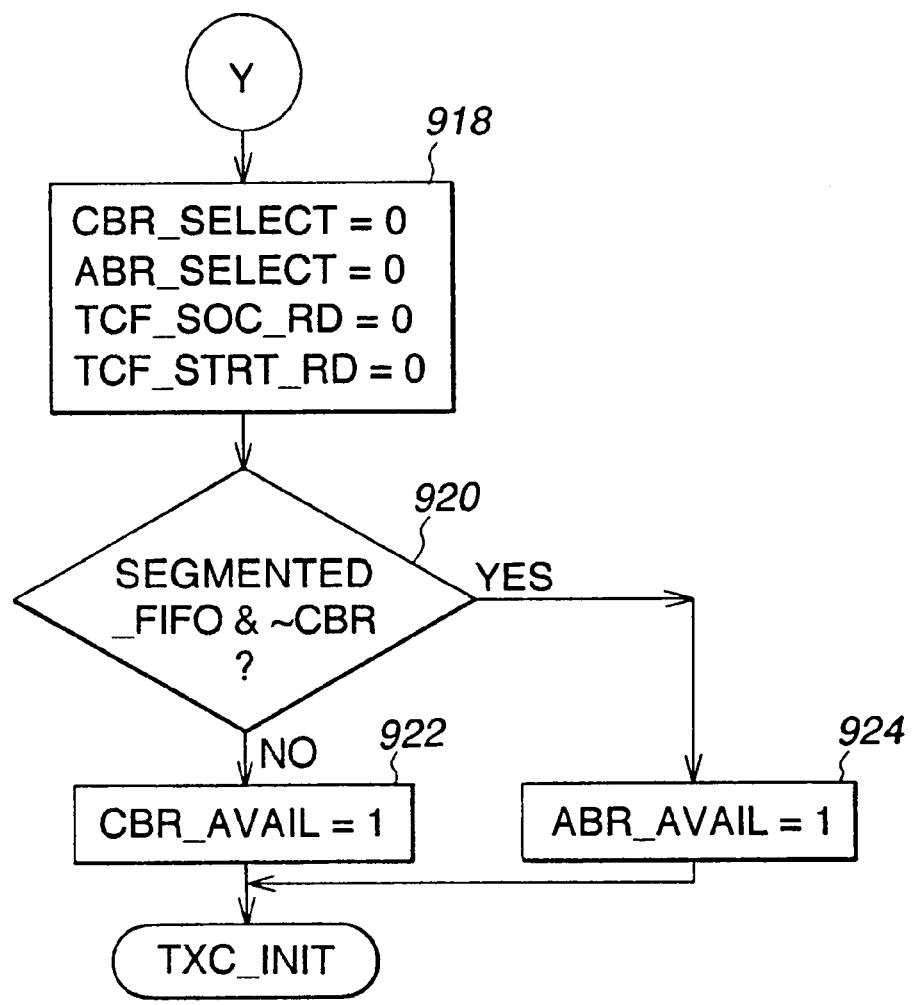

Each data cell in the FIFO is stored as either a 52-byte quantity or a 56-byte quantity, depending on whether the cell is an AAL5 cell or a raw cell. AAL5 cells are stored as a 4-byte start of cell control longword (tdf SOC LW) followed by 48 bytes of data, thus consuming 13 LW of space in the FIFO. Raw cells are stored as a 4-byte tdf SOC LW followed by 52-bytes of data (the entire cell excluding the HEC field), thus consuming 14 LW. RM cells are stored as a 4-byte tdf SOC LW followed by 8 bytes of RM control information, thus consuming 3 LW. In FIG. 26, the tx data FIFO 132 is shown containing 3 cells: a raw cell 812 at the head of the FIFO, followed by an AAL5 cell 814, followed by another raw cell 816 at the tail of the FIFO.

Figure 27:
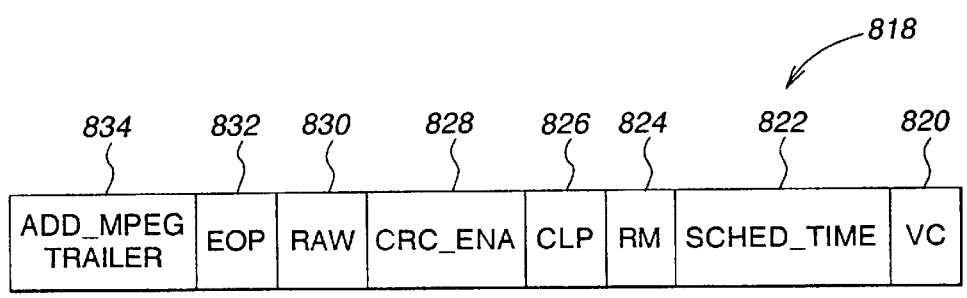
FIG. 27 illustrates a tx data FIFO SOC control longword.

The tx data FIFO SOC control longword 818 is shown in FIG. 27. Its fields are copied from the txsf SOC LW fields as follows:

VC (820)
This 12-bit field specifies the VC with which the cell is associated.

Sched_time (822)
This 8-bit field contains the time at which the tx DMA scheduler 122 issued the request for the cell.

RM (824)
This 1-bit field indicates if the cell following the SOC control longword in the tx data FIFO 132 is an 8-byte RM cell. If this bit is set, the CRC_Ena, Raw and EOP bits have no significance and will be ignored.

CLP (826)
This 1-bit field contains the CLP bit to be inserted into the cell header of the transmitted cell for AAL5 and RM cells. Its value is extracted by the tx DMA scheduler 122 from VC state, and is significant only when the Raw bit is cleared.

CRC_Ena (828)
This 1-bit field indicates whether or not a CRC-10 is to be calculated across the data in a raw cell. Its value is significant only when the RM bit is cleared and the raw bit is set (see below). RM cells will always have the CRC-10 calculated and appended regardless of the value of this bit.

Raw (830)
This 1-bit field indicates whether the cell following the SOC control longword is an AAL5 cell consisting of 48 bytes of data or a raw cell consisting of 52 bytes of data. It's value is significant only when the RM bit is cleared. If the RM bit is set, the data following the tdf SOC LW comprises an 8-byte RM cell.

EOP (832)
This 1-bit field indicates if the cell following the tdf SOC LW contains the last byte of an AAL5 packet. It's value is significant only when the PM, Raw and Add_MPEG_Trailer bits are all cleared. This bit will be used to determine if the EOM bit of the PT field of the cell should be set.

Add_MPEG_Trailer (834)
This 1-bit field indicates if the AAL5 packet being segmented is an MPEG super packet and if the tdf SOC LW describes the last cell in a set of 2 MPEG PDUs (transmitted in a single AAL5 packet). This bit will be used to determine if the EOM bit of the PT field of the cell should be set.

The tx data FIFO 132 keeps track of whether or not it is full, providing the signals cbr_space_avail and abr_space_avail to the tx cell FSM 130. In the event that the tx data FIFO 132 is in unsegmented mode and it is full, the cbr_space_avail bit is reset. In the event that the tx data FIFO 132 is in segmented mode and the cbr tx data FIFO 300 is full, the cbr_space_avail bit is reset. In the event that it is in segmented mode and the abr tx data FIFO 302 is full, the abr_space_avail bit is reset.

Tx Cell FSM 130

The tx cell FSM 130 serves as the interface between the tx data synch fifo 128 and the tx data FIFO 132. The functions of the tx cell FSM 130 are generally as follows:

moving of SOC control longword entries from the tx data synch fifo 128 to the tx data FIFO 132;

moving of cell data from the tx data synch fifo 128 to the tx data FIFO 132;

computation of CRC32 for AAL5 packets, as insertion of CRC32 into AAL5 EOP cells;

initialization of the CRC32 value at AAL5 packet boundaries;

delineation of 8-cell MPEG packets and insertion of the AAL5 trailer for such packets;

reading of RM cells from the local memory 76 and writing of the RM cells to the tx data FIFO 132.

FIGS. 28a–28d describe the detailed operation of the tx cell FSM 130. The tx cell FSM 130 first waits for the txsf_SOC_rdy signal from the tx DMA FSM 126 (step 835), indicating that a valid SOC is available in the tx data synch fifo 128. The tx cell FSM 130 reads the txsf SOC LW (step 836) and sets the SOC_rd bit (step 838) to indicate to the tx DMA FSM 126 that the SOC LW has been consumed. The txsf SOC LW is then decoded (step 840). If either the segmented_fifo signal is deasserted, indicating single FIFO mode, or the segmented_fifo signal is asserted but the txsf SOC LW CBR bit is set, indicating that the tx data synch fifo 128 holds a CBR cell to be placed in the cbr tx data FIFO 300 (step 842), the tx cell FSM 130 checks to see if space is available in the CBR data FIFO by checking to see if a cbr_space_avail bit from the tx data FIFO 132 is set (step 844). If so, the tx cell FSM 130 sets a cbr_select bit (step 846) to enable writing to the cbr tx data FIFO 300. If the segmented_fifo signal is asserted and txsf SOC LW CBR bit is not set, indicating that the tx synch FIFO holds an ABR/UBR cell to be placed in the abr tx data FIFO 302 (step 842), the tx cell FSM 130 sets an abr_select bit to enable writing to the abr tx data FIFO 302 (step 850). Note that the tx cell FSM 130 need not check to see if space is available in the ABR data FIFO, since the fifo_remain controller 316 has already made this determination.

If the decoding of the txsf SOC LW indicates an AAL5 (or MPEG) cell which is not an EOP cell (step 852), the tx cell FSM 130 reads the CRC value for VC from tx VC state for the VC (step 856). Then if the txsf_data_rdy bit is set (step 854), indicating that cell data is available for transfer from the tx data synch fifo 128, the tx cell FSM 130 sets a tcf_strt_rd bit (step 858) to indicate to the tx DMA FSM 126 that cell data is being transferred from the tx data synch fifo 128 to the tx data FIFO 132. The cell data is then moved from the tx data synch fifo 128 to the tx cbr data FIFO is cbr_select if set, or to the abr data FIFO if abr_select is set (step 860).

The 32 bit CRC for an AAL5 packet is calculated incrementally across the various cells making up the packet. Thus, the tx cell FSM 130 calculates the new CRC32 value based on the CRC field previously read from tx VC state (step 854) and on the data transferred, and writes the new CRC32 value back to the tx VC state table 254 (step 862).

If the decoding of the txsf SOC LW indicates an AAL5 cell which is an EOP cell (step 864), then the txsf data is handled in the same manner as previously described for AAL5 cells. The CRC value for the VC is read from tx VC state for the VC (step 866). Then, if the txsf_data_rdy bit is set (step 868), indicating that cell data is available for transfer from the tx data synch fifo 128, the tx cell FSM 130 sets the tcf_strt_rd bit (step 870) to indicate to the tx DMA FSM 126 that cell data is being transferred to the tx data FIFO 132. The cell data is then moved from the tx data synch fifo 128 to the tx cbr data FIFO if cbr_select is set, or to the abr data FIFO if abr_select is set. The new CRC32 value is then calculated based on the CRC field read from tx VC state and on the data transferred (step 872), and then written to the tx data FIFO 132 (step 874). The CRC value stored in the tx VC state table 254 for the VC is then reset to an initialization value (step 876).

If the decoding of the txsf SOC LW indicates an MPEG cell which is an EOP cell (step 878), then the txsf data is handled in the same manner as previously described for AAL5 EOP cells (steps 880–892), except that the MPEG trailer is written to the tx data FIFO 132 prior to writing the CRC32 to the tx data FIFO 132 (step 888).

If the decoding of the txsf SOC LW indicates a RAW cell (step 894), then if the txsf_data_rdy bit is set (step 896), indicating that cell data is available for transfer from the tx data synch fifo 128, the tx cell FSM 130 sets a tcf_strt_rd bit (step 898) to indicate to the tx DMA FSM 126 that cell data is being transferred from the tx data synch fifo 128 to the tx data FIFO 132. The cell data is then moved from the tx data synch fifo 128 to the tx cbr data FIFO is cbr_select is set, or to the abr data FIFO if abr_select is set (step 900). No CRC calculation is required for raw cells.

If the decoding of the txsf SOC LW indicates an RM cell (step 902), the tx cell FSM 130 then checks the CRC Ena/Fwd bit (step 908). If this bit is set, the header for a forward RM cell is moved from the local memory 76 to the tx abr data FIFO (step 910). If the bit is not set, the header for a backward RM cell is moved from the local memory 76 to the tx abr data FIFO (step 912). Tx VC state for the VC is then checked to see if the VC_congestion bit is set (step 914). If so, the bit is reset (step 916).

Upon completion of construction of the tx data FIFO 132 entry, the tx cell FSM 130 resets the cbr_select, abr_select, tcf_SOC_rd, and tcf_strt_rd bits (step 918). If the FIFO is not segmented or if the FIFO is segmented and the txsf SOC LW CBR bit is set (step 920), a cbr_avail signal is asserted (step 922) to indicate that a cell is available in the cbr tx data FIFO 300. If the FIFO is segmented and the txsf SOC LW CBR bit is not set (step 920), an abr_avail signal is asserted (step 924) to indicate that a cell is available in the abr tx data FIFO 302.

Tx phy FSM 134

The tx phy FSM 134 reads the SOC longwords and cell data from the tx data FIFO 132 and transfers cell data to the PHY interface 80 for transmission to the Utopia interface. The functions of the tx phy FSM 134 are generally as follows:

transfer of AAL5, AAL5 EOP, MPEG EOP, Raw, BRM and FRM cells from the tx data FIFO 132 to the PHY interface 80;

creation of the cell header for AAL5, AAL5 EOP, MPEG EOP, BRM and FRM cells. Raw cells are transmitted unmodified except for the CONTROLLED bit in the GFC field;

generation of 40 bytes of payload for BRM and FRM cells;

generation of CRC10 for RM cells, and for raw cells when the CRC_Ena bit is set;

generation of the 8-bit ABR_current_time and CBR_current_time pointers;

synchronization of transmission of cells to current time—i.e. cells are not transmitted until current_time>=the Sched_time timestamp for the cell.

Figure 29:
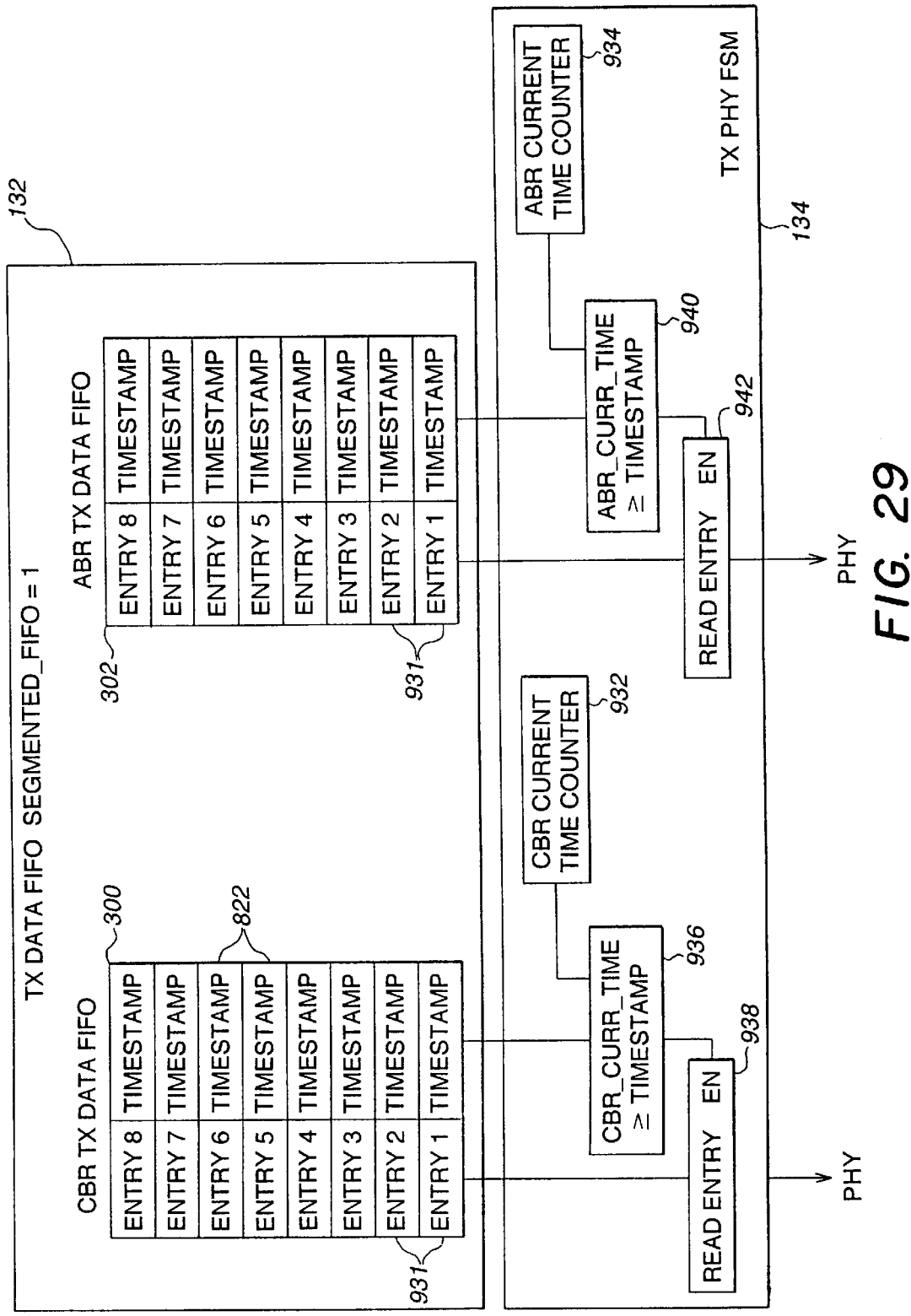
FIG. 29 is a block diagram of the tx data FIFO and tx phy FSM of FIG. 6.

FIG. 29 is a block diagram of the tx data FIFO 132 and the tx phy FSM 134 when GFC is enabled; i.e. the tx data FIFO 132 is segmented into a cbr tx data FIFO 300 and an abr tx data FIFO 302. The cbr and abr tx data FIFOs 300 and 302 each contain up to 8 tx data FIFO entries 931. Each entry 931 includes the cell data and the tdf SOC LW 818 including the Sched_time timestamp field 822. The head entry 931 from each of the tx data FIFOs 300 and 302 is coupled to the tx phy FSM 134. Within the tx phy FSM 134 is a CBR_current_time counter 932 and an ABR_current_time counter 934. The CBR_current_time counter 932 produces as output the current location of the CBR_current_time pointer (cbr_curtime). The output of the CBR_current_time counter is coupled to a comparator 936, as is the timestamp 822 from the head entry 931 of the cbr tx data FIFO 300. When the comparator 936 detects that cbr_curtime is greater than or equal to the contents of the timestamp 822, a driver 938 is enabled in order to pass the head entry 931 from the cbr tx data FIFO 300 to the PHY 80. Likewise, the ABR_current_time counter 934 produces as output the current location of the ABR_current_time pointer (abr_curtime). The output of the ABR_current_time counter is coupled to a comparator 940, as is the timestamp 822 from the head entry 931 of the abr tx data FIFO 302. When the comparator 940 detects that cbr_curtime is greater than or equal to the contents of the timestamp 822, a driver 942 is enabled in order to pass the head entry 931 from the cbr tx data FIFO 300 to the PHY 80.

Figure 30A:
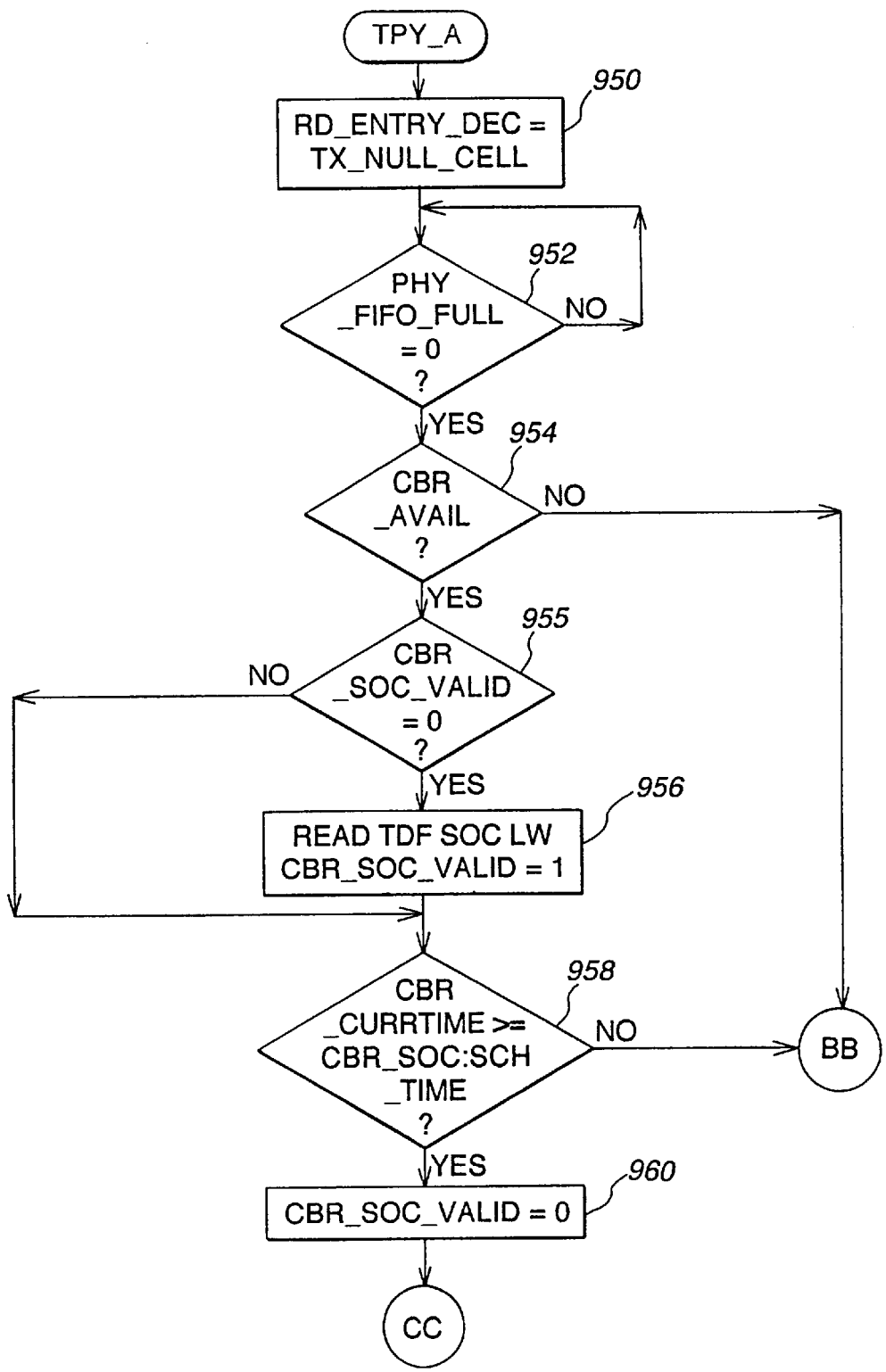

FIGS. 30a–30d show a flow diagram of the functionality of the tx phy FSM 134. As shown in FIG. 30a, the tx phy FSM 134 first sets the rd_entry_dec[1:0] vector to TX_NULL_CELL (step 950). The rd_entry_dec[1:0] vector is used by the fifo_remain counter to keep track of the number of entries remaining in the abr tx data FIFO 132, as previously described. The tx phy FSM 134 then checks a phy_FIFO_full bit from the PHY interface 80 (step 952). If the phy_FIFO_full bit is deasserted, indicating that there is room in a phy synch FIFO (not shown) in the PHY interface 80 to accept data from the tx data FIFO 132, the tx phy FSM 134 then checks a cbr_avail bit (step 954) from the tx data FIFO 132 to determine whether any CBR cells are available in the cbr tx data FIFO 300 for transmission.

If the cbr_avail bit is asserted, the tx phy FSM 134 checks a cbr_soc_valid bit (step 955). This bit indicates as to whether the SOC longword at the head of the cbr tx data FIFO 300 has been read. If the bit is deasserted, the tx phy FSM 134 reads the tdf SOC LW 818 in the cbr tx data FIFO 300 (step 956), and sets the cbr_soc_valid bit. The Sched_time timestamp field 822 in the tdf SOC LW 818 is then compared to cbr_curtime (step 958) via the comparator 936.

The Sched_time timestamp field 822 in the tdf SOC longword is a copy of the Sched_time field (358 or 388) originally written to the tx DMA request FIFO 125 when the cell was scheduled for DMA. For the segmented FIFO case described here, the Sched_time field was written with the value of cbr_sch_time at the time of DMA scheduling. The tx phy FSM 134 now compares this timestamp to cbr_curtime (step 958). If cbr_curtime is greater than or equal to the timestamp, a cbr cell will be transferred from the tx data FIFO 132 to the PHY interface 80. Cell transmissions are thereby synchronized to occur at the rate intended when the cells were scheduled in the CBR schedule table 176.

For example, consider a VC scheduled in the CBR schedule table 176 at locations 2, 4, 6, and 8, such that transmission of these cells is intended to use 50% of the link bandwidth. As this VC is scheduled for DMA by the tx DMA scheduler 122, the successive entries will be timestamped (i.e. the Sched_time field 358 will be written) with the values 2, 4, 6, and 8. After DMA, these cells reside back-to-back in the cbr tx data FIFO 300. If the timestamp is ignored, the cells will be transferred to the PHY interface 80 in a back-to-back manner, thereby using the full link bandwidth. Instead, the tx phy FSM 134 compares the timestamp to cbr_curtime via comparator 936. When cbr_curtime=1, an idle cell is transmitted from the PHY interface 80 because the timestamp 822 at the head of the cbr data FIFO is greater than cbr_curtime. At cbr_curtime=2, the scheduled cell is transmitted; at cbr_curtime=3, an idle cell is transmitted, and so on. Thus, by comparing the timestamp 822 to cbr_curtime, the tx phy FSM 134 ensures that the cells are transmitted at the intended rate.

Referring back to FIG. 30a, if the tx phy FSM 134 finds that cbr_curtime is greater than or equal to the timestamp 822 in the tdf SOC LW 818 at the head of the cbr tx data FIFO 302 (step 958), it resets the cbr_soc_valid bit (step 960), and then proceeds to determine whether the cell to be transmitted is an AAL5, AAL5 EOP, MPEG EOP, or Raw cell.

If the cell is an AAL5 (or MPEG, treated here as AAL5) cell (FIG. 30b, step 962), the tx phy FSM 134 generates the ATM cell header for the cell (step 964). Accordingly, the GFC bit in the cell header is set to controlled or reset to uncontrolled depending upon whether the cell is on a GFC controlled VC. The PT bit is set to 0 for non-EOP cells, and the CLP bit is set to the value read from the SOC longword CLP field. The VPI and VCI fields are set according to a VPI/VCI mapping algorithm that operates on the VC number. The cell header is written to the PHY (step 966), and the cell data is then transferred from the cbr tx data FIFO 300 to the PHY (step 968). The rd_entry_dec [1:0] vector is then set to the value tx_AAL5 cell (step 970).

If the cell is an AAL5 or MPEG EOP cell (step 972), it is handled in the same manner as previously described except that the PT bit in the generated cell header is set to 1 (step 974).

If the cell is a raw cell (step 976), no cell header is generated, since the header for the raw cell was originally provided by the driver 24 and is included as part of the data present in the tx data FIFO 132. The GFC bit in the header is, however, set to controlled or reset to uncontrolled depending upon whether the cell is on a GFC controlled VC (step 978). The cell data is then moved from cbr tx data FIFO 300 to the PHY (step 980). If the CRC/Ena bit was set in the SOC longword (step 982), the tx phy FSM 134 generates a CRC10 for the cell (step 984) and then writes it to the PHY (step 986). The rd_entry_dec [1:0] vector is then set to the value tx_RAW_cell (step 988). After transmitting a cell, the tx phy FSM 134 resets the data_on_CBR_channel bit (step 990).

Figure 30C:
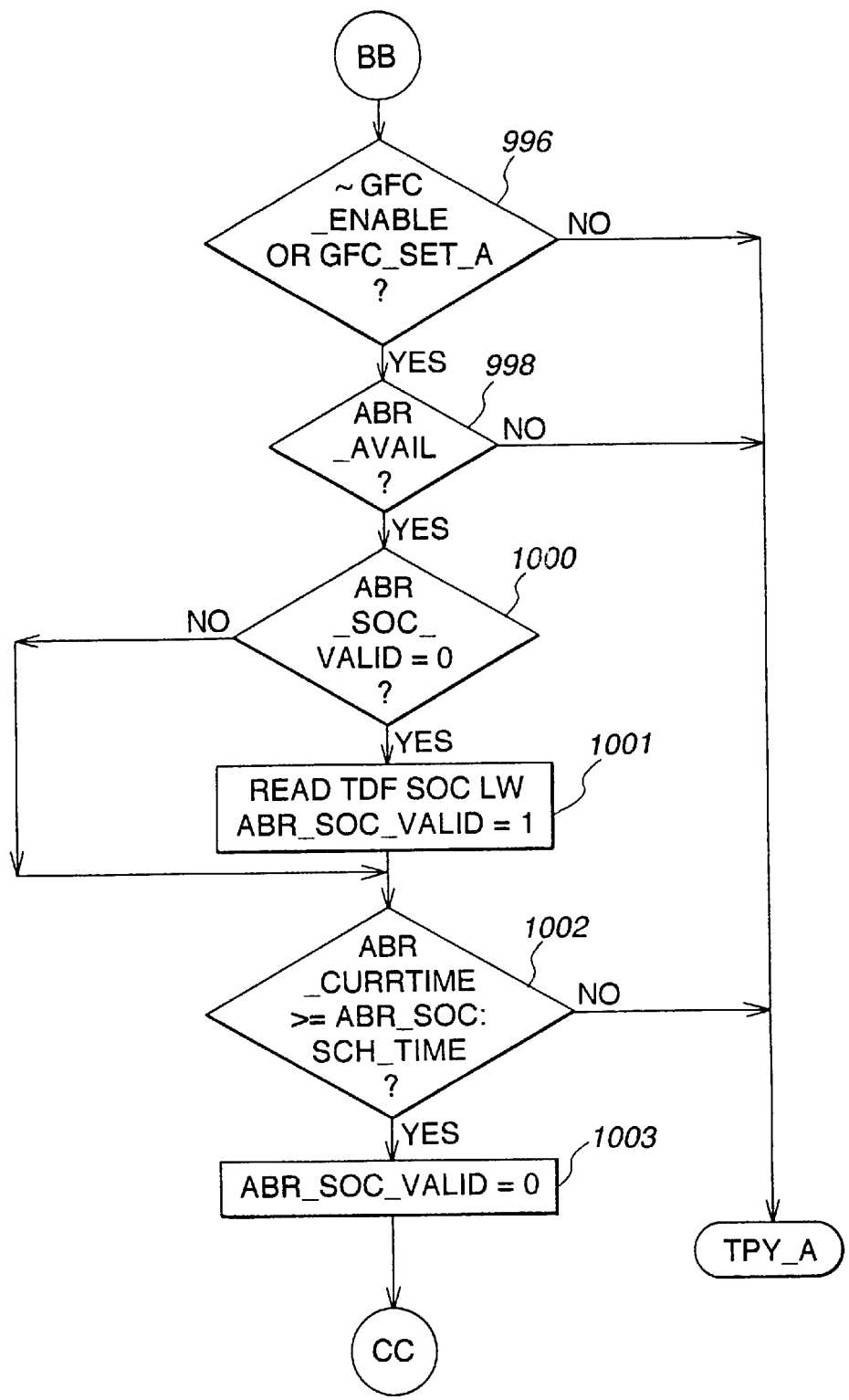

Referring back to FIG. 30a, If the tx phy FSM 134 finds that no valid tdf SOC LW is present in the cbr tx data FIFO 300 (step 954), or if cbr_curtime is less than the tdf SOC LW timestamp field 822 (step 958), the tx phy FSM 134 then determines whether an abr cell should be transferred from the abr tx data FIFO 302 to the PHY interface 80. Referring now to FIG. 30c, if GFC flow control is disabled or if GFC flow control is enabled and set_A is asserted (step 996), the tx phy FSM 134 checks an abr_avail bit from the tx data FIFO 132 (step 998). The abr_avail bit is asserted only when the tx data FIFO 132 is segmented and there is an entry available in the abr tx data FIFO 302 portion of the tx data FIFO 132. If an entry is available, the tx phy FSM 134 checks an abr_soc_valid bit (step 1000). This bit indicates as to whether the SOC longword at the head of the abr tx data FIFO 302 has been read. If the bit is deasserted, if will proceed to read the tdf SOC longword from the abr tx data FIFO 302 and set the abr_soc_valid bit (step 1001).

If GFC flow control is enabled, but set_A is deasserted, no ABR/UBR cell is transmitted. In this case, cell transmissions from the abr tx data FIFO 302 are inhibited until set_A becomes asserted. As previously described, the fifo_remain counter (FIG. 17) then controls DMA scheduling of abr traffic to ensure that cbr traffic is not blocked.

After reading the tdf SOC LW, the tx phy FSM 134 checks to see if abr_curtime is greater than or equal to the Sched_time timestamp 822. As was previously described with reference to CBR cell transfers, ABR/UBR data cells will be transmitted only if abr_curtime is greater than or equal to the timestamp 822. If so (step 1002), the tx phy FSM 134 resets the abr_soc_valid bit (step 1003) and proceeds to transmit an ABR/UBR cell. The tdf SOC LW is further decoded to determine whether the cell to be transmitted is an AAL5, AAL5 EOP, MPEG EOP, Raw cell, or RM cell.

AAL5, AAL5 EOP, MPEG EOP, and Raw cells are handled as previously described for cbr cells (FIG. 30b). The abr tx data FIFO 302 may also hold RM cells. If the cell to be transmitted is an RM cell (step 1006), the tx phy FSM 134 first generates the RM cell header (step 1008). The GFC field is set to controlled or reset to uncontrolled depending upon whether the cell is on a GFC controlled VC. The PT field is set to 6H, indicating an RM type cell. The CLP bit is set to the value contained in the SOC longword CLP field. The VPI and VCI fields are set according to a VPI/VCI mapping algorithm that operates on the VC number. The cell header is then transferred from the tx data FIFO 132 to the PHY (step 1010). The tx phy FSM 134 then generates the 40 byte payload for the RM cell (step 1012). The payload for an RM cell is known to be 40 bytes of value 6AH. Note that, rather than using abr tx data FIFO 302 space to hold the RM cell payload, the tx phy FSM 134 generates the payload as needed. The payload is then transferred to the PHY (step 1014). Finally, the tx phy FSM 134 generates the CRC10 for the RM cell (step 1016) and transfers it to the PHY (step 1018). The rd_entry_dec [1:0] vector is then set to the value tx_RM_cell (step 1020).

Figure 30D:
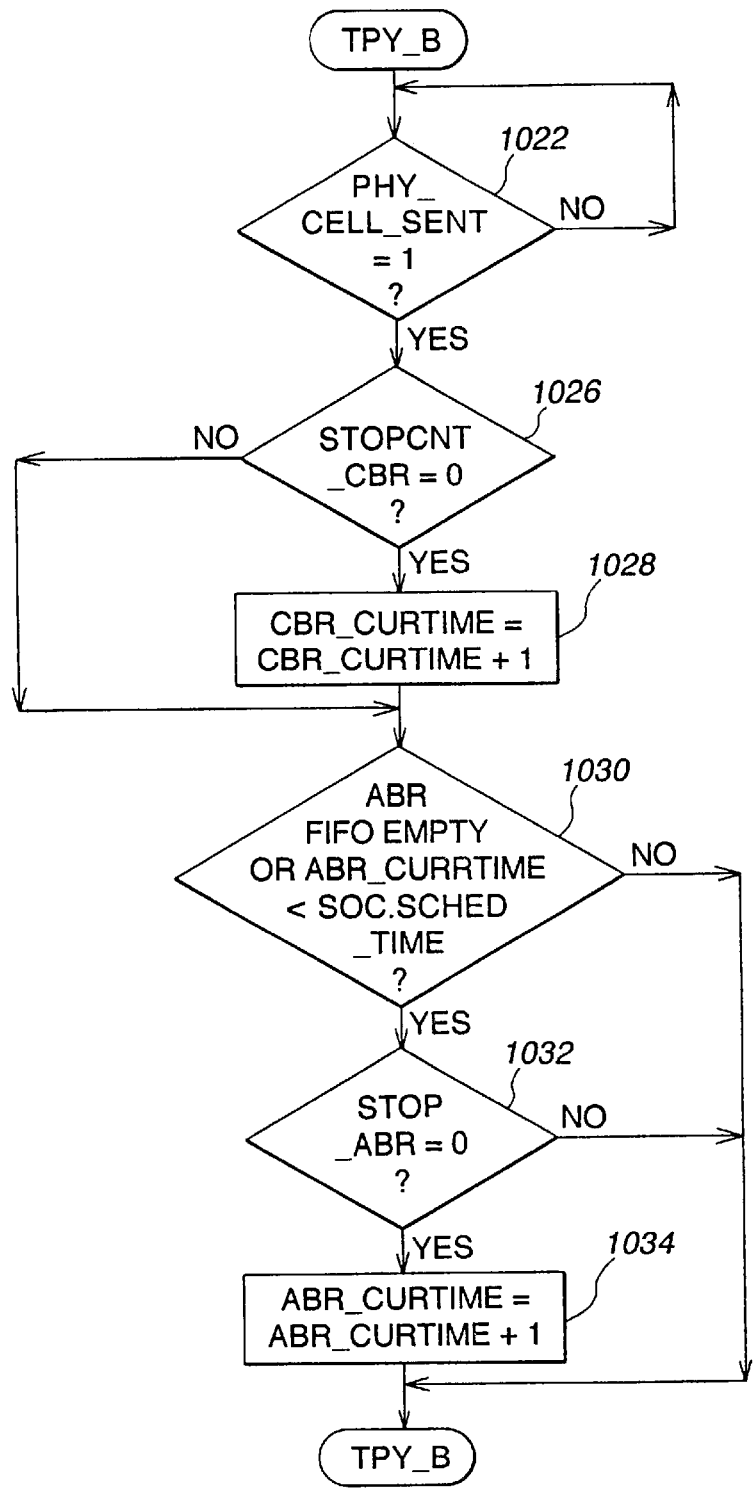

The tx phy FSM also functions to update the current time counters 932 and 934. Referring now to FIG. 30d, the tx phy FSM 134 awaits the assertion of a phy_cell_sent signal from the PHY interface 80 (step 1022). The PHY interface 80 transmits CBR and ABR cells from the tx data FIFO 132 to the Utopia bus. When no CBR or ABR cells are available for transmission at a particular time (i.e. curtime has not yet reached the timestamp of the cell at the head of the tx data FIFO 132 or the FIFO is empty), then an idle cell is sent by the PHY interface 80 to the Utopia bus. The phy_cell_sent signal is asserted when the PHY interface has transmitted a CBR or ABR cell from the tx data FIFO 132 or, if no CBR or ABR cells are available for transmission at this time, when an idle cell has been transmitted.

Once the phy_cell_sent signal is asserted, the tx phy FSM 134 determines whether to advance the cbr_current_time and abr_current_time counters 932 and 934. First, the stopcnt_cbr signal is checked (step 1026).

Recall that the CBR_schedule_time pointer advances ahead of the CBR_current_time pointer (whose value is output from the cbr current time counter 932). Due to PCI bus 18 latency, the advancement of the CBR_schedule_time pointer may stop for some period of time because the tx DMA request FIFO 125 is full. The CBR_current_time pointer, however, continues to advance. When cbr_curtime has caught up with cbr_sch_time, the stopcnt_cbr bit is set by the tx rate scheduler 120 to prevent cbr_curtime from passing cbr_sch_time. No CBR cells will be transmitted until stopcnt_cbr is cleared. Thus, if the stopcnt_cbr signal is asserted, cbr_curtime is not incremented. If the stopcnt_cbr signal is deasserted, cbr_curtime is incremented (step 1028).

The tx phy FSM 134 now determines whether to increment the abr current time counter 934. Accordingly, if the abr tx data FIFO 302 is empty, or if there is an entry in the abr tx data FIFO 302 but abr_curtime is less than the timestamp for the entry (step 1030), the stopcnt_abr signal is checked (step 1032). As previously described for cbr traffic, the stopcnt_abr bit is set by the tx rate scheduler 120 to prevent abr_curtime from passing abr_sch_time. If the stopcnt_abr signal is deasserted, then the tx phy FSM 134 increments the abr current time counter 934, thereby incrementing abr_curtime (step 1034). Otherwise abr_curtime is not incremented.

Note that, due to the condition check at step 1030, when ABR cells are not being transmitted because, for example, GFC set_A is deasserted, abr_curtime will be incremented only until abr_curtime reaches the timestamp value 822 contained in the tdf SOC LW 818 of the next entry in the abr tx data FIFO 302. Then, when abr flow is enabled, i.e. a GFC set_A bit is received, the next cell will be transmitted immediately.

Alternatively, abr_curtime could be incremented regardless of the next entry timestamp, until abr_curtime reaches abr_sch_time. In this case, when the abr flow is enabled, all entries in the abr tx data FIFO 302 with timestamps less than abr_curtime will be transmitted back-to-back (unless interrupted by cbr cell transmissions), at full link bandwidth.

Note that, when PCI bus 18 latencies become unusually large, the cbr and/or abr tx data FIFO 300, 302 may remain empty for some time while the cbr_current_time and abr_current_time counters 932 and 934 continue to advance. In this case, when cell data is finally available in the tx data FIFO 132, a number of cells may have timestamps less than cbr_curtime or abr_curtime. In this case, all cells with timestamps less than curtime will be transmitted back-to-back on the link. Cell transmission will therefore be out of synch with the schedule table rate intended. This will only occur for at worst 32 cells (the maximum allowed difference between abr_curtime and abr_sch_time). However, this may advantageously prevent cells from being dropped from scheduling due to back pressure.

When GFC is disabled, the tx data FIFO 132 is configured as a single FIFO holding both CBR and ABR/UBR cells. In this case, only the cbr_current_time pointer need be used. Thus, when the segmented_fifo signal is deasserted, the timestamp values 822 in the tdf SOC LWs 818 are derived from abr_sch_time (FIG. 22c at step 518) and compared to cbr_curtime. Stopcnt_cbr is set whenever cbr_sch_time=cbr_curtime or abr_sch_time=cbr_curtime.

It should be noted that the previously described is a specific example of a mechanism for associating timestamps with entries in a schedule memory to facilitate the transfer of data from a transmit buffer memory at a particular rate. Various alternative implementations are available to achieve the same result. The current time counters 932 and 934 shown in FIG. 29 (932, 934), for example, are specific examples of current time circuitry used to represent points in time at which data is to be transmitted from a transmit buffer memory (herein the tx data FIFO 132). Alternative circuitry, such as linear feedback shift registers, may be employed for the same purpose. Furthermore, timestamps can be associated with entries in a schedule memory in a variety of ways. Though the preferred embodiment implements the timestamp as a copy of a schedule time pointer associated with an entry in the schedule table 174 which then becomes part of the DMA request entry and is ultimately forwarded to the tx phy FSM 134, the position of the entry in the schedule table could alternatively be stored as a timestamp anywhere, as long as the circuitry for transferring the data from the transmit buffer memory (herein the tx phy FSM) can associate the timestamp with the data in the transmit buffer memory. Furthermore, the timestamp need not be related to the linear position of the entries in the schedule memory. For example, the schedule memory might be implemented as a content addressable memory (CAM) accessed by a timer or counter which preferably leads in time the output of the current time circuitry. In this case, the output of the CAM is a VC or pointers to a list of VCs to be scheduled for DMA. A DMA request could then be generated which includes the value of the timer or counter output used to access the CAM as the timestamp associated with the entry.

Furthermore, the current time circuitry herein embodied is implemented as counters (932, 934) which are continually incremented at the line rate up to the maximum size of the schedule table 174. These counter values are compared to timestamps generated from schedule time pointer values which are also incremented up to the maximum size of the schedule table 174. Yet another alternative embodiment could employ current time circuitry and timestamps which are incremented relative to each other. For example, consider that cbr_curtime is initially '0', and cbr_sch_time is incremented until a valid cbr entry is found in the CBR schedule table 176. Suppose a valid entry is found at location '4' in the CBR schedule table 176. After a data transfer for the entry is initiated and performed, the timestamp 822 in the entry at the head of the tx data FIFO 132 is '4'. When cbr_curtime reaches 4, the cell is transferred to the PHY interface 80, cbr_curtime is reset, and cbr_sch_time is reset. The next valid entry exists at location '8' in the schedule table. Now cbr_sch_time is advanced four times to take on the value '4', while cbr_curtime counts from 0 at the line rate. When cbr_curtime reaches 4, the cell is transmitted.

Tx Status Reports and the Tx Report Queue

As data is transferred via a DMA operation from tx slots in host memory, the SAR controller reports to the driver in the host system the tx slots which have been consumed. Such a reporting mechanism enables the driver to recover and re-use the physical memory that had been occupied by those tx slots. As illustrated in FIG. 1, this reporting mechanism takes the form of the tx report queue 36 (from FIG. 1) residing in host memory. The tx report queue 36 is a fixed-size structure located at a fixed location, which can be specified by the driver through the Tx_Report_Base CSR, and must be 64-Byte aligned. In the described embodiment, the tx report queue contains 1K entries, and each entry is 4 bytes wide. It can be appreciated that the size of the tx report queue is chosen to be equal to the total number of tx slot descriptors supported by the SAR controller.

Figure 31:
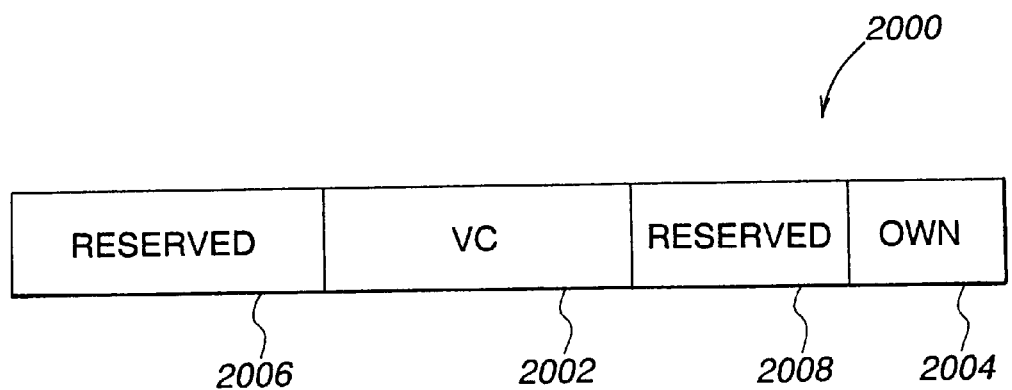
FIG. 31 illustrates the layout of a tx report queue entry of the tx report queue of host memory (FIG. 1)

Now referring to FIG. 31, there is depicted the format of a tx report queue entry 2000. As shown, the tx report queue entry 2000 includes a VC field 2002 and an own field 2004. Also included are two reserved fields indicated by reference numbers 2006 and 2008. The VC field 2002 specifies the VC associated with the AAL5 packet or raw cell which was transmitted.

The own field 2004 contains an own bit for each entry in the tx report queue 36 to indicate whether the entry is owned by the adapter or by the host system. After reset, the polarity of each own bit is initially set to "1", indicating that the entry is owned by the adapter. Thereafter, it toggles every time the SAR controller fills the tx report queue. This scheme allows the driver to determine ownership of a given tx report queue entry without requiring driver writes to the queue. After the driver has initialized the tx report queue by writing the own bits in all the entries in the tx report queue to 1, it will never write the queue. Similarly, the SAR controller never reads the queue.

When the tx DMA scheduler FSM is creating a DMA request for the last byte(s) of data in a tx slot, it determines if the tx slot is an end-of-packet (EOP) slot, or, for AAL5 packets, if the Tx_AAL5_SM bit in the tx VC state is set. If either is true (i.e., the transit slot is an EOP transmit slot or the transmit slot contains a streaming mode AAL5 packet), the SAR controller initiates DMA of a status report entry into the tx report queue and typically generates an interrupt after the data DMA request has been serviced. This DMA operation is referred to as a tx status report.

When all the data in a tx slot has been transferred via DMA across the PCI bus from host memory to the SAR controller, it is said that the tx slot has been consumed. The SAR controller reports the consumption of a tx slot in host memory to the host system through the tx status report. In general, the SAR controller only reports consumption of tx slots for which the EOP bit is set in the transmit slot descriptor. For AAL5 PDUs, the EOP bit is only set for the tx slot containing the last byte of payload of the packet. For AAL5 packets in streaming mode, the driver can choose to report and interrupt per tx slot on a per-VC basis whether or not the EOP bit is set (via the Tx_AAL5_SM bit in the tx VC state table), but this is not the normal mode of operation. Typically, only the consumption of the last slot of an AAL5 packet results in a tx status report.

Unlike AAL5 cell data, each raw cell is contained in a single tx slot. Under normal operation, then, a status report is generated for every tx slot containing a raw cell. To provide relief to the host system, the EOP bit in the EOP field of the tx slot descriptors (shown in FIG. 11) is manipulated to mitigate the frequency with which tx status reports are generated for raw cells. More particularly, the driver may choose to set the EOP bit for every raw cell tx slot, or, choose to mitigate the frequency with which raw cell status reports take place by setting the EOP bit every N raw cell tx slots, where N is chosen so as to maximize the performance of the driver. Hereafter, N is referred to as the raw cell status report mitigation number. It will be appreciated that, in alternative system implementations, a tx slot descriptor field other than an EOP field could be defined to indicate whether or not a raw cell tx status report should be generated.

Referring back to FIG. 31, the driver uses the VC field 2002 in the tx report queue entry 2000 along with the FIFO order of packets within the identified VC to determine which packets have completed transmission. For example, the driver could maintain a per-VC count of packets which have been queued for transmission but have not yet been transmitted.

Figure 32:
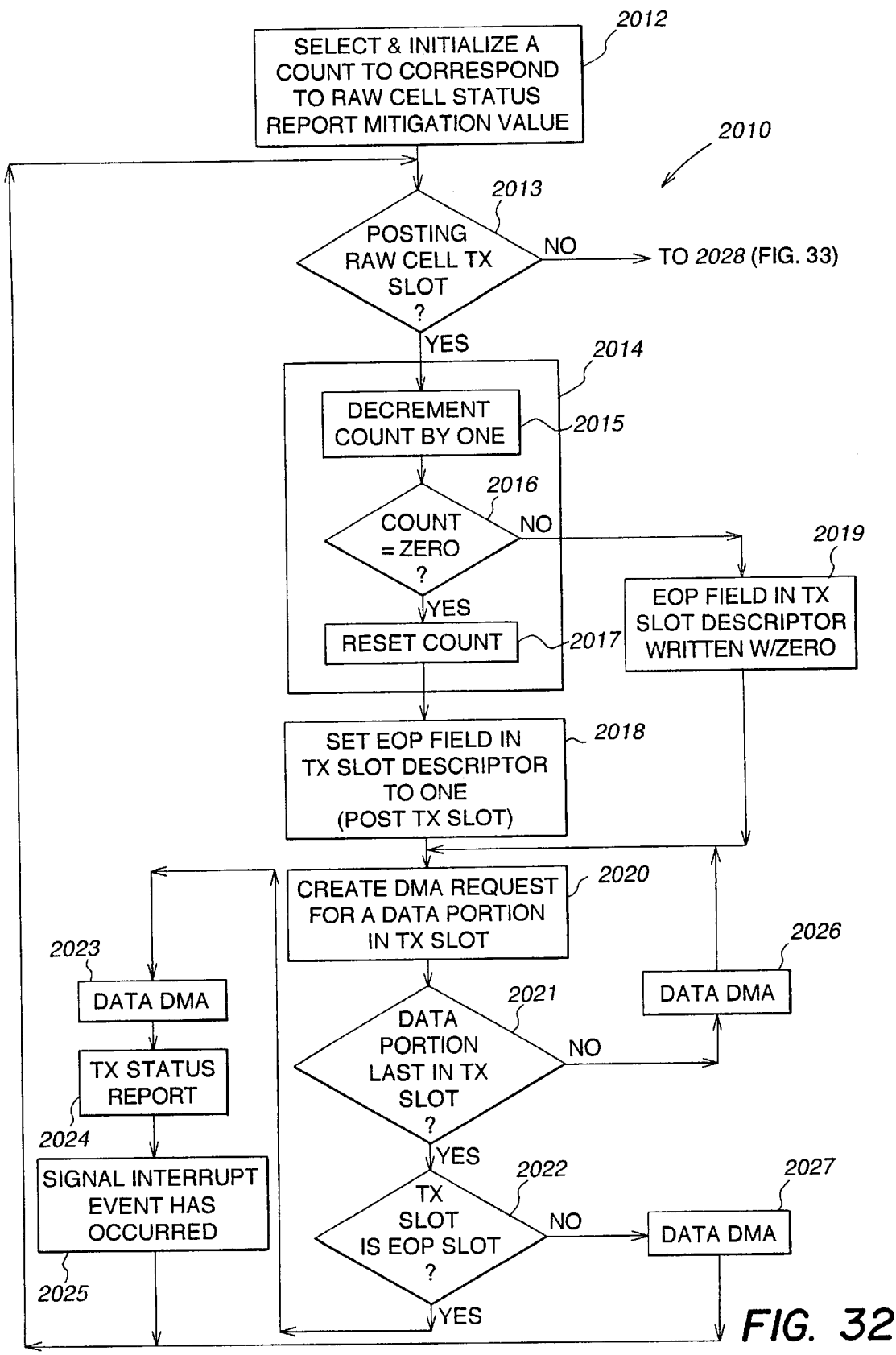
FIG. 32 is a flow diagram of a method of performing tx raw cell report frequency mitigation.

In FIG. 32, there is shown a flow diagram illustrating a method of tx status reports frequency mitigation for raw cells 2010. In this embodiment, the host system selects a raw cell status report mitigation value N 2012, where N indicates the number of raw cell tx slots that must be consumed before a tx status report is generated. As part of step 2012, the host system may initialize a count for counting a number corresponding to N. For each tx slot the driver prepares to post to the adapter, the following steps are performed. First, the driver determines if the tx slot to be posted corresponds to (i.e., contains) a raw cell 2013. If the driver is posting a tx slot for a raw cell, it decides whether or not a tx status report should be generated. This decision making step is indicated by 2014. It can be appreciated that the decision can be performed by any host system controlled decision making mechanism, whereby the posting of an Nth raw cell tx slot is detected. In this embodiment, the driver maintains a count as described above to keep track of the number of raw cell tx slots posted. The count is modified by one at step 2015. If the count is a downward counting count, initialized to the raw cell status report mitigation value N (or N plus as an offset value), it is decremented by one 2015. If the count is an upward counting count, initialized to zero (or some offset value) and counting up to the raw cell status report mitigation value N (or N+offset value), it is incremented by one. If the count "expires", i.e., counts the Nth raw cell tx slots to be posted 2016, the driver knows that the raw cell tx slot to be posted for transmission is the Nth such slot. The driver resets the count 2017 and, in response to the step of deciding, writes the tx slot descriptor associated with the tx slot, setting the EOP field in the associated tx slot descriptor to one 2018. If the count has not expired at step 2017, the driver writes the EOP field with a zero 2019. It can also be appreciated that the host system or driver could perform the decision making step 2014 in an alternative fashion, e.g., on a raw tx slot by raw tx slot basis without the assistance of a count or even a selection of N, in which case the method would commence at either of steps 2013 or 2014.

In response to the posting of the tx slot, a data transfer request is created for each data portion in the tx slot to be copied from the host system in a separate data transfer operation 2020. In this embodiment, the data transfer request is a DMA request and the data transfer operation a DMA operation as previously described. If the data portion is the last in the tx slot 2021 and the tx slot is an EOP slot 2022 (i.e., a tx slot having an associated tx slot descriptor in which the EOP bit in the EOP field has been set), the DMA request is serviced at step 2023. Because the tx slot contains a raw cell, the servicing of the DMA request will result in the DMA of data from the tx slot to the adapter. Lastly, a tx status report is generated and sent to the host system 2024. In the preferred embodiment, the tx status report DMA is an interrupt event. The tx data DMA FSM therefore indicates to the interrupt block that an interrupt event has occurred (STEP 2025). If the data portion is not the last in the tx slot, the DMA request is serviced in the form of a DMA operation 2026 and the method returns to step 2018. If the tx slot is not an EOP slot at step 2021, the DMA request is serviced 2027.

Figure 33:
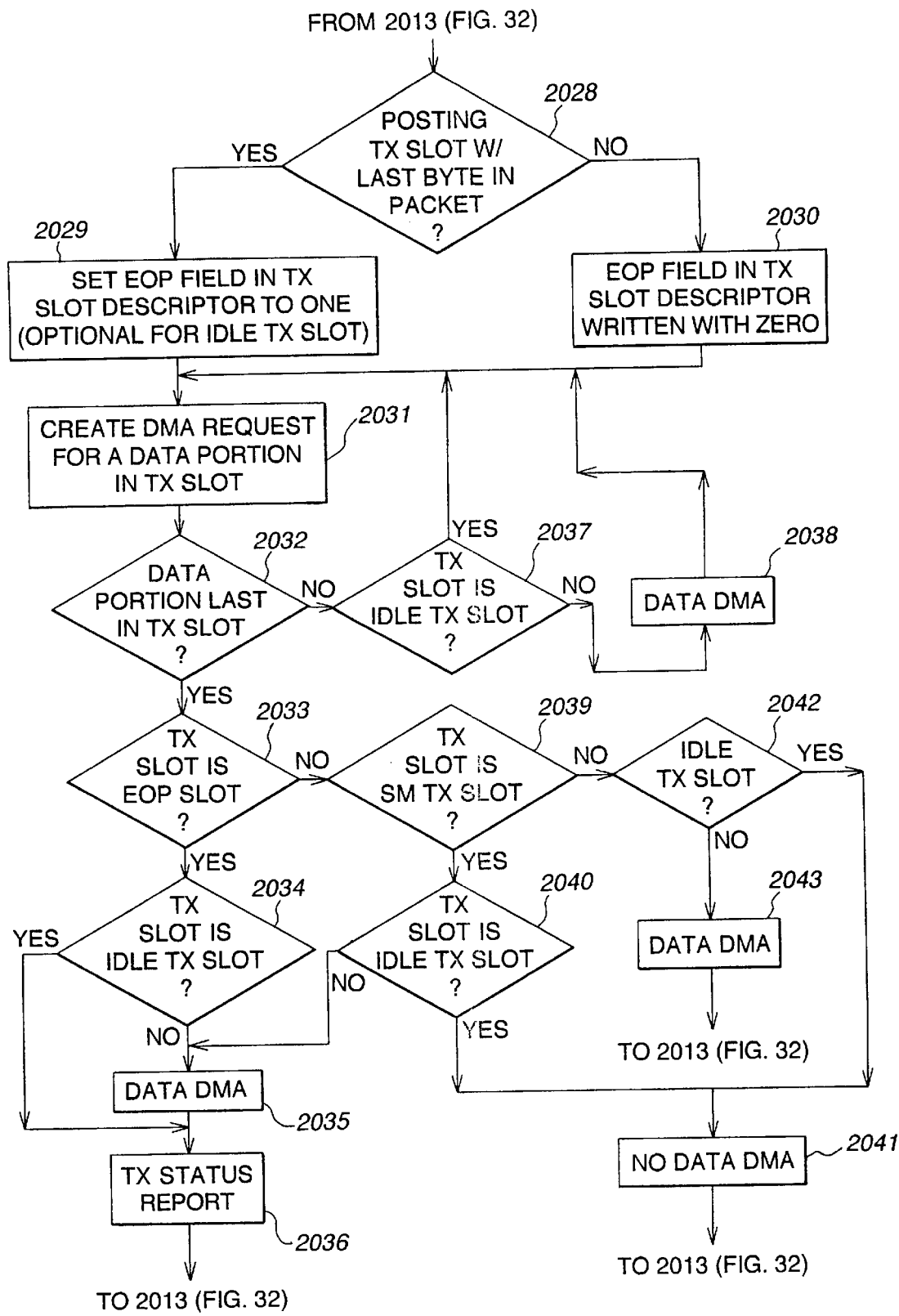
FIG. 33 is a flow diagram of a method of reporting status for data other than raw cell data.

FIG. 33 illustrates a method of generating tx status reports when the tx slot to be posted at step 2014 is not a tx slot corresponding to a raw cell. Referring now to FIG. 33, if the host system is posting a tx slot containing the last byte in a packet 2028, it writes the associated tx slot descriptor, setting the EOP bit as indicated by step 2029. It should be noted that this EOP bit is set for tx slots corresponding to idle slots at the option of the host system. Otherwise, the EOP bit in the EOP field is zero according to step 2030. In response to the posting of the tx slot, the tx DMA scheduler creates a DMA request corresponding to a portion of data to be DMA'd from the transmit slot in host memory 2031. If the data portion is the last in the transmit slot 2032 and the tx slot is determined to be an EOP slot 2033, the DMA request is serviced by first determining if the tx slot corresponds to an idle slot 2034 and then initiating the DMA transfer of data from the host memory to the adapter 2035 if the tx slot is not an idle slot. The tx data DMA FSM then DMAs a status report entry into the tx report queue in host memory 2036. Although not shown, there is an indication to the interrupt block that an interrupt event has occurred.

Still referring to FIG. 33, if the data portion is not the last in the tx slot at step 2032, no status report is sent. The DMA request is serviced by determining if the tx slot is an idle slot 2037 and DMA'ing data if the tx slot is not an idle slot 2038. The procedure returns to step 2031 for the next data portion. If the tx slot is not an EOP slot at step 2033, step 2039 determines whether or not tx slot stores streaming mode packet data (referred to as a SM tx slot). If it does, and the slot is an idle tx slot 2040, no data is transferred 2041. If the slot is not an idle tx slot, the DMA request is serviced at step 2035 and a tx status report is generated at step 2036 as previously described. If the slot is not an SM tx slot at step 2039, the DMA request is serviced by determining if the tx slot is an idle tx slot 2042 and a data DMA operation is performed when the tx slot is not an idle slot 2043. If the tx slot is an idle slot, no data is copied from the tx slot in host memory 2041. As noted above, the host system should set the EOP bit for idle slots only if it desires to be informed of the consumption of the slot. Although no data is DMA'd from idle slots, it may still be useful for the driver to learn when an idle slot has been consumed (i.e., processed by the SAR controller). Idle slots use up tx slot descriptors in the same way that other slots do, and the number of outstanding tx slot descriptors is limited to the size of the tx free slot list.

As indicated earlier, the SAR controller usually signals an interrupt event and generates an interrupt request following the occurrence of a tx status report. The frequency with which the interrupt request to the host system occurs may also be mitigated through the use of an interrupt holdoff mechanism. A more detailed description of the interrupt holdoff mechanism and the interrupt function in general follows the description of the receive operation below.

Receive Operation

In order to receive data or units of data (e.g., PDUs, packets) intended for receipt by the host system, the driver must allocate physically contiguous areas of host memory into which the data should be DMA'd by the SAR controller. These blocks of physically contiguous host memory were shown in FIG. 1 as the rx slots 32. A single AAL5 PDU may be DMA'd into a single rx slot, or may span multiple rx slots. Each received raw cell is contained in a single rx slot.

The rx slots 32 include three types: small, big and raw slots. Small slots are intended to receive AAL5 PDUs on VCs on which the maximum PDU size is expected to be small. All small slots must be the same size, and the size is programmable through SAR_Cntrl2 in CSRs to be in the range 64 B–2 KB. Big slots are those rx slots intended to receive AAL5 PDUs on VCs on which the maximum PDU size is expected to be larger than will fit in small slots. All big slots must be the same size. The size is programmable through the SAR_Cntrl2 CSR to be 1K, 2K, 4K, 8K, 10K, or 16K bytes. Raw slots are those rx slots intended to receive 52-Byte raw cell data and accompanying status information per cell. All raw cell rx slots must therefore be 56-bytes in length. They may be longer, but only the first 56 bytes of each rx slot will be used. All rx slots must be longword-aligned in the host memory. The SAR controller completely fills rx slots, with the exception of raw cell rx slots over 56 bytes in length, and EOP AAL5 rx slots (since the last portion of an AAL5 PDU may not exactly fill the last rx slot used by the PDU).

When the driver opens a VC for reception of data, it assigns a slot type to that VC. The VC then receives data only into the assigned slot type. One notable exception is the F5 OAM cell, as this type of cell is placed in a raw cell rx slot regardless of the slot type assigned to the VC with which it is associated.

Figure 34:
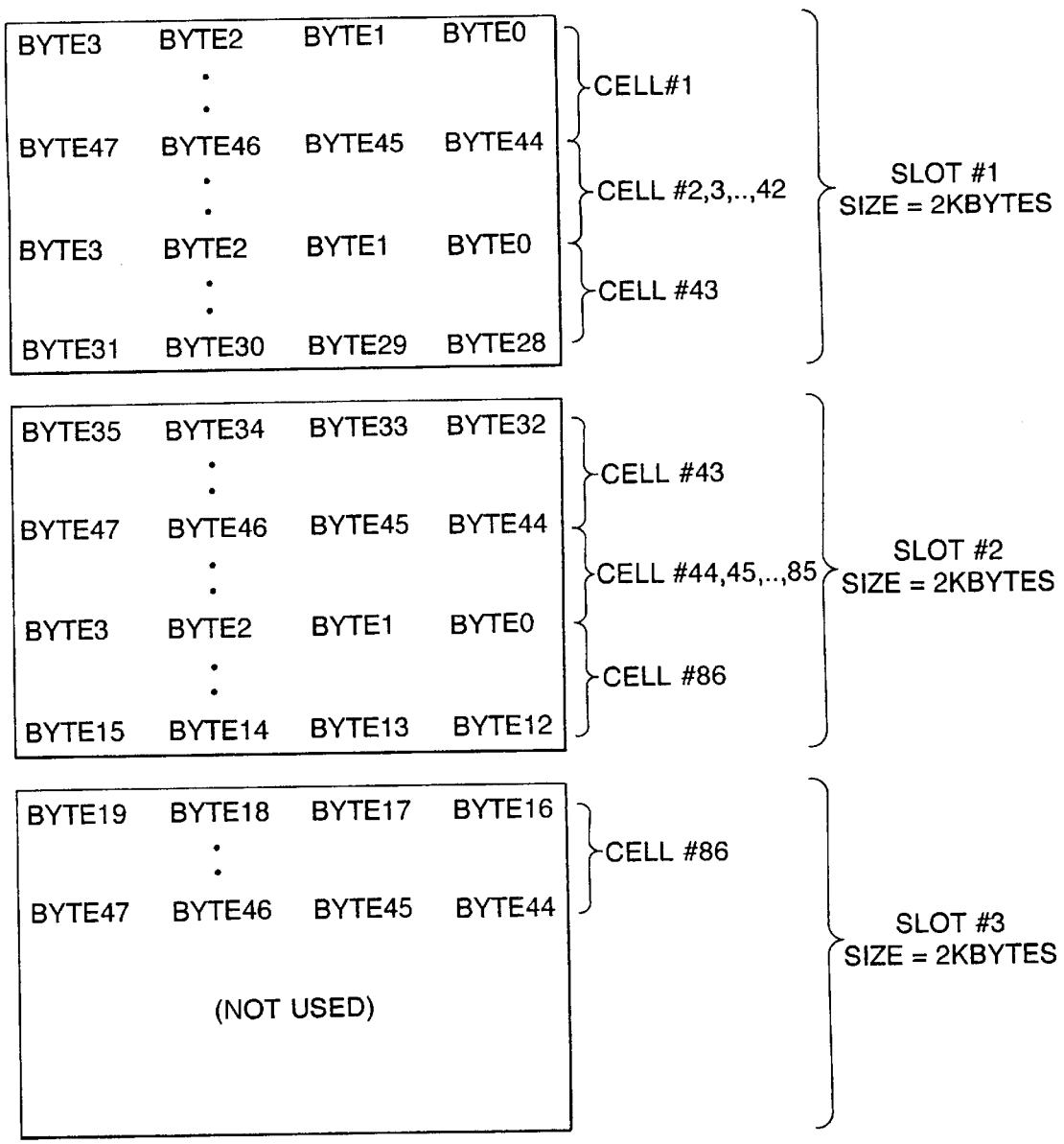
FIG. 34 illustrates an AAL5 packet stored in three rx slots.

FIG. 34 illustrates an example of an AAL5 packet which has been transferred via a DMA operation into three rx slots in host memory. The rx slots are big slots, each of which is 2 KB in length. The packet is exactly 4128 bytes in length, including the AAL5 pad, control, length and CRC fields.

Once the driver has allocated rx slots in the host memory to receive data from the SAR controller, or, alternatively, when the driver wishes to reuse rx slots from which it has extracted received data, it provides to the SAR controller the addresses of the allocated rx slots. For each rx slot 32 allocated for the reception of data, the driver 24 writes control information to an address space in the SAR controller 62. In this embodiment, the control information is two longwords; thus, the write must be 2-LW (quadword) aligned. Referring back to the CSRs shown in Table 1, the address space is indicated in the table as "rx pending slots" address space. When the driver 24 writes 2 consecutive LWs of control information describing a single rx slot to this address space, the operation is referred to as posting an rx slot. The 2 LW writes need not necessarily occur in a single PCI burst. The SAR controller is designed to handle an arbitrarily long delay between the write of the first and the second LWs corresponding to the posting of a single rx slot. In this embodiment, the rx pending slots address space is 16-LW deep to allow for the posting of up to eight rx slots in a single 16-LW PCI burst.

Figure 35A:
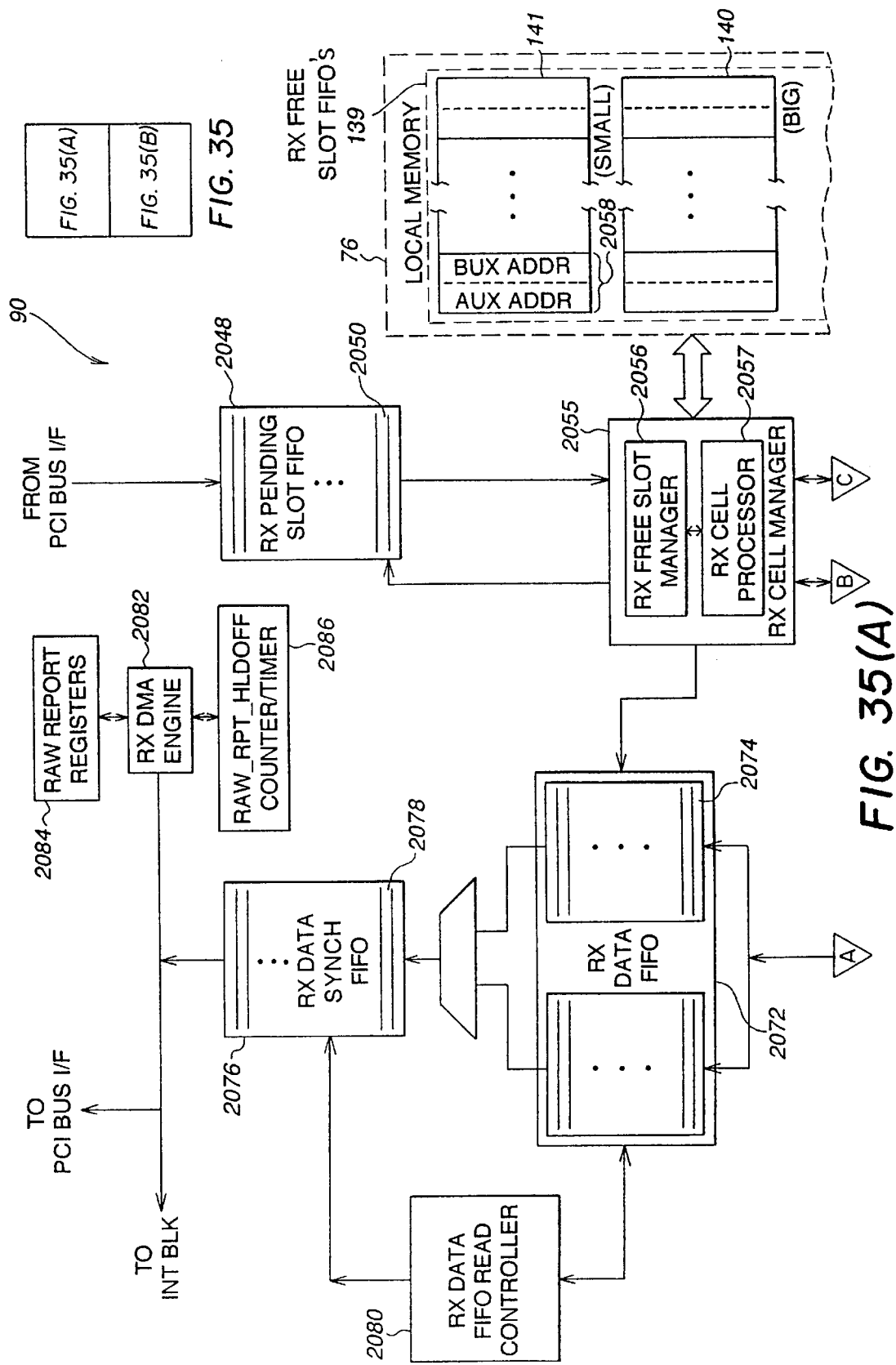
FIG. 35 is a block diagram of the reassembly engine of the SAR controller.
Figure 35B:
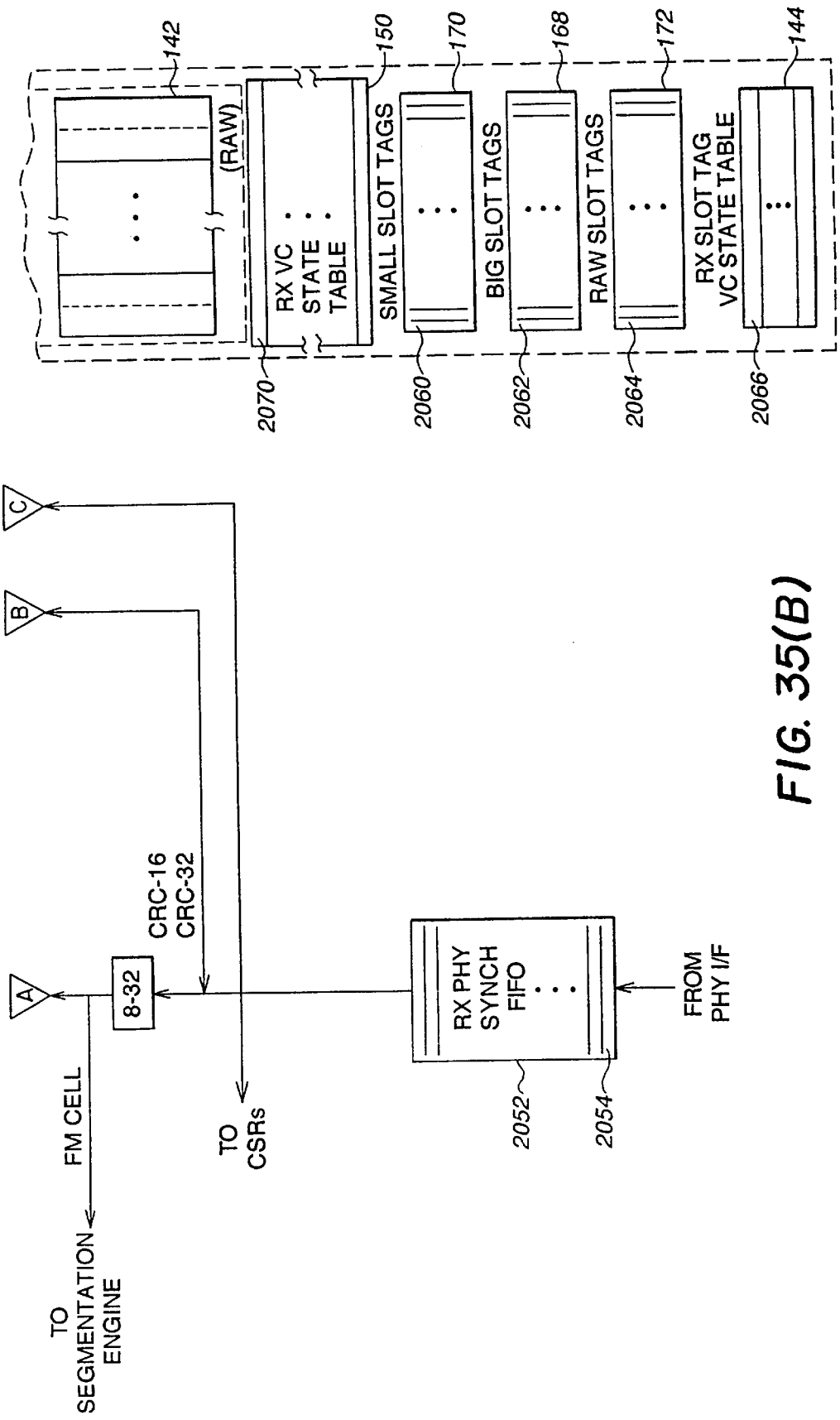

FIG. 35 illustrates the major components of the reassembly engine 90 (from FIG. 4). An rx control memory 2048, preferably implemented as and alternatively referred to as an rx pending slot FIFO 2048, having rx pending slot entries 2050, is connected to the PCI bus interface (from FIG. 4), and an rx PHY synch FIFO 2052, having rx PHY synch FIFO entries 2054, is connected to the PHY interface (also from FIG. 4). The rx PHY synch FIFO 2052 provides byte-wide buffering to cell data received from the PHY interface. Coupled to both the rx pending slot FIFO 2048 and the rx PHY synch FIFO 2052 is an rx cell manager 2055, which includes an rx free slot manager 2056 for performing pending rx slot processing and rx free slot buffer memory management, as well as an rx cell processor 2057 for performing ATM and AAL level processing on received rx cells in the rx PHY synch FIFO 2052.

Further illustrated is the local memory 76 (external to the reassembly engine 90 in this embodiment and thus indicated by dashed lines), since various data structures within the control memory are utilized during the reassembly operation. As can be seen in the figure, the rx cell manager 2055 is connected to the local memory 76, thus enabling the rx cell manager 2055 to access the data structures in the local memory 76. To simplify the figure, only those data structures pertinent to the reassembly process, and more particularly, to an understanding of the present invention, are shown. Those data structures include the rx free slot FIFOS 139, more specifically including the rx "small" free slot FIFO 141, the rx "big" free slot FIFO 140 and the "raw" free slot FIFO 142, each of which includes free slot FIFO entries 2058 for storing 2 LW addresses (which will be described later) of allocated rx slots. Also shown are the rx small slot_tags table 170 for storing as entries small rx slot tags 2060 assigned to small rx slots, the rx big slot_tags table 168 for storing as entries big rx slot tags 2062 assigned to big rx slots and an rx raw slot_tags table 172 for storing as entries raw rx slot tags 2064 assigned to raw rx slots. Thus, each rx slot tag is associated with a single entry in a corresponding one of the rx free slot FIFOs.

Further included in the illustrated data structures of the local memory are the rx slot_tag VC state table 144 and the rx VC state table 150. The rx slot_tag VC state table 144 includes an rx slot_tag VC state entry 2066 for holding the rx slot tag of the rx slot currently in use by the VC with which the entry is associated. The function of the rx slot tags will be described in some detail later. The rx VC state table 150 includes an rx VC state table entry 2070 for storing information associated with each VC over which incoming cell data is carried. These data structures retain the same reference numbers used in FIG. 7.

Returning to a consideration of the reassembly engine components shown in FIG. 35, the rx cell manager 2055 is further connected to and feeds an rx buffer memory 2072, implemented as an rx data FIFO, having rx data FIFO entries 2074, as well as CSRs (CSRs 86 from FIG. 4). The rx data FIFO 2072 feeds an rx data synch FIFO 2076, having rx data synch FIFO entries 2078, under the control of an rx data FIFO read controller 2080. An rx DMA engine 2082 is connected to the rx data synch FIFO 2076, the PCI bus interface (PCI bus interface 78 from FIG. 4), a temporary storage space indicated as rx raw report holdoff registers 2084 and a raw report counting device implemented as a raw_rpt_hldoff (raw report holdoff) counter/timer 2086. It is also connected to and interacts with the interrupt block (interrupt block 96 from FIG. 4). Although the preferred embodiment employs an rx DMA engine, data synch FIFO and data FIFO read controller for controlling data transfer, and the DMA engine for performing the transfer of data, other arrangements may be employed to perform these control and data transfer functions. Alternative device(s) or combinations of varying degree of integration may be used to move the data from the rx data FIFO to the host memory. The rx DMA engine 2082, rx cell manager 2055 and rx data FIFO read controller 2080 are control units which may be implemented via any number of known logic design methods, such as hard-wired, programmable logic based or microprogrammed control. Inasmuch as the implementation details are a matter of design choice and need not limit the scope of the present invention, the treatment of these control units will remain at the higher functional level. The operation of the various reassembly engine components depicted in FIG. 35 during the reassembly process is as follows.

Still referring to FIG. 35, the data written by the driver to the rx pending slots address space is placed in the rx pending slot FIFO 2048 by the PCI bus interface (from FIG. 4) operating in PCI slave mode. Each time a set of 2-LW writes occurs to the rx pending slots address space, the PCI bus interface places a pending slot FIFO entry 2050 on the rx pending slot FIFO 2048. This pending slot FIFO entry 2050 is also referred to as an rx slot descriptor 2050. In the described embodiment, the rx pending slot FIFO is capable of storing eight (2 LW) entries.

Figure 8B:
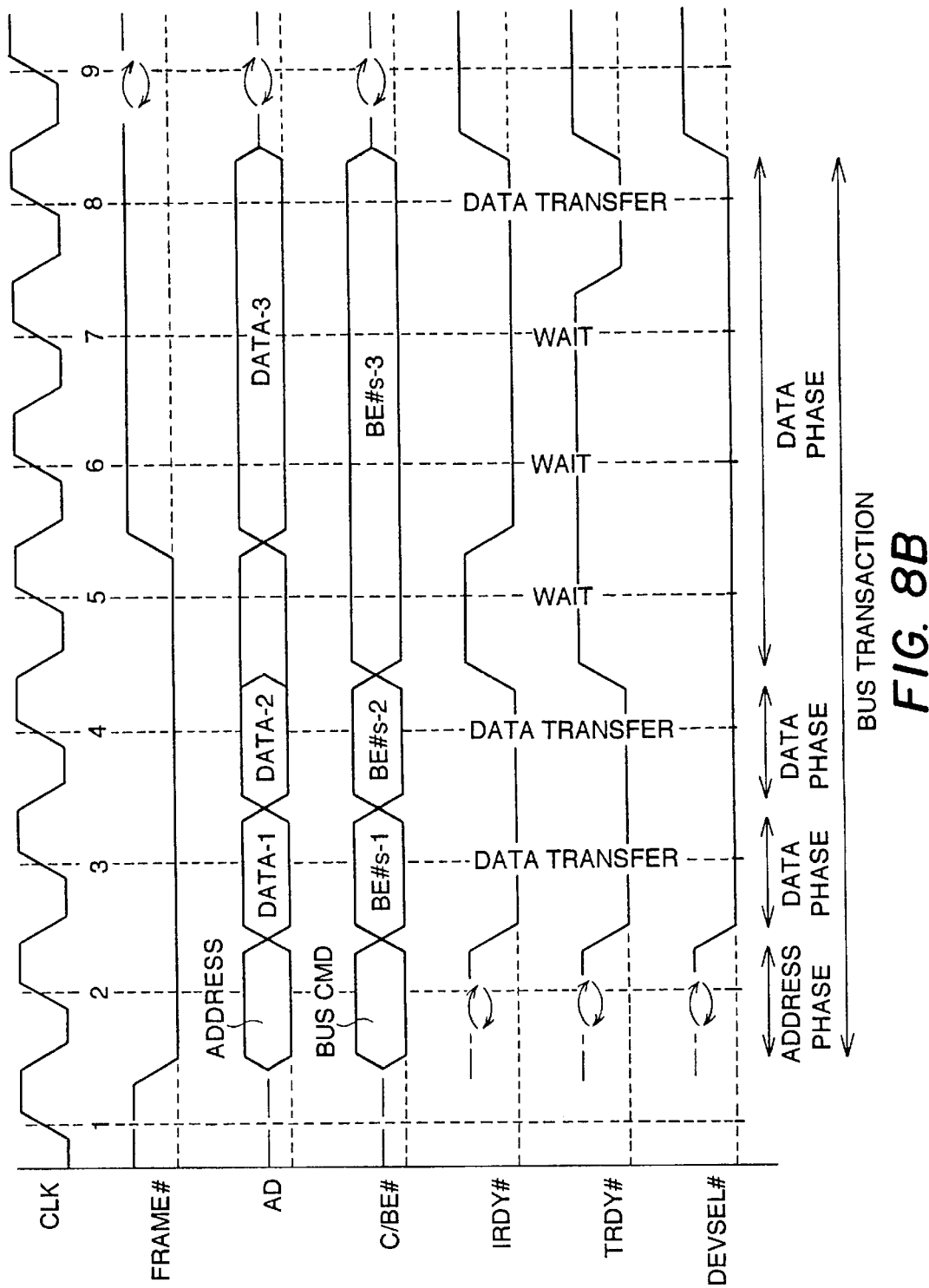
FIG. 8B is a timing diagram of a PCI bus burst write transaction.

It is important to note that the host-PCI writes to the pending slot FIFO operate according to the technique described with reference to FIGS. 8A–B and 9. The consecutive CSR burst write technique as discussed in the preceding transmit/segmentation section is as applicable to the receive operation as it is to the transmit operation. In fact, the technique can be applied to any system performing burst writes to a single device location as discussed earlier.

Figure 36:
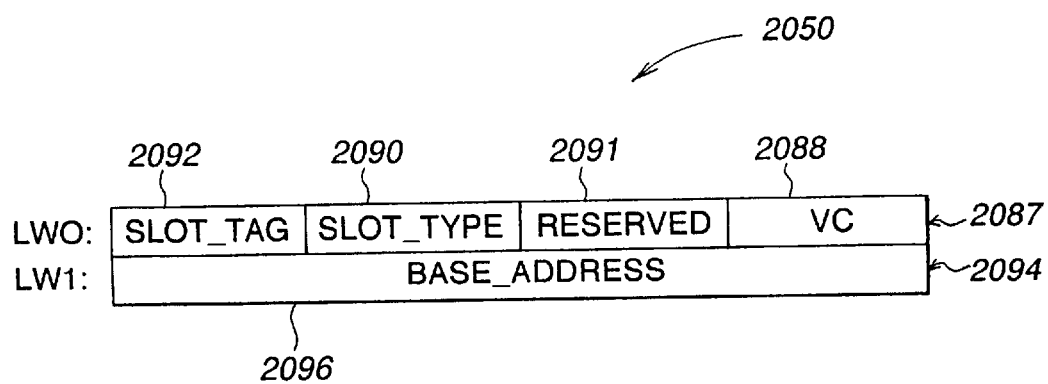
FIG. 36 illustrates in rx pending slot FIFO entry of the rx pending slot FIFO of the reassembly engine.

Illustrated in FIG. 36 is the format of the rx pending slot FIFO entry 2050, alternatively referred to as an rx slot descriptor 2050 or control information 2050. The first LW (LW0) 2087 is organized as a VC field 2088, a slot type (slot_type) field 2090, a reserved field 2091 and a slot tag (slot_tag) field 2092. The VC field 2088 indicates the VC associated with the rx slot being posted. In this example, the VC field stores a 12-bit VC. It should be noted that rx slots are not associated with particular VCs when they are queued by the driver. The 12-bit VC field 2088 in the rx pending slot FIFO entry 2050 is used solely for the purposes of handling rx congestion, as later described. The slot type field 2090 indicates the type of rx slot being posted. Here, the slot type field 2090 is a two bit field and is decoded as follows:

00—Small
01—Big
10—Raw
11—Reserved

The slot_tag field 2092 uniquely identifies the rx slot being posted. It is used by the driver to obtain the virtual address of an rx slot once data has been placed in the slot by the SAR controller. When the driver allocates an rx slot for receiving data from the SAR controller, it indicates to the SAR controller the physical address of the rx slot. Because the two types of AAL5 slots (big and small) are shared among VCs, and because both types of slots may hold several cells of data, the rx slots may be consumed (filled with data) in an order different from the order in which they were posted. Consequently, the SAR controller must report the consumption of every AAL5 receive slot in a manner which unambiguously identifies the slot being reported. Although the physical address of a slot uniquely identifies the rx slot, it is cumbersome in many operating systems to translate the physical address to the virtual address needed by the driver. Therefore, the SAR controller uses slot tags to simplify the driver's task in processing rx slots.

The operation of the driver with respect to slot tag usage is as follows. First, the driver assigns a unique slot tag to each rx slot which has been allocated for use by the SAR controller. Once the slot tag has been assigned, the driver stores the slot tag in association with the virtual address of the rx slot to which it has been assigned. In the embodiment shown in FIG. 1, the slot tag and virtual address pair are stored as an entry in the lookup table 40. Next, the driver provides the SAR controller with the slot tag and the physical address of the rx slot. When the SAR controller has placed data to be processed by the driver in an rx slot, the SAR controller reports to the host system that the rx slot is full by returning the slot tag associated with the rx slot to the driver. The driver then uses the returned slot tag to obtain the associated virtual address of the rx slot to be processed from the lookup table.

Slot tags are unnecessary for raw rx slots, since the raw slot type can hold only one cell and is consumed in the order in which it is provided to the SAR controller. For simplicity, however, the SAR controller utilizes slot tags for all supported slot types.

Returning again to FIG. 36, a second LW (LW1) 2094 of the rx pending slot FIFO entry 2050 includes a base address field 2096, which is written by the driver with the physical address of the rx slot being posted. This physical address, 32-bits wide in the described implementation, is the base or starting address of the rx slot. Because the rx slots must be longword-aligned, the least-significant 2 bits of this field are always zero.

As the driver posts rx slots for transmission, entries are placed in the rx pending slot FIFO until it is full, at which point the host system is disconnected from the PCI bus. Whenever a burst to the rx pending slot FIFO from the host system begins, the SAR controller determines how many completely empty spaces (spaces for a complete 2 LW entry) are available in the rx pending slot FIFO and allows only that number of entries to be written by the driver before disconnecting the host system.

With reference to FIG. 35, the rx free slot manager 2056 takes entries off of the rx pending slot FIFO 2048 and copies the address field 2096 in each entry into one of the rx free slot FIFO entries 2058 (in the local memory 76) according to the slot type specified in the slot type field 2090 in the rx pending slot FIFO entry 2050. In the described embodiment, each of the rx free slot FIFOs has a different one of the slots types (small, big, or large in this embodiment) associated therewith. Thus, each of the rx free slot FIFOs holds addresses for the associated slot type and can hold up to 1K entries in 1K-VC mode. Pointers to the head and tail of each of the rx free slot FIFOs are kept in CSRs 86 (from FIG. 4). Entries are taken from the head of and written to the tail of the rx free slot FIFOs in the described embodiment. Since the head and tail pointers of the rx free slot FIFOs are kept in the SAR controller itself, they are initialized by the SAR controller at power-up or reset.

Figure 37:
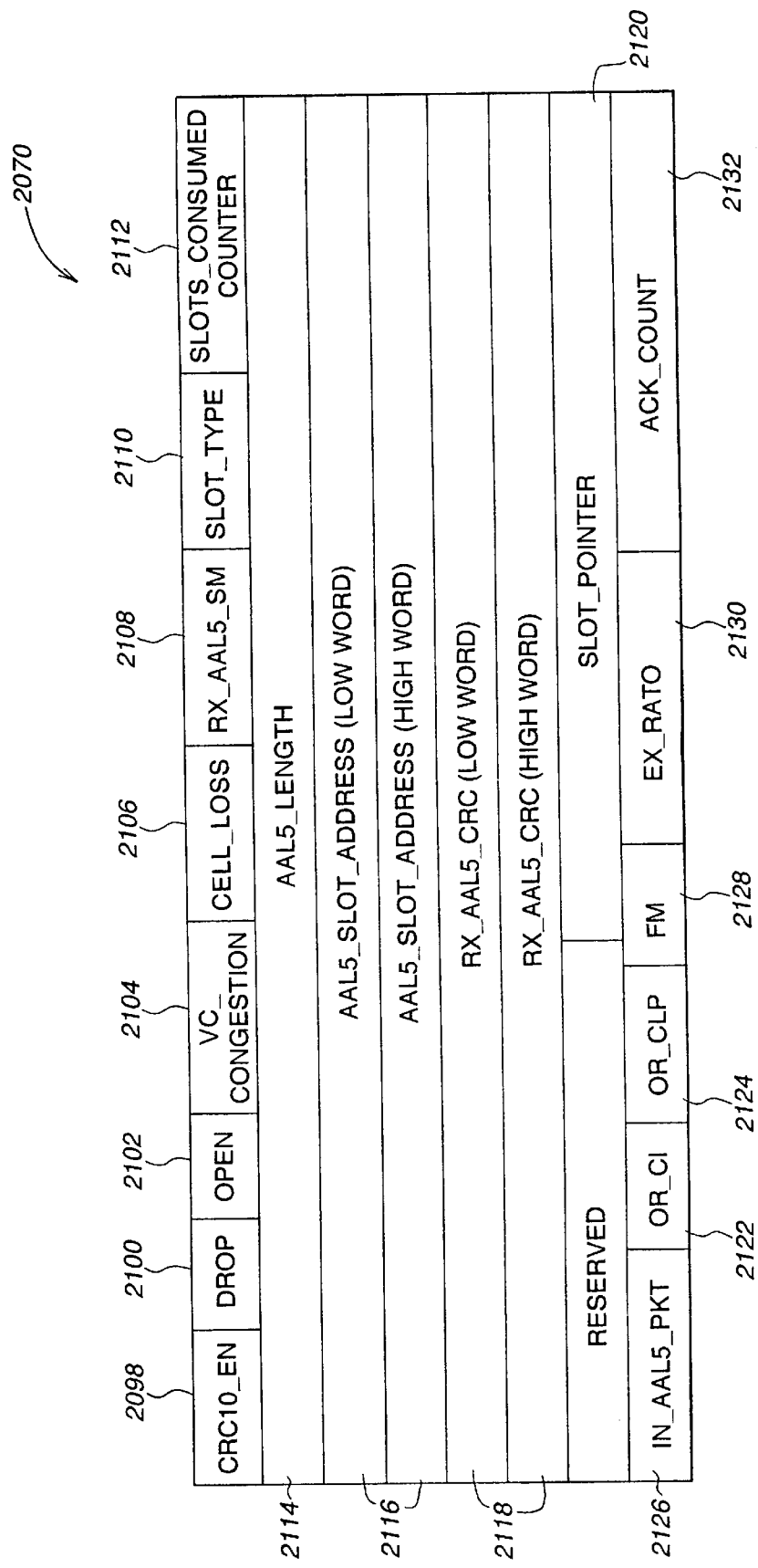
FIG. 37 depicts the format of a rx VC state table entry.

It is appropriate at this point to consider briefly, with reference to FIG. 37, the layout of the rx VC state table entry 2070. A CRC10_En field 2098 is used to selectively enable or disable CRC10 checking. A drop flag 2100 indicates that cells on the VC should be dropped. An open field 2102 indicates that the VC has been opened by the driver. A VC_congestion flag 2104 (also referred to as congestion flag 2104) indicates that the VC to which the entry corresponds is congested. A cell loss flag 2106 indicates cell loss has occurred on the VC and should be reported to the host system. An rx_AAL5_SM field 2108 enables or disables rx AAL5 packet streaming mode. When this field is set and rx AAL5 streaming mode thereby enabled, AAL5 status reports and interrupts can occur on a "per slot" basis. A slot_type field 2110 selects the type of rx slot (i.e., big or small for AAL5 PDUs, or raw for raw cells) to be used for data received on the VC. A slots_consumed field 2112 indicates the number of slots consumed by the VC and not yet returned by the host system for reuse. An AAL5_length field 2114 is used to count the number of received bytes in AAL5 PDUs. An AAL5_slot_address field 2116 stores the base address of the rx slot currently being used for AAL5 data on the VC. An rx_AAL5_CRC field 2118 stores a partial CRC-32 for received AAL5 PDUs. A slot_pointer 2120 is a write pointer into current rx slot. An OR_CI field 2122 is used to select the logical OR of EFCI bits (from cell header PT<1>) of received cells in an AAL5 packet. An OR_CLP field 2124 is used to select the logical OR of CLP bits of received cells in an AAL5 packet. As the fields corresponding to reference numbers 2126 through 2132 do not directly relate to the invention, a description of these fields is not provided.

Whenever a new rx slot is needed for reception of data, the rx VC state table entry 2070 serves to associate slot type with the VC of the incoming cell. The slot_type field 2110 in the rx VC state table entry 2070 for the incoming cell indicates the slot type and thus the correct rx free slot FIFO to be selected for rx slot allocation purposes. The rx cell manager 2055 is able to index into the rx VC state table to access the appropriate entry by reading VCI and VPI (reference numbers 52 and 50 in FIG. 2) in the cell header (header 44 in FIG. 2) of received cells it removes from the rx PHY synch FIFO 2052. It should be noted that the VPI_VCI_Mapping field in the SAR_Cntrl CSR shown in Table 1 provides VCI/VPI to VC mapping. Once the appropriate slot type is obtained, an entry corresponding to an rx slot is popped off of the correct rx free slot FIFO and the address contained therein written to the slot_address field 2116 in the rx VC state table. The reception of an incoming cell will cause a new rx slot to be taken from one of the rx free slot FIFOs by the rx free slot manager whenever that rx cell starts a new packet or when the previous slot allocated to the cell's VC has no more space available for storing rx cell data. Every raw or F5 OAM cell is considered a single-cell packet.

Once an rx slot corresponding to an rx free slot FIFO entry has been filled with receive data, the slot tag which uniquely identifies the consumed rx slot is reported to the driver (with the exception of raw cell slots, which may not all be reported) as previously mentioned. For each slot type, the driver must keep a count of how many TOTAL slots (across all VCs) have been posted but not yet reported, and ensure that this number never exceeds the maximum size of the free slot FIFOs (1K entries in 1K-VC mode).

If any of the rx free slot FIFOs 139 has been completely filled with data, the SAR controller stops processing posted rx slots. If the driver attempts to post one or more additional rx slots once both the free slot FIFO and the rx pending slot FIFO become full, the access is retried until the free slot FIFO is no longer full.

Referring once again to FIG. 35, the rx data FIFO 2072 provides buffering for incoming rx cells after processing by the rx cell processor. At STS-3c/STM-1 line rates, this equates to approximately 200 μs worth of PCI latency buffering. As shown, the rx data FIFO 2072 is implemented as two banks of 32-bit wide SRAM to emulate a dual-port SRAM, thus enabling the rx data FIFO read controller 2080 to read from it at a full PCI burst rate. In this embodiment, each incoming cell in the rx data FIFO is stored as either a 60-byte quantity if the cell is a raw cell, or as a 56 or 64 byte quantity if the cell is an AAL5 cell. The rx cell processor 2057 reads the incoming cell data from the rx PHY synch FIFO 2052, removes the cell headers, calculates CRCs and updates the rx_AAL5_CRC field 2118 in the rx VC state table entry 2070 for the cell data as necessary and writes the cell data to the rx data FIFO along with associated control information obtained from the VC state entry and an rx free slot buffer memory allocated by the rx free slot manager.

Figure 38:
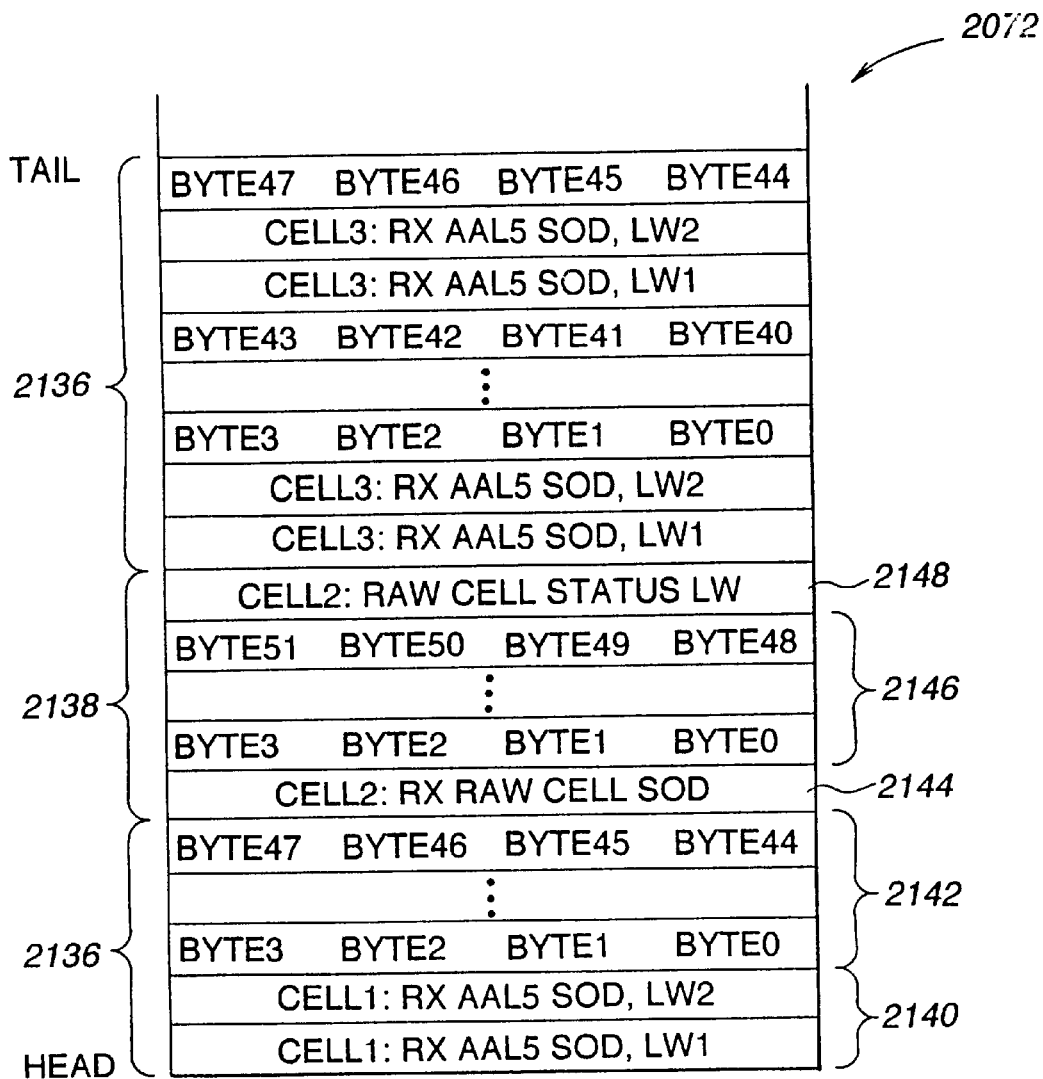
FIG. 38 is an illustration of the rx data FIFO.

FIG. 38 illustrates the appearance of the rx data FIFO 2072 when it contains exactly three full cells, the first and last of which are rx AAL5 cells 2136, and the middle of which is an rx raw cell 2138. In the example shown, the first AAL5 cell fits in a single slot, while the second straddles 2 slots, with 44 bytes in the first slot and 4 bytes in the second slot. A single AAL5 cell is stored along with associated control information in the form of a 2-LW AAL5 cell start-of-DMA (SOD) control entry 2140 for each DMA burst which will be required to store the cell. Thus, if a cell fits in a single rx slot, it will be stored as a 2-LW SOD control entry followed by 48 bytes of data, the 48-byte AAL5 cell data indicated by reference number 2142. If a cell straddles two rx slots, it will be stored as a first SOD entry followed by the bytes to be placed in the first rx slot, then a second SOD longword followed by the bytes to be placed in the second rx slot (64 bytes in total). There are thus 2 SOD entries associated with the second AAL5 cell. When rx slots which are to receive AAL5 data must be at least 64 bytes in length, a cell can occupy at most 2 rx slots.

The raw rx cell 2138 is stored as a raw cell SOD control entry 2144, followed by 52 bytes of raw cell data 2146 and a rx raw cell status longword 2148. The raw cell data 2146 and the raw cell status longword 2148 are DMA'd into the rx slot indicated by the raw cell SOD entry 2144.

Figure 39A:
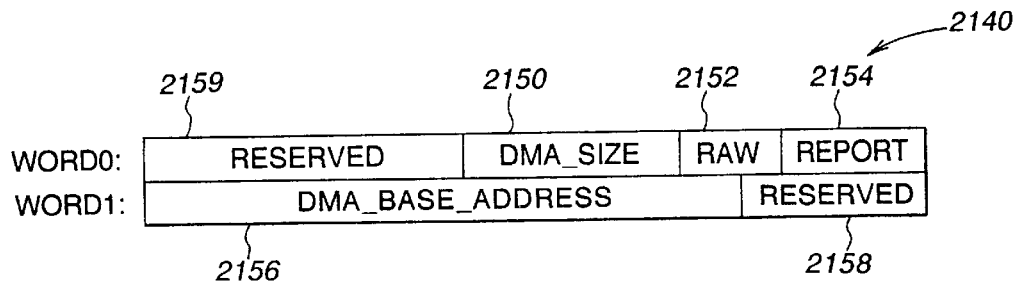
FIGS. 39A–C illustrate the formats for the three types of Rx Cell SOD entries: rx data AAL5 Cell SOD entry (A), rx data raw cell SOD entry (B) and rx AAL5 status report SOD entry (C)

FIG. 39A illustrates the rx AAL5 cell SOD entry 2140. As shown, the rx AAL5 cell SOD entry comprises a DMA size (DMA_size) field 2150, a raw field 2152, a report field 2154, and a DMA base address (DMA_base_address) field 2156. The entry also includes two reserved fields, indicated by reference numbers 2158 and 2159. The report field 2154 is used to indicate whether the SOD entry is a data DMA request (0) or AAL5 Status Report DMA request (1). The raw field 2152 indicates whether a data DMA request is an AAL5 request (0) or a raw request (1). The DMA_Base_Address field 2156 indicates the starting address (in longwords) to which data should be transferred for data DMA requests. The address in the DMA_Base_Address field is derived by-the rx cell processor 2057 by adding the address of the current rx slot being used for the VC on which the data has been received to the slot_pointer 2120 kept in the rx VC state table entry 2070. The number of longwords to be transferred via DMA for AAL5 data requests is indicated by the DMA_size field 2150, implemented as a 4-bit field. The size may be specified in longwords as all rx slots are longword aligned and a multiple of 1 LW in size.

Figure 39B:

FIG. 39B illustrates the rx raw cell SOD longword 2144. Like the rx AAL5 cell SOD entry 2140 shown in FIG. 39A, the rx data raw cell SOD entry 2144 includes DMA_base_ address, raw and report fields, each of which is indicated by the same reference number as the equivalently named field in FIG. 39A.

Figure 39C:
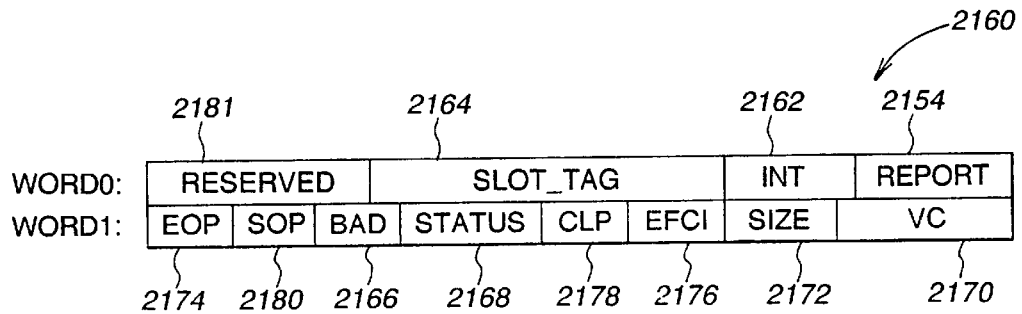

Shown in FIG. 39C is a third type of entry which may appear in the rx data FIFO 2072. An AAL5 status report SOD entry 2160 is a request to the rx DMA engine to report the consumption of an rx slot to the host system. No data follows an AAL5 status report SOD entry. In common with the other two types of entries is the report field 2154. Additionally, the rx AAL5 status report SOD entry 2160 includes an interrupt (Int) field 2162, which indicates when set that an interrupt should be generated immediately following a status report. This bit is set for EOP entries and for every entry associated with an AAL5 streaming mode VC. A slot tag (slot_tag) field 2164 provides the slot tag of the AAL5 rx slot (small or big) which has been filled with receive data and is being reported to the host system. A bad field 2166 indicates if the packet being reported should be processed normally by the driver (0) or if an error condition was experienced while receiving the packet which should result in the discarding of the packet (1). When this bit is set, a status field 2168 indicates the reason why the packet should be discarded. When the bit is cleared, the status field 2168 gives information about the VC on which the packet was received. Table 3 below provides the bad and status bit decoding in the rx AAL5 status report SOD entry.

TABLE 3

| BAD | STATUS | MEANING |
| --- | --- | --- |
| 0 | XXX | Status <0> = Slot congestion experienced<br>Status <1> = Packet loss experienced<br>Status <2> = Reserved |
| 1 | 000 | CRC-32 error, discard packet |
| 1 | 001 | Length error, discard packet |
| 1 | 010 | Aborted packet, discard packet |
| 1 | 011 | Slot congestion cell loss, discard packet |
| 1 | 100 | Other cell loss, discard packet (Rx data FIFO overflow or Rx free slot exhaustion) |
| 1 | 101 | Reassembly timer timeout, discard packet |
| 1 | 110 | Packet too long error, discard packet |
| 1 | 111 | Reserved |

The VC of the data which has been placed in an AAL5 rx slot is indicated by a VC field 2170. The driver uses this 12-bit field to reconstruct received AAL5 packets which are spread out among multiple rx slots. A size field 2172 indicates the number of valid longwords in the reported rx slot. This 12-bit field will usually be equal to the size (in longwords) of the rx slot being reported, except for end-of-packet rx slots (rx slots containing the last byte of an AAL5 packet), which will probably not be completely filled. Also, the value 0x000 is used to represent exactly 16 KB of valid data. The driver reads this field to determine packet boundaries in end-of-packet rx slots. This field is valid only if the bad bit is not set.

An EOP field 2174 indicates if the slot being reported is an end-of-packet rx slot. It is used in normal operation by the driver to find AAL5 packet boundaries.

An EFCI field 2176 is either the logical OR of all the EFCI bits in the cells which make up a received AAL5 packet, or the EFCI bit in the last cell received in the packet. The selection of which of the two modes is to be used is made through the OR CI field 2122 in the rx VC state table 2070. It is of significance only for end-of-packet rx slots.

A CLP field 2178 is the logical OR of all the CLP bits received in the cells which make up a received AAL5 packet when enabled by the setting of the OR_CLP field 2124 in the rx VC state table. Like the EFCI field, it is of significance only for end-of packet rx slots.

A start of packet (SOP) field 2180 indicates if the rx slot being reported contains the first byte of an AAL5 packet. It is used by the driver to detect error conditions which may not have been reported due to lack of rx slots (i.e., receive congestion). Also included is a reserved field 2181.

As mentioned above, each 52-byte raw cell is DMA'd into host memory with the accompanying raw cell status longword 2148 (from FIG. 38). The driver uses the raw cell status longword 2148 to obtain information about the raw cell and about the VC on which the raw cell has been received.

Figure 40:
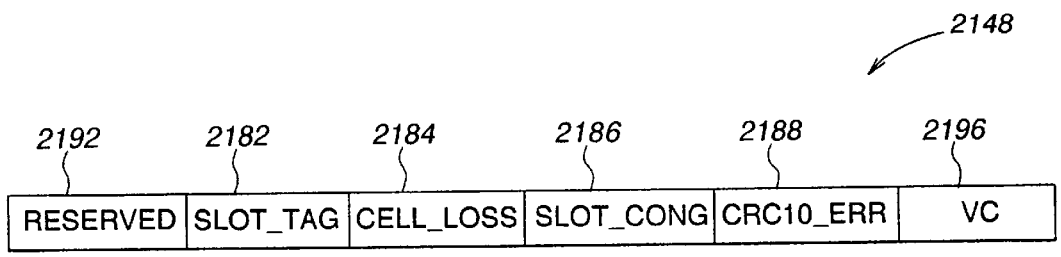
FIG. 40 illustrates the format of an rx raw cell status longword.

FIG. 40 depicts the format of the raw cell status longword 2148. As illustrated, it includes a slot tag (slot_tag) field 2182, a cell loss (cell_loss) field 2184, a slot congestion (slot_congest) field 2186, a CRC10 error (CRC10_err) field 2188 and a VC field 2190. A reserved field is indicated by 2192. A description of each of these fields follows.

The VC field 2190 identifies the mapped VC of the raw cell. The CRC10_Err field 2188 indicates, when set, that a CRC10 check was done on the raw cell and an error was detected. The driver should therefore discard the cell. The Slot_cong field 2186 indicates, when set, that the VC of the raw cell has experienced slot congestion. Cell loss may or may not have occurred as a result of the congestion. The Cell_loss field 2184 is set to indicate that the VC of the raw cell has experienced cell loss (of 1 or more cells). This cell loss may have occurred for one or more of the following reasons: rx free slot exhaustion, rx data FIFO overflow or slot congestion on the VC (for data cells in non-FlowMaster mode). The slot_tag field 2182 contains the slot tag of the rx slot into which the raw cell has been DMA'd.

Referring again to FIG. 35, the rx data FIFO read controller 2080 determines if a complete request is available in the rx data FIFO 2072. When the rx data read controller 2080 detects that a new entry has been placed in the rx data FIFO 2072, it moves the SOD longwords and data from the rx data FIFO 2072 to the rx data synch FIFO 2076, and informs the rx DMA engine 2082 that a new rx DMA operation should take place. Each rx data FIFO entry 2074 in the rx data FIFO 2072 may correspond to a single raw cell DMA (56 bytes), an AAL5 data DMA (1–48 bytes), or an AAL5 status report (8 bytes) as previously described. Thus, the rx data FIFO read controller 2080 must immediately begin moving any DMA data for the burst from the rx data FIFO 2072 to the rx data synch FIFO 2076 as soon as the SOD entry for the burst has been moved.

Although not shown, the rx data FIFO read controller 2080 can detect that data is available in the rx data FIFO 2072 by polling a counter which counts the number of complete requests stored in the rx data FIFO. If the counter is non-zero, the rx data FIFO read controller knows that a rx DMA request is present and that data may be moved to the rx data synch FIFO 2076 if the rx data synch FIFO 2076 is available.

The rx data synch FIFO 2076 provides buffering across the FCI bus and core clock domains for receive data. Preferably, it is 16 LW deep, thus providing adequate buffering for the maximum receive DMA burst of 14-LW, in addition to 1 LW of control information for the burst (for raw cells), or for a 12-LW burst and 2 LW of control information for the burst (for AAL5 data).

As soon as a first longword of an SOD entry is moved to fill one of the rx data synch FIFO entries 2078, the rx data FIFO read controller 2080 signals to the rx DMA engine 2082 that it may begin to process the rx request. Since this indication is given early (i.e., before all of the data to be DMA'ed has been placed in the rx data synch FIFO), the rx data FIFO read controller 2080 needs to ensure that data is moved into the rx data synch FIFO 2076 at the rate of 1 longword per core clock cycle once the indication is given. This will ensure that the rx data synch FIFO 2076 will be not underrun by the rx DMA engine 2082 as data is read from the rx data synch FIFO and DMA'ed to host memory.

Rx Status Reports and the Rx Report Queue

As data is written to the rx slots in host memory, the SAR controller reports to the driver the rx slots which have been consumed (i.e., filled with data) so that the driver may read the data from and repost those rx slots to the appropriate free slot FIFO. Once the freed rx slots are returned to the appropriate free slot FIFO, they are available for reuse by the SAR controller during PDU reassembly.

Returning briefly to FIG. 1, the reporting mechanism used to report full rx slots is provided by the rx report queue 38 in the reporting data structures 34 of host memory 22. The rx report queue 38 is implemented as a fixed-size structure located at a fixed location in the host memory. It consists of 24 KB of contiguous physical host memory, and its location is specified by the driver through the Rx_Report_Base CSR, but it must be 64-Byte aligned. It contains 3K entries, and each entry is 2 longwords wide. It can be appreciated that the size of the rx report queue 38 is chosen to be equal to the total number of receive slots supported by the SAR controller across all three of the free slot FIFOs. If the SAR controller was to support a greater number of VCs, the total number of rx slots supported would be likely to increase. Consequently, the size of the rx report queue would have to increase as well.

Figure 41A:
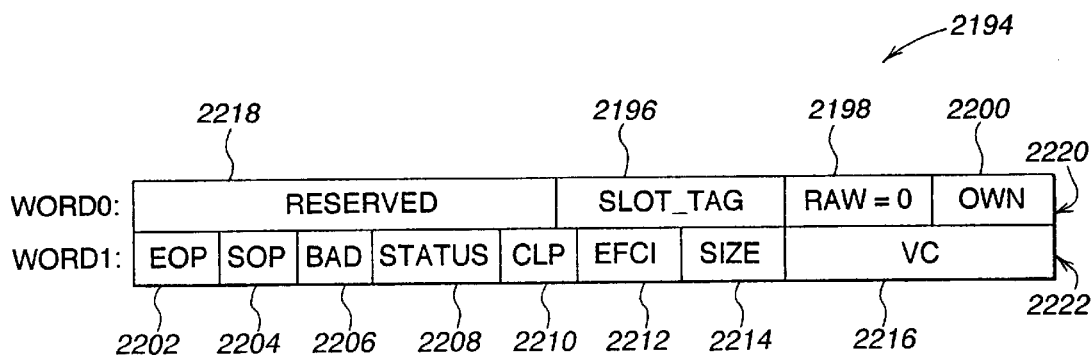
FIGS. 41A and 41B depict the rx AAL5 and raw cell report queue entries, respectively, of the rx report queue shown in host memory (FIG. 1)
Figure 41B:
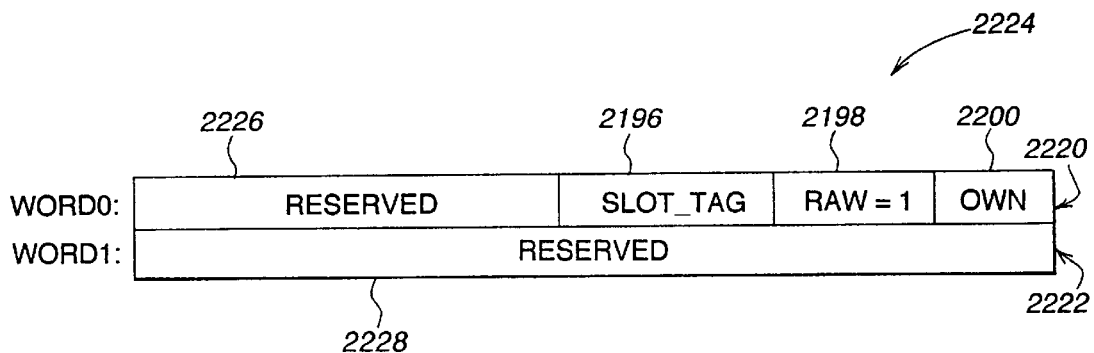

The two types of entries are illustrated in FIGS. 41A and 41B. As shown in FIG. 41A, an rx AAL5 report queue entry 2194 comprises the following fields: a slot_tag field 2196, a raw field 2198, an own field 2200, an EOP field 2202, an SOP field 2204, a bad field 2206, a status field 2208, a CLP field 2210, an EFCI field 2212, a size field 2214 and a VC field 2216. A reserved field is indicated by 2218. In the sample format shown, the entry is organized as two words, word0 2220 and word1 2222. Word0 includes the slot_tag, raw and own fields, with 16-bits being reserved. The remaining fields belong to word2.

FIG. 41B depicts the format of an rx raw cell report queue entry 2224. When the report queue entry is utilized for an rx raw cell report, only word0 contains useful information. Like the rx AAL5 report queue entry, the rx raw cell report queue entry 2224 also includes the slot_tag field, raw field, an own field and a 16-bit reserved field 2226 in word0. The reference numbers are the same as the equivalently named fields in the rx AAL5 report queue entry. Word1 is entirely reserved as indicated by 2228.

In reference to both FIGS. 41A and 41B, a description of the illustrated fields follows. The Raw field indicates if the status report is for a raw cell slot (1), or for a slot containing AAL5 data (0). With respect to the rx AAL5 report queue entry, the raw field 2198 is copied from the raw field 2152 of the rx AAL5 cell SOD entry 2140 (shown in FIG. 39A). The AAL5 rx slot may be either a small slot or a big slot. Similarly, for raw cells, the raw field 2198 is copied from the raw field 2152 in the rx raw cell SOD entry 2144. When this bit is set, indicating that the slot is a raw cell slot, the second longword 2222 has no significance and is written with 0's by the SAR controller. The own field indicates whether the entry is owned by the adapter or by the host. The polarity of the own bits is initially set to (1=owned by the SAR controller) after reset, and thereafter toggles every time the SAR controller fills the rx report queue. This scheme is chosen to allow the driver to determine ownership of a given entry in the queue without requiring that the driver write to the queue. The slot tag field contains the driver-generated slot tag which uniquely identifies the rx slot being reported. The driver uses this field to obtain the virtual address of the rx slot as previously described.

As the second longword of the rx AAL5 report queue entry is copied from the second longword of the rx AAL5 status report SOD entry 2160 (from FIG. 39C), the fields included in word0 need not be described in any further detail.

It is important to note that, after the driver initializes the rx report queue by writing the own bits in all the entries in the queue to 1, it never writes the queue. Conversely, the SAR controller never reads the rx status report queue.

When an AAL5 rx slot has been filled with data, the rx cell processor 2057 creates an AAL5 status report SOD entry and places it in the rx data FIFO, whether or not the slot is an end-of-packet rx slot. In fact, it is necessary to report all consumed AAL5 rx slots on receive (as compared to reporting only EOP slots, as may be done in the transmit direction), because these slots are shared among all open VCs. Therefore, the driver must be explicitly informed of the VC to which each rx slot has been allocated.

It may be recalled that, unlike AAL5 cells, rx slots for raw cells are consumed at a rate of one rx slot per cell. Thus, to reduce the amount of bus bandwidth consumed by raw slots on receive, the driver can choose to mitigate the rate at which raw cell status reports occur via a status report holdoff technique.

Figure 42:
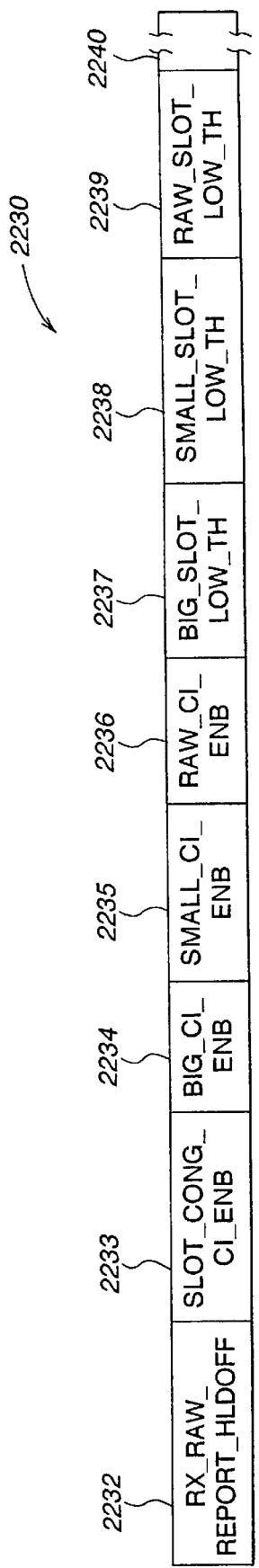
FIG. 42 shows the rx_raw_report_hldoff field in the SAR_Cntrl2 register CSRs.

As shown in FIG. 42, a CSR indicated as a SAR_Cntrl2 register 2230 provides an rx raw report holdoff (Rx_Raw_Report_Hldoff) field 2232 for specifying a preselected rx raw report holdoff value N, corresponding to a number by which raw cell status reports may be prescaled. This value is set by the driver. Also included in the SAR_Cntrl2 register 2230 are several other fields which pertain to the use of backward RM cells and congestion handling. They include a slot_cong_CI_enb field 2233, a big_CI_enb field 2234, a small_CI_enb field 2235 and a raw_CI_enb field 2236. The slot_cong_CI_enb field 2233 is set to enable the CI bit in turn-around RM cells when VC-specific slot congestion occurs. The big_CI_enb field 2234 is set to enable unconditional setting of the CI bit in turn around RM cells for VCs assigned to big slots. The small_CI_enb field 2235 is set to enable unconditional setting of the CI bit in turn around RM cells for VCs assigned to small slots. The raw_CI_enb field 2234 is set to enable unconditional setting of the CI bit in turn around RM cells for VCs assigned to raw slots. Further included are a big_slot_low_th field 2237, a small_slot_low_th field 2238 and a raw_slot_low_th field 2239, each specifying an rx free slot FIFO threshold for a corresponding one of the rx free slot FIFOs at which an interrupt will be generated. The fields 2233–2239 will be discussed in more detail later during a discussion of RM cell turnaround and congestion handling mechanisms. Fields using remaining SAR_Cntrl2 bits, indicated by 2240, are not pertinent to the description and thus omitted.

Returning to the consideration of rx raw cell status reports, the rx_raw_report_hldoff (rx raw report holdoff) field 2232 is programmed with N, where N is equal to the number of raw cell rx slots which must be filled with receive data before a raw cell status report is generated. In the illustrated embodiment, the rx raw report holdoff field 2232 is programmed with a two bit value, which can be decoded as follows: '00' specifies a report every raw rx slot, '01' specifies a report every 4th raw rx slot, '10' selecting a report every 16th raw rx slot and '11' a report every 32nd raw rx slot. Thus, for a preselected value N '10', the SAR controller performs a single raw cell status report for every 16 rx raw cells received.

Referring to FIG. 35, the rx cell processor does not create a status report to report rx slot consumption for raw cells as it does for AAL5 cells. Instead, the rx DMA engine 2082 detects that raw cell data (52 byte raw cell and associated status information) is to be DMA'd into a raw rx slot by reading the rx raw cell SOD entry 2144 (FIG. 39B) for the rx request to be processed. If the raw field 2152 is set, the rx DMA engine copies the raw field and the slot_tag field 2182 (from the rx raw cell status longword 2148)— collectively referred to as rx raw report holdoff information—into the rx raw report holdoff registers 2084. The raw report holdoff registers 2084 are overwritten with new data every time a new raw rx cell is written to host memory by the rx DMA engine. The contents of the registers are DMA'd in a status report to the rx report queue 38 (from FIG. 1) only when the rx request for the raw rx cell data is the Nth such request to be serviced.

Thus, the rx DMA engine 2082 employs the raw_rpt_hldoff (raw report holdoff) counter/timer 2086 (shown in FIG. 35) as an event counter for counting events as the processed rx requests for raw cell data. It is programmed to count a number corresponding to N. The count is modified in response to each transfer of raw cell data.

When implemented as a programmable downward counting counter, the counter is initially loaded with a raw_rpt_hldoff (raw report holdoff) count corresponding to the value N (i.e., equal to the decoded value N) and decrements each time raw rx cell data is DMA'd into a raw rx slot. When the counter expires, the rx raw report holdoff information is DMA'd to the rx report queue 38 as an rx raw cell report queue entry 2224. It may be appreciated that the counter can also be an upward counting counter, initialized to zero and incrementing upon each raw rx cell DMA until the counter expires, i.e., a count corresponding to N is reached. In fact, a device capable of detecting and signalling the occurrence of N raw rx cell data transfers may be utilized. In yet another arrangement, the raw_rpt_hldoff counter/timer could be programmed to time a desired time interval between raw rx cell status report DMAs.

Figure 43:
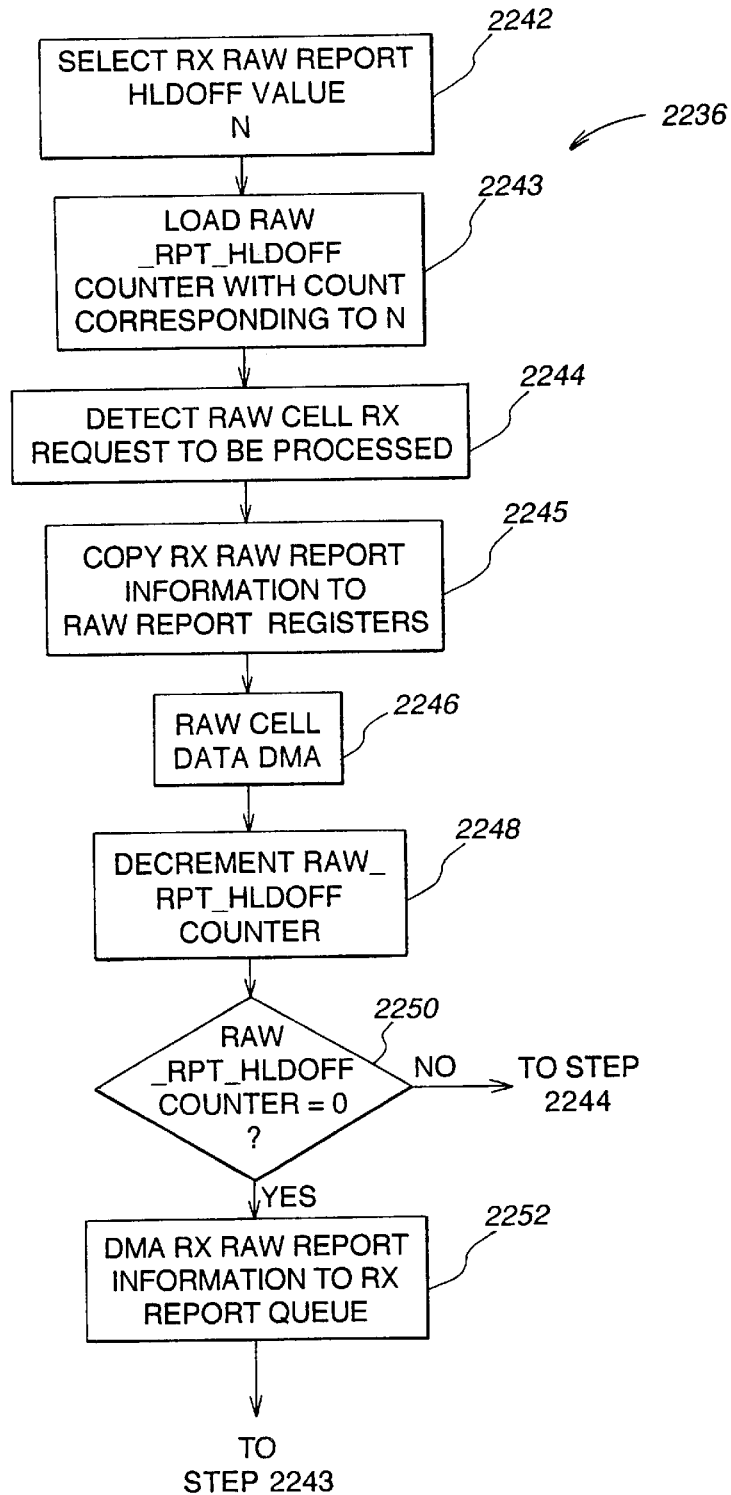
FIG. 43 is a flow diagram illustrating a method of performing rx raw cell status report frequency mitigation.

FIG. 43 depicts the method of adjusting or mitigating the frequency of raw status report generation 2236 employed by the SAR controller in accordance with the present invention. First, the rx raw report holdoff value N is selected 2242. Once N has been selected, the raw_rpt_hldoff count corresponding to N is loaded into the raw_rpt_hldoff counter 2243. When a raw rx cell data transfer request is detected 2244, raw report information—information necessary to create a raw rx cell status report—is copied into the raw report registers 2245. In this embodiment, the data transfer request is a DMA request and the raw report information includes the slot_tag associated with the rx slot to be filled and the raw bit. Once the rx DMA engine has processed the rx raw cell DMA request by transferring the raw cell data to the host system 2246, the raw_rpt_hldoff counter decrements by one 2248. If the raw_rpt_hldoff counter has expired 2250, the number of raw cells processed by the rx DMA engine since the last raw cell status report DMA is equal to the rx raw report holdoff value N. Accordingly, the raw report information in the raw report registers is DMA'd to the rx report queue 2252 and the process returns to step 2243. If the raw_rpt_hldoff counter has not expired at step 2250, then the process returns to step 2244.

Reporting raw cell slot consumption only on expiration of a an event counter or a timer means that not all consumed raw cell slots will be reported to the host system. Unlike AAL5 cell slots, raw cell slots are consumed (filled with data) in the order in which they were posted by the driver. Therefore, the driver can easily ascertain which of the raw cell slots have been consumed whenever a new raw cell status report appears in the rx report queue. To do so, the driver must keep track of the slot tags and virtual addresses of raw cell slots, and the order in which the rx slots were pushed onto the rx raw free slot FIFO. Additionally, the VC of the cell with which each free slot is filled must be extracted from the cell header. The mapped VC and other status information for the raw cell may be extracted from the raw cell status longword DMA'd with the cell.

Generally, interrupts are generated following certain DMA operations; however, the rate at which this type of interrupt may occur may be adjusted, as discussed in further detail following the description of the receive operation.

Whenever the driver is interrupted, it processes outstanding rx report queue entries by grouping all AAL5 and raw cell rx slot tags together by VC. Any AAL5 end-of-packet indications signify that a complete AAL5 packet has been received. Once the complete packet has been copied to user space or otherwise processed, all rx slots in which the packet resided may be reused.

RX Congestion Handling

When the SAR controller receives incoming rx cells, it writes the data in the rx cells into rx slots allocated via one of the three rx free slot FIFOs, depending on the VC associated with the each of the rx cells, and on whether or not the rx cells are OAM F5 rx cells. Each of the three rx free slot FIFOs can hold a maximum of 1K entries in 1K-VC mode. As an rx slot corresponding to a one of the free slot FIFOs is filled with data and its consumption reported to the host system through the rx report queue in host memory, the host system copies the data from the rx slot and reposts the rx slot to the free slot FIFO to which the reposted rx slot corresponds. Unfortunately, the host system usually empties and reposts rx slots on packet boundaries only. For raw cell slots, a "packet boundary" occurs at every rx slot. For AAL5 rx slots, packet boundaries occur every N rx slots, where N may be arbitrarily large, depending on the size of the incoming packets and the size of the rx slots. If many VCs are active simultaneously, with a high degree of interleaving on the physical link, and the packets being received are large in comparison to the size of the rx slots (such that a single packet occupies many slots), then one of the rx AAL5 free slot FIFOs may be depleted of slots. It is assumed that this situation would never occur with raw cell rx slots, which may be reclaimed by the host and re-posted to the free slot FIFO on a slot-by-slot basis.

The condition in which one or both of the rx AAL5 free slot FIFOs are becoming empty (less than 10% full, for example) is termed rx congestion. If either of the rx AAL5 free slot FIFOs (i.e., the big or small rx free slot FIFO) becomes completely empty, slot exhaustion is said to have occurred. If all of the rx slots from the rx AAL5 free slot FIFOs are occupied with partially assembled packets, then reassembly deadlock has occurred. At this point, one or more packets must be dropped as quickly and efficiently as possible, in order to reuse the rx slots occupied by those packets in order to complete reassembly on other packets.

The SAR controller implements a simple algorithm to avoid or minimize rx congestion. Again referring to FIG. 37, the slots_consumed (slots consumed) counter 2112, implemented as an 8-bit upward counting counter, is kept in each rx VC state table entry 2070 in the rx VC state table 150. Thus, each flow (e.g., VC) has an associated slots_consumed counter. Each slots_consumed counter 2112 is initialized to 0 by the driver at initialization time. Whenever a new rx slot is taken from one of the rx free slot FIFOs, the slots_consumed counter 2112 associated with the VC of the data to be placed in the rx slot is incremented by 1. Whenever the rx slot is returned to a corresponding one of the free slot FIFOs by the host system, the associated slots_consumed counter is decremented by 1. (Recall that the host reposts an rx slot to one of the free slot FIFOs by writing the address of the rx slot followed by a VC). It should be noted that the slots_consumed counters stick at 0 during decrementing, so any value may be written to the VC field of a write to the rx pending slot address spaces at initialization time (when all the rx_slots_consumed counters will be 0). It can be understood that the slots_consumed counter may be implemented as a downward counting counter as well.

Figure 44:
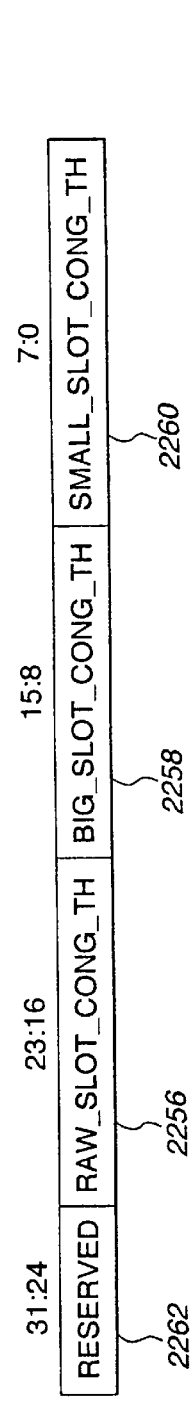
FIG. 44 shows the layout of the rx_slot_cong_th register in CSRs.

FIG. 44 illustrates the layout of an rx_slot_cong_th register (CSR) 2254 utilized by the rx congestion handling mechanism. The rx_slot_cong_th register 2254 stores three predetermined rx_congestion_threshold (or predetermined congestion threshold) values, each associated with a different one of the supported slot types. As already noted, each of the three free slot FIFOs corresponds to a different one of the slot types. Each predetermined rx congestion threshold is therefore associated with a free slot FIFO via the slot type to which the free slot FIFO corresponds. The predetermined rx congestion threshold values are written by the host system. As shown in the figure, the rx_slot_cong_th register 2254 includes a raw_slot_cong_th (raw slot congestion threshold) field 2256 for indicating the threshold value associated with the raw free slot FIFO. This field specifies the number of raw slots which a single VC may be allowed to consume before it is considered congested. Further included in the rx_slot_cong_th register 2254 is a big_slot_cong_th (big slot congestion threshold) field 2258 for indicating the threshold value associated with the big free slot FIFO and a small_slot_cong_th (small slot congestion threshold) field 2260 for indicating the threshold value associated with the small free slot FIFO. The big_slot_cong_th field 2258 specifies the number of big slots that a single VC may be allowed to consume before it is considered congested. The small_slot_cong_th field 2260 specifies the number of small slots that a single VC may be allowed to consume before it is considered congested. A value of 0 in any of the three fields disables the congestion detection and reporting mechanism. Lastly, the MSB in the register is a reserved space, indicated by reference number 2262. Thus, the three threshold values are FIFO-specific, but used across all VCs.

Figure 45:
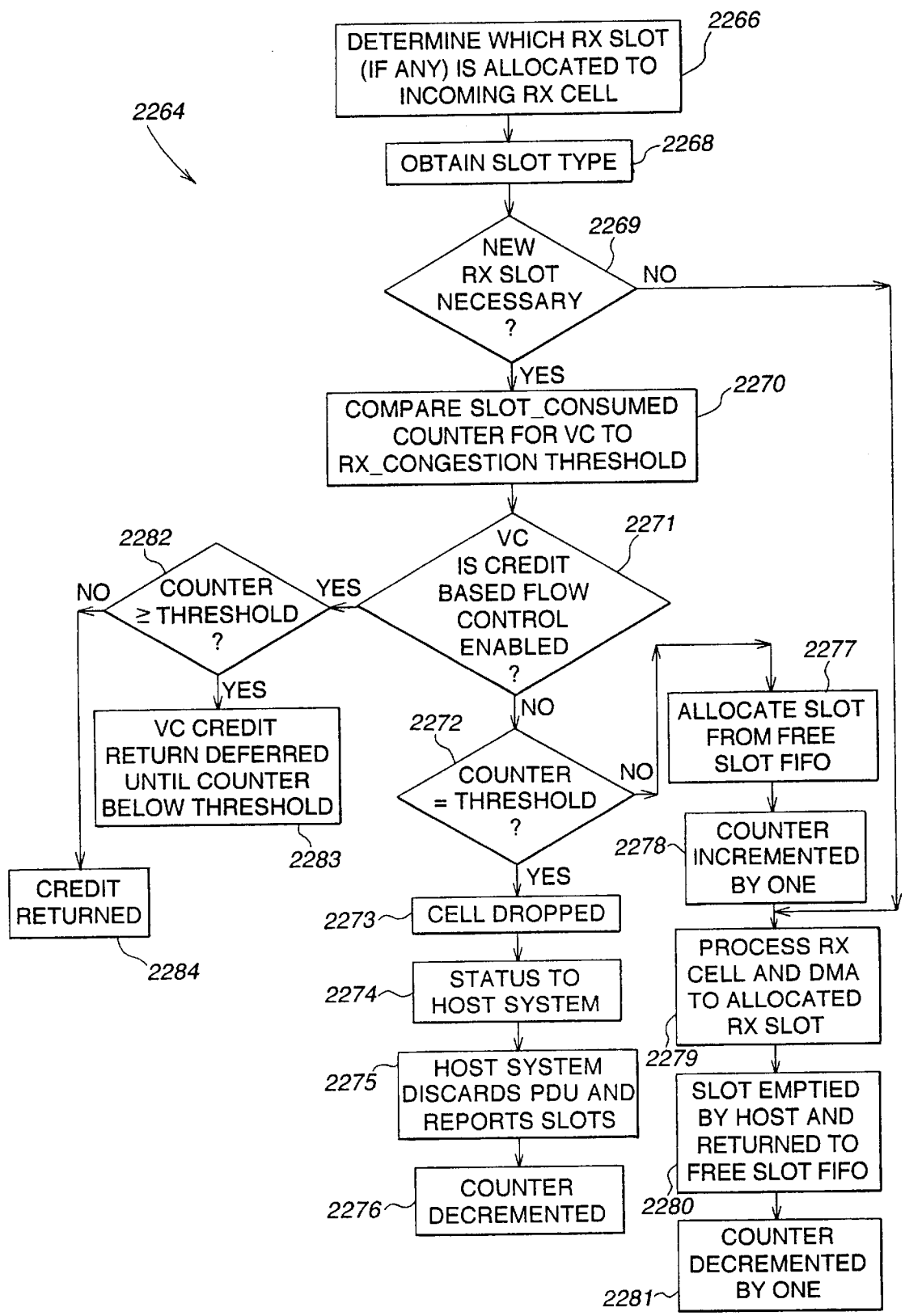
FIG. 45 is a flow diagram showing the rx congestion control method performed by the SAR controller in conjunction with the driver.

FIG. 45 depicts an rx congestion control method 2264. At initialization time, the driver sets or initializes the slots_consumed counters to zero. For an incoming rx cell received from the network, a determination is made as to which rx slot (if any) is allocated to receive this data 2266. It should be noted that this method, which addresses the problem of congestion, concerns the type of rx cell which uses an rx slot. Typically, rx cell types such as null cells, unopened- or unknown-VC cells, as well as some types of RM cells, are dropped. Returning to the method, the slot type is obtained from the rx VC state table entry corresponding to the VC on which the incoming rx cell is being carried 2268. The slot type indicates a corresponding one of the rx free slot FIFOs (the selected rx free slot FIFO) to be used for rx slot allocation. If an rx slot has already been allocated, the slot type is used to determine whether or not the rx slot has enough space available to receive the data. If the allocation of an rx slot is necessary 2269, the slots_consumed counter associated with the VC on which the rx cell is received is compared to the rx congestion threshold value associated with the slot type to which the free slot FIFO from which the new rx slot is to be taken 2270 corresponds. In a system which supports credit-based flow control, the method will determine if the VC is credit-based flow control enabled 2271. If it is not, and the VC is at threshold at this time (i.e., the slots_consumed counter is equal to the rx_congestion_threshold) 2272, the new rx cell is dropped 2273. It should be noted that, with brief reference to FIG. 37, the SAR controller sets the congestion flag 2104 in the rx VC state table entry 2070 when the VC is at threshold. The congestion flag is utilized to indicate congestion on RM cell turnaround, as later discussed.

When the SAR controller drops an rx cell for an AAL5 VC, it continues to drop cells (even if the VC becomes uncontested) until the next AAL5 packet boundary. Returning to FIG. 45, congestion detected on the VC is reported as soon as possible (at the next status report time) by setting the appropriate bit in the status field of the rx AAL5 report queue entry 2274. When the host system processes the report queue entry and sees that congestion on the VC has occurred, it knows that the VC has too many slots outstanding. In response, the host system discards the packet in which the status field bit is set, and reposts (via the rx slot descriptor, which indicates the VC with which the returned rx slots are associated) the outstanding rx slots to the appropriate rx free slot buffer as soon as possible 2275. Thus, the step of repasting the rx slot involves both returning the rx and indicating a VC as discussed. Repasting the rx slots will cause the slots_consumed counter to decrement for each rx slot returned 2276.

If the VC is not at the threshold at step 2272, then the rx slot is allocated from the corresponding (or selected) free slot FIFO 2277 and the associated slots_consumed counter is incremented by one 2278. The rx cell is processed by the rx cell processor and then DMA'd as processed to the rx slot by the rx DMA engine 2279. The step of processing the rx cell in this context and embodiment refers to the activities performed by the rx cell manager in preparing and writing the rx cell data along with associated SOD entries to the rx data FIFO as discussed earlier. In a general sense, it refers to any functions that may be performed in preparing and submitting the rx cell data to an rx data buffer after slot allocation has occurred and is not limited to a particular manner in which they are performed. Once the host system has recovered the rx slot, the freed rx slot is reposted to the corresponding free slot FIFO (the free slot FIFO from which it was taken) 2280 and the slots_consumed counter for the VC is decremented by one 2281.

Returning to step 2271, if the VC is enabled to be a credit-based flow control VC, and the counter is greater than or equal to the threshold value 2282, credit return for the VC is deferred until the slots_consumed counter drops below the associated predetermined congestion threshold value 2283. Typically, the SAR controller keeps a per-VC count of the credits pending return to a given VC. If the VC is already below threshold, then a credit is returned 2284.

The above-described mechanism thus ensures that a single or a few misbehaving VCs (which are either being serviced too slowly by the host system or which are carrying packets relatively large in comparison to the rx slot sizes) do not impact reassembly of more well-behaved VCs by consuming more than their fair share of "free" rx slots.

Even with the above mechanism, it is still possible for the SAR controller to encounter slot exhaustion and/or reassembly deadlock. For example, even if rx_congestion_threshold for a given rx free slot FIFO is set to a small value, such as 8, for 1K slots, as few as 128 VCs may still consume all available rx slots. Another mechanism is therefore provided to deal with this problem.

When the reception of a new rx cell requires that a new slot from one of the free slot FIFOs be taken, leaving that rx free slot FIFO empty, the rx cell is discarded and an interrupt request generated via interrupt block 96 (FIG. 4). For AAL5 slots, the rest of the packet to which the cell belonged is also discarded. No attempt is made to report the VC which caused the exhaustion of slots, since no VC is directly at fault (unless that VC is above the congestion_threshold for the free slot FIFO which it is using, in which case a status report for the VC will eventually indicate the condition).

Similarly, an interrupt request may be generated when the rx free slot from which a new slot has been allocated reaches a "low" threshold. Referring back to FIG. 42, the low thresholds for raw, small and big rx slots are contained in the SAR_Cntrl2 register 2230 in the raw_slot_low_th field 2239, the small_slot_low_th field 2238 and the big_slot_low_th field 2237, respectively. Each of these fields specifies the FIFO level (number of rx slots remaining) at which an interrupt request will be generated for the free slot FIFO to which it corresponds. In the embodiment described herein, the bits in these fields are decoded as follows: '00' indicates 8 slots, '01' indicated 16 slots, '10' indicates 32 slots and '11' indicates 64 slots.

These schemes do not attempt to differentiate between "important" VCs and "less important" VCs when dropping cells due to congestion. Instead, they report to the host system all VCs on which data was lost due to congestion whenever possible. It is then the responsibility of the host system to respond to the situation. For example, the host system may reduce the number of VCs active at one time, increase the rate at which it services receive traffic (if response time is the problem) or increase the size of the rx slots. Finally, it should be noted that there is no way for the host system to determine which VCs have lost data due to slot exhaustion.

AAL5 Reassembly Timeout

It is not guaranteed that every received AAL5 packet for which the SAR controller begins reassembly is completed. For example, if the cell containing the EOM bit for a packet on a given VC is lost due to data corruption by the network, reassembly of the packet will not complete until a subsequent packet is received on the VC. If no other packet is received on the VC for a long period of time, the rx slots being used to reassemble the first packet will go unrecovered for this time period, wasting host memory.

The SAR controller provides the capability to detect when no cells for an AAL5 packet being reassembled have been received for a programmable period of time. When this occurs, the packet will be "timed-out", the remainder of it (if received) will be dropped, and the event will be reported to the host through an rx status report.

A single global (across all VCs) reassembly timeout time may be specified through the Rx_RATO_Time field of the SAR_Cntrl2 register in CSRs. This field is 4-bits wide, and provides for timeout times in the range of 386 ms–2.895 s±193 ms. If the field is written with a 0, the timeout function for AAL5 packets is disabled. The OAM F5 cells received on a given VC are not considered part of an AAL5 packet being reassembled on the VC for purposes of reassembly timeout.

Interrupts

Figures 46, 46A:
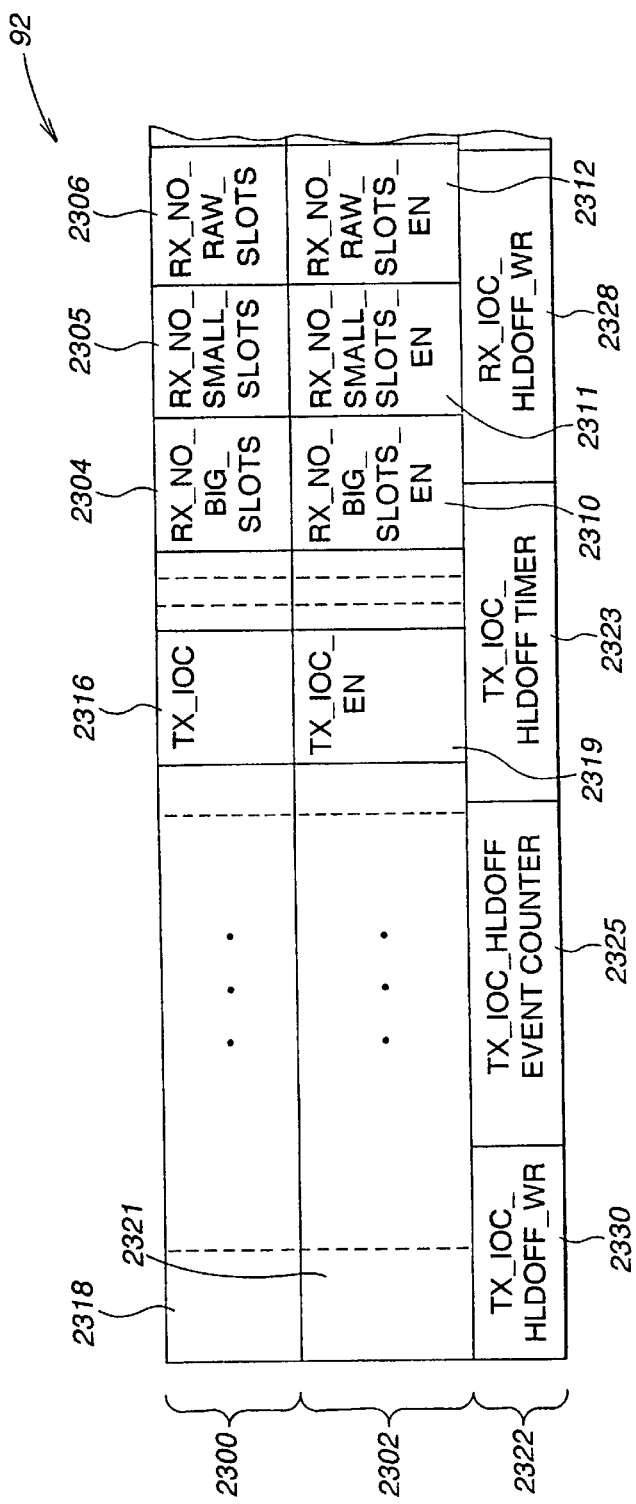
FIG. 46 depicts the layout of the INT CSRs from FIG. 4.
Figure 46B:
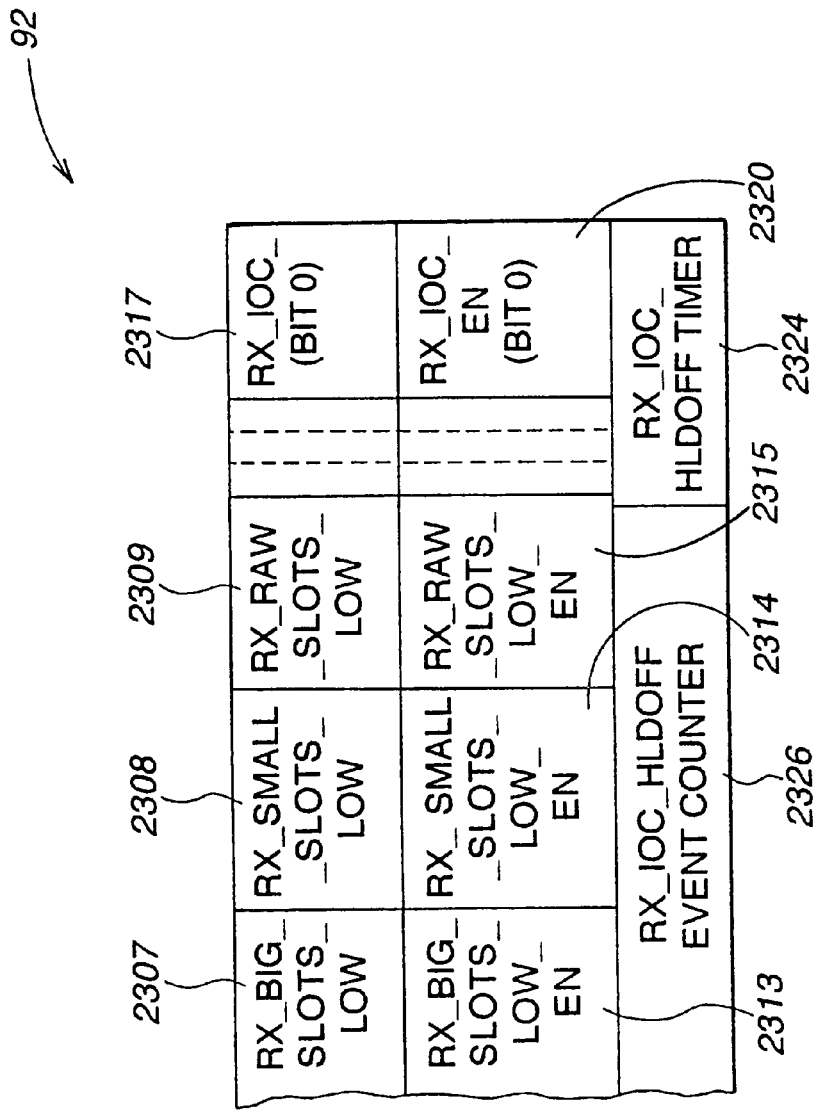

Overall interrupt control is provided by the interrupt block 96 (shown in FIG. 4). As shown in FIG. 46, the INT CSRs 92 include an interrupt status (Intr_Status) register 2300, which is used to indicate interrupt requests for supported interrupt sources. In the embodiment shown, each bit in the interrupt status register 2300 corresponds to a single interrupt source. When an interrupt event occurs, the bit corresponding to the appropriate interrupt source for the interrupt event in the interrupt status register is set by the SAR controller to indicate an interrupt request by the corresponding interrupt source. When the driver writes a one to the bit, interrupt signaling is prevented. A driver write of 0 to the bit will not modify its state.

Referring to FIG. 46, the INT CSRs further include an interrupt enable register (Intr_Enb) 2302. The interrupt enable register allows each of the interrupt sources in the interrupt status register to be selectively enabled or disabled. When any bit in the interrupt status register 2300 is set, an interrupt request can be generated on the system bus only if a corresponding bit in the interrupt enable register 2302 is set. If the corresponding bit in the interrupt enable register 2302 is cleared, no interrupt request will be generated even though the interrupt status bit may be set. Consequently, the driver may determine that an interrupt event has occurred by reading the interrupt status register 2300 even if the interrupt enable bit for the interrupt event has been cleared and the interrupt therefore disabled.

Interrupt status register 2300 includes several fields corresponding to congestion-related interrupt events. As shown, there is provided an rx_no_big_slots field 2304, an rx_no_small_slots field 2305 and an rx_no_raw_slots field 2306. The rx_no_big_slots field 2304 indicates that the rx big free slot FIFO is empty. This interrupt request is generated on reception of an rx cell which causes the FIFO to become empty and on reception of every rx cell for a big slot while the FIFO remains empty. The rx_no_small_slots field 2305 indicates that the rx small free slot FIFO is empty. This interrupt request is generated on reception of an rx cell which causes the FIFO to become empty and on reception of every rx cell for a small slot while the FIFO remains empty. The rx_no_raw_slots field 2306 indicates that the rx raw free slot FIFO is empty. This interrupt request is generated on reception of an rx cell which causes the FIFO to become empty and on reception of every rx cell for a raw slot while the FIFO remains empty.

Also included are rx_big_slots_low field 2307, rx_small_slots_low field 2308 and rx_raw_slots_low field 2309. These low threshold fields are associated with the rx big free slot FIFO, the rx small free slot FIFO and the rx raw free slot FIFO, respectively. For the free slot FIFO with which it is associated, each indicates that the FIFO has less than N slots available. The value of N is specified in the SAR_Cntrl2 register 2230 (FIG. 42). For the rx big free slot FIFO, it is provided by the big_slot_low_th field 2237. For rx small and raw free slot FIFOs, N is specified by the small_slot_low_th field 2238 and the raw_slot_low_th field 2239, respectively. When bits in these fields are set, an interrupt request is generated provided that a corresponding bit in the interrupt enable register is set. Rx_no_bit_slots_En field 2310 corresponds to 2304. Rx_no_small_slots_En field 2311 corresponds to 2305. Rx_no_raw_slots_En field 2312 corresponds to 2306. For the low threshold interrupts, an rx_big_slots_low_En field 2313, an rx_small_slots_low_En field 2314 and an rx_raw_slots_low_En field 2315 correspond to fields 2307–2309 in the interrupt status register 2300.

IOC Interrupts

There is one class of interrupt sources or interrupts available in the interrupt status register 2300 which is treated differently from other interrupt sources. Referring again to FIG. 46, that class is the IOC (Interrupt-On-Completion) class of interrupts and includes a tx_IOC interrupt 2316 and an rx_IOC interrupt 2317. Interrupt fields 2318 correspond to other types of interrupts not pertinent to an understanding of IOC interrupt request generation and thus not described herein. As mentioned above, each of these interrupts, tx_IOC and rx_IOC, has a corresponding mask bit interrupt enable register like all other interrupt sources. Shown in the interrupt enable register 2302 in FIG. 46 are a tx_IOC_en 2319 and an rx_IOC_en 2320 corresponding to the tx_IOC interrupt 2316 and the rx_IOC interrupt 2317, respectively. Enable fields 2321 corresponding to the interrupt fields represented by 2318, are not shown or discussed.

Unlike the other interrupt sources, the rate at which the Tx_IOC and the Rx_IOC interrupts are generated can be controlled by the driver. As shown in FIG. 46, an interrupt holdoff (Intr_Hldoff) register 2322 provides an additional level of interrupt control in the form of holdoff capability, which is both time and event-based. The holdoff capability frees up the host system, while ensuring that the host system will service interrupt requests when either a given period of time has elapsed or a given number of interrupt events has occurred.

As shown in FIG. 46, holdoff parameters are provided by a Tx_IOC_Hldoff (or tx IOC holdoff) timer 2323, which defines a tx_IOC holdoff interval (or tx IOC holdoff event-based count), the amount of time which must elapse since this field was last written before an interrupt request to the host system may occur. The tx_IOC holdoff interval may be programmed in the range 0–128 ms, in units of 503.04 $\mu s$, for this embodiment. An Rx_IOC_Hldoff (or rx holdoff) timer 2324 defines an rx_IOC holdoff interval, the amount of time which must elapse since this field was last written before an rx_IOC interrupt may be generated to the host system. In this embodiment, the rx_IOC holdoff interval may be programmed in the range 0–1 ms, in units of 3.93 $\mu s$.

Also provided is a Tx_IOC_hldoff (or tx IOC holdoff) event counter 2325, which may be programmed to count a tx_IOC event count, i.e., defined to count a number of events, in the range 0–127. An Tx_IOC "event" is the data transfer, a DMA in this embodiment, of any of the following: data from a tx EOP raw slot; data from a tx AAL5 slot for a streaming mode VC; data from a tx EOP AAL5 slot. The holdoff event counter is modified by one every time such a tx_IOC event occurs. In the preferred embodiment, it is a downward counting counter. Every time a tx_IOC event occurs, the tx_IOC_hldoff event counter 2325 decrements by 1. Alternatively, the counter could be implemented as an upward counting counter which increments upon the occurrence of a tx_IOC event. When the tx IOC holdoff event counter has "expired", i.e., counted (either upwardly or downwardly) a number of events equal to the tx_IOC event count, an interrupt request may be generated to the host system.

For a receive operation, there is provided an rx_IOC_Hldoff (or rx IOC holdoff) event counter 2326, which may be programmed to count an rx_IOC event count in the range 0–127. An Rx_IOC "event" is the receipt of a single rx raw cell, the consumption of an rx AAL5 EOP slot for a streaming mode VC, or the reception of a complete rx AAL5 packet. Every time an Rx_IOC event occurs, the rx_IOC_hldoff event counter 2326 is modified by one. In the preferred embodiment, the holdoff event counter is a downward counting counter which decrements each time an rx_IOC event occurs. Alternatively, this counter could be implemented as an upward counting counter which increments upon the occurrence of an rx_IOC event. When the rx_IOC_hldoff event counter 2326 has expired, i.e., counted (either upwardly or downwardly) a number of events equal to the rx_IOC event count, an interrupt request may be generated to the host system. Therefore, when either a holdoff timer or event counter requirement is satisfied for a given IOC interrupt, an interrupt request may be generated to the host system via the system bus.

The counting logic implementing the event counter or timer functions is well known and thus not described. The counters and timers must be retriggered once an interrupt request has been sent and serviced. In this embodiment, the timers and event counters are not of the self-triggering variety. Once they have expired, they must be re-loaded by the driver with new holdoff parameters (i.e., a new count or holdoff interval) as appropriate. The new parameters may be the same values as the previous parameters or may be new values to reflect another adjustment deemed necessary to improve the efficiency of host system utilization.

It is important to understand that receive raw cells are counted by the Rx_IOC_Hldoff event counter whether or not they result in status reports. Accordingly, the Rx_IOC_Hldoff event counter should be programmed with a count greater than or equal to that specified by the Rx_Raw_Report_Holdoff field to minimize spurious interrupts.

Still referring to FIG. 46, an rx_IOC_hldoff_wr field 2328 and a tx_IOC_hldoff_wr field 2330 control whether or not the rx_IOC and tx_IOC holdoff parameters, respectively, may be written. These fields must be set to 1 to enable a write of the corresponding holdoff parameters.

Figure 47:
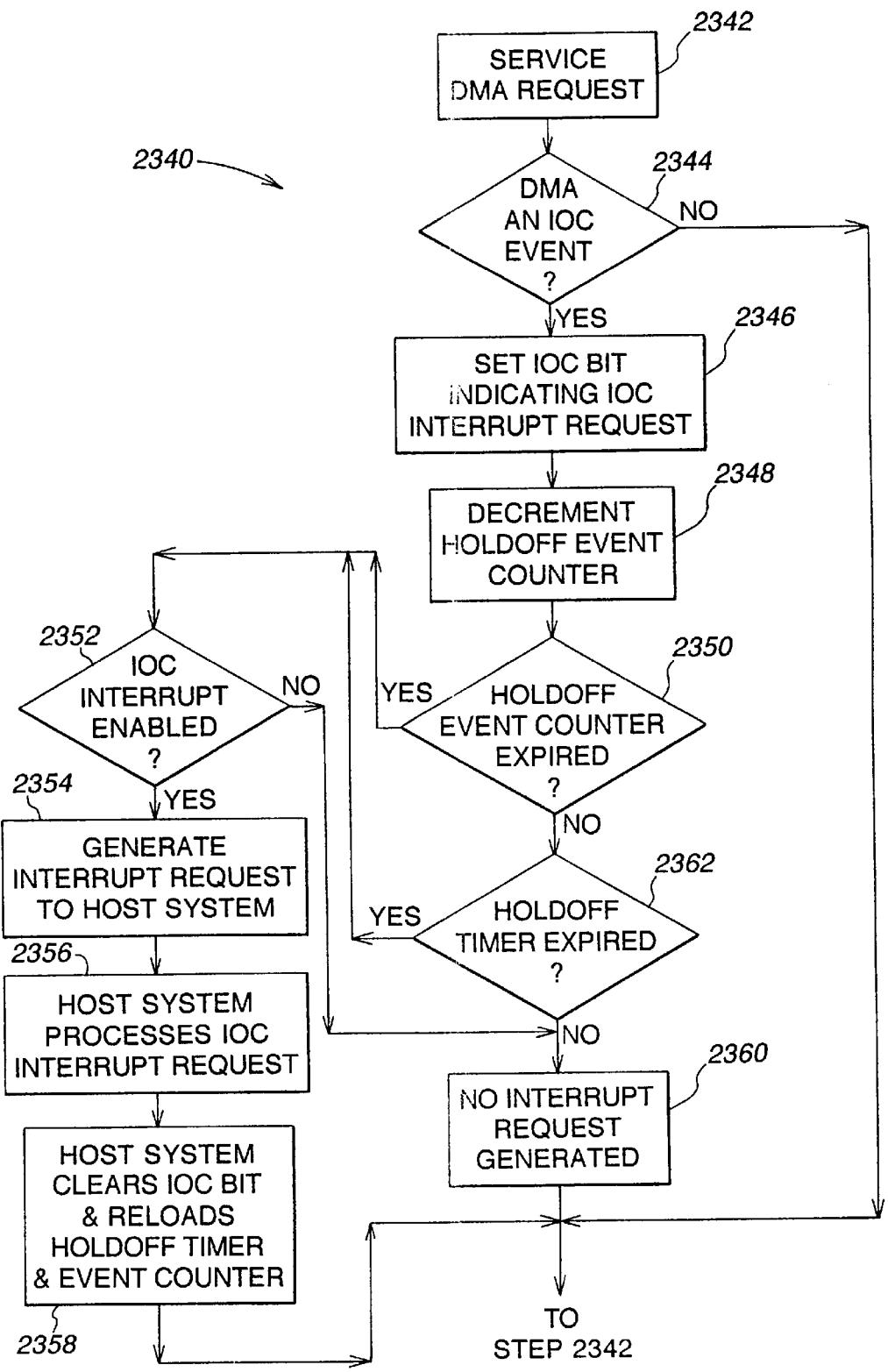
FIG. 47 is a flow diagram of the interrupt-on-completion interrupt request frequency mitigation method.

Referring now to FIG. 47, there is shown a flow diagram depicting one embodiment of the interrupt frequency mitigation method 2340 in accordance with the present invention. The method proceeds with reference to either a transmit or receive operation, so "IOC" represents either "rx_IOC" or "tx_IOC", "holdoff" is either "rx IOC holdoff" or "tx IOC holdoff"). Further, although "DMA" is described, any type of data transfer can be used. At step 2342, a DMA operation is performed. After data has been DMA'd, the SAR controller determines whether the DMA operation is an IOC event 2344. Note that this is performed by the tx data DMA FSM in the transmit direction and the rx DMA engine in the receive direction. These units will read the INT field in the DMA request to determine if the Int bit is set, or, in the case of raw rx cells, the rx DMA engine reads the RAW bit to determine if a raw cell DMA request is being serviced. If the DMA operation qualifies as an IOC event at step 2344, the IOC bit is set 2346 (i.e., the rx DMA engine sets the Rx_IOC bit or the tx data DMA FSM sets the tx_IOC bit) and the holdoff event counter for the IOC is decremented 2348. If the holdoff event counter expires 2350 as a result of step 2348, and the IOC interrupt is enabled 2352 as indicated by the setting of the IOC_en field by the driver, the interrupt logic causes the assertion of an interrupt request to the host system 2354, which processes the IOC interrupt request 2356. Once the host system has processed the IOC interrupt request, it clears the IOC bit. Lastly, the holdoff timer and event counters are retriggered 2358, and the method subsequently returns to step 2342. If the IOC interrupt is not enabled at step 2352, then the IOC interrupt request is masked off 2360 and the process goes to step 2342. Returning to step 2350, if the holdoff event counter has not reached zero, but the holdoff timer for timeout has expired 2362, the method performs the step 2352 as described above. If the holdoff timer has not yet reached zero at step 2362, step 2360 is performed as above-described. If the DMA operation is not an IOC event at step 2344, the method goes directly to step 2342 as described above.

Figure 48:
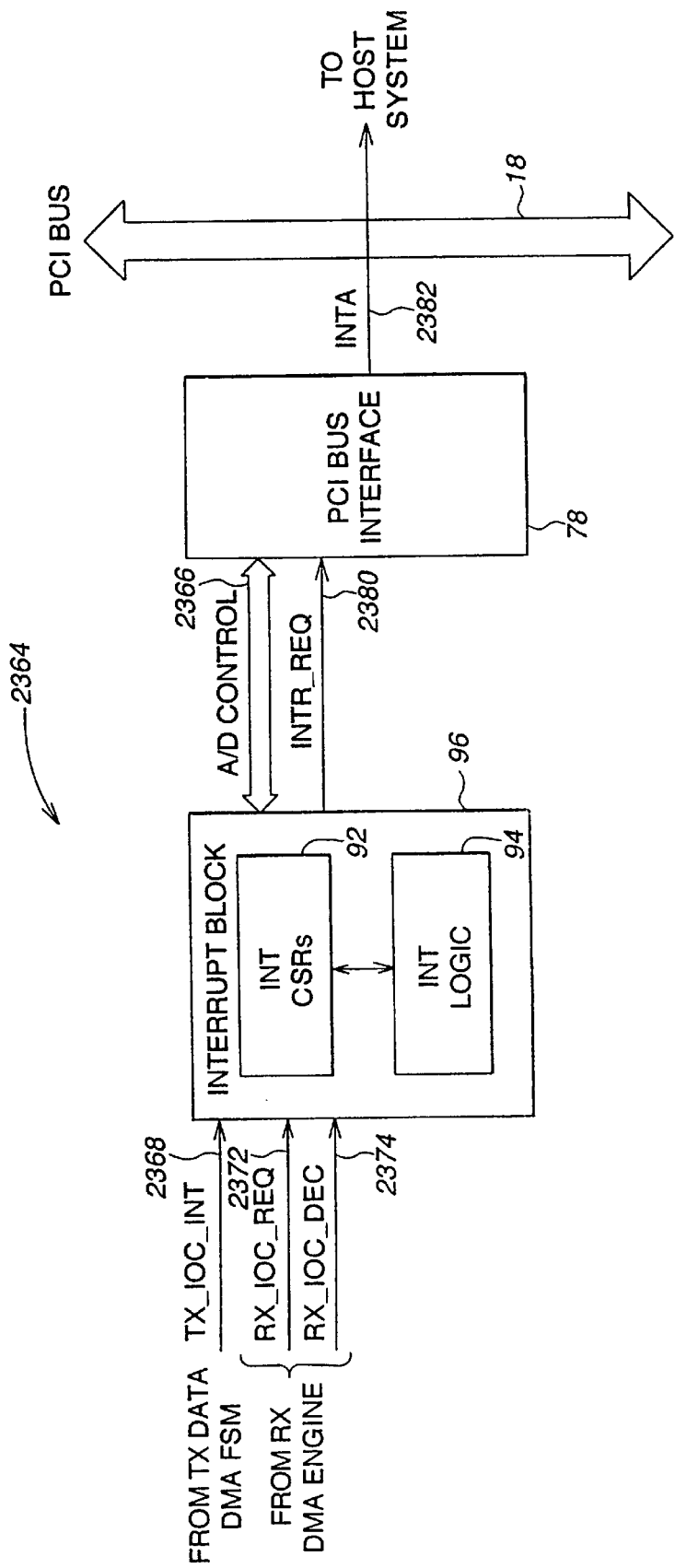
FIG. 48 illustrates the interrupt block and the PCI bus interface signals involved in IOC interrupt request generation.

The interrupt generation "path" 2364 is illustrated in the block diagram of FIG. 48. As shown, the interrupt block 96 has a number of data and addresses lines, as well as controls signals by which the driver can set and read the INT CSRs via the PCI bus interface. These lines are indicated by 2366. Additional inputs are received from the tx data DMA FSM and the rx DMA engine. Via signals tx_IOC_int 2368, the tx data DMA FSM can assert the tx_IOC interrupt request and decrement the tx_IOC_hldoff event counter as needed. Via signals rx_IOC_req 2372 and rx_IOC_dec 2374, the rx DMA engine can assert the rx_IOC interrupt request and decrement the rx_IOC_hldoff event counter, respectively. The interrupt logic 94 is coupled to the INT CSRs 92 and serves to assert the int_req signal 2380 to the PCI bus interface 78, which in turn asserts low an interrupt request signal, INTA 2382, one of the PCI bus-defined interrupt requests, on the PCI bus 18 during a transmit operation when a) either the tx_IOC_hldoff timer or tx_IOC_hldoff event counter has timed out and thus asserted a timeout signal to the INT logic; b) the tx_IOC interrupt bit is set; and c) the corresponding tx_IOC_en bit is set. If any of the three conditions (a)–(c) is not met, intr_req is masked off and the INTA interrupt request is not asserted. If all of the three conditions is met, INTA interrupt request is asserted. Similarly, the INT logic 94 asserts the intr_req signal to the PCI bus interface, which asserts INTA, during a receive operation when a) either the rx_IOC_hldoff timer or rx_IOC_hldoff event counter has timed out and thus asserted a timeout signal to the INT logic; b) the rx_IOC interrupt bit is set; and c) the corresponding rx_IOC_en bit is set. If any of the three conditions in not met, the INTA interrupt request is not asserted. The assertion of INTA on the PCI bus indicates to the host that the adapter is requesting an interrupt from the host. Once the INTA signal is asserted, it remains asserted until the driver clears the pending request. When the request is cleared, the SAR controller deasserts the INTA signal.

Although the above interrupt frequency mitigation is described with respect to IOC interrupts, it need not be so limited. It can be applied to any type of interrupt.

It can be seen from the foregoing that the interrupt frequency mitigation functions in a manner that is responsive to both latency and workload concerns. The holdoff event counter enables the host system to operate more efficiently by mitigating the frequency of interrupts without allowing the host system to fall too far behind in its work. The holdoff timer also mitigates the rate at which interrupts may occur, but serves to bound the latency associated with the processing of reports. Thus, a balance that is both time- and event-sensitive is achieved.

It can be further seen that the mitigation of the frequency of tx raw cell status reports and interrupts may be combined. For example, if a tx raw cell status report is allowed to occur only every N raw cell rx slots, then that status report is counted as an interrupt event, or more particularly, a tx IOC event, and an interrupt request is generated for every X events (or X*N raw cell rx slots).

In reference to the above description, it can be understood that the network node operates in a manner that obviates the need for control reads on the system bus for the normal flow of data in both the transmit and receive directions. The host system writes control information in the form of tx and rx slot descriptors to the adapter. The adapter writes control information in the form of status reports to the host. Therefore, by reducing the system bus bandwidth ordinarily consumed by control reads, overall throughput is greatly improved. In the event that an exception condition occurs, the host system may need to read the CSRs. Because interrupt rates can be mitigated, however, this type of control read should be fairly infrequent.

Figure 49:
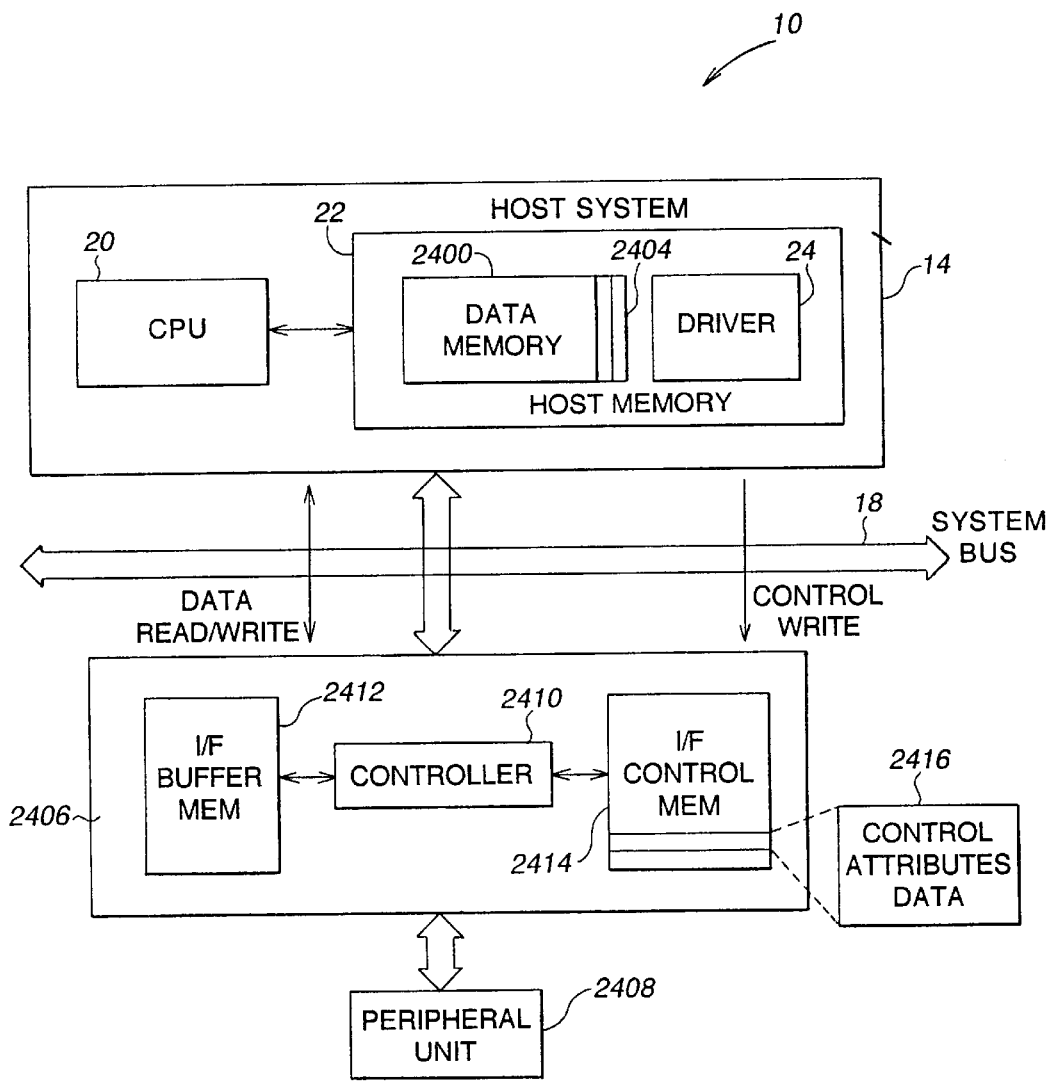
FIG. 49 shows the system from FIG. 1 having a host system coupled to a peripheral unit by an interface.

This control read avoidance mechanism need not be limited to an ATM network node or even a network node. Alternative system configurations and system operations embodying the mechanism are suggested by the block diagram shown in FIG. 49, which depicts the system 10 having the host system 14 connected to the system bus 18 as shown in FIG. 1. Here, the host system 14 includes, in relevant part, the CPU 20 coupled to the host memory 22, and the host memory includes the driver 24 and a data memory 2400. The data memory is divided into memory portions 2404 (e.g., blocks) of the same or varying sizes and may be used to store outgoing and incoming data. Also connected to the system bus 18 in this alternative system configuration is an interface 2406, which couples the host system 14 as shown in FIG. 49 to a peripheral unit 2408. The interface includes a controller 2410, an interface (I/F) buffer memory 2412 and an interface (I/F) control memory 2414. The controller is connected to both the I/F buffer memory and the I/F control memory. The I/F control memory includes a number of locations corresponding to and storing control information in the form of control attributes data 2416 written by the host system to the interface.

The data memory stores data to be transferred to the interface by the host system. The driver 24 writes to the interface 2406 via the system bus 18 the control information or control attributes data 2416 corresponding to each data memory portion 2404 occupied by data in the host memory, each of the control attributes data being placed in a separate one of the locations in the I/F control memory 2414. The control attributes data may include starting addresses associated with the data memory portion to which the control attributes data corresponds. The controller 2410 reads the control attributes data associated with the data to be read from the host system, then copies and processes the data according to the control attributes data.

The interface 2406 is intended to represent any number of interfaces which typically require the transfer of control information during a data transfer operation. Similarly, the peripheral unit 2408 is intended to represent any type of peripheral unit being served by such an interface.

By way of an example, the interface 2406 may be a video adapter and the peripheral unit 2408 a display memory. In this type of a system, the data memory may serve as a screen memory for storing character codes to be read by the controller on the video adapter. The control attributes data written by the host system to the I/F control memory may include character attributes data needed by the controller 2410 in processing the character code.

Alternatively, the interface 2406 could also be a mass storage system adapter and the peripheral unit 2408 a mass storage system. In this example, the control attributes data 2416 might include addresses and other types of control information data, e.g., metadata. Unlike the video system, the host system in this example would write the interface with such control information corresponding to data memory portions holding data to be transferred to the adapter or data memory portions to receive data from the interface, where the interface has received data from the mass storage system to be transferred to the microprocessor system.

In yet another alternative, the peripheral unit 2408 is a network bus and the interface 2406 a network adapter. The operation of this system is similar to the previous example in that the host system is also providing the interface with control information associated with the data memory portions to receive incoming data. In this type of embodiment, however, the incoming and outgoing data is packet data.

Backward RM Cells

Figure 50:
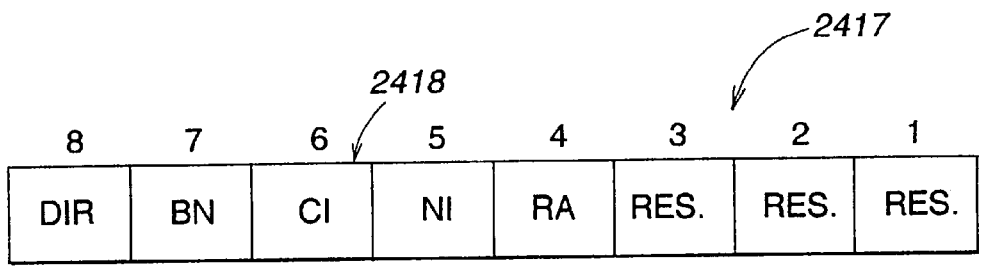
FIG. 50 depicts the format of the message type field of an RM cell.

The ATM Forum Traffic Management Specification specifies RM cells used for ABR flow control. Following the ATM header as shown in FIG. 2, an RM cell has a message type field 2417 as shown in FIG. 50. Included in this message type field is a congestion indication (CI) bit 2418. The CI bit is set to cause the source of an RM cell to decrease the ACR for the VC with which the RM cell is associated. In compliance with the ATM Forum Traffic Management Specification, the CI bit is to be handled in the following manner for backwards RM cells:

1) when a data cell is received on a VC, its EFCI indicator is saved as the EFCI state for that VC. Whenever the EFCI state for a VC is set, the backward RM cell should be sent with its CI bit set (=1). The EFCI state for the VC should then be reset.

2) when a forward RM cell is received, the cell is returned ("turned around") to the source by sending a backward RM cell. The CI field, if set, is to remain unchanged.

3) When internal congestion is detected at a node (i.e. an adapter), that node may set the CI bit in any backward RM cells sent.

Figure 51:
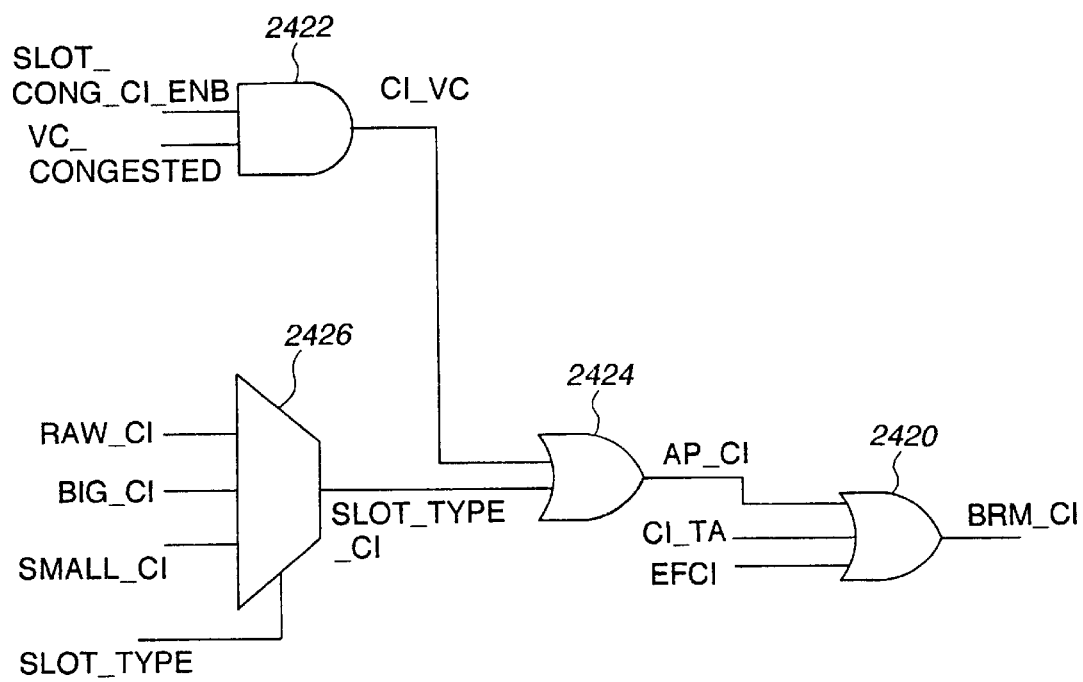
FIG. 51 is a logical representation of the generation of the CI bit in a backwards RM cell header.

Referring now to FIG. 51, there is shown a logical representation of the function undertaken by the RM cell request generator 435 portion of the tx rate scheduler 120 to generate the CI bit for a backward RM cell. Accordingly, the CI bit in a backward RM cell is set when the signal BRM__CI is set. This signal is set when either the CI__TA bit is set, indicating the receipt of a forward RM cell with its CI bit set (point 2 above), or when the EFCI bit is set, indicating reception of a data cell with its EFCI bit set (point 1 above), or when an application specific CI bit AP__CI is set ('or' gate 2420). The AP__CI bit is set when internal congestion has been detected by the SAR controller 62 (point 3 above).

Internal congestion is indicated on either a VC specific basis or on a receive slot type basis. First of all, recall that a VC__congestion bit 2104 is set in rx VC state for a VC when it is determined that the given VC has consumed receive slots beyond a threshold value (FIG. 37). Referring now to FIG. 42, the control register 2230 shown contains a slot__cong__CI__enb bit 2233. This bit is set by the driver 24 when it is desirable to indicate congestion on a per-VC basis; i.e. when a particular VC has consumed receive slots beyond a threshold value. When the slot__cong__CI__enb bit is set, and when the congestion bit for a given VC is set in rx VC state for the VC, a CI__VC bit is set ('and' function 2422) which causes in turn the assertion of the AP__CI bit ('or' function 2424), and thus the assertion of the BRM__CI bit. Thus, any backward RM cell sent on that VC will be sent with its CI bit set.

Second of all, the control register 2230 includes Raw__CI__enb 2236, Big__CI__enb 2234, and Small__CI__enb 2235 bits which can be set by the driver 24. In the event that any of these bits is set when an RM cell is received and associated with the corresponding slot type, a slot__type__CI bit is set (mux function 2426), causing the AP__CI bit to be asserted. Backward RM cells for all VCs associated with receive slots of that type are then sent with their CI bits set.

This functionality can be useful, for example, when the driver detects that the small__slot__low__th bit in the register 2230 has been set by the reassembly engine 90. In this case, the driver can choose to set the Small_CI bit in the control register 2230. All RM cells thereafter received on VCs associated with small receive slots will then be turned around and transmitted with their CI bits set, thereby easing congestion in the small receive slots.

Referring back to FIG. 35, rx cell manager 2055 generates the BRM CI bit as previously described, making it available along with other BRM cell header fields in the local memory 76 to be accessed by the tx cell FSM 130 when building an RM cell header (FIG. 28c steps 902–916).

Note that the technique previously described can be useful in a general way as applied to connection-oriented networks employing congestion control schemes, such as forward explicit congestion notification (FECN) or backward explicit congestion notification (BECN) schemes. In general, where there are provided slots for receiving data units, a slot_type congestion signal is generated for indicating that the number of slots available for receiving data units is below a threshold limit. A CI_VC signal is further generated for indicating that the buffer space consumed by cells received on a particular virtual circuit (VC) has passed a threshold value. A congestion indication bit in a data unit to be transmitted when either the slot_type congestion signal or the CI_VC signals are asserted.

It is apparent that within the scope of the invention, modifications and different arrangements may be made other than as disclosed herein. The present disclosure is merely illustrious, the invention comprehending all variations thereof.

What is claimed is:

1. An apparatus for scheduling transmission of data units, the scheduling apparatus comprising:
   a schedule table having a plurality of entries, each entry representing a time at which a data unit is to be transmitted, each entry pointing to a data structure of data units scheduled for transmission at the time represented by the entry; and
   a scheduler operative such that when a particular data unit is to be a first data unit transmitted at a particular time, the scheduler changes the schedule table entry representing the particular time such that the entry points to the particular data unit and such that the particular data unit becomes a first data unit in a data structure scheduled to be transmitted at the particular time.

2. The apparatus of claim 1, wherein:
   each entry of the schedule table includes:
      a head pointer pointing to a beginning of a list of data units scheduled for transmission at the time represented by the entry, and
      a tail pointer pointing to an end of the list of data units; and
   the scheduler is operative such that when a particular data unit is to be a first data unit transmitted at a particular time, the scheduler changes the head pointer of the schedule table entry representing the particular time such that the head pointer points to the particular data unit, and such that the particular data unit becomes a beginning of a list of data units scheduled to be transmitted at the particular time.

3. An apparatus for scheduling transmission of cells for different virtual circuits from a network node, the scheduling apparatus comprising:
   a schedule table having a plurality of entries each entry representing a time at which a cell is to be transmitted, each entry including:
      a head pointer pointing to a beginning of a list of virtual circuit numbers, each virtual circuit number representing a virtual circuit having cells scheduled for transmission at the time represented by the entry and
      a tail pointer pointing to an end of the list; and
   a scheduler operative such that when a particular virtual circuit has a cell that is to be the first cell transmitted at a particular time, the scheduler adjusts the head pointer of the schedule table entry representing the particular time such that the head pointer points to the virtual circuit number representing the particular virtual circuit, and such that the virtual circuit number becomes a beginning of a list of virtual circuit numbers that represent virtual circuits with cells scheduled to be transmitted at the particular time.

4. A method of scheduling transmission of data units, the method comprising:
   storing entries in a schedule table, each entry representing a time at which a data unit is to be transmitted, each entry pointing to a data structure of data units scheduled for transmission at the time represented by the entry; and
   when a particular data unit is to be a first data unit transmitted at a particular time, changing the schedule table entry representing said particular time such that the entry points to the particular data unit such that the particular data unit becomes a first data unit of a data structure scheduled to be transmitted at the particular time.

5. The method of claim 4, wherein:
   each entry in the schedule table includes:
      a head pointer pointing to a beginning of a list of data units scheduled for transmission at the time represented by the entry, and
      a tail pointer pointing to an end of the list of data units; and
   the method further comprising, when a data unit is to be the first data unit transmitted at a particular time, changing the head pointer of the schedule table entry representing the particular time such that the head pointer points to the particular data unit, and such that the particular data unit becomes a beginning of a list of data units scheduled to be transmitted at the particular time.

6. A method of scheduling transmission of cells for different virtual circuits from a network node, the method comprising:
   storing entries in a schedule table, each entry representing a time at which a cell is to be transmitted, each entry including:
      a head pointer pointing to a beginning of a list of virtual circuit numbers, each virtual circuit number representing a virtual circuit having cells scheduled for transmission at the time represented by the entry, and
      a tail pointer pointing to an end of the list; and
   when a particular virtual circuit has a cell that is to be the first cell transmitted at a particular time, adjusting the head pointer of the schedule table entry representing the particular time such that the head pointer points to the virtual circuit number representing the particular virtual circuit, and such that the virtual circuit number becomes a beginning of a list of virtual circuit numbers that represent virtual circuits with cells scheduled to be transmitted at the particular time.

7. The apparatus of claim 1, wherein the apparatus is an asynchronous transfer mode adapter.

8. The apparatus of claim 1, wherein each entry of the schedule table defines a linked list.

9. The apparatus of claim 1, further comprising:
   a work list having a first entry that includes a work list head pointer and a work list tail pointer, the first entry defining an ordered list of data units scheduled for transmission; and
   wherein the scheduler is operative to append a schedule table entry to a tail of the work list, such that the data structure of data units scheduled for transmission at the time represented by the schedule table entry are at an end of the ordered list.

10. The apparatus of claim 2, wherein each entry of the schedule table further includes a valid bit, wherein when the valid bit of an entry is set to a first logic level, the entry is valid.

11. The apparatus of claim 3, wherein the different virtual circuits are of a variable bit rate class.

12. The method of claim 4, wherein each entry of the schedule table defines a linked list.

13. The method of claim 4, further comprising:
   storing a first entry in a work list, the first entry including a work list head pointer and a work list tail pointer, the first entry defining an ordered list of data units scheduled for transmission; and
   appending a schedule table entry to a tail of the work list, such that the data structure of data units scheduled for transmission at the time represented by the schedule table entry are at an end of the ordered list.

14. The method of claim 5, wherein each entry of the schedule table further includes a valid bit, wherein when the valid bit of an entry is set to a first logic level, the entry is valid.

15. The method of claim 6, wherein the different virtual circuits are of a variable bit rate class.

16. The apparatus of claim 3, further comprising:
   a work list having a first entry that includes a work list head pointer and a work list tail pointer, the first entry defining an ordered list of virtual circuit numbers representing virtual circuits having cells scheduled for transmission; and
   wherein the scheduler is operative to append a schedule table entry to a tail of the work list, such that the list of virtual circuit numbers representing virtual circuits having cells scheduled for transmission at the time represented by the schedule table entry are at an end of the ordered list.

17. The method of claim 6, further comprising:
   storing a first entry in a work list, the first entry including a work list head pointer and a work list tail pointer, the first entry defining an ordered list of virtual circuit numbers representing virtual circuits having cells scheduled for transmission; and
   appending a schedule table entry to a tail of the work list, such that the list of virtual circuit numbers representing virtual circuits having cells scheduled for transmission at the time represented by the schedule table entry are at an end of the ordered list.

* * * * *